United States Patent
Choi et al.

(10) Patent No.: US 12,433,958 B2
(45) Date of Patent: Oct. 7, 2025

(54) SELF-THERAPEUTIC NANOPARTICLE FOR ENHANCED TOPICAL DELIVERY TO SKIN KERATINOCYTES AND TREATING SKIN INFLAMMATION

(71) Applicant: The Chinese University of Hong Kong, Hong Kong (CN)

(72) Inventors: Chung Hang Jonathan Choi, Hong Kong (CN); Ruifang Han, Henan (CN); Lok Wai Cola Ho, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 24 days.

(21) Appl. No.: 17/652,559

(22) Filed: Feb. 25, 2022

(65) Prior Publication Data
US 2023/0048258 A1 Feb. 16, 2023

Related U.S. Application Data

(60) Provisional application No. 63/153,680, filed on Feb. 25, 2021.

(51) Int. Cl.
*A61K 47/69* (2017.01)
*A61K 9/00* (2006.01)
*A61K 47/60* (2017.01)

(52) U.S. Cl.
CPC ........ *A61K 47/6929* (2017.08); *A61K 9/0014* (2013.01); *A61K 47/60* (2017.08)

(58) Field of Classification Search
None
See application file for complete search history.

(56) References Cited

U.S. PATENT DOCUMENTS

| | | |
|---|---|---|
| 2010/0136124 A1 | 6/2010 | Prestidge et al. |
| 2011/0020457 A1 | 1/2011 | Panyam et al. |
| 2014/0170229 A1 | 6/2014 | Haddadi et al. |
| 2014/0329913 A1* | 11/2014 | Hanes .................. A61K 9/146 514/772.1 |

FOREIGN PATENT DOCUMENTS

| | | |
|---|---|---|
| CN | 102342914 A | 2/2012 |
| KR | 10-2019-0048848 A | 5/2019 |
| WO | 2020/120787 A1 | 6/2020 |
| WO | WO 2020120787 * | 6/2020 |
| WO | 2020/241925 A1 | 12/2020 |

OTHER PUBLICATIONS

Ho et al. "Effect of Alkylation on the Cellular Uptake of Polyethylene Glycol-Coated Gold Nanoparticles".*

Nemati, H., et al., "Using siRNA-based spherical nucleic acid nanoparticle conjugates for gene regulation in psoriasis," Journal of Controlled Release, 2017, 268:259-268.
Polte, J., et al., "Mechanism of Gold Nanoparticle Formation in the Classical Citrate Synthesis Method Derived from Coupled In Situ XANES and SAXS Evaluation," J. Am. Chem. Soc., 2010, 132(4):1296-1301.
Sapino, S., et al., "Mesoporous Silica Nanoparticles as a Promising Skin Delivery System for Methotrexate," International Journal of Pharmaceutics, 2017, pp. 1-33.
Roenigk, H.H., et al., "Methotrexate in psoriasis: Revised guidelines," Journal of the American Academy of Dermatology, 1988, 19(1):145-156.
Ferreira, M., et al., "Methotrexate loaded lipid nanoparticles for topical management of skin-related diseases: Design, characterization and skin permeation potential," International Journal of Pharmaceutics, 2016, pp. 1-26.
Kohler, N., et al., "Methotrexate-Modified Superparamagnetic Nanoparticles and Their Intracellular Uptake into Human Cancer Cells," Langmuir, 2005, 21(19):8858-8864.
Vogt, A., et al., "Nanocarriers for drug delivery into and through the skin—Do existing technologies match clinical challenges?" Journal of Controlled Release, 2016, 242:3-15.
Ho, L.W.C., et al., "Nano-Cell Interactions of Non-Cationic Bionanomaterials," Accounts of Chemical Research, 2019, 52:1519-1530.
Kim, J.Y., et al., "Nanoparticle-Assisted Transcutaneous Delivery of a Signal Transducer and Activator of Transcription 3-Inhibiting Peptide Ameliorates Psoriasis-like Skin Inflammation," ACS Nano, 2018, 12:6904-6916.
Ozcan, A., et al., "Nanoparticle-Coupled Topical Methotrexate Can Normalize Immune Responses and Induce Tissue Remodeling in Psoriasis," Journal of Investigative Dermatology, 2019, pp. 1-12, supplemental pp. 12.e1-12.e8.
Filon, F.L., et al., "Nanoparticles skin absorption: New aspects for a safety profile evaluation," Regulatory Toxicology and Pharmacology, 2015, 72:310-322.
Viegas, J.S.R., et al., "Nanostructured lipid carrier co-delivering tacrolimus and TNF-alpha siRNA as an innovate approach to psoriasis," Drug Delivery and Translational Research, 2020, pp. 1-15.
Pariser, D.M., et al., "National Psoriasis Foundation Clinical Consensus on Disease Severity," Arch Dermatol, 2007, 143:239-242.

(Continued)

*Primary Examiner* — Danah Al-Awadi
(74) *Attorney, Agent, or Firm* — Saliwanchik, Lloyd & Eisenschenk

(57) ABSTRACT

A composition of an anti-psoriatic drug and methods of applying the anti-psoriatic drug for transdermal delivery of nanoparticles and entry into skin cells are provided. The composition of the anti-psoriatic drug includes a core having at least one gold nanoparticle, a shell of polyethylene glycol (PEG) strands conjugated to the core, and a plurality of alkyl groups conjugated to the shell of PEG strands. Moreover, a chain length of the plurality of alkyl groups, chain loading of the plurality of alkyl groups, or a diameter of the core is configured to optimize a distribution of the composition in the skin cells. The distribution may include skin permeability or an entry into keratinocytes. Further, methods of modulating effectiveness of the anti-psoriatic drug for inhibiting development of a psoriasis phenotype or for treatment of the psoriasis phenotype are provided.

7 Claims, 69 Drawing Sheets

Specification includes a Sequence Listing.

(56) References Cited

OTHER PUBLICATIONS

Mehul, B., et al., "Non-invasive proteome analysis of psoriatic stratum corneum reflects pathophysiological pathways and is useful for drug profiling," Br. J. Dermatol., 2017, 177:470-488.

Griffiths, C.E., et al., "Pathogenesis and clinical features of psoriasis," Lancet, 2007, 370:263-271.

Lowes, M.A., et al., "Pathogenesis and therapy of psoriasis," Nature, 2007, 445:866-873.

Ogawa, E., et al., "Pathogenesis of psoriasis and development of treatment," The Journal of Dermatology, 2018, 45:264-272.

Lee, C.-H., et al., "Pathophysiology of chemokines and chemokine receptors in dermatological science: a focus on psoriasis and cutaneous T-cell lymphoma," Dermatologica Sinica, 2012, 30:128-135.

Schuck, S., et al., "Polarized sorting in epithelial cells: raft clustering and the biogenesis of the apical membrane," Journal of Cell Science, 117(25):5955-5964.

Wong, L.S., et al., "Potential for methotrexate exposure through contamination during parenteral use as an immunosuppressant," Internal Medicine Journal, 2009, 39:379-383.

Boehncke, W.-H., et al., "Psoriasis," Lancet, 2015, pp. 1-12.

Fernandez-Ruiz, M., et al., "Risk of infection associated with anti-TNF-alpha therapy," Expert Review of Anti-Infective Therapy, 2018, pp. 1-50.

Brown, K.R., et al., "Seeding of Colloidal Au Nanoparticle Solutions. 2. Improved Control of Particle Size and Shape," Chem. Mater. 2000, 12:306-313.

Stone, K.J., et al., "Selective Inhibition of Prostaglandin Biosynthesis by Gold Salts and Phenylbutazone," Prostaglandins, 1975, 10(2):241-251.

Arora, R., et al., "Solid lipid nanoparticles and nanostructured lipid carrier-based nanotherapeutics in treatment of psoriasis: a comparative study," Expert Opinion on Drug Delivery, 2016, pp. 1-45.

Chen, Z., et al., "Specific Delivery of Oligonucleotides to the Cell Nucleus via Gentle Compression and Attachment of Polythymidine," ACS Appl. Mater. Interfaces, 2019, 11:27624-27640.

Korkmaz, E., et al., "Spherical Nucleic Acids as Emerging Topical Therapeutics: a Focus on Psoriasis," Journal of Investigative Dermatology, 2020, 140:278-281.

Worthen, A.J., et al., "Steric stabilization of nanoparticles with grafted low molecular weight ligands in highly concentrated brines including divalent ions," Soft Matter, 2016, pp. 1-34.

Yin, B., et al., "Sub-10 nm Substrate Roughness Promotes the Cellular Uptake of Nanoparticles by Upregulating Endocytosis-Related Genes," Nano Letters, 2021, 21:1839-1847, supplemental pp. S1-S31.

Liu, H., et al., "Targeting the IL-17 Receptor Using Liposomal Spherical Nucleic Acids as Topical Therapy for Psoriasis," Journal of Investigative Dermatology, 2020, 140:435-444, supplemental pp. 444e.1-444.e4.

Bos, J.D., et al., "The 500 Dalton rule for the skin penetration of chemical compounds and drugs," Exp Dermatol, 2000, 9:165-169.

Mehrmal, S., et al., "The global, regional, and national burden of psoriasis in 195 countries and territories, 1990 to 2017: a systematic analysis from the Global Burden of Disease Study 2017," J Am Acad Dermatol, 2021, 84(1):46-52.

Champion, G.D., et al., "The gold complexes," Bailliere's Clinical Rheumatology, 1990, 4(3):491-534.

Muhlpfordt, H., "The preparation of colloidal gold particles using tannic acid as an additional reducing agent," Experientia, 1982, 38:1127-1128.

Rioux, G., et al., "The Tissue-Engineered Human Psoriatic Skin Substitute: a Valuable In Vitro Model to Identify Genes with Altered Expression in Lesional Psoriasis," International Journal of Molecular Sciences, 2018, 19:1-17.

Nagalakshmi, U., et al., "The Transcriptional Landscape of the Yeast genome Defined by RNA Sequencing," Science, 2008, pp. 1-16.

Ferreira, M., et al., "Topical co-delivery of methotrexate and etanercept using lipid nanoparticles: a targeted approach for psoriasis management," Colloids and Surfaces B: Biointerfaces, 2017, 159:23-29.

Fereig, S.A., et al., "Tackling the various classes of nano-therapeutics employed in topical therapy of psoriasis," Drug Delivery, 2020, 27(1):662-680.

Castela, E., et al., "Topical corticosteroids in plaque psoriasis: a systematic review of efficacy and treatment modalities," JEADV, 2012, 26:36-46.

Camisa, C., et al., "Topical Corticosteroids," Comprehensive Dermatologic Drug Therapy, 2021, pp. 511-527, supplemental pp. 527.e1-527.e6.

Zheng, D., et al., "Topical delivery of siRNA-based spherical nucleic acid nanoparticle conjugates for gene regulation," PNAS, 2012, 109(30):11975-11980.

Liang, H., et al., "Topical nanoparticles interfering with the DNA-LL37 complex to alleviate psoriatic inflammation in mice and monkeys," Science Advances, 2020, 6:1-14.

Crisan, D., et al., "Topical silver and gold nanoparticles complexed with Cornus mas suppress inflammation in human psoriasis plaques by inhibiting NF-kB activity," Experimental Dermatology, 2018, 27:1166-1169.

Lewandowski, KT., et al., "Topically Delivered Tumor Necrosis Factor-alpha-Targeted Gene Regulation for Psoriasis," Journal of Investigative Dermatology, 2017, 137:2027-2030.

Rijzewijk, J.J., et al., "Two Binding Sites for Ki67 Related to Quiescent and Cycling Cells in Human Epidermis," Acta Derm Venereol, 1989, 69:512-515.

Warren, E.W., et al., "Use of retinoids in the treatment of psoriasis," Clinical Pharmacy, 1989, 8(5):1-2.

European Search Report dated Jul. 21, 2022 in European Application No. 22158875.9.

Office Action dated Jun. 29, 2023 in Chinese Application No. 202210184252.9.

Kragballe, K., et al., "A 52-week randomized safety study of a calcipotriol/betamethasone dipropionate two-compound product (Dovobet/Daivobet/Talconex) in the treatment of psoriasis vulgaris," British Journal of Dermatology, 2006, 154:1155-1160.

Koch, C.M., et al., "A Beginner's Guide to Analysis of RNA Sequencing Data," Am J Respir Cell Mol Biol, 2018, 59 (2):145-157.

Pinto, M.F., et al., "A new topical formulation for psoriasis: Development of methotrexate-loaded nanostructured lipid carriers," International Journal of Pharmaceutics, 2014, 477:519-526.

Avasatthi, V., et al., "A novel nanogel formulation of methotrexate for topical treatment of psoriasis: optimization, in vitro and in vivo evaluation," Pharmaceutical Development and Technology, 2015, pp. 1-9.

McGrath, J.A., et al., "Anatomy and Organization of Human Skin," Rook's Textbook of Dermatology, 2004, pp. 1-84.

Mukherjee, P., et al., "Antiangiogenic Properties of Gold Nanoparticles," Clin Cancer Res, 2005, 11(9):3530-3534.

Morizane, S., et al., "Antimicrobial peptides in the pathogenesis of psoriasis," J Dermatol., 2012, pp. 1-13.

Nedoszytko, B., et al., "Chemokines and cytokines network in the pathogenesis of the inflammatory skin diseases: atopic dermatitis, psoriasis and skin mastocytosis," Postep Derm Alergol, 2014, 2:84-91.

Kean, W.F., et al., "Clinical pharmacology of gold," Inflammopharmacology, 2008, 16:112-125.

Enustun, B.V., et al., "Coagulation of Colloidal Gold," Journal of the American Chemical Society, 1963, 85 (21):3317-3328.

Frens, G., "Controlled Nucleation for the Regulation of the Particle Size in Monodisperse Gold Suspensions," Nature Physical Science, 1973, 241:20-22.

Rosmarin, D.M., et al., "Cyclosporine and psoriasis: 2008 National Psoriasis Foundation* Consensus Conference," J Am Acad Dermatol, 2010, 62(5):838-853.

Khlebtsov, N.G., "Determination of Size and Concentration of Gold Nanoparticles from Extinction Spectra," Anal. Chem., 2008, 80:6620-6625.

(56) References Cited

OTHER PUBLICATIONS

Liu, Y., et al., "Dopamine Receptor-Mediated Binding and Cellular Uptake of Polydopamine-Coated Nanoparticles," ACS Nano, 2021, 15:13871-13890.

Dunnett, C.W., "Multiple Comparison Procedure for Comparing Several Treatments with a Control," Journal of the American Statistical Association, 1955, 50(272):1096-1121.

Ho, L.W.C., et al., "Effect of Alkylation on the Cellular Uptake of Polyethylene Glycol-Coated Gold Nanoparticles," ACS Nano, 2017, 11:6085-6101.

Goldberg, R.L., et al., "Effect of Gold Sodium Thiomalate on Proliferation of Human Rheumatoid Synovial Cells and on Collagen Synthesis in Tissue Culture," Biochemical Pharmacology, 1980, 29:869-876.

Ho, L.W.C., et al., "Effect of Surface Modification with Hydrocarbyl Groups on the Exocytosis of Nanoparticles," Biochemistry, 2020, pp. A-L.

Fratoddi, I., et al., "Effects of topical methotrexate loaded gold nanoparticle in cutaneous inflammatory mouse model," Nanomedicine: Nanotechnology, Biology, and Medicine, 2019, 17:276-286.

Benhadou, F., et al., "Epidermal autonomous VEGFA/Flt1/Nrp1 functions mediate psoriasis-like disease," Sci. Adv., 2020, 6:1-16.

Chou, L.Y.T., et al., "Fluorescence-Tagged Gold Nanoparticles for Rapidly Characterizing the Size-Dependent Biodistribution in Tumor Models," Advanced Healthcare Materials, 2012, 1:714-721.

Armstrong, A.W., et al., "From the Medical Board of the National Psoriasis Foundation: Treatment targets for plaque psoriasis," J Am Acad Dermatol, 2016, pp. 1-9.

Bessar, H., et al., "Functionalized gold nanoparticles for topical delivery of methotrexate for the possible treatment of psoriasis," Colloids and Surfaces B: Biointerfaces, 2016, 141:141-147.

Stenn, K.S., et al., "Glucocorticoid Effect on Hair Growth Initiation: a Reconsideration," Skin Pharmacol, 1993, 6:125-134.

Higby, G.J., et al., "Gold in Medicine: a Review of Its Use in the West Before 1900," Gold Bull., 1982, 15(4):130-140.

Saha, S., et al., "Gold Nanoparticle Reprograms Pancreatic Tumor Microenvironment and Inhibits Tumor Growth," ACS Nano, 2016, 10:10636-10651.

Carneiro, M.F.H., et al., "Gold nanoparticles: a critical review of therapeutic applications and toxicological aspects," Journal of Toxicology and Environmental Health, Part B, 2016, 19(3-4):129-148.

Sumbayev, V.V., et al., "Gold Nanoparticles Downregulate Interleukin-1beta-Induced Pro-Inflammatory Responses," Small, 2013, 9(3):472-477.

Giljohann, D.A., et al., "Gold Nanoparticles for Biology and Medicine," Angew. Chem. Int. Ed., 2010, 49:3280-3294.

Zhang, Y., et al., "Gold nanoparticles inhibit activation of cancer-associated fibroblasts by disrupting communication from tumor and microenvironmental cells," Bioactive Materials, 2021, 6:326-332.

Daniel, M.-C., et al., "Gold Nanoparticles: Assembly, Supramolecular Chemistry, Quantum-Size-Related Properties, and Applications toward Biology, Catalysis, and Nanotechnology," Chem. Rev., 2004, 104(1):293-346.

Yamashita, S., "Heat-induced antigen retrieval: Mechanisms and application to histochemistry," Progress in Histochemistry and Cytochemistry, 2007, 41:141-200.

Brown, K.R., et al., "Hydroxylamine Seeding of Colloidal Au Nanoparticles. 3. Controlled Formation of Conductive Au Films," Chem. Mater., 2000, 12(2):314-323.

Gilleron, J., et al., "Image-based analysis of lipid nanoparticle-mediated siRNA delivery, intracellular trafficking and endosomal escape," Nature Biotechnology, 2013, 31(7):638-646, supplemental pp. 1-3.

Fits, L.V.D., et al., "Imiquimod-Induced Psoriasis-Like Skin Inflammation in Mice is Mediated via the IL-23/IL-17 Axis," The Journal of Immunology, 2009, 182:5836-5845.

Veale, D.J., et al., "Immunohistochemical markers for arthritis in psoriasis," Annals of the Rheumatic Diseases, 1994, 53:450-454.

Lowes, M.A., et al., "Immunology of Psoriasis," Annu. Rev. Immunol., 2014, 32:227-255.

Sonavane, G., et al., "In vitro permeation of gold nanoparticles through rat skin and rat intestine: Effect of particle size," Colloids and Surfaces B: Biointerfaces, 2008, 65:1-10.

Dimartino, M.J., et al., "Inhibition of Lysosomal Enzyme Release from Rat Leukocytes by Auranofin," Inflammation, 1977, 2(2):131-142.

Arvizo, R.R., et al., "Inhibition of tumor growth and metastasis by a self-therapeutic nanoparticle," PNAS, 2013, 110 (17):6700-605.

Yin, B. et al., "Intrapulmonary Cellular-Level Distribution of Inhaled Nanoparticles with Defined Functional Groups and Its Correlations with Protein Corona and Inflammatory Response," ACS Nano, 2019, 13:14048-14069.

Zhang, X., et al., "Keratin 6, 16 and 17—Critical Barrier Alarmin Molecules in Skin Wounds an Psoriasis," Cells, 2019, 8(807):1-14.

Lessard, J.C., et al., "Keratin 16 regulates innate immunity in response to epidermal barrier breach," PNAS, 2013, 110(48):19537-19542.

Vasseur, P., et al., "Liver fibrosis is associated with cutaneous inflammation in the imiquimod-induced murine model of psoriasiform dermatitis," Br. J. Dermatol., 2018, 179:101-109.

Mezentsev, A., et al., "Matrix metalloproteinases and their role in psoriasis," Gene, 2014, 540:1-10.

Hurst, S.J., et al., "Maximizing DNA Loading on a Range of Gold Nanoparticle Sizes," Anal Chem., 2006, pp. 1-13.

Ruiz-Romeu, E., et al., "MCPIP1 RNase Is Aberrantly Distributed in Psoriatic Epidermis and Rapidly Induced by IL-17A," Journal of Investigative Dermatology, 2016, 136:1599-1607.

Yang, H., et al., "Mechanism for the Cellular Uptake of Targeted Gold Nanorods of Defined Aspect Ratios," Small, 2016, 12(37):5178-5189.

Office Action dated Apr. 3, 2024 in Chinese Application No. 202210184252.9.

* cited by examiner

| NPs | Au₃@PEG-octadecyl₄₀% NPs | Au₃@PEG-octadecyl₆₀% NPs | Au₃@PEG-octadecyl₈₀% NPs | Au₃@PEG-octadecyl₁₀₀% NPs |
|---|---|---|---|---|
| Hydrodynamic size in water | 24.5 ± 3.9 | 36.4 ± 4.5 | 48.5 ± 10.8 | 72.5 ± 9.4 |
| Mass percentage of alkyl group in PEG coating (%) | 9.19 | 11.23 | 16.83 | 20.19 |

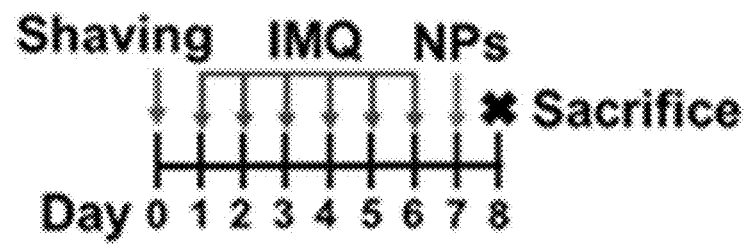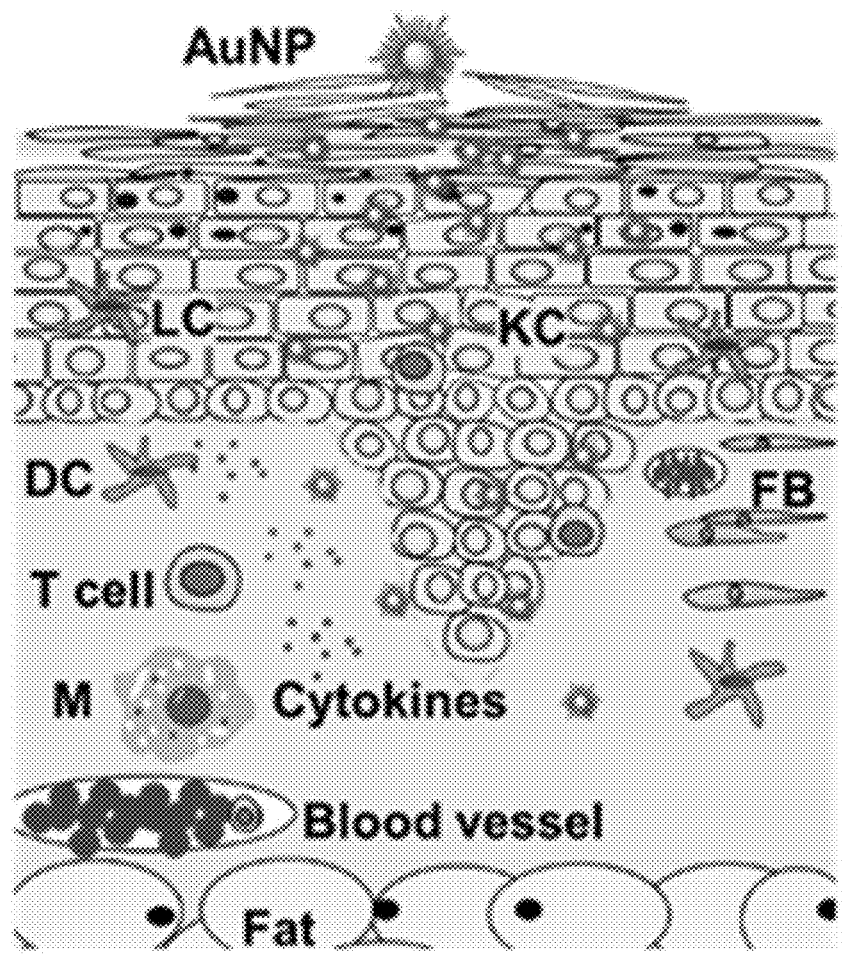
FIG. 14

| NP | HD Size, 0 h (nm) | HD size, 24 h (nm) | Zeta potential (mV) |
|---|---|---|---|
| Cy5-labeled Au₃@PEG-methoxy NPs | 10.60 ± 0.60 (0.23) | 12.4 ± 0.53 (0.24) | -5.12 ± 0.62 |
| Au₃@PEG-methoxy NPs | 9.45 ± 0.10 (0.19) | 9.75 ± 0.32 (0.16) | -3.52 ± 0.37 |
| Cy5-labeled Au₃@PEG-octadecyl₃₀% NPs | 13.93 ± 0.50 (0.42) | 14.93 ± 0.31 (0.51) | -2.67 ± 1.77 |
| Au₃@PEG-octadecyl₃₀% NPs | 13.30 ± 0.45 (0.35) | 14.5 ± 0.61 (0.33) | -1.65 ± 0.87 |

| Blood Chemistry | Au$_3$@PEG-octadecyl$_{30\%}$ NPs (Day 38) | Reference range |
|---|---|---|
| ALT (U/L) | 43.3 ± 12 | 28–132 |
| AST (U/L) | 171.3 ± 6.3 | 59–247 |
| BUN (mg/dL) | 27.7 ± 4.2 | 7–31 |

KEGG network diagram

(i) IMQ only vs
IMQ+ Au$_3$@PEG-octadecyl$_{30\%}$ NPs

($|\log_2$(relative expression)$|$=1 and Q<=0.005 and node connection>=1, 113 genes)

8: Metabolic pathways
7: MARK signaling pathway
6: Necroptosis
5: PI3K-Akt signaling pathway
4: IL-17 signaling pathway
3: Jak-STAT signaling pathway
2: Chemokine signaling pathway
1: Cytokine-cytokine receptor

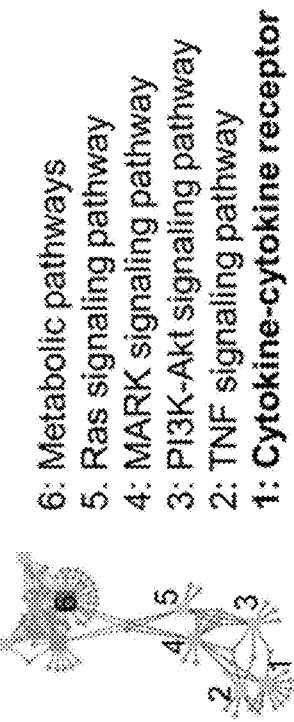

(ii) IMQ only vs
IMQ+ Au$_3$@PEG-methoxy NPs

(Q<=0.05 and node connection>=1, 79 genes)

6: Metabolic pathways
5: Ras signaling pathway
4: MARK signaling pathway
3: PI3K-Akt signaling pathway
2: TNF signaling pathway
1: Cytokine-cytokine receptor

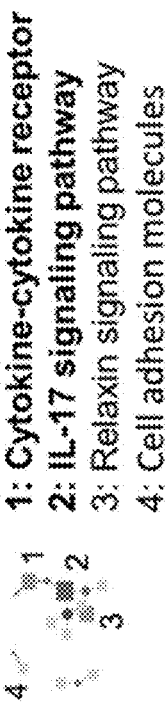

(iii) IMQ+ Au$_3$@PEG-methoxy NPs vs
IMQ+ Au$_3$@PEG-octadecyl$_{30\%}$ NPs

(Q<=0.05 and node connection>=1, 6 genes)

1: Cytokine-cytokine receptor
2: IL-17 signaling pathway
3: Relaxin signaling pathway
4: Cell adhesion molecules

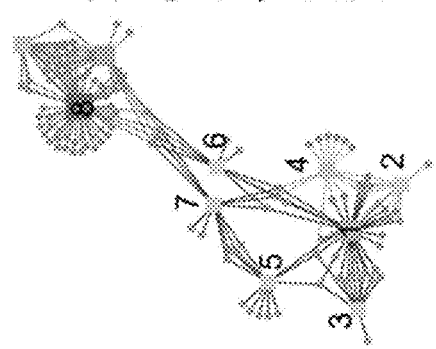

The box represents KEGG Pathway, the circle represents mRNA, etc. Both color and size indicate the number of gene connected to the node.

FIG. 57

SEQUENCE LISTING

<160> NUMBER OF SEQ ID NOS: 12

<210> SEQ ID NO 1
<211> LENGTH: 22
<212> TYPE: DNA
<213> ORGANISM: Artificial Sequence
<220> FEATURE:
<223> OTHER INFORMATION: Forward primer for Mouse Il17a

<400> SEQUENCE: 1
cagactacct caaccgttcc ac     22

<210> SEQ ID NO 2
<211> LENGTH: 22
<212> TYPE: DNA
<213> ORGANISM: Artificial Sequence
<220> FEATURE:
<223> OTHER INFORMATION: Reverse primer for Mouse Il17a

<400> SEQUENCE: 2
tccagctttc cctccgcatt ga     22

<210> SEQ ID NO 3
<211> LENGTH: 22
<212> TYPE: DNA
<213> ORGANISM: Artificial Sequence
<220> FEATURE:
<223> OTHER INFORMATION: Forward primer for Mouse Il17f

<400> SEQUENCE: 3

```
aaccagggca tttctgtccc ac                                          22

<210> SEQ ID NO 4
<211> LENGTH: 22
<212> TYPE: DNA
<213> ORGANISM: Artificial Sequence
<220> FEATURE:
<223> OTHER INFORMATION: Reverse primer for Mouse Il17f

<400> SEQUENCE: 4
ggcattgatg cagcctgagt gt                                          22

<210> SEQ ID NO 5
<211> LENGTH: 22
<212> TYPE: DNA
<213> ORGANISM: Artificial Sequence
<220> FEATURE:
<223> OTHER INFORMATION: Forward primer for Mouse Il12b

<400> SEQUENCE: 5
ttgaactggc gttggaagca cg                                          22

<210> SEQ ID NO 6
<211> LENGTH: 23
<212> TYPE: DNA
<213> ORGANISM: Artificial Sequence
<220> FEATURE:
<223> OTHER INFORMATION: Reverse primer for Mouse Il12b

<400> SEQUENCE: 6
ccacctgtga gttcttcaaa ggc                                         23

<210> SEQ ID NO 7
<211> LENGTH: 22
<212> TYPE: DNA
<213> ORGANISM: Artificial Sequence
<220> FEATURE:
<223> OTHER INFORMATION: Forward primer for Mouse Il1b

<400> SEQUENCE: 7
tggaccttcc aggatgagga ca                                          22

<210> SEQ ID NO 8
<211> LENGTH: 22
<212> TYPE: DNA
<213> ORGANISM: Artificial Sequence
<220> FEATURE:
<223> OTHER INFORMATION: Reverse primer for Mouse Il1b

<400> SEQUENCE: 8
gttcatctcg gagcctgtag tg                                          22

<210> SEQ ID NO 9
<211> LENGTH: 22
<212> TYPE: DNA
<213> ORGANISM: Artificial Sequence
<220> FEATURE:
<223> OTHER INFORMATION: Forward primer for Mouse Tnf

<400> SEQUENCE: 9
ggtgcctatg tctcagcctc tt                                          22

<210> SEQ ID NO 10
<211> LENGTH: 23
<212> TYPE: DNA
<213> ORGANISM: Artificial Sequence
```

```
<220> FEATURE:
<223> OTHER INFORMATION: Reverse primer for Mouse Tnf

<400> SEQUENCE: 10
gccatagaac tgatgagagg gag                                              23

<210> SEQ ID NO 11
<211> LENGTH: 23
<212> TYPE: DNA
<213> ORGANISM: Artificial Sequence
<220> FEATURE:
<223> OTHER INFORMATION: Forward primer for Mouse GAPDH

<400> SEQUENCE: 11
catcactgcc acccagaaga ctg                                              23

<210> SEQ ID NO 12
<211> LENGTH: 23
<212> TYPE: DNA
<213> ORGANISM: Artificial Sequence
<220> FEATURE:
<223> OTHER INFORMATION: Reverse primer for Mouse GAPDH

<400> SEQUENCE: 12
atgccagtga gcttcccgtt cag                                              23
```

SELF-THERAPEUTIC NANOPARTICLE FOR ENHANCED TOPICAL DELIVERY TO SKIN KERATINOCYTES AND TREATING SKIN INFLAMMATION

CROSS-REFERENCE TO RELATED APPLICATION

This application claims the benefit of U.S. Provisional Application Ser. No. 63/153,680, filed Feb. 25, 2021, which is hereby incorporated by reference in its entirety including any tables, figures, or drawings.

REFERENCE TO SEQUENCE LISTING

The Sequence Listing for this application is labeled "SequenceListing.txt" which was created on Jan. 13, 2022 and is 4,096 bytes. The entire content of the sequence listing is incorporated herein by reference in its entirety.

BACKGROUND OF THE INVENTION

Psoriasis is a chronic inflammatory disease that affects approximately 100 million people worldwide[1]. Clinically, psoriasis is characterized by red plaques with silver or white scales[2]. Histologically, psoriatic lesions show parakeratosis, epidermal hyperplasia and leukocyte infiltration[3]. In the clinic, conventional treatments of psoriasis depend on disease severity[4,5]. Moderate to severe psoriasis typically involve systemic delivery of methotrexate[6], retinoids[7], cyclosporin[8], and biologic agents[9], but these drugs may lead to an increased risk of infection owing to long-term chronic immunosuppression[10]. Phototherapy is also a popular method for treating moderate to severe psoriasis, but its usage is limited because it is time consuming[3]. For milder psoriasis, which affects about 80% of patients, topical deliveries of corticosteroids and vitamin analogs are common methods of treatment, but they are associated with adverse effects such as skin atrophy[7,11].

Nanoparticles (NPs) offer immense potentials for transdermal delivery and treating skin diseases, because they can be engineered to diffuse through the skin upon topical application[12]. In recent years, great efforts have been made to conjugate NPs with traditional systemic immunosuppressive substances including vitamin-D derivatives[13], methotrexate[14-23] or calcineurin inhibitors[24] for topical applications. Furthermore, NP-assisted topically delivery of nucleic acids[25-29] or peptides[30] for targeting or interfering psoriasis pathogenesis[31] provide promising approaches for treating psoriasis as well. Unfortunately, studies seldom report the biodistribution of transdermal delivered NPs in specific cell types such as keratinocytes and dendritic cells which cause inflammation in psoriasis. Moreover, the lack of fundamental understanding of skin-nano interactions to great extent hampers the development of nanomedicines for treating skin diseases.

Gold NP (AuNP) is a commonly used nanocarrier for topical drug delivery due to its biocompatibility and capability for surface modulation. Although Au compounds have been utilized as effective therapeutic agents for the treatment of certain inflammatory diseases such as rheumatoid arthritis, there are few studies that focus on the efficacy of AuNPs without drug loading[32]. Alaz et al. recently reported that AuNPs coupled with methotrexate may normalize the immune response in psoriasis and found that AuNPs alone, as a control group, also have anti-inflammatory potential[22]. However, the skin-nano interactions and the underlying anti-inflammation mechanisms of AuNPs in the treatment are not investigated. Therefore, a NP platform for effective delivery the NPs to skin cells and treating psoriasis is desired.

BRIEF SUMMARY OF THE INVENTION

Embodiments of the subject invention pertain to a composition of an anti-psoriatic drug and methods of applying the anti-psoriatic drug for transdermal delivery of nanoparticles and entries into skin cells.

According to an embodiment of the invention, the composition of the anti-psoriatic drug can comprise a core comprising at least one gold nanoparticle; a shell comprising a plurality of polyethylene glycol (PEG) strands conjugated to the core; and a plurality of alkyl functional groups conjugated to the shell of PEG strands. Chain lengths of the plurality of alkyl groups are configured to be in a range of 1-24 carbons such that a distribution of the composition in the skin cells is optimized. Chain loading of the plurality of alkyl groups is configured to be in a range of 0 mol %-50 mol % such that a distribution of the composition in the skin cells is optimized and the chain loading of the plurality of alkyl groups is configured to be about 30 mol % to obtain an optimal distribution of the composition in the skin cells. Moreover, a diameter of the core is configured to be in a range of 1-10 nm to such that a distribution of the composition in the skin cells is optimized and the diameter of the core is configured to be about 3 nm to obtain an optimal distribution of the composition in the skin cells. An overall diameter of the composition is configured to be smaller than 15 nm and greater than zero nm such that a distribution of the composition in the skin cells is optimized. Furthermore, the composition is configured for optimal skin permeability or for an optimal entry into keratinocytes.

In another embodiment, a method of modulating effectiveness of an anti-psoriatic drug for inhibiting development of a psoriasis phenotype is provided. The method comprises steps of applying the anti-psoriatic drug concurrently with a toll-like receptor (TLR) 7/8 ligand, for a period of time onto skin of a subject who is at risk for developing a psoriasis phenotype; wherein the anti-psoriatic drug comprises a core comprising at least one gold nanoparticle, a shell comprising a plurality of polyethylene glycol (PEG) strands conjugated to the core, and a plurality of alkyl groups conjugated to the shell of PEG strands. Moreover, the core has a diameter of about 3 nm to obtain an optimal distribution of the composition in the skin cells. The plurality of alkyl groups has a chain loading of about 30 mol % octadecyl group loading to obtain an optimal distribution of the composition in the skin cells. Chain lengths of the plurality of alkyl groups are configured to be in a range of 1-24 carbons to obtain an optimal distribution of the composition in the skin cells.

In another embodiment, a method of modulating effectiveness of an anti-psoriatic drug for treating a psoriasis phenotype is provided. The method comprises steps of topically applying the anti-psoriatic drug subsequent to topically applying a toll-like receptor (TLR) 7/8 ligand for a period of time onto skin of a subject exhibiting a psoriasis phenotype; wherein the anti-psoriatic drug comprises a core comprising at least one gold nanoparticle, a shell comprising a plurality of polyethylene glycol (PEG) strands conjugated to the core, and a plurality of alkyl groups conjugated to the shell of PEG strands. Moreover, the core has a diameter of about 3 nm to obtain an optimal distribution of the composition in the skin cells. The plurality of alkyl groups has a chain loading of about 30 mol % octadecyl group loading to obtain an optimal distribution of the composition in the skin cells. Chain lengths of the plurality of alkyl groups are configured. to be in a range of 1-24 carbons to obtain an optimal distribution of the composition in the skin cells.

In another embodiment, a method of synthesizing gold nanoparticles is provided. The method comprises adding a $HAuCl_4$ solution and a sodium citrate solution into a certain amount of Nanopure water to prepare a mixture; adding NaBH4 solution to the mixture under rapid stirring; stirring the resultant solution for a first predetermined period of time; and incubating the resultant at a predetermined temperature for a second predetermined period of time.

In another embodiment, a method of preparing an alkyl-terminated, PEG-coated. AuNPs ($alkyl_{x\ \%}$-PEG-AuNPs) composition is provided. The method comprises mixing an aqueous suspension of AuNP solution with $HS-PEG_{1000}$-$C_nH_{2n+1}$ having a molecular weight of 1000 Da and $HS-PEG_{1000}$-$OCH_3$ having a molecular weight of 1000 Da by keeping a total PEG concentration at 10 PEG molecules per $nm^2$ of AuNP surfaces to be coated; keeping PEGylation reactions for 1 hour with sonication; purifying resultants of the reactions by multiple rounds of centrifugal filter filtration for a predetermined period of time; and resuspending the resultants by deionized water.

In certain embodiments, a method of transdermal delivery of nanoparticles and entry into skin cells is provided. The method comprises the step of administering a therapeutically effective amount of a composition to skin of a subject, the composition comprising a core comprising at least one gold nanoparticle; a shell comprising a plurality of polyethylene glycol (PEG) strands conjugated to the core; and a plurality of alkyl functional groups conjugated to the shell of PEG strands.

BRIEF DESCRIPTION OF THE DRAWINGS

FIGS. 3A-3B show synthesis and characterization of alkyl-terminated and thiolated PEG ($SH-PEG_{1000}$-$C_nH_{2n+1}$), wherein FIG. 3A shows the synthesis of $SH-PEG_{1000}$-$C_nH_{2n+1}$ molecule, and FIG. 3B shows MALDI-TOF spectra of $SH-PEG_{1000}$-$C_nH_{2n+1}$ molecule, according to an embodiment of the subject invention.

FIGS. 5A-5B show characterization of $Au_x$@PEG-$alkyl)_{y\ \%}$ NPs by UV-Vis and TEM, wherein FIG. 5A shows UV-Vis spectra of citrate-capped AuNPs, $Au_3$@PEG-$alkyl_{y\ \%}$ NPs, $Au_6$@PEG-$alkyl_{y\ \%}$ NPs, and $Au_{13}$@PEG-$alkyl_{y\ \%}$ NPs, and FIG. 5B shows representative TEM images of citrate-capped AuNPs, $Au_x$@PEG-methoxy NPs, and $Au_x$@PEG-$octadecyl_{30\%}$ NPs, according to an embodiment of the subject invention.

FIGS. 7A-7B show 1-Octanol/water partitioning of $Au_x$@PEG-methoxy NPs and $Au_x$@PEG-$octadecyl_{30\%}$ NPs, wherein FIG. 7A shows that $Au_x$@PEG-methoxy NPs, and $Au_x$@PEG-$octadecyl_{30\%}$ NPs do not show observable transfer from water to 1-octanol after 24 hours of mixing, wherein upper layer: 1-octanol; Lower layer: water, wherein FIG. 7B shows the UV-vis spectra of NPs in water after 24 hours of mixing, and wherein there is insignificant drop in the concentration of NPs in water, indicating limited transfer from water to 1-octanol, according to an embodiment of the subject invention.

FIGS. 8A-8C show stability and hydrophilicity tests of $Au_3$@PEG-$octadecyl_{y\ \%}$ NPs with higher octadecyl loading (y>30), wherein FIG. 8A shows that hydrodynamic size of $Au_3$@PEG-$octadecyl_{y\ \%}$ NPs (y=40, 50, 80 and 100) significantly increases when compared to that of $Au_3$@PEG-$octadecyl_{y\ \%}$ NPs with lower octadecyl loading, wherein FIG. 8B shows 1-Octanol/water partitioning of $Au_3$@PEG-$octadecyl_{y\ \%}$ NPs, and wherein FIG. 8C shows the UV-vis spectra of NPs in water after 24 hours of mixing, according to an embodiment of the subject invention.

FIGS. 10A-10B show nano-bio the interactions of alkyl-terminated, PEGylated Gold nanoparticles with keratinocytes in vitro to in vivo, wherein FIG. 10A shows $alkyl_{x\ \%}$-PEG-AuNPs is prepared; and wherein FIG. 10B additionally shows nano-bio interactions of $alkyl_{x\ \%}$-PEG-Au6 NPs with keratinocytes, according to an embodiment of the subject invention.

FIGS. 11A-11B show distribution of $Au_x$@PEG-$alkyl_{y\ \%}$ NPs upon topical application to healthy mice, wherein FIG. 11A is a photograph of the topical application of AuNPs (200 µL; ~3 µM $Au_3$@PEG-$alkyl_{y\ \%}$ NPs, ~500 nM $Au_6$@PEG-$alkyl_{y\ \%}$ NPs, or ~50 nM $Au_{13}$@PEG-$alkyl_{y\ \%}$ NPs in PBS; or equivalently 500 ppm Au for all three Au core sizes) onto mouse skin and a schematic representation of the isolation of epidermis cells and the "dermis+hypodermis" (D+HD), wherein 24 hours post-application of NPs, the treated skin is rinsed, harvested, and incubated with neutral protease for 3 hours to remove the "D+HD" layers, wherein the epidermis layer is treated with trypsin for 20 minutes and filtered by a cell strainer to isolate the epidermal cells, wherein FIG. 11B shows intradermal tissue-level distribution of $Au_x$@PEG-$alkyl_{y\ \%}$ NPs in normal skin, wherein n=3-4 mice, mean±SD, wherein statistical significance is calculated by one-way ANOVA with Tukey's Test for post-hoc analysis, wherein "*" indicates the comparison between $Au_x$@PEG-$alkyl_{y\ \%}$ NPs group with $Au_x$@PEG-methoxy NPs group with the same NP core size, wherein *P<0.05, P<0.01, *P<0.001, ****P<0.0001, wherein "#" indicates the comparison between two $Au_x$@PEG-$alkyl_{y\ \%}$, NPs groups with the same NP core size, wherein #P<0.05, ##P<0.01, ###P<0.001, ####P<0.0001, and wherein NS stands for not significant, according to an embodiment of the subject invention.

FIGS. 13A-13B show TEM images of $Au_3$@PEG-octadecyl$_{30\%}$ NPs in epidermal cells, wherein FIG. 13A shows representative TEM image of epidermis cells that are isolated from healthy skin topically applied with $Au_3$@PEG-octadecyl$_{30\%}$ NPs (200 µL, ~3 µM) and FIG. 13B shows representative TEM images of intact healthy skin that is treated with $Au_3$@PEG-octadecyl$_{30\%}$ NPs, wherein boxes and arrows point to the intracellular AuNPs, according to an embodiment of the subject invention.

FIG. 14 is a schematic representation of experimental processes and schemes for topically applying alkyl-terminated AuNPs onto IMQ-induced psoriatic skin, according to an embodiment of the subject invention.

FIGS. 15A-15B show TEM images of $Au_3$@PEG-octadecyl$_{y\ \%}$ NPs in isolated epidermal cells, wherein different types of $Au_3$@PEG-alkyl$_{y\ \%}$ NPs (200 µL; ~3 µM) are topically applied to healthy mice, wherein after 24 hours, the mice are sacrificed, and the skin is harvested for isolating the epidermal cells, wherein FIG. 15A shows bright-field (BF) light microscopy and TEM images verifying the isolation of epidermal cells from the skin, wherein FIG. 15B shows that 24 hours post-application, the mice are sacrificed, and the skin is harvested for isolating the epidermal cells, wherein TEM images of the isolated epidermal cells show the in vivo entry of NPs to the epidermal cells, indicating their permeation through the stratum corneum to epidermis, wherein boxes and arrows point to the intracellular AuNPs, according to an embodiment of the subject invention.

FIGS. 21A-21B show cellular uptake of $Au_3$@PEG-alkyl$_{y\ \%}$ NPs by primary epidermal cells isolated from psoriatic skin, wherein FIG. 21A shows the experimental protocol and FIG. 21B shows ICP-MS measurement of 24 hours uptake of $Au_3$@PEG-alkyl$_{y\ \%}$ NTs (300 nM, 0.3 mL) by primary epidermal cells that are isolated from IMQ-induced psoriasis mouse, Mean±SD, and statistical significance is calculated by one-way ANOVA with Tukey's Test for post-hoc analysis, with adjusted P values shown in the FIG. 21B, according to an embodiment of the subject invention.

FIGS. 24A-24B show distribution of $Au_3$@PEG-alkyl$_{y\%}$ NPs upon topical application to psoriatic mice, wherein FIG. 24A shows the experimental protocol, and FIG. 24B shows ICT-MS measurement of intradermal distribution of topically applied $Au_3$@PEG-alkyl$_{y\%}$ NPs (3 μM, 200 μL) in psoriatic mouse skin for 24 hours, wherein n=3-4 mice, across 1 experiment, Mean±SD, and statistical significance is calculated by one-way ANOVA with Tukey's Test for post-hoc analysis, with adjusted P values shown in FIG. 24B, according to an embodiment of the subject invention.

FIGS. 26A-26C show synthesis and characterization of Cy5-labeled $Au_3$@PEG-alkyl$_{y\%}$ NPs, wherein FIG. 26A shows preparation of Cy5-labeled $Au_3$@PEG-alkyl$_{y\%}$ NPs, and FIG. 26B shows that adding 1 mol % Cy5 does not severely modify the physiochemical properties of the NPs (hydrodynamic size and zeta potential), and FIG. 26C shows that Cy5-labeling does not affect the uptake of $Au_3$@PEG-alkyl$_{y\%}$ NPs (300 nM, 200 μL) by Kera-308 cells upon 24 hours of incubation, wherein W/o stands for without; W stands for with, n=3, mean±SD, statistical significance is calculated by two-way ANOVA with Tukey's Test for post-hoc analysis, with adjusted P values shown in FIG. 26C, wherein NS stands for not significant, according to an embodiment of the subject invention.

FIGS. 30A-30B show effects of excipients, wherein 24 hours post-application of $Au_3$@PEG-methoxy NPs in PBS (3 μM, 200 μL) or a commercial hand cream [50 μL of $Au_3$@PEG-methoxy NPs (12 μM) with 50 mg of hand cream] onto healthy mouse skin, the skin and internal organs are collected for ICP-MS measurement, wherein FIG. 30A shows the intradermal distribution of $Au_3$@PEG-methoxy NPs in different formulation, FIG. 30B shows the systemic distribution of cream-formulated $Au_3$@PEG-methoxy NPs after topical application, wherein n=3 mice, Mean±SD, statistical significance is calculated by t test, wherein *p<0.05, and NS stands for not significant, according to an embodiment of the subject invention.

FIGS. 31A-31C show topical application of $Au_3$@PEG-octadecyl$_{30\%}$ NPs improves the IMQ-induced psoriatic skin condition in the "prevention mode", wherein FIG. 31A shows dosing schedule in "prevention mode", wherein mice are depilated on Day 0 and divided into four groups, wherein from Day 1 to Day 6, the mice receive daily topical application of IMQ; 30 mm later, the mice are topically applied with a 7:3 molar mixture of free PEG to PEG-octadecyl strands (the same composition of PEG in $Au_3$@PEG-octadecyl$_{30\%}$ NPs; termed "PEG-octadecyl$_{30\%}$"; 1.2 mg/mL), $Au_3$@PEG-methoxy NPs (200 μL, 6 μM), and $Au_3$@PEG-octadecyl$_{30\%}$ NPs (200 μL, 6 μM), wherein for the remaining group, the mice only receive daily topical application of IMQ, wherein an additional group of healthy mice without IMQ-induced psoriasis is included to benchmark the efficacy of $Au_3$@PEG-octadecyl$_{30\%}$ NPs, wherein FIG. 31B shows photographs of the treated skin on Day 7, wherein yellow boxes indicate the treated area, wherein representative images are chosen from n=8 mice/group, wherein FIG. 31C shows time-course PASI total score and scaling, induration, and erythema scores, wherein n=8, across 3 independent experiments, mean±SD, wherein statistical significance is calculated by one-way ANOVA with Tukey's Test for post-hoc analysis, wherein * stands for treatment groups compared with the IMQ only group on Day 7, wherein ****P<0.0001, and "#" indicates the comparison between two specific treatment groups, ##P=0.0042, ###P=0,0006, and wherein NS stands for P>0.05, according to an embodiment of the subject invention.

FIGS. 32A-32B show efficacy evaluation of $Au_3$@PEG-octadecyl$_{30\%}$ NPs in the "prevention mode" by histological staining, wherein FIG. 32A shows histological imaging (first row), and immunohistochemical staining of Ki67, and $CD3^+$ T cells of the harvested skin, wherein red arrows point to the positively stained cells, wherein scale bar is 100 μm, wherein representative images are chosen from n=6 images per mouse from n=8 mice/group, wherein FIG. 3213 shows epidermis thickness, number of $Ki67^+$ cells per unit length of basal epidermis, and number of $CD3^+$ cells per unit length of skin, wherein n=8 mice per group, n=6 images per mouse, wherein n=8 mice, across 3 independent experiments, mean±SD, statistical significance is calculated by one-way ANOVA with Tukey's Test for post-hoc analysis (excluding the healthy control group), with adjusted P values shown in the FIG. 32B, and wherein P>0.05 for NS cases, according to an embodiment of the subject invention.

FIGS. 33A-33B show efficacy evaluation of $Au_3$@PEG-octadecyl$_{30\%}$ NPs in the "prevention mode" by ELISA, wherein FIG. 33A shows percentage of spleen mass to bodyweight on Day 7, wherein FIG. 33B shows relative concentrations of inflammatory cytokines extracted from the treated skin as detected by ELISA, wherein "1 a.u." indicates the mean concentration of "IMU only" group, wherein n=8 mice, across 3 independent experiments, mean±SD, statistical significance is calculated by one-way ANOVA with Tukey's Test for post-hoc analysis (excluding the healthy control group), with adjusted P values shown in the FIGS. 33A-33B, and wherein P>0.05 for NS cases, according to an embodiment of the subject invention.

FIGS. 34A-34B show that application of PBS or free PEG may not inhibit the development of psoriasis in the "prevention mode", wherein mice are topically applied with IMQ cream in conjunction with Free PEG strands (200 μL of 1.2 mg/mL in PBS, the same amount of PEG found in $Au_3$@PEG-methoxy NPs, denoted "IMQ+free PEG") or PBS for 6 days, wherein on Day 7, the mice are sacrificed, and the skin is harvested, wherein FIG. 34A shows histological and immunohistochemical staining of Ki67 and CD3 of the harvested skin, wherein red arrows point to the stained $CD3^+$ T cells, wherein FIG. 34B shows epidermis thickness, number of Ki67 per length of basal epidermis and skin, and $CD3^+$ T cells per length of basal epidermis and skin, respectively, wherein Mean±SD, statistical significance is calculated by one-way ANOVA with Tukey's Test for post-hoc analysis, wherein P>0.05 for NS cases, according to an embodiment of the subject invention.

FIGS. 35A-358 show anti-psoriasis efficacy of $Au_3$ NPs coated with polythymidine ($Au_3$@T12 NPs) in the "prevention mode", wherein mice are topically applied with IMQ cream in conjunction with $Au_3$@T12 NPs (200 μL of PBS containing 6 μM NPs pipetted into a piece of gauze with an area of 15 mm×25 mm; or equivalently 1.000 ppm Au) for 6 consecutive days (from Day 1 to Day 6), in accordance with the "prevention mode", wherein on Day 7, the mice are sacrificed, and the skin is harvested, wherein FIG. 35A shows histological and immunohistochemical staining of Ki67 and CD3 of the harvested skin, wherein red arrows point to the stained $CD3^+$ T cells, wherein

FIGS. 39A-39B show that topical application of $Au_3$@PEG-octadecyl$_{30\%}$ NPs does not induce significant acute systemic toxicity in the "prevention mode", wherein FIG. 39A shows histological examination of the liver, spleen, and kidney harvested from mice in different treatment groups, wherein FIG. 39B shows levels of serum alanine transaminase (ALT) and blood urea nitrogen (BUN) of psoriatic mice that are topically applied with IMQ only or topically applied with IMQ in conjunction with $Au_3$@PEG-octadecyl$_{30\%}$ NPs, wherein n=3 mice per group, wherein the concentration range between the green dotted line and the red dotted line shows the normal range of Balb/c mice, Mean±SD, statistical significance is calculated by unpaired two-tailed t test, and wherein NS stands for not significant, according to an embodiment of the subject invention.

FIGS. 41A-41C show topical application of $Au_3$@PEG-octadecyl$_{30\%}$ NPs improves IMQ-induced psoriatic skin condition in the "treatment mode", wherein FIG. 41A shows dosing schedule in "treatment mode", wherein mice are depilated on Day 0 and divided into three groups, wherein from Day 1 to Day 6, the mice daily receive topical application of IMQ, wherein from Day 7 to Day 10, the mice are topically applied with PBS, BC (20 mg), or $Au_3$@PEG-octadecyl$_{30\%}$ NPs (200 μL, 6 μM) daily, wherein on Day 11, the mice are sacrificed for efficacy evaluation, wherein an additional group of healthy mice without IMQ-induced psoriasis is included to benchmark the efficacy of our NPs, wherein FIG. 41B shows representative photographs of the treated skin from Days 7 to 11, wherein yellow boxes indicate the treated area, wherein FIG. 41C shows time-course PASI total score and scaling, induration, and erythema scores, wherein n=7 mice, across 2 independent experiments, mean±SD, statistical significance is calculated by one-way ANOVA with Tukey's Test for post-hoc analysis, wherein "*" indicates the comparison between treatment groups and PBS control on Day 11, wherein ****P<0.0001, according to an embodiment of the subject invention.

FIGS. 42A-42B show efficacy evaluation of $Au_3$@PEG-octadecyl$_{30\%}$ NPs in the "prevention mode" by histological staining, wherein FIG. 42A shows histological imaging (first row), and immunohistochemical staining of Ki67 (second row), and CD3$^+$ T cells (third row) of the harvested skin, wherein red arrows point to the positively stained cells, wherein FIG. 42B shows epidermis thickness, number of Ki67$^+$ cells per unit length of basal epidermis, and number of CD3$^+$ cells per unit length of basal epidermis, wherein representative images are chosen from n=6 images per mouse from n=7 mice/group, across 2 independent experiments, mean SD, statistical significance among different treatment groups (excluding the healthy control group) is calculated by one-way ANOVA with Tukey's Test for post-hoc analysis, with adjusted P values shown in the FIG. 42B, wherein P>0.05 for NS cases, according to an embodiment of the subject invention.

FIGS. 44A-44B show topical application of $Au_3$@PEG-octadecyl$_{30\%}$ NPs did not induce cutaneous side effects in the "treatment mode", wherein FIG. 44A shows thickness of whole skin (from epidermis to hypodermis-muscle junction) upon different treatments. n=7 mice, across 2 independent experiments, wherein FIG. 44B shows number of hair follicles in skin upon different treatments, wherein n=5 mice, across 2 independent experiments, mean±SD, statistical significance among different treatment groups (excluding the healthy control group) is calculated by one-way ANOVA with Tukey's Test for post-hoc analysis, with adjusted P values shown in the FIGS. 44A-44B, wherein P>0.05 for NS cases, according to an embodiment of the subject invention.

FIGS. 46A-46B show that topical application of $Au_3$@PEG-octadecyl$_{30\%}$ NPs does not induce significant acute systemic toxicity in the "treatment mode", wherein FIG. 46A shows that levels of alanine aminotransferase (ALT) in blood serum and blood urea nitrogen (BUN) of different groups are in the normal range for mice between green and red lines), wherein n=4 mice, across 1 experiment, wherein FIG. 46B demonstrates that histological examination of the liver, spleen, and kidney harvested from mice in different treatment groups shows no appreciable change in tissue morphology, wherein scale bar is 100 μm, and wherein representative images are chosen from n=3 images per mice from n=3 mice per group, according to an embodiment of the subject invention.

FIGS. 47A-47E show long-term toxicity evaluation of $Au_3$@PEG-octadecyl$_{30\%}$ NPs based on the "treatment mode", wherein FIG. 47A shows schedule of toxicity evaluation, wherein four weeks after the completion of the treatment (Day 37), the mice are depilated, wherein a day later (Day 38), the mice are sacrificed, wherein FIG. 47B shows changes in body weight during and after the treatment, wherein time-course body weights of mice are measured and normalized based on the weight on Day 7, wherein FIG. 47C shows levels of ALT, AST, and BUN in blood serum harvested from mice on Day 38, Mean±SD, wherein FIG. 47D shows normalized organ weights (mg) against body weight (g) on Day 38, wherein the healthy control mice are at the same age as that of the mice treated with NPs treated mice and sacrificed on Day 38, mean±SD, statistical significance is calculated by unpaired two-tailed t test, wherein NS stands for not significant, wherein FIG. 47E shows histological analysis of skin and major internal organs on Day 38, wherein n=4 mice, across 1 experiment, according to an embodiment of the subject invention.

FIGS. 49A-49B show correlation and expression quantity of samples, wherein FIG. 49A shows Heatmap demonstrating the Pearson correlation coefficients of all gene expressions between each two samples, and wherein FIG. 49B shows boxplot demonstrating the similar gene expression quantity distribution of samples, wherein FPKM stands for Fragments Per Kilobase Million, according to an embodiment of the subject invention.

FIGS. 50A-50B show differentially expressed genes (DEGs) in different pairwise comparisons, wherein Venn diagram of FIG. 50A shows the DEGs (Q value <0.05) in each pairwise comparison: "IMQ only" vs "IMQ $Au_3$@PEG-octadecyl$_{30\%}$ NPs" (2428 genes), "IMQ only" vs "IMQ $Au_3$@PEG-methoxy NPs" (343 genes) and "IMQ+$Au_3$@PEG-methoxy NPs" vs "IMQ+$Au_3$@PEG-octadecyl$_{30\%}$ NPs" (25 genes), wherein "Group X vs. Group Y" indicates statistically significant changes in RNA expression that are found in Group Y with reference to Group X as baseline, and wherein FIG. 50B shows volcano maps demonstrating the distribution of significantly up-regulated and down-regulated genes in different pairwise comparisons, according to an embodiment of the subject invention.

FIGS. 51A-51C show changes in gene expression in psoriatic skin with $Au_3$@PEG-alkyl$_{y, \%}$ NPs application in the "prevention mode", wherein skin tissues harvested from the mice of the "IMQ only", "IMQ+$Au_3$@PEG-methoxy NPs", or "IMQ+$Au_3$@PEG-octadecyl$_{30\%}$ NPs" groups are used for RNA-sequencing (RNA seq) analysis (n=3 mice per group, across 1 experiment), wherein FIG. 51A shows key enriched biological processes found in the "IMQ+$Au_3$@PEG-octadecyl$_{30\%}$ NPs" group when compared to the "IMQ only" group (Q<0.05), wherein FIG. 5113 shows differentially expressed genes [including (i) cytokines, (ii) antimicrobial peptides (AMPs), (iii) chemokine, and (iv) other related genes] found in the "IMQ+$Au_3$@PEG-octadecyl$_{30\%}$ NPs" group when compared to the "IMQ only" control group (Q<0.05), wherein the downregulated genes shown (colored in blue) are either enriched in the downstream of the IL-17 signaling pathway or are genes related to psoriasis, wherein FIG. 51C shows expression of selected important genes from skin treated with "IMQ only", "IMQ+Au$_3$@PEG-methoxy NPs", or "IMQ+Au$_3$@PEG-octadecyl$_{30\%}$ NPs, wherein FPKM stands for fragments per kilobase million, wherein n=3, statistical significance is calculated by one-way ANOVA with Tukey's Test for post-hoc analysis, with adjusted P values shown in the FIG. 51C, P>0.05 for NS cases, according to an embodiment of the subject invention.

FIG. 57 shows KEGG network diagrams of the three different pairwise comparisons, wherein (i) shows IMQ only vs IMQ+Au$_3$@PEG-octadecyl$_{30\%}$ NPs treated skin (total 2428 genes, since the amount of DEGs exceeds the processing capacity, wherein only DEGs with |log 2(relative expression)|≥1 and Q≤0.005 (498 genes) are analyzed and we only showed the network diagram of genes with at least one node connection, 113 genes left in the diagram) Relative expression: [the expression of genes in "IMQ+Au$_3$@PEG-octadecyl$_{30\%}$ NPs group" ][the gene expression in "IMQ only" group], wherein (ii) shows IMQ only vs IMQ+Au$_3$@PEG-methoxy NPs treated skin (total 343 genes, filtered by node connection ≥1, 79 genes left in the diagram), and wherein (iii) shows IMQ+Au$_3$@PEG-methoxy NPs vs IMQ+Au$_3$@PEG-octadecyl$_{30\%}$ NPs treated skin (total 25 genes, filtered by node connection ≥1, only 6 genes left in the diagram), according to an embodiment of the subject invention.

FIGS. 58A-58B show similarity and difference between topical application of Au$_3$@PEG-methoxy NPs and Au$_3$@PEG-octadecyl$_{30\%}$ NPs in the "prevention" mode, wherein FIG. 58A shows heatmap depicting the similarity of the gene expression profiles between the two pairwise comparisons of "IMQ only" vs "IMQ+Au$_3$@PEG-octadecyl$_{30\%}$ NPs" and "IMQ only" vs "IMQ Au$_3$@PEG-methoxy NPs", wherein the 284 commonly identified DEGs with Q value <0.05 in both pairwise comparisons are shown in the heatmap, and wherein FIG. 58B shows that the 25 DEGs found in the pairwise comparison between "IMQ+Au$_3$@PEG-octadecyl$_{30\%}$ NPs" vs "IMQ+Au$_3$@PEG-methoxy NPs" group indicates the effect of alkylation on gene expression, according to an embodiment of the subject invention.

BRIEF DESCRIPTION OF THE SEQUENCES

Figure 1:
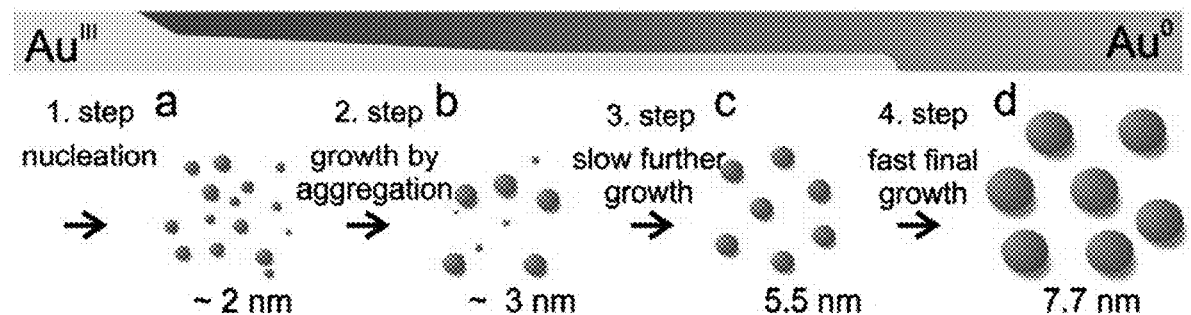
FIG. 1 is a schematic representation of the deduced process of gold NP formation, according to prior art.

SEQ ID NO: 1 Forward primer for Mouse Il17a
SEQ ID NO: 2 Reverse primer for Mouse Il17a
SEQ ID NO: 3 Forward primer for Mouse Il17f
SEQ ID NO: 4 Reverse primer for Mouse Il17f
SEQ ID NO: 5 Forward primer for Mouse Il12b
SEQ ID NO: 6 Reverse primer for Mouse Il12b
SEQ ID NO: 7 Forward primer for Mouse Il1b
SEQ ID NO: 8 Reverse primer for Mouse Il1b
SEQ ID NO: 9 Forward primer for Mouse Tnf
SEQ ID NO: 10 Reverse primer for Mouse Tnf
SEQ ID NO: 11 Forward primer for Mouse GAPDH
SEQ ID NO: 12 Reverse primer for Mouse GAPDH

DETAILED DISCLOSURE OF THE INVENTION

The embodiments of subject invention show a non-steroidal and topical solution for treating psoriasis. The interactions of the alkyl-PEG-AuNPs with skin, the self-therapeutic property of AuNPs against psoriasis, and the favorable therapeutic outcome are also discussed below.

The terminology used herein is for the purpose of describing particular embodiments only and is not intended to be limiting of the invention. As used herein, the term "and/or" includes any and all combinations of one or more of the associated listed items. As used herein, the singular forms "a," "am," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A platform termed "alkyl-PEG-AuNP" that comprises a gold nanoparticle (AuNP) core, a shell of polyethylene glycol (PEG) strands, and alkyl groups at the periphery is provided. Alkyl groups are commonly found in the form of hydrophobic excipients or cream in many skincare products or therapeutic ointments. Based on the in vitro and in vivo experiments, it is proved that alkylation of the NP surface can significantly enhance the delivery of AuNPs to Kera 308 cells, primary epidermal cells, and mouse skin.

The effects of alkyl chain length, alkyl chain loading, or Au core size such as Au core diameter on the distribution of alkyl-PEG-AuNP in both healthy mice and Imiquimod (IMQ) induced psoriatic mice are also investigated.

In certain embodiments, the alkyl chain length is in a range of 1-24 carbons, the alkyl chain loading is in a range of 0%-50%, and Au core size/diameter is in a range of 1-10 nm. The results show that alkyl-PEG-AuNP with a longer alkyl chain, a higher alkyl loading, and a smaller size exhibit higher skin permeability and entry to keratinocytes when compared to methoxy-PEG-AuNPs.

The anti-psoriatic potential of alkyl-PEG-AuNPs (with 30% octadecyl group loading and a 3 nm Au core, termed "octadecyl$_{30\%}$-PEG-Au$_3$ NPs") in the "prevention mode" by concurrently applying IMQ and alkyl-PEG-AuNPs for a certain period of time, for example, 6 days is also investigated. Remarkably, it is found that the octadecyl$_{30\%}$-PEG-Au$_3$ NPs, without drug loading, exhibit anti-psoriatic inflammation efficacy by inhibiting the development of psoriasis phenotype and significantly reducing epidermis thickness, proliferative keratinocytes, and CD3$^+$ T cell infiltration, and psoriasis-related cytokines. RNA sequencing analysis demonstrates that topical treatment with octadecyl$_{30\%}$-PEG-Au$_3$ NPs leads to a significant downregulation of the cytokine-cytokine receptor interaction and IL-17 inflammatory pathway.

To evaluate the translational potential of alkyl-PEG-AuNPs, a "treatment mode" is employed by establishing psoriasis in a mouse IMQ model for a certain period of time, for example, 6 days before topically applying certain doses, for example, 4 doses of octadecyl$_{30\%}$-PEG-Au$_3$ NPs. During the treatment period, both the octadecyl$_{30\%}$-PEG-Au$_3$ NPs and the Daivobet® ointment (a commercial anti-psoriasis ointment) show similar levels of anti-psoriatic efficacy when compared to PBS treated mice. At the end of treatment, octadecyl$_{30\%}$-PEG-Au$_3$ NPs treated skin appear normal and smooth, while Daivobet® ointment treated skin show wrinkles and hair loss.

Embodiment One: Alkyl-Terminated Gold Nanoparticles for Enhanced Topical Delivery to Skin Keratinocytes The delivery platform, termed "Au$_x$@PEG-alkyl$_{y\%}$ NP", contains a gold core, a shell of PEG strands, and a fraction of alkyl groups at the periphery. The platform provides the advantage of modularity, allowing for flexible adjustment of the length and density of alkyl group to be attached.

First, by screening a series of sub-15 nm alkylated NPs that bear different lengths and loadings of alkyl chains, it is proved that alkylation promotes the in vitro uptake of NPs by immortalized keratinocytes as well as primary epidermal cells isolated from both healthy mice and psoriatic mice.

Next, by topically applying un-alkylated NPs with various Au core sizes onto the skin of healthy mice and psoriatic mice, it shows that the optimal core size for epidermal delivery is about 3 nm.

Further, screening is performed to identify that sub-15 nm alkylated NPs with longer alkyl chains and higher alkyl loadings enter epidermal cells in both healthy skin and psoriatic skin more abundantly, showing that Au$_3$@PEG-octadecyl$_{30\%}$ NP is the top performer. As a result of these comprehensive studies on skin-nano interaction, Au$_3$@PEG-octadecyl$_{30\%}$ NP is chosen for downstream efficacy studies.

Materials and Methods 1.1.1 Synthesis of HS-PEG$_{1000}$-Alkyl

The carboxyl group of the bifunctional PEG linker, HS-PEG$_{1000}$-COOH (JenKem Technology), is activated by 1-ethyl-3-(3-(dimethylamino)propyl)-carbodiimide (Sigma)/N-hydroxy succinimide (Sigma) (EDC/NHS) chemistry, HS-PEG1000-COOH (0.1 µmol), EDC (0.5 µmol), NHS (0.5 µmol), and trimethylamine (0.5 µmol) (TAE) (Sigma) is dissolved in 1 mL of freshly distilled dichloromethane (DCM) and vortexed for 2 hours. Next, 0.5 µmol of hexylamine (H$_2$N—C$_6$H$_{13}$) (Sigma), dodecylamine (H$_2$N—C$_{12}$H$_{25}$) (Sigma), or octadecylamine (H$_2$N—C$_{18}$H$_{37}$) (Alfa Aesar), initially dissolved in 0.5 mL of DCM, is added in excess to the 0.1 µmol of activated PEG linker, followed by vortexing overnight. The reaction mixture is added dropwise into cold diethyl ether and then centrifuged at 3000×g for 3 minutes. The precipitated PEG product is washed with cold diethyl ether for 5 more times with sonication and briefly dried. Finally, the product is dialyzed against methanol for 1 week, against 0.1% acetic acid in water for 1 day, and against deionized water for 1 more day. Successful conjugation of alkylamine to the bifunctional PEG linker is confirmed by matrix-assisted laser desorption/ ionization time-of-flight (MALDI-TOF) (Bruker).

1.1.2 Synthesis of Gold NPs ($Au_x$ NPs) with Different Core Sizes (x)

AuNPs can be prepared by various methods including chemical, sonochemical, or photochemical routes.[7] The most common chemical route is precipitation of the AuNPs in an aqueous solution obtained from a dissolved gold precursor, for example, $HAuCl_4$, by a reducing agent such as sodium citrate, ascorbic acid, sodium boron hydride, or block-copolymers. Whereas in most cases another stabilizing agent is required to inhibit agglomeration or further growth of the NPs, some reducing agents, for example, sodium citrate and block copolymers also act as stabilizers. The classical citrate method of reduction of a gold precursor with sodium citrate in aqueous solution near the boiling point[8] is one of the most reliable synthesis pathways. Using the combination of small-angle X-ray scattering and X-ray absorption near-edge spectroscopy analysis, Polte et al. proposed a four-step mechanism of AuNP formation[9] as shown in FIG. 1. Particles are formed through a sequence of reaction steps comprising fast initial formation of small nuclei, coalescence of the nuclei into bigger particles, slow growth of particles sustained by ongoing reduction of gold precursor, and subsequent fast reduction ending with the complete consumption of the precursor species.

The size of the final gold NPs is tunable by changing both the activity of the gold precursor and the reducing power of the reductants or their ratios. Generally, a strong reductant such as sodium borohydride results in the formation of small gold NPs and a weak reductant such as citrate results in the formation of large particles. Moreover, the temperature and time duration of the reaction also have effects on the NP size.

To synthesize AuNPs of about 3 nm in diameter ($Au_3$ NPs), 100 µL of 50 mM $HAuCl_4$ (Sigma) and 129 µL of 38.8 mM sodium citrate (1% w/v) (Alfa Aesar) is added into 20 mL of Nanopure water. The mixture immediately turns brownish orange after injection of 0.6 mL of 0.1 M freshly prepared $NaBH_4$ (Sigma) under rapid stirring. The resultant solution is stirred for 30 minutes and incubated at 60° C. for another 30 minutes. To synthesize AuNPs of 6 nm in diameter ($Au_6$ NPs), 50 mL of 0.01% (w/v) $HAuCl_4$ is brought to boil in a 125 mL flask for 6-7 minutes. A reducing agent containing 1 mL of 38.8 mM sodium citrate (1% w/v) and 225 µL of freshly prepared 1% (w/v) tannic acid (Sigma) is injected into the boiling solution under vigorous stirring. The solution immediately changes to dark violet and wine red in a few seconds. The mixture is kept boiling for another 5 minutes before being cooling down to the room temperature. AuNPs of 13 nm in diameter ($Au_{13}$ NPs) is synthesized by the Frens' method[13]. 50 mL of 1 mM $HAuCl_4$ is brought to boil, followed by a rapid injection of 5 mL of 38.8 mM sodium citrate under vigorous stirring. The reaction is stopped after 15 minutes.

1.1.3 Preparation of Alkyl-Terminated, PEG-Coated AuNPs ($Au_x$(PEG-Alkyl$_{y, \%}$ NPs)

Figure 2:
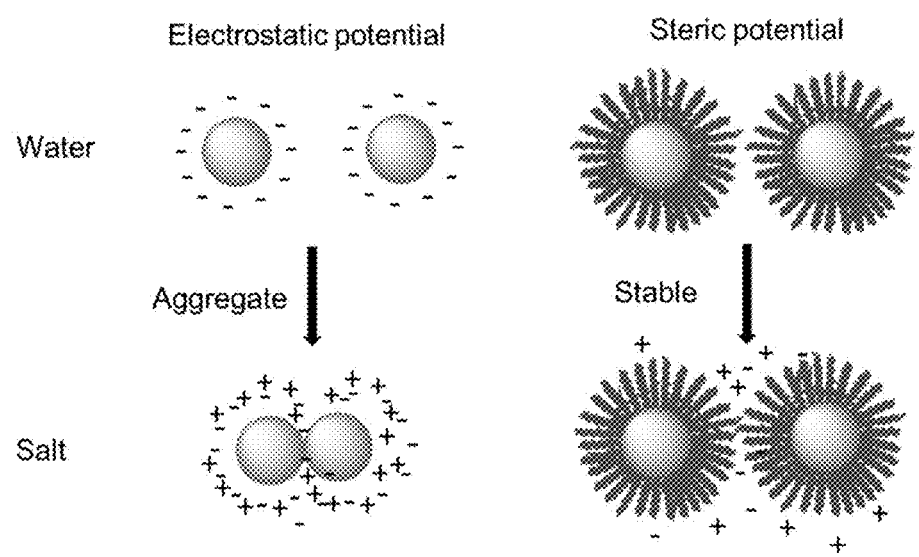
FIG. 2 is a schematic representation of two types of stabilization of colloidal dispersion, according to an embodiment of the subject invention.

The citrate-capped gold cores are negatively charged such that they maintain colloidal stability in aqueous solution by electrostatic repulsion. However, in high-ionic-strength solvents (for example, saline), the gold cores aggregate due to electrostatic screening of the negative charges around the gold cores by the positive salt ions (for example, $Na^+$), NP aggregation is a nearly irreversible process in which the particles attach to one another as shown in FIG. 2. To make sure the AuNPs are monodispersed in saline and biological medium, the gold cores are coated with a shell of PEG strands by Au—S bonds. The dense PEG shell keeps the colloidal stability of AuNPs by increasing the steric hindrance between Au cores.

First, an aqueous suspension of citrate-capped $Au_x$ NPs (x=3 nm, 6 nm, or 13 nm) is mixed with y mol % of HS-$PEG_{1000}$-alkyl and (100–y) mol % of HS-$PEG_{1000}$-$OCH_3$ (JenKem Technology) by keeping the total PEG concentration at 10 PEG molecules per $nm^2$ of AuNP surface to be coated. All PEGylation reactions last for 1 hour with sonication, followed by purification by 5 rounds of centrifugal filtration (Amicon® Ultra-15, MWCO: 50 k Da) at 4,000 g for 15 minutes and resuspension in deionized water. For confocal fluorescence imaging, cyanine 5 (Cy5)-labeled $Au_3$-PEG-alkyl$_{y, \%}$ NPs are also prepared. An aqueous suspension of citrate-capped $Au_3$ NPs is mixed with y mol % of HS-$PEG_{1000}$-alkyl, (99–y) mol % of HS-$PEG_{1000}$-$OCH_3$, and 1 mol % of HS-$PEG_{1000}$-Cy5 (JenKem Technology) by keeping the total PEG concentration at 10 PEG molecules per $nm^2$ of AuNP surface to be coated. 1 ml % of Cy5 loading is selected because it does not severely affect the physiochemical properties (for example, hydrodynamic sizes and zeta potentials) and the cellular uptake properties of the NPs. All PEGylation reactions last for 1 hour with sonication in the dark, followed by purification and resuspension in deionized water.

1.1.4 Physicochemical Characterization of $Au_x$@PEG-alkyl$_{y, \%}$ NPs

The concentration of the NPs is determined by spectrophotometry (Agilent Cary 5000) based on the Beer-Lambert's law and the molar extinction coefficient of AuNPs at 450 nm ($Au_3$ NPs: $1.49 \times 10^6$ $M^{-1}$ $Au_6$ NPs: $1.26 \times 10^7$ $M^{-1}$ $cm^{-1}$; $Au_{13}$ NPs: $1.39 \times 10^8$ $M^{-1}$ $cm^{-1}$). Hydrodynamic diameters (HD) and ζ-potentials are measured by the DelsaMax PRO light-scattering analyzer (Beckman Coulter), For HD measurements, the NPs are suspended in PBS buffer. For ζ-potential analysis, the NPs are suspended in 1 mM KCl. The values represent mean+SD from three independent measurements. The AuNPs are visualized by TEM at a voltage of 100 kV (Hitachi H7700).

1.1.5 Quantification of PEG Strands on AuNPs

The density of PEG strands attached to the AuNP surface in terms of number of PEG strands per NP or per $nm^2$ is determined based on the thiol depletion approach using Ellman's assay (5,5-dithiobis (2-nitrobenzoic acid)) (JenKem Technology). After PEGylation of AuNPs of different sizes, the supernatant containing free alkyl-PEG-SR strands are obtained after centrifugation. Then, 20 µL of concentrated supernatant is added to 100 µL of assay buffer (for example, 1 mM EDTA and 0.1 M sodium phosphate dibasic; pH=8). 50 µL of detection buffer (for example, 0.5 mg/mL Ellman's reagent formulated in assay buffer) is added into the mixture. Known concentrations of $Au_x$@PEG-alkyl$_{y, \%}$ NPs are used as standards. The reaction is allowed to proceed for 10 minutes and an absorbance at 412 nm is recorded by a UV-absorbance plate reader (Thermo Scientific Multiskan GO). The PEG amount on the AuNP surface is calculated by subtracting the PEG amount in the supernatant from the total PEG amount initially added. The PEG density is calculated by dividing the number of PEG strands by the surface area of AuNPs.

1.1.6 Water/1-Octanol Partitioning of NPs 0.5 mL of 1-octanol (Sigma) and 0.5 mL, of Nanopure water containing $Au_x$@PEG-alkyl$_{y, \%}$ NPs (50 ppm) are added into a glass vial and mixed at 40 rpm using a tube revolver (Thermo Scientific). After 24 hours, the concentration of the NPs remaining in the aqueous phase is determined by UV-vis spectroscopy (Agilent Cary 5000).

1.1.7 Uptake of NPs by Immortalized Keratinocytes

Mouse Kera-308 keratinocytes (Cell Lines Service) are cultured in complete DMEM [DMEM (Gibco) supplemented with 10% FBS (Gibco) and 1% penicillin/streptomycin (Gibco)] and maintained at 37° C. and in an environment with 5% $CO_2$. Cells are pre-seeded in 24-well plates until the cell population reached about 80% confluence. During the uptake experiment, the cells are incubated with 300 nM $Au_3$@PEG-alkyl$_{y, \%}$ NPs or equivalently, 50 ppm Au, formulated in 0.3 mL of OptiMEM (Gibco) per well for 24 hours. It is noted that alkyl$_{y, \%}$ includes methoxy, hexyl$_{10\%}$, dodecyl$_{10\%}$, octadecyl$_{10\%}$, hexyl$_{30\%}$, dodecyl$_{30\%}$, and octadecyl$_{30\%}$. After that, the cells are rinsed with phosphate-buffered saline (PBS) twice and trypsinized (0.25% Trypsin-EDTA, Gibco) for cell counting by a hemocytometer. Cell pellets are collected by centrifugation at 500 g for 10 minutes for further ICP-MS analysis of the Au content associated with the cells.

1.1.8 Removal of Hair for In Vivo Studies

All procedures followed the guidelines stipulated by the Animal Experimentation Ethics Committee at The Chinese University of Hong Kong. The dorsal hairs (about 3 cm×3 cm in area) of Balb/c mice (male or female, 6-8 weeks old) are shaved using an electronic shaver (Hair clipper A2, Jiamei) and treated with a thin layer of hair remover spray foam (about 1 g, Dimples) under anesthesia. The mice are intraperitoneally injected with ketamine (100 mg/kg) and xylazine (10 mg/kg) to achieve anesthesia. After 10 minutes, the hair remover spray foam is wiped by cotton and the skin is rinsed by PBS-soaked cotton for 3 times. Then, the depilated mice are used for further distribution or efficacy experiments. At the end of the experiments, the animals are sacrificed by cervical dislocation under anesthesia.

1.1.9 Isolation of Primary Epidermal Cells from Healthy Mouse Skin

After hair removal, the dorsal skin is immediately isolated after sacrifice. Freshly isolated skin is chopped into slices of 10 mm² in area and then digested with 2 mL of neutral protease (LS02109, 2.4 U/mL, Worthington) in a 35 mm cell culture dish with the epidermis side up for 3 hours at 37° C. to detach the epidermis from the tissue. The epidermis is digested by adding 0.2 mL of 0.25% Trypsin-EDTA (Gibco) for 20 minutes. Then, the cells are filtered by passing the cell suspension through a cell strainer (40 μm, Falcon) and collected by centrifugation at 500×g for 10 minutes.

1.1.10 Uptake of NPs by Primary Epidermal Cells

Three healthy mice are sacrificed for harvesting the fresh primary epidermal cells. After resuspending the cells in OptiMEM and combining them into one single tube of about 7.2 mL in total volume, they are seeded in an entire 24-well plate of wells at a seeding density of about 4×10⁵ cells per well. Next, the cells are incubated with $Au_3$@PEG-alkyl$_{y, \%}$ NPs (alkyl$_{y, \%}$: methoxy, hexyl$_{10\%}$, dodecyl$_{10\%}$, octadecyl$_{10\%}$, hexyl$_{30\%}$, dodecyl$_{30\%}$, octadecyl$_{30\%}$) formulated with 150 μL of OptiMEM, such that the final concentration of $Au_3$@PEG-alkyl$_{y, \%}$ NPs is 300 nM or equivalently 50 ppm. After 24 hours, the cell pellets are collected by centrifugation at 500×g for 10 minutes, rinsed with PBS for 3 times, and collected for ICP-MS analysis.

1.1.11 ICP-MS Analysis

The cell pellets collected from in vitro cellular uptake experiments, or the isolated epidermis collected from in vivo distribution and efficacy experiments are digested by adding 0.25 mL of aqua regia [68% $HNO_3$: 37% HCl=1:3 (v/v)] overnight at room temperature. The composite layer of skin dermis and hypodermis (D+HD) and other internal organs excised from mice are fully digested in 1 mL of aqua regia for 2-3 days. The lysate is diluted to 10 mL by adding matrix solution (for example, 2% HCl, 2% $HNO_3$) with 10 ppb indium as internal standard, followed by passing through a 0.2 μm hydrophilic syringe filter for ICP-MS analysis (Agilent 7900).

1.1.12 Biodistribution of NPs on Healthy Mouse Skin

After hair removal, Balb/c mice are randomly divided into various treatment groups. A piece of gauze (15 mm×25 mm), pipetted with 200 μL of $Au_x$@PEG-alkyl$_{y, \%}$ NP solution with about 3 μM $Au_3$@PEG-alkyl$_{y, \%}$ NPs, about 500 nM $Au_6$@PEG-alkyl$_{y, \%}$ NPs, or about 50 nM $Au_{13}$@PEG-alkyl$_{y, \%}$ NPs in PBS; or equivalently 500 ppm Au for all three Au core sizes, is applied to the shaved area of healthy mice, followed by covering the NP-applied area with a piece of Tegaderm (3M) adhesive dressing for 24 hours. After that, the gauze is removed, and the treated skin is rinsed with PBS-containing cotton for 3 times. The mice are then sacrificed for harvesting the skin. The harvested NP-containing skin (for example, 15 mm×25 mm) is cut into slices, treated with neutral protease for 3 hours to separate the epidermis from the composite layer of dermis and hypodermis. Then, the epidermis is treated with trypsin for 20 minutes and filtered by a cell strainer (40 μm) to obtain a single primary epidermal cell suspension. Then, the cell pellets are collected by centrifugation at 500 g for 10 minutes. It is noted that the collected epidermal cell pellet is denoted as isolated epidermis. Next, the isolated epidermis and H+HD composite layer are digested by adding 0.25 mL and 1 mL of aqua regia, respectively, for ICP-MS quantification. The collected NP-containing skins are also processed to prepare samples for TEM and histological analysis (see procedures below) to elucidate the cellular-level distribution of NPs.

1.1.13 TEM Imaging

TEM Imaging of the Isolated Epidermal Cells

The cell pellets are fixed with glutaraldehyde (for example, 2.5% in phosphate buffer, pH=7.2-7.4, J&K Scientific) at room temperature for 2 hours and stained by osmium tetroxide [2%, Electron Microscopy Sciences (EMS)] for 1 hour. Blocks are washed by phosphate buffer (pH=7.2-7.4) for 3 times, then gradually dehydrated in increasing ethanol gradients and propylene oxide. The blocks are embedded in Epon 812 resins (EMS) and polymerized at 55° C. for 48 hours. Ultrathin sections of about 70 nm in thickness are deposited onto 200-mesh copper grids (EMS) and stained with 4% uranyl acetate (in 50% methanol/water, EMS) and Reynolds lead citrate (Sigma) for observation under TEM at a beam voltage of 100 kV (Hitachi H7700).

TEM Imaging of the Whole Skin Tissue

NP-treated skin tissue blocks (about 1 mm×1 mm×3 mm) are fixed with glutaraldehyde (2.5% in phosphate buffer, pH=7.2-7.4) at 4° C. overnight. It is noted that the use of heavy metal stains, for example, osmium, uranium, and lead, is omitted to increase the contrast between the small AuNPs of 3 nm and the tissue structures. Instead, skin blocks are gradually dehydrated in increasing ethanol gradients and propylene oxide, followed by embedding in Epon 812 resins and polymerization at 55° C. for 48 hours. Ultrathin sections of about 70 nm in thickness are deposited onto 200-mesh copper grids (EMS) for observation under TEM at a beam voltage of 100 kV (Hitachi H7700). As a negative control, untreated skin tissue blocks are also prepared using the above protocol for TEM imaging.

The cell pellets are fixed with glutaraldehyde (2.5% in phosphate buffer, pH=7.2-7.4, J&K Scientific) at room temperature for 2 hours and stained by osmium tetroxide [2%, Electron Microscopy Sciences (EMS)] for 1 hour. Blocks are washed by phosphate buffer (pH=7.2-7.4) for 3 times, then gradually dehydrated in increasing ethanol gradients and propylene oxide. The blocks are embedded in Epon 812 resins (EMS) and polymerized at 55° C. for 48 hours. Ultrathin sections of about 70 nm in thickness are deposited onto 200-mesh copper grids (EMS) and stained with 4% uranyl acetate (in 50% methanol/water, EMS) and Reynolds lead citrate (Sigma) for observation under TEM at a beam voltage of 100 kV (Hitachi H7700).

1.1.14 Histology

Tissues are fixed in 10% buffered formalin (3.7% w/v) for 24 hours and then stored in PBS (0.1 M, pH=7.5) at 4° C. until tissue dehydration. Fixed tissues are dehydrated in ethanol, cleared in xylene, and embedded in paraffin blocks. Paraffin-embedded tissues are cut into sections of 5 μm thick using a rotary microtome (Leica RM 2235) and mounted on Superfrost Plus™ Adhesion microscope slides (Thermo Scientific). Paraffin-embedded tissue slides of 5 μm thick are deparaffinized in xylene (5 min 3 times) and rehydrated through a series of ethanol (100%, 90%, 70%; 3 min×2 times at each ethanol concentration) as well as deionized water (Milli Q) (5 min×5 times). Then, the tissues are counterstained by hematoxylin and eosin (Sigma) for 2 minutes and 1 minute, respectively. The stained sections are dehydrated in ethanol, cleared in xylene, and mounted with DPX mountant (Sigma) for visualization and photograph under a Ti-E motorized inverted fluorescence microscope (Nikon) in bright-field mode.

1.1.15 Silver Enhancement Staining

Deparraffinized and rehydrated tissue sections of 5 μm thick are stained by the Silver Enhancement Kit for Light and Electron Microscopy (Nanoprobes). The silver enhancement solutions, A (enhancer) and B (initiator), are mixed at a 1:1 ratio immediately before use. A drop of the mixture of about 50 μL is applied to the tissue section for 15 minutes in the dark. The tissue sections are rinsed with Milli Q water (3 minutes×3 times), followed by immunofluorescence staining or hematoxylin and eosin staining.

1.1.16 Confocal Immunofluorescence (IF) to Determine Cellular-level Distribution of NPs Silver-enhanced tissue sections undergo antigen retrieval by a microwave-based antigen retrieval technique[17]. After immersing in citrate buffer (10 mM sodium citrate, 0.05% Tween 20, pH=6.0), the slides are heated in a microwave oven for 3 minutes under high power at about 95-100° C. and for 20 more minutes under low power. After cooling in the heated solution for 30 minutes, the slides are washed in distilled water twice, then rinsed in PBS for 5 minutes. Next, the slides are blocked with 2.5% normal horse serum (Vector Laboratories) for 2 hours at room temperature and incubated with 50 μL of primary antibodies [1× prediluted AE1/AE3 (ab961, Abcam), 5 μg/mL for CD207 (Langerin; 14-2073-82; Thermo Scientific), and 2.5 μg/mL for CD3 (ab16669; Abcam)] formulated in horse serum overnight at 4° C. After rinses with PBS, the sections are stained with secondary antibody [5 μg/mL Alexa Fluor 532-conjugated goat anti-mouse secondary (A11002; Thermo Scientific) for AE1/AE3, 5 μg/mL Alexa Fluor 647-conjugated goat anti-rat secondary (A21247; Thermo Scientific) for CD207, and 5 μg/mL Alexa Fluor 532-conjugated goat anti-rabbit secondary (A10520; Thermo Scientific) for CD3] at room temperature for 1 hour. Next, the slides are stained by 4',6-diamidino-2-phenylindole (1 μg/mL DAPI; D9542; Sigma-Aldrich) for 10 min, washed in PBS for 3 times and in distilled water twice, and mounted with Antifade Mountant (P36980; Thermo Scientific). Slides are visualized under a confocal laser scanning microscope (TCS SP8, Leica). The excitation wavelengths of DAPI, Alexa Fluor 532, and Alexa Fluor 647 are 405 nm, 532 nm, and 647 nm, respectively. The emission wavelength ranges of DAPI, Alexa Fluor 532, and Alexa Fluor 647 are 415-500 nm, 542-650 nm, and 657-700 nm, respectively. Images are taken at the same laser settings for each fluorophore type (DAPI, Alexa Fluor 532 or Alexa Fluor 647). For reflectance imaging to detect the Au cores, the samples are imaged under a Leica SP8 microscope in the reflectance mode with a 20× objective under the excitation of an argon laser at 488 nm and the emission wavelength range is 483-493 nm. All reflectance images are taken at the same laser settings irrespective of the fluorophore type. Fluorescent images and reflectance images are taken between frames. The overlay images and mean fluorescent intensity (MFI) of the reflected signal (from Au core) in the region of cells stained positively by the fluorescent dye (e.g., $CD3^+$ cells, $CD207^+$ cells, and $AE1/AE3^+$ cells) are processed by the Image J software.

1.1.17 Animal Disease Model of Psoriasis

Balb/c mice between 6 and 8 weeks of age are randomly divided into various treatment groups after dorsal hair removal on Day 0. Each mouse receives a daily topical dose of 62.5 mg of commercially available IMQ cream (Aldara, 5% w/w) on the depilated back (3 cm×3 cm in area) for 6 consecutive days. On Day 7, the psoriasis disease model is established for further studies such as primary epidermal cell uptake and biodistribution of NPs.

1.1.18 Primary Psoriatic Epidermal Cells Isolation and Uptake of NPs

Balb/c mice between 6 and 8 weeks of age are depilated on Day 0 and daily receive topical application of 62.5 mg of IMQ cream on the dorsal skin (3 cm×3 cm) for 6 consecutive days (Day 1 to Day 6). On Day 7, the psoriatic skin is harvested for epidermal cells isolation via the same method as that of healthy mice. Then, the primary epidermal cells (from 1 psoriasis mouse), freshly seed in a 24-well plate at a density of about $4\times10^5$ cells per well, are incubated with 0.3 mL of 300 nM $Au_3$@PEG-alkyl$_{y\ \%}$ NPs (alkyl$_{y\ \%}$; methoxy, hexyl$_{10\%}$, dodecyl$_{10\%}$, octadecyl$_{10\%}$, hexyl$_{30\%}$, dodecyl$_{30\%}$, octadecyl$_{30\%}$; or equivalently 50 ppm Au) in OptiMEM. After 24 hours, the cell pellets are collected and washed by PBS for 3 times for ICP-MS measurements.

1.1.19 Biodistribution of NPs in Psoriatic Mouse Skin

When IMQ-induced psoriasis is established on Day 7, the mice are randomly divided into different groups (n=3-4 mice per group) for topically applying 200 μL of $Au_x$@PEG-alkyl$_{y\ \%}$ NPs (about 3 μM $Au_3$@PEG-alkyl$_{y\ \%}$ NPs, about 500 nM $Au_6$@PEG-methoxy NPs, or about 50 nM $Au_{13}$@PEG-methoxy NPs in PBS; or equivalently 500 ppm Au for all three Au core sizes). For $Au_3$@PEG-alkyl$_{y\ \%}$ NPs, 10 mol % octadecyl, 30 mol % hexyl, 30 mol % dodecyl, 30 mol % octadecyl, and 50 mol % octadecyl groups are selected for the PEG coating. Detailed experimental procedures of topical application of NPs and further analysis are the same as that of the healthy mice. For $Au_6$@PEG-alkyl$_{y\ \%}$ and $Au_{13}$@PEG-alkyl$_{y\ \%}$ NPs, only NPs with 30 mol % octadecyl groups are tested. $Au_x$@PEG-methoxy NPs serve as control for each size. Detailed experimental procedures of topical application of NPs and further analysis are the same as that of the healthy mice.

1.1.20 Intradermal Distribution of NPs in Fluorescence Mode

Skin harvested from mice treated with Cy5-labeled NPs is cut into slices (3 mm×10 mm), frozen in Shandon Cryomatrix frozen embedding medium (Thermo Fisher Scientific) and sliced into cryosections of 20 µm thick. After fixing in cold acetone at −20° C. for 20 minutes, the slides are rinsed with PBS and stained by 4',6-diamidino-2-phenylindole (1 µg/mL DAPI; D9542; Sigma-Aldrich) for 10 minutes. After being rinsed with PBS for 3 times and with distilled water twice, the stained slides are mounted with Antifade Mountant (P36980; Thermo Scientific) and visualized under a confocal laser scanning microscope (TCS SP8, Leica) at identical imaging settings. The excitation wavelengths of DAPI and Cy5 are 405 nm and 647 nm, respectively. The emission wavelength ranges of DAPI and Cy5 are 415-500 nm and 657-700 nm, respectively.

1.2 Results

1.2.1 Preparation and Characterization of Thiol-PEG-Alkyl Ligand

Figure 3A:
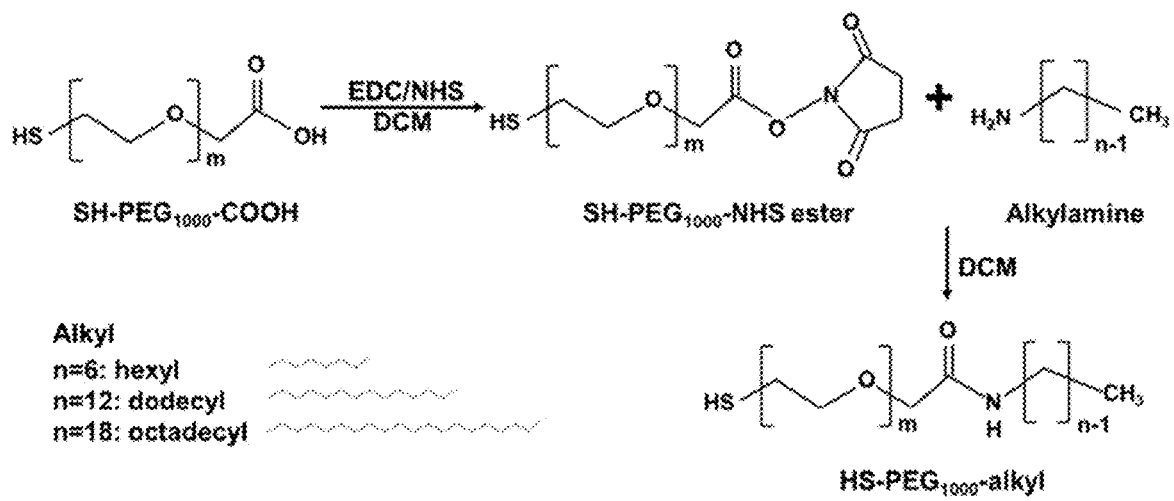

The bifunctional alkyl (hexyl, dodecyl, octadecyl), and thiol-terminated PEG strands (HS-PEG-alkyl) for the surface passivation of AuNPs are prepared. First, the carboxyl group of a bifunctional PEG (MW: about 1000) linker is activated by EDC (1-ethyl-3-(3-dimethylaminopropyl)-carbodiimide/NHS (Nthydroxysuccinimide) chemistry. Then, HS-PEG-NHS ester reacts with the amine group of the alkylamine to form HS-PEG-alkyl as shown in FIG. 3A. To inhibit the presence of free unreacted alkylamines associated with the alkyl-terminated AuNPs from interfering with the cellular uptake data, the HS-PEG-alkyl product is extensively purified by solvent extraction and dialysis.

Figure 3B:
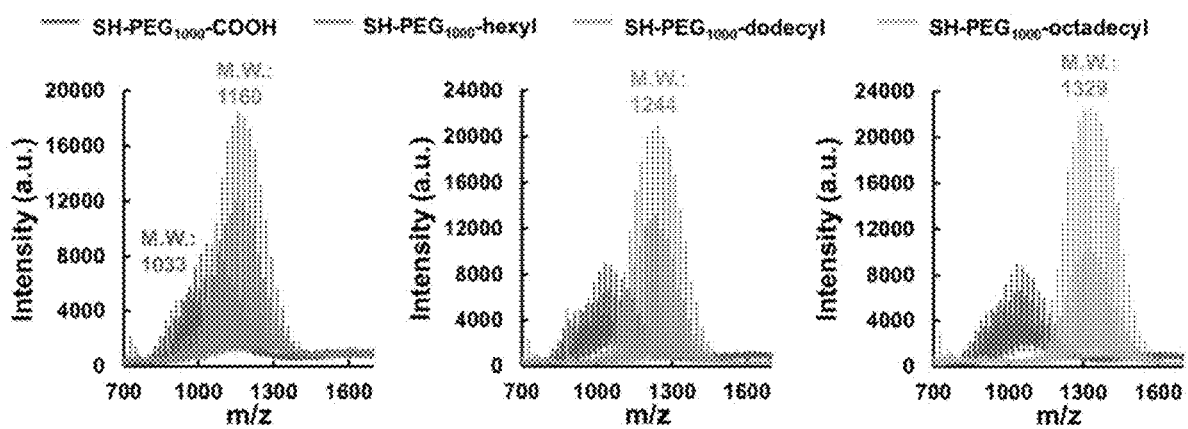

After dialysis, MALDI-TOF is used to characterize the molecular weight of the product as shown in FIG. 3B. After covalent conjugation of dodecyl-amine to carboxyl-PEG-thiol, a right-shift of the peak of MALDI-TOF spectra of SH-PEG-alkyl is observed. Covalent conjugation of alkylamine to COOH-PEG$_{1000}$-thiol leads to a right-shift of the peak of the MALDI-TOF spectra of hexyl-PEG$_{1000}$-thiol, dodecyl-PEG$_{1000}$-thiol, and octadecyl-PEG$_{1000}$-thiol.

Figure 4:
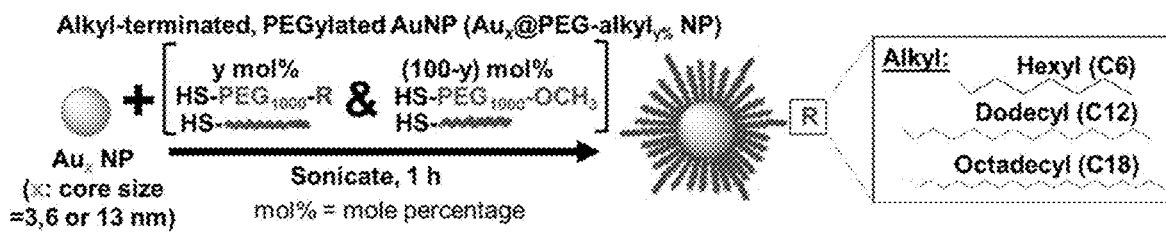
FIG. 4 shows design of alkyl-terminated, PEG-coated AuNPs, wherein Alkyl (R: hexyl, dodecyl, octadecyl) groups are conjugated to the thiol-terminated PEG strands (MW: 1000 Da) for forming bifunctional alkyl, and thiol-terminated PEG strands (HS-PEG-alkyl), and wherein a mixture of y mol % of HS-PEG-methoxy and (100−y) mol % of HS-PEG-R is added to citrate-capped $Au_x$ NPs to deposit the PEG coating onto the surface of AuNPs to form $Au_x$@PEG-$alkyl_{y\ \%}$ NPs via gold-sulfur linkages, according to an embodiment of the subject invention.

1.2.2 Preparation and Characterization of Alkyl-Terminated, PEG-Coated AuNPs A library of alkyl-terminated AuNPs with an overall hydrodynamic diameter smaller than 20 nm for topical delivery in vivo is established, because NP with a diameter larger than 25 nm cannot permeate the epidermis. Specifically, citrate-capped AuNPs is coated with a core diameter of 3 nm, 6 nm, or 13 nm with a mixture of y mol % of HS-PEG$_{1000}$-alkyl strands that bear hexyl, dodecyl, or octadecyl groups and (100−y) mol % of HS-PEG$_{1000}$-methoxy as shown in FIG. 4. The dense layer of PEG$_{1000}$ strands (M.W: about 1000 Da) ensures that the NP platform is stable and largely hydrophilic. The library of NPs is denoted as Au$_x$@PEG-alkyl$_{y \%}$NPs (x: Au core size in nm; y: mol % of alkyl loading in the PEG shell). The ratio added is optimized such that the NP remains largely hydrophilic and stable.

Figure 5A:
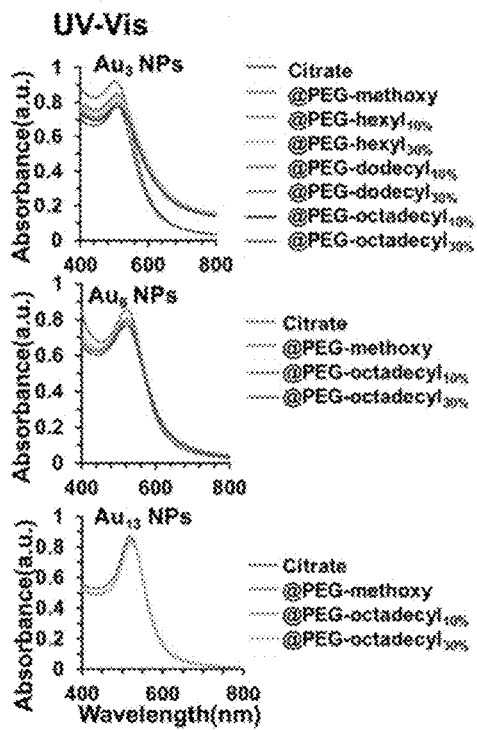
Figure 5B:
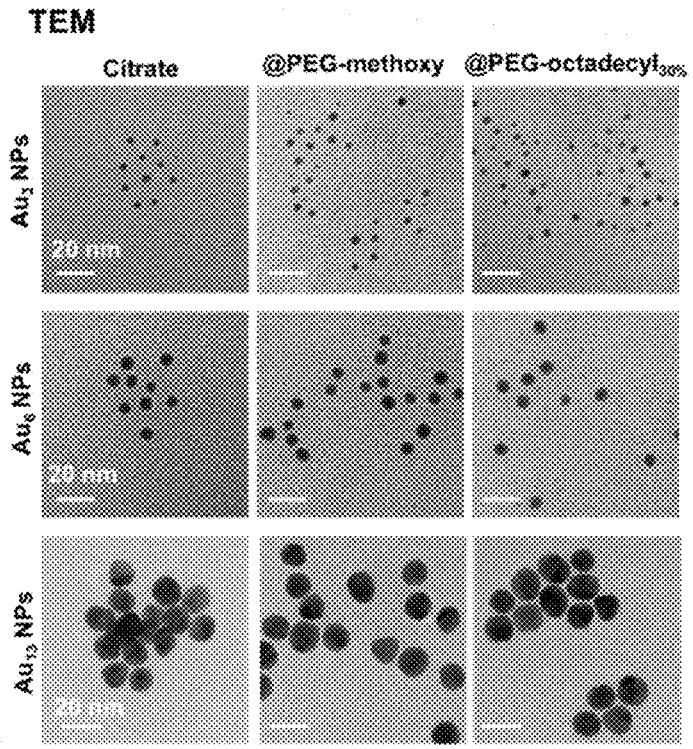

It is confirmed that the loading of PEG strands by Ellman's assay and the colloidal stability of the Au$_x$@PEG-alkyl$_{y \%}$ NPs in water and UV-Vis spectrophotometry, respectively as shown in Table 1 and FIG. 5A. For Au$_3$ NPs and Au$_{13}$ NPs, attachment of methoxy-terminated PEG strands to AuNPs leads to a red-shift in the surface plasmon resonance (SPR) peak. The SPR peaks of Au$_6$@PEG-alkyl$_{y \%}$ NPs display a 1-2 nm blue-shift due to the removal of tannic acid. By TEM, it is confirmed that the mean physical diameters of citrate-capped Au$_3$, Au$_6$, and Au$_{13}$ NPs are 3.41±0.51 nm, 5.48±0.67 nm, and 12.36±1.3 nm, respectively as shown in FIG. 5B. The resultant Au$_x$@PEG-octadecyl NPs (x: 3, 6, or 13 nm) remain monodisperse upon loading with 0% or 30% octadecyl groups which is the highest alkyl loading used for the experiments.

TABLE 1

Hydrodynamic size, ζ-potential, PEG loading, and colloidal stability in PBS of Au$_x$@PEG-alkyl$_{y \%}$ NPs.

| Sample | HD size in water (nm) [a] | HD size after incubation in PBS (37° C., 24 h) (nm) | ζ-potential in 1 mM KCl (mV) | No. of PEG strands/nm$^2$ of AuNPs surface |
|---|---|---|---|---|
| Citrate-capped Au$_3$ NPs | 6.43 ± 0.23 (0.24) | 226.03 ± 15.59 (0.23) | −17.81 ± 4.23 | NA |
| Au$_3$@PEG-methoxy NPs | 9.45 ± 0.10 (0.19) | 9.75 ± 0.32 (0.16) | −3.52 ± 0.37 | 5.73 ± 0.03 |
| Au$_3$@PEG-hexyl$_{10\%}$ NPs | 9.70 ± 0.21 (0.14) | 9.62 ± 0.41 (0.19) | −3.79 ± 0.14 | 5.56 ± 0.09 |
| Au$_3$@PEG-hexyl$_{30\%}$ NPs | 9.98 ± 0.32 (0.26) | 11.20 ± 0.32 (0.31) | −2.84 ± 0.65 | 5.07 ± 0.14 |
| Au$_3$@PEG-dodecyl$_{10\%}$ NPs | 10.96 ± 0.42 (0.2) | 11.45 ± 0.67 (0.24) | −3.63 ± 1.05 | 5.59 ± 0.13 |
| Au$_3$@PEG-dodecyl$_{30\%}$ NPs | 12.64 ± 0.51 (0.33) | 13.93 ± 0.41 (0.34) | −1.89 ± 0.99 | 5.12 ± 0.22 |
| Au$_3$@PEG-octadecyl$_{10\%}$ NPs | 12.71 ± 0.58 (0.22) | 12.86 ± 0.53 (0.32) | −4.73 ± 1.53 | 5.6 ± 0.1 |
| Au$_3$@PEG-octadecyl$_{30\%}$ NPs | 13.30 ± 0.45 (0.35) | 14.5 ± 0.61 (0.33) | −1.65 ± 0.87 | 5.14 ± 0.15 |
| Citrate-capped Au$_6$ NPs | 10.87 ± 0.06 (0.21) | 80.57 ± 1.80 (0.57) | −19.51 ± 3.93 | NA |
| Au$_6$@PEG-methoxy NPs | 13.67 ± 0.23 (0.17) | 13.52 ± 0.36 (0.15) | −3.89 ± 0.14 | 5.44 ± 0.32 |
| Au$_6$@PEG-octadecyl$_{10\%}$ NPs | 14.20 ± 0.26 (0.14) | 14.78 ± 0.43 (0.18) | −1.35 ± 0.41 | 4.87 ± 0.11 |
| Au$_6$@PEG-octadecyl$_{30\%}$ NPs | 14.87 ± 0.06 (0.23) | 15.55 ± 0.37 (0.31) | −3.74 ± 1.25 | 6.07 ± 0.62 |
| Citrate-capped Au$_{13}$ NPs | 16.40 ± 0.08 (0.26) | 374.77 ± 30.38 (0.04) | −30.28 ± 2.36 | NA |
| Au$_{13}$@PEG-methoxy NPs | 18.65 ± 0.35 (0.24) | 18.90 ± 0.45 (0.23) | −5.74 ± 0.37 | 4.92 + 0.08 |
| Au$_{13}$@PEG-octadecyl$_{10\%}$ NPs | 19.25 ± 0.17 (0.22) | 19.85 ± 0.37 (0.25) | −3.35 ± 0.38 | 3.98 ± 0.88 |
| Au$_{13}$@PEG-octadecyl$_{30\%}$ NPs | 19.87 ± 0.06 (0.21) | 22.47 ± 0.66 (0.28) | −4.51 ± 0.73 | 3.36 ± 1.24 |

[a] Reported data represent mean ± SD from three independent measurements of Z-average sizes. Numbers in parentheses refer to the polydispersity index (PDI).

By dynamic light scattering (DLS), after loading citrate-capped AuNPs with different percentages (0-30%) of alkyl chain of various lengths (1-18 carbons), the hydrodynamic sizes of Au$_3$@PEG-alkyls % NPs, Au$_6$@PEG-alkyl$_{y \%}$ NPs, and Au$_{13}$@PEG-alkyl$_{y \%}$ NPs are observed to be about 9.5-13.3 nm, about 13.7-14.9 nm, and about 18.7-19.9 nm, respectively as shown in Table 1.

Since Phosphate Buffered Saline (PBS) is used as the solvent for the in vivo experiments, the stability of NPs in PBS is verified. After 24 hours incubation in PBS at 37° C., DLS is used to test the hydrodynamic size of NPs as shown in Table 1. It is noted that citrate-capped Au$_x$ NPs tend to aggregate in PBS by exhibiting obvious color change and a significant increase in size; while the color and hydrodynamic sizes of $Au_x$@PEG-alkyl$_{y\,\%}$NPs do not show obvious change, demonstrating their colloidal stability in PBS buffer by the coating of a dense layer of $PEG_{1000}$ strands. OptiMEM with reduced serum is selected as the culture medium for in vitro studies. It is confirmed that the %; Sigma) in deionized water. The pH of the solution is adjusted with 1 M sodium hydroxide to a final pH of 6.5±0.05. After 24 hours of incubation, the hydrodynamic (HD) sizes of all tested AuNPs do not show significant increase, indicating the stability of alkylated AuNPs as shown in Table 3.

TABLE 3

HD sizes of AuNPs after incubation in artificial sweat for 24 h.

| NPs | Citrate-capped $Au_3$ NPs | $Au_3$@PEG-methoxy NPs | $Au_3$@PEG-octadecyl$_{30\%}$ NPs | Citrate-capped $Au_6$ NPs | $Au_6$@PEG-methoxy NPs | Citrate-capped $Au_{13}$ NPs | $Au_{13}$@PEG-methoxy NPs |
|---|---|---|---|---|---|---|---|
| HD size (nm) | 789 ± 47 | 11.7 ± 0.3 | 17.0 ± 0.7 | 1131 ± 93 | 15.6 ± 0.4 | 1856 ± 503 | 21.2 ± 0.3 |

$Au_x$@PEG-alkyl$_{y\,\%}$ NPs remain colloidally stable upon incubation in OptiMEM or PBS for 24 hours as shown in Table 2.

TABLE 2

Hydrodynamic sizes and stability of $Au_3$@PEG-alkyl$_{y\,\%}$ NPs in OptiMEM.

| Sample | HD size (nm)[a] before incubation | HD size after incubation (37° C., 24 h) (nm) |
|---|---|---|
| $Au_3$@PEG-methoxy NPs | 11.0 ± 0.8 (0.4) | 15.1 ± 0.1 (0.5) |
| $Au_3$@PEG-hexyl$_{10\%}$ NPs | 11.3 ± 1.4 (0.5) | 13.1 ± 0.6 (0.5) |
| $Au_3$@PEG-hexyl$_{30\%}$ NPs | 9.7 ± 0.3 (0.5) | 12.0 ± 1.8 (0.5) |
| $Au_3$@PEG-dodecyl$_{10\%}$ NPs | 10.7 ± 2.6 (0.4) | 11.8 ± 0.4 (0.5) |
| $Au_3$@PEG-dodecyl$_{30\%}$ NPs | 9.5 ± 1.0 (0.5) | 12.4 ± 1.6 (0.5) |
| $Au_3$@PEG-octadecyl$_{10\%}$ NPs | 11.1 ± 0.8 (0.5) | 15.5 ± 1.6 (0.5) |
| $Au_3$@PEG-octadecyl$_{30\%}$ NPs | 13.5 ± 1.1 (0.5) | 16.0 ± 0.7 (0.5) |

[a] Reported data represent mean ± SD from three independent measurements of Z-average sizes. Numbers in parentheses refer to the polydispersity index (PDI).

Figure 6:
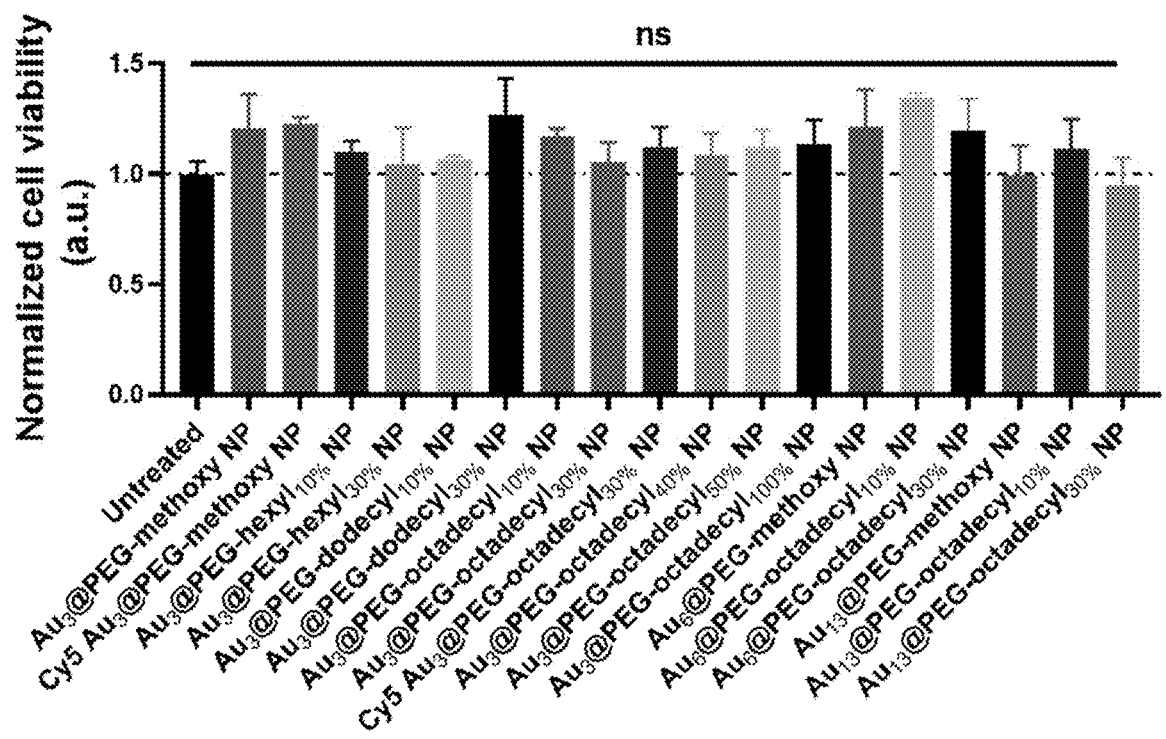
FIG. 6 shows cell viability upon incubating Kera-308 cells with $Au_x$@PEG-$alkyl_{y\ \%}$ NPs, wherein by the alamar-Blue assay, Kera-308 cells remain largely viable after incubation with $Au_x$@PEG-$alkyl_{y\ \%}$ NPs that are used in this study for 24 hours, wherein the mean viability of untreated cells is normalized to "1 au." n=3, mean±SD, and statistical analysis is determined by one-way ANOVA, and wherein ns: not significant (P>0.05), according to an embodiment of the subject invention.

Prior to animal studies, it is further confirmed that the collection of $Au_x$@PEG-alkyl$_{y\,\%}$ NPs does not induce severe cytotoxicity to Kera-308 cells after 24 hours of incubation as shown in FIG. 6.

Figure 7A:
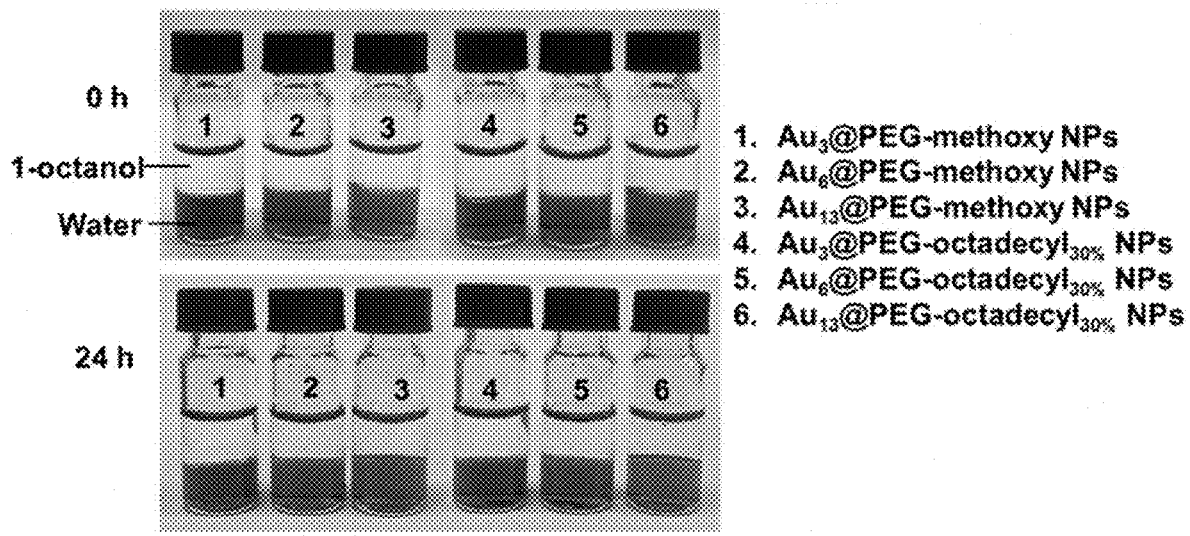
Figure 7B:
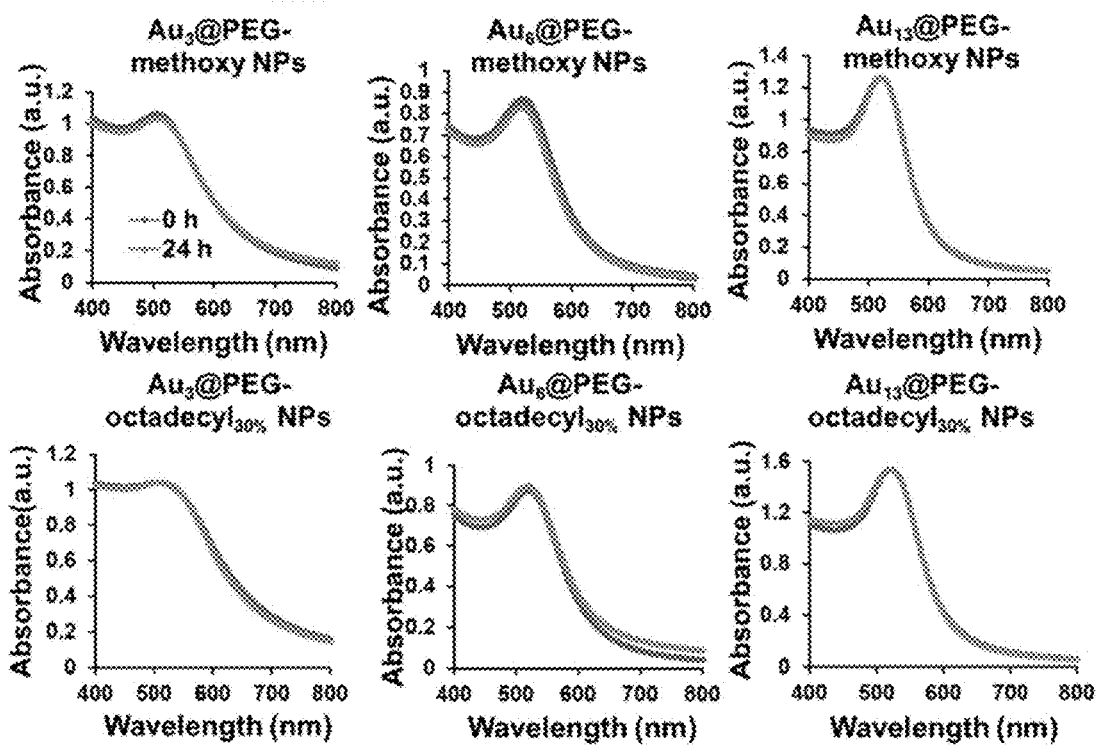

When loaded with 30 mol % alkyl group, the calculated mass percentage of alkyl group on the total PEG coating is only 2.49%, 4.83%, and 7.05% in $Au_x$@PEG-hexyl$_{30\%}$ NPs, $Au_x$@PEG-dodecyl$_{30\%}$ NPs, and $Au_x$@PEG-octadecyl$_{30\%}$ NPs, respectively, which is much lower than that in other lipid-based NPs (for example, 28%), due to the effects of the functional group, not the effects of hydrophobicity. To prove that the NPs are overall hydrophilic, the 1-octanol/water partitioning experiment is conducted as shown in FIG. 7A.

Referring to 7B, the results from the experiment show that even for the NPs bear 30% octadecyl at the PEG periphery, the NPs are mainly dispersed in the water phase, with limited transferring to the 1-octanol phase. However, when octadecyl loading exceeds 40%, the AuNPs gradually partition to 1-octanol. The results indicate that when octadecyl loading exceeds 30%, the $Au_3$@PEG-octadecyl$_{y\,\%}$ NPs are less stable and less hydrophilic.

Figures 8A, 8B:
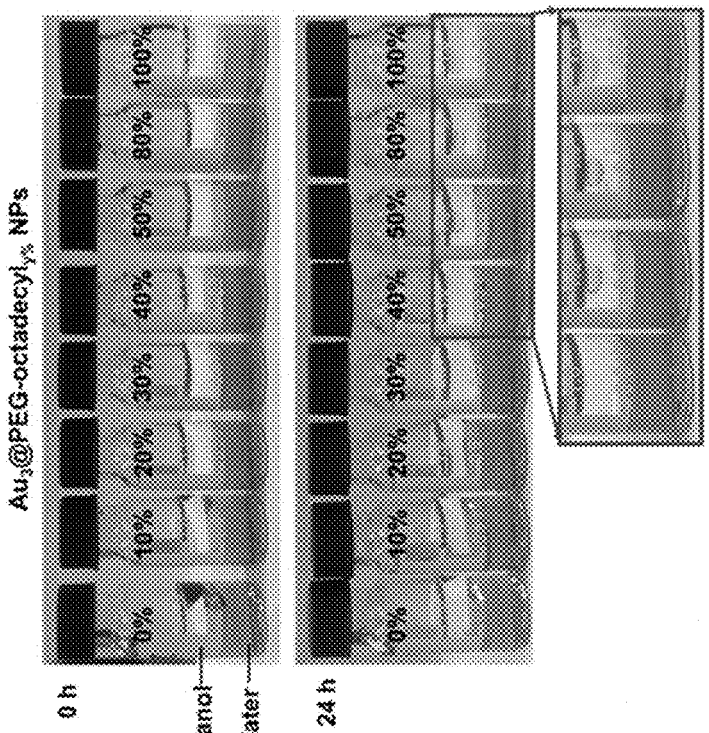
Figure 8C:
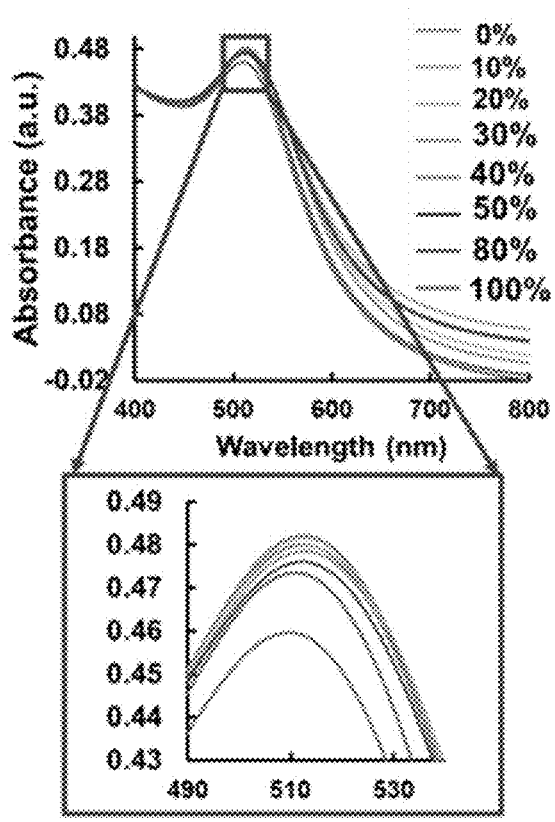

Therefore, attaching excessive octadecyl chains to the AuNPs causes NP agglomeration due to interparticle hydrophobic interaction as shown in FIGS. 8A-8C.

On the same day as the colloidal stability experiments, artificial sweat is freshly prepared according to the standard protocol (EN 1811:2011) by mixing urea (0.1 wt %; TCI), NaCl (0.5 wt %; J&K Scientific), and DL-lactic acid (0.1 wt 1.2.3 Surface Alkylation Enhances the Uptake of $Au_3$ NPs by Immortalized Keratinocyte and Primary Epidermal Cells.

It has been reported that gold NPs of 25 nm in size with an outer hydrophilic coating of PEG strands of about 5000 Da exhibit enhanced uptake by Kera-308 mouse keratinocytes in vitro upon modification with minute amounts of alkyl groups. The issue of whether such effect of alkylation is also applied to AuNP with a smaller core is investigated and the uptake of $Au_3$@PEG-alkyl$_{y\,\%}$ NPs (300 nM, 0.3 mL) by Kera-308 cells after 24 hours of NPs incubation in OptiMEM is studied.

Figure 9:
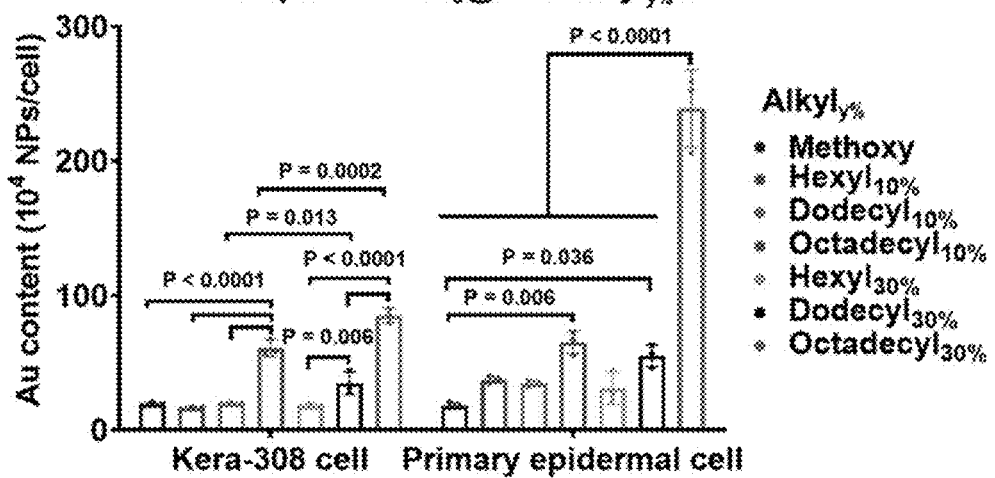
FIG. 9 shows uptake of $Au_3$@PEG-$alkyl_{y\ \%}$ NPs with different alkyl loadings by immortalized keratinocytes (mouse Kera-308) and primary epidermal cells, wherein Kera-308 cells or primary epidermal cells are incubated with $Au_3$@PEG-$alkyl_{y\ \%}$ NPs (300 nM, 0.3 mL) for 24 hours, wherein statistical significance is calculated by one-way ANOVA with Tukey's Test for post-hoc analysis, with adjusted P value shown in FIG. 9, and wherein NS stands for not significant, according to an embodiment of the subject invention.

ICP-MS results show that the cellular uptake of $Au_3$@PEG-alkyl$_{y\,\%}$ NPs is increased with increasing alkyl chain length and loadings as shown in FIG. 9, which is consistent with previous report[6]. Specifically, when compared to $Au_3$@PEG-methoxy NPs, the cellular uptake of $Au_3$@PEG-octadecyl$_{10\%}$ NPs and $Au_3$@PEG-octadecyl$_{30\%}$ NPs is enhanced by about 2.1-fold and about 3.4-fold, respectively.

The primary epidermal cells (mainly keratinocytes) are further isolated from the dorsal skin of healthy Balb/c mice and incubated them with $Au_3$@PEG-alkyl$_{y\,\%}$ NPs (300 nM, 0.3 mL) for 24 hours. Similar to Kera-308 cells, ICP-MS data shows that the uptake of $Au_3$@PEG-alkyl$_{y\,\%}$ NPs by primary cells increases with alkyl chain length and loadings. For example, the uptake of $Au_3$@PEG-octadecyl$_{30\%}$ NPs by the primary cells is about 12.1-fold ($p<0.0001$) higher than $Au_3$@PEG-methoxy NPs. The in vitro data have proved that surface alkylation of $Au_3$ NPs with longer alkyl chain length and higher alkyl loading promotes the NP uptake by both immortalized and primary keratinocytes.

Figure 10A:
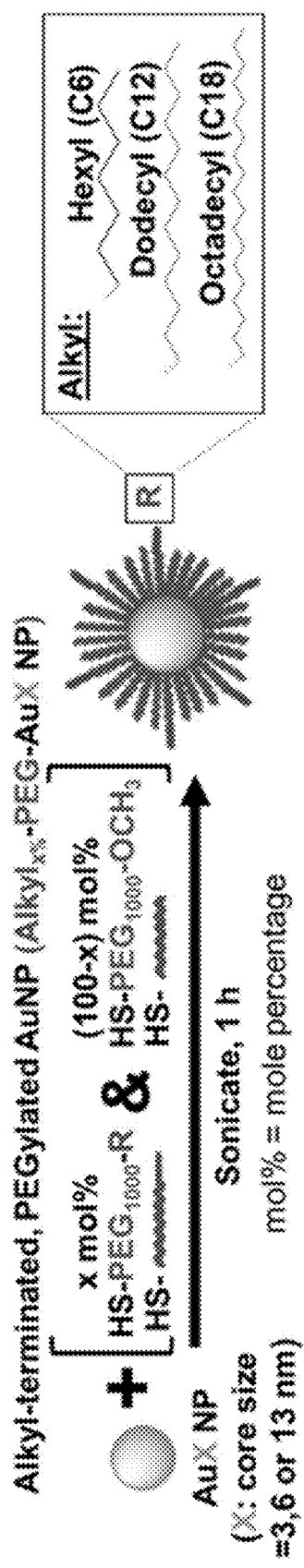
Figure 10B:
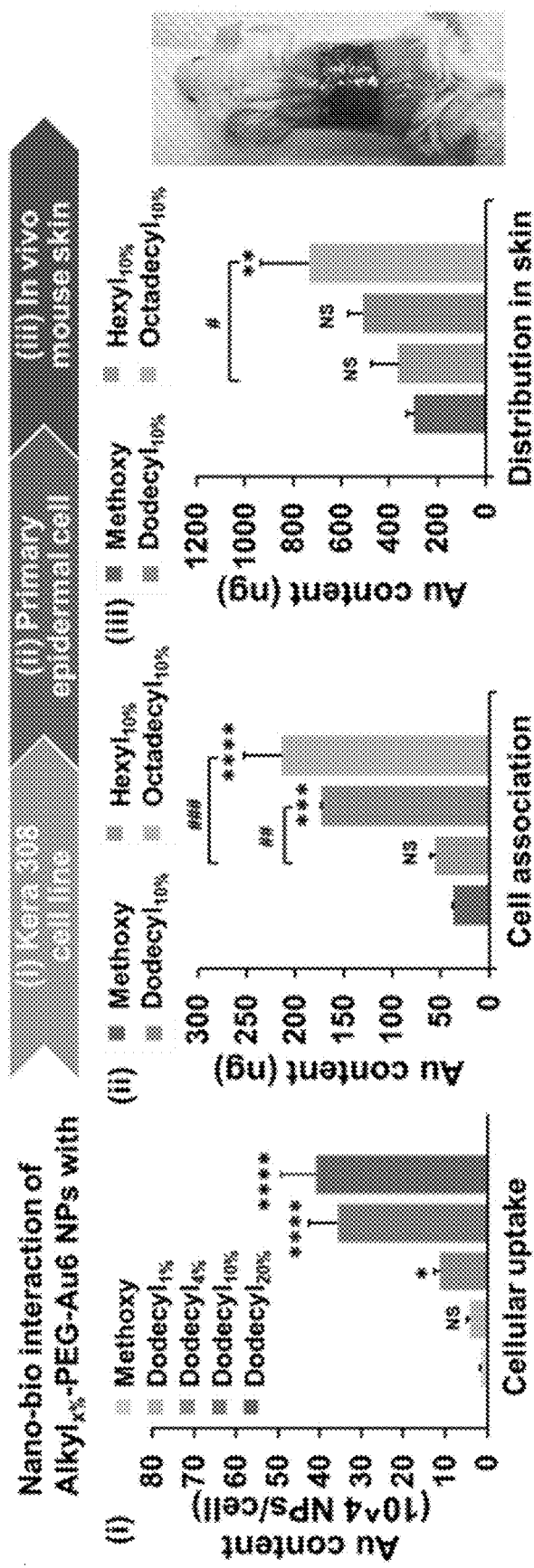

The interactions between alkyl$_{x\,\%}$-PEG-Au6 NPs and the Kera 308 cell line (mouse keratinocytes) are studied, and then the results of investigation applied to primary epidermal cells and Balb/c mice skin are shown in FIGS. 10A and 10B. In FIG. 10A, the library of NPs is denoted as alkyl$_{x\,\%}$-PEG-AuX NPs, wherein x % denotes mol % of surface alkyl loading and X denotes the core diameter.

In one embodiment, Kera-308 cells are first, incubated with dodecyl$_{x\,\%}$-PEG-Au6 NPs (for example, 50 ppm; formulated in OptiMEM) that contain 0%, 1%, 2%, 4%, 10%, or 20% dodecyl group for 8 hours. By inductively coupled plasma mass spectrometry measured (ICP-MS), the association of dodecyl$_{x\,\%}$-PEG-Au6 NPs by Kera-308 cells increases with increasing alkyl amounts as shown in FIG. 10B(i), which is consistent with previous reports[36].

Referring again to FIGS. 10A-10B, nano-bio interactions of alkyl-terminated, PEGylated Gold nanoparticles with keratinocytes from in vitro to in vivo is demonstrated. In FIG. 10A, alkyl$_{x\ \%}$, PEG-AuNPs is prepared wherein different mole ratios of thiol- and alkyl-terminated PEG [HS-PEG-R (R: hexyl, dodecyl or octadecyl); x mol %] to thiol- and methoxy-terminated PEG [HS-PEG-OCH$_3$; (100−x) mol %] are coupled to the surface of citrate-capped AuX NPs (X=3, 6 and 13 nm) via gold-sulfur linkages, wherein the molecular weight of PEG is about 1000 Da. FIG. 10B additionally shows nano-bio interactions of alkyl$_{x\ \%}$-PEG-Au6 NPs with keratinocytes. FIG. 10B(i) shows that cellular uptake of dodecyl$_{x\ \%}$-PEG-Au6 NPs with different dodecyl chain loading is quantified by ICP-MS, wherein the incubation time and NPs concentration are set to be 8 hours and 50 ppm, respectively. Kera-308 cells (mouse keratinocytes) are incubated with dodecyl$_{x\ \%}$-PEG-Au6 NPs that contain 0%, 1%, 2%, 4%, 10%, or 20% (all in terms of mol %) dodecyl in the dense PEG coating. FIG. 10B(ii) shows the association of alkyl$_{x\ \%}$-PEG-Au6 NPs with primary epidermis cells (95% keratinocytes) association. Primary skin cells isolated from the tail skin of Balb/c mice are seeded in a 24-well plate and incubated with alkyl$_{x\ \%}$-PEG-Au6 NPs (50 ppm) in OptiMEM for 24 hours. FIG. 10B(iii) shows topical delivery of alkyl$_{x\ \%}$-PEG-Au6 NPs to mouse dorsal skin. A gauze (15 mm×25 mm) is first soaked in 200 μL of alkyl$_{x\ \%}$-PEG-Au$_6$ NPs (500 ppm) before being applied onto the shaved mouse dorsal skin, and then covered with a Tegaderm (3M) adhesive dressing for 24 hours (as shown in the right image). The symbol "*" indicates the comparison between a specific treatment group with the control. *0.01<P<0.05, 0.001<P<0.01, *0.0001<P<0.001, ****P<0.0001. The symbol "#" indicates the comparison between two specific treatment groups that are not control groups. #0.01<P<0.05, ##0.001<P<0.01, ###0.0001<P<0.001, and NS stands for not significant.

Specifically, compared to NPs loaded with methoxy group only, the cellular uptake of dodecyl$_{x\ \%}$-PEG-Au6 NPs loaded with 10% and 20% dodecyl is enhanced by about 23-fold and about 27-fold, respectively. It is note that 10% is selected as the minimal alkyl loading percentage for further study because alkyl loading more than 10% leads to more drastic cellular uptake.

1.2.4 Distribution of Au$_3$@PEG-alkyl$_{y\ \%}$ NPs in Healthy Mouse Skin

Figure 11A:
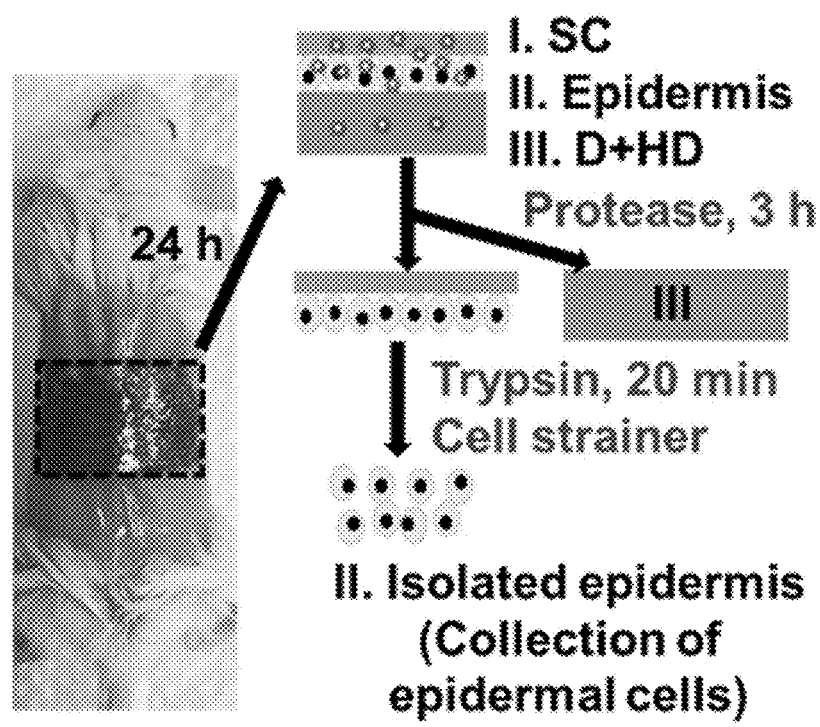

The effects of Au core size, alkyl chain length, and loading on the biodistribution of Au$_x$@PEG-alkyl$_{y\ \%}$ NPs in healthy Balb/c mice are studied. Au$_x$@PEG-methoxy NPs or Au$_x$@PEG-alkyl$_{y\ \%}$ NPs (500 ppm, 200 μL) are topically applied onto shaved mouse dorsal skin. It is noted that the same gold mass of AuNPs with different core sizes is applied to the mouse skin. After 24 hours, the treated skin is rinsed then harvested for further analysis. To quantify the Au content in different skin layers, the harvested skin is treated with neutral protease to isolate the epidermis from the dermis and hypodermis as shown in FIG. 11A. The examinations are focused on the epidermis (skin layer where keratinocytes reside) because keratinocyte is the key participant in psoriasis.

Figure 11B:
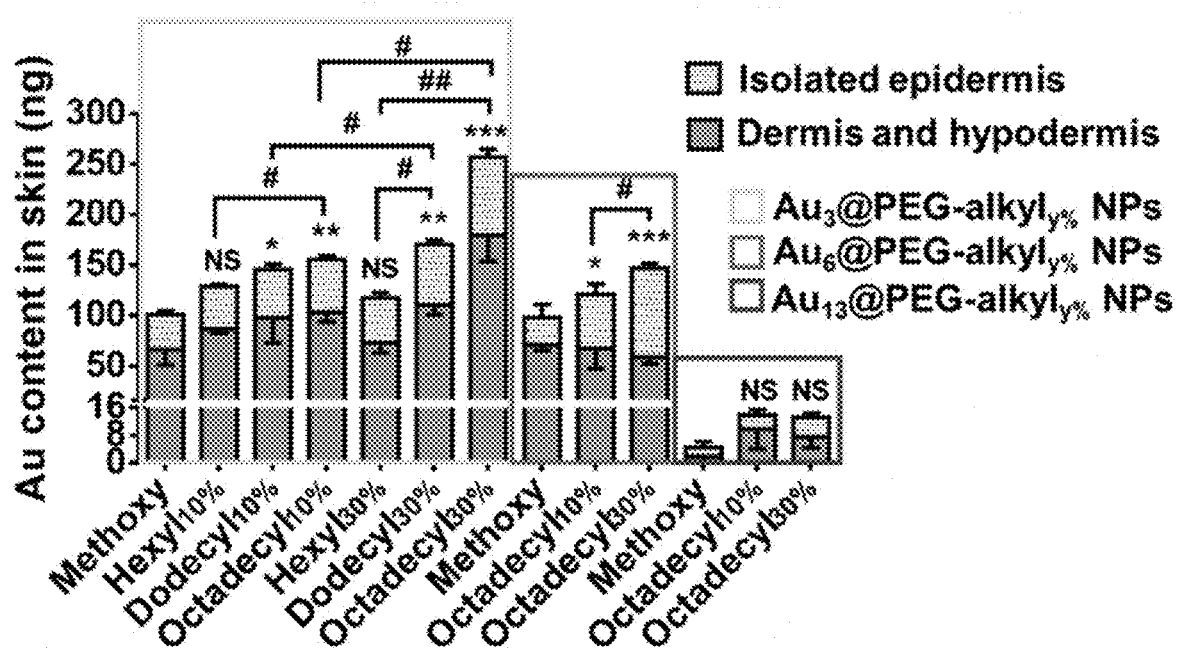

The ICP-MS results show that Au$_x$@PEG-alkyl$_{y\ \%}$ NP with a longer alkyl chain, higher alkyl loading density exhibit higher keratinocytes entry and skin permeability among all sizes as shown in FIG. 11B. For example, Au$_3$@PEG-octadecyl$_{30\%}$ NPs can permeate the skin (into epidermis plus dermis and hypodermis) by 145% more and enter the epidermis by 97% more than Au$_3$@PEG-methoxy NPs as shown in FIG. 11B With respect to the effect of size, NPs with smaller Au core exhibit higher skin permeation compared to their larger counterparts. In particular, Au$_{13}$@PEG-alkyl$_{y\ \%}$ NPs show limited permeation and cellular entry. Au$_6$@PEG-alkyl$_{y\ \%}$ NPs show weaker ability to permeate in whole skin but a similar level of cellular entry as Au$_3$@PEG-alkyl$_{y\ \%}$ NPs.

Figure 12:
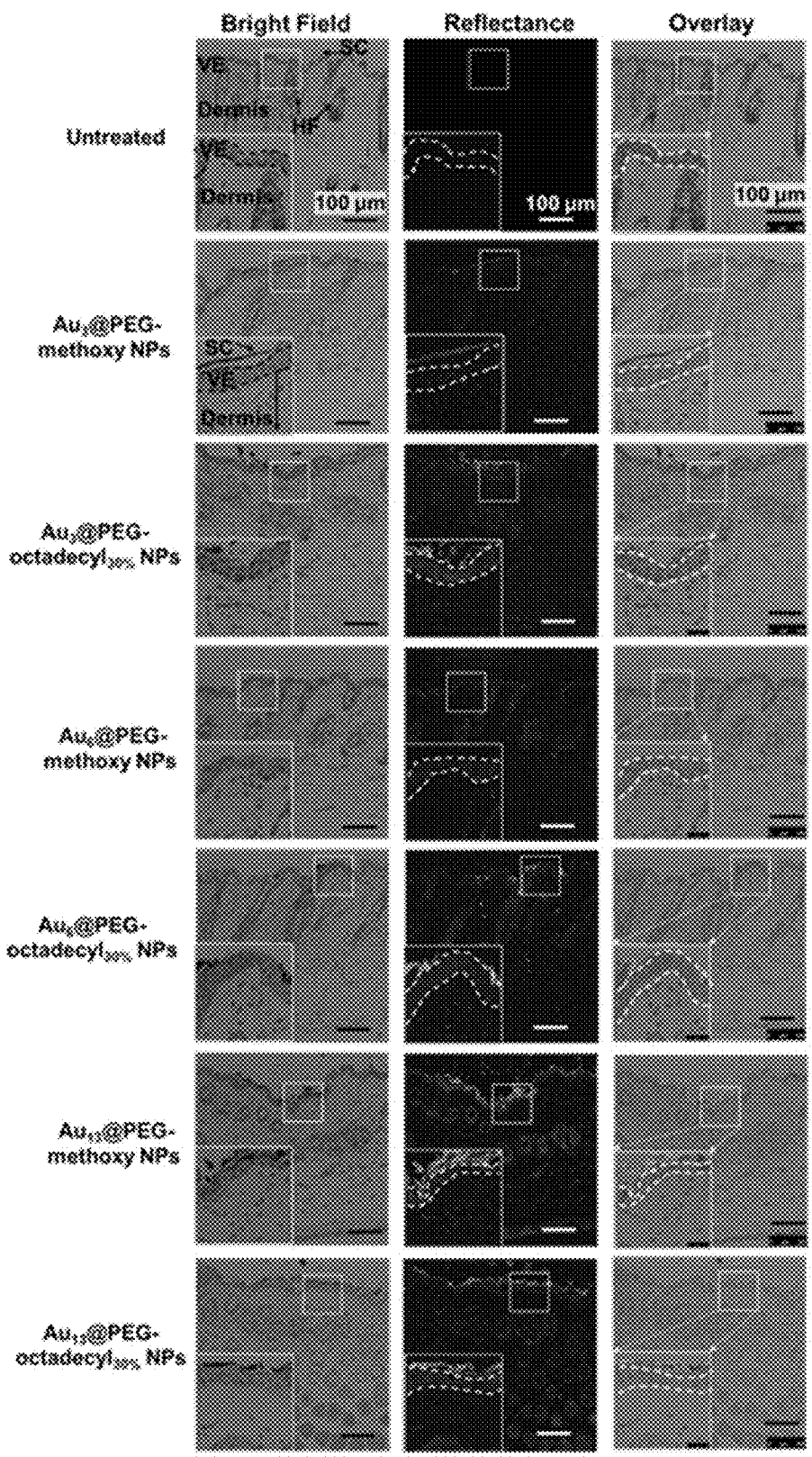
FIG. 12 shows confocal images of skin harvested from healthy mice that are topically applied with NPs, wherein 24 hours post-application (200 µL; ~3 µM $Au_3$@PEG-alkyl$_{y\ \%}$ NPs, ~500 nM $Au_6$@PED-alkyl$_{y\ \%}$ NPs, or ~50 nM $Au_6$@PEG-alkyl$_{y\ \%}$ NPs in PBS), the mice are sacrificed, and the skin is harvested for preparing skin sections, wherein after using silver staining to enhance the AuNPs and using H&E staining to visualize the skin structure, the sections are imaged under bright field (first column) to reveal the silver-enhanced AuNPs (brown) and in reflectance mode to reveal the reflectance signals of the silver-enhanced AuNPs (green, second column), wherein the third column is the overlay of bright field image with reflectance image, wherein untreated stands for normal skin without topical application of NPs, wherein inset (in the bottom left corner) indicates the enlargement of the area boxed in yellow, wherein representative images are chosen from n=3 images per mice from n=2 mice/group, across 1 experiment, wherein SC stands for stratum corneum; VE stands for viable epidermis; HF stands for hair follicle, and the dot lines show the region of VE, according to an embodiment of the subject invention.

To further visualize the biodistribution of AuNPs in the healthy skin at the tissue level, the locations of topically applied AuNPs are tracked by silver staining enhancement using confocal reflectance imaging. Representative confocal images of FIG. 12 show that all types of AuNPs tested are mainly distributed in the SC, viable epidermis, and hair follicles in the dermis layer. Consistent with the quantitative ICP-MS data, the reflected light from AuNPs in the viable epidermal layer is stronger in samples treated with Au$_x$@PEG-octadecyl$_{30\%}$ NPs than that in samples treated with Au$_x$@PEG-methoxy NPs. It is noted that the tissue-level distributions of NPs across treatment groups with different core sizes cannot be quantitatively compared because the intensity of the light reflected by AuNPs of different core sizes varies.

Figure 13A:
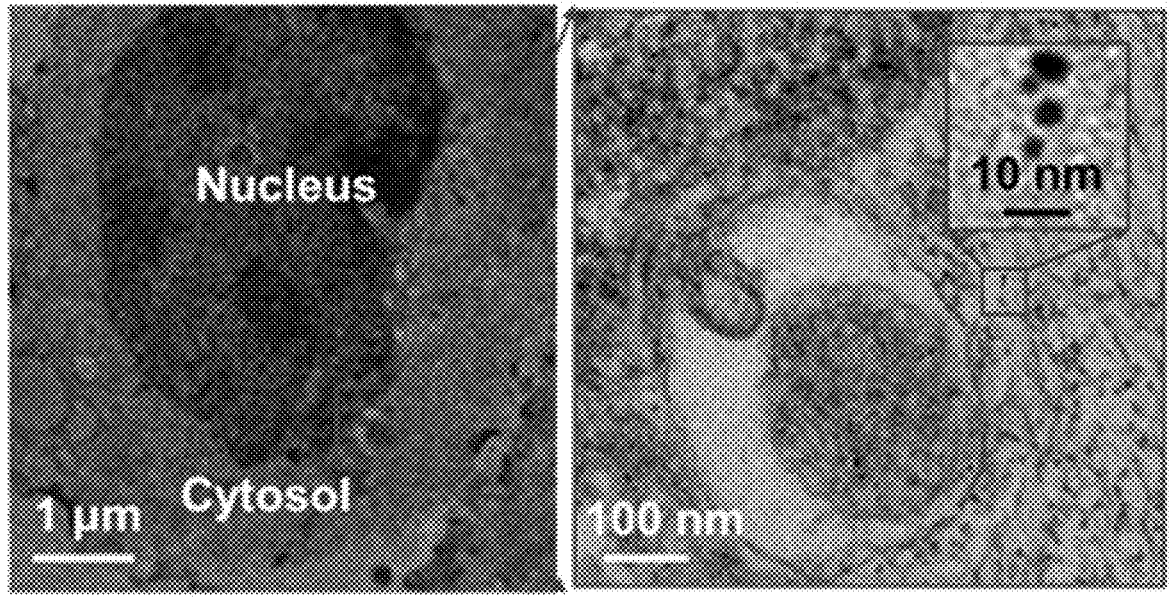
Figure 13B:
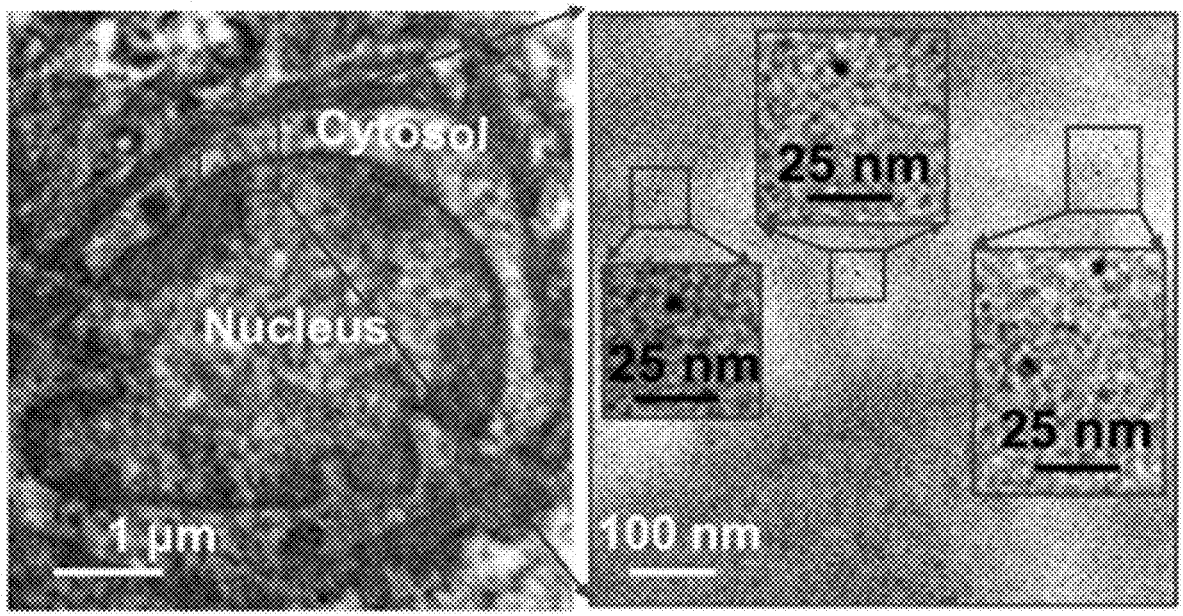
Figure 15A:
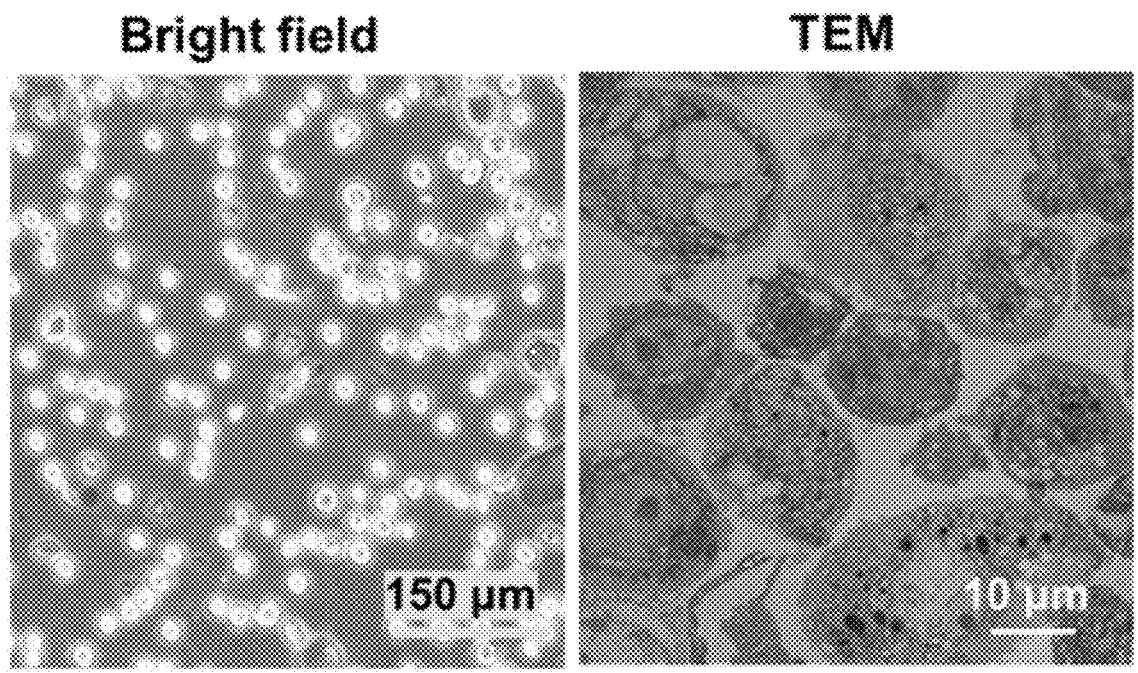
Figure 15B:
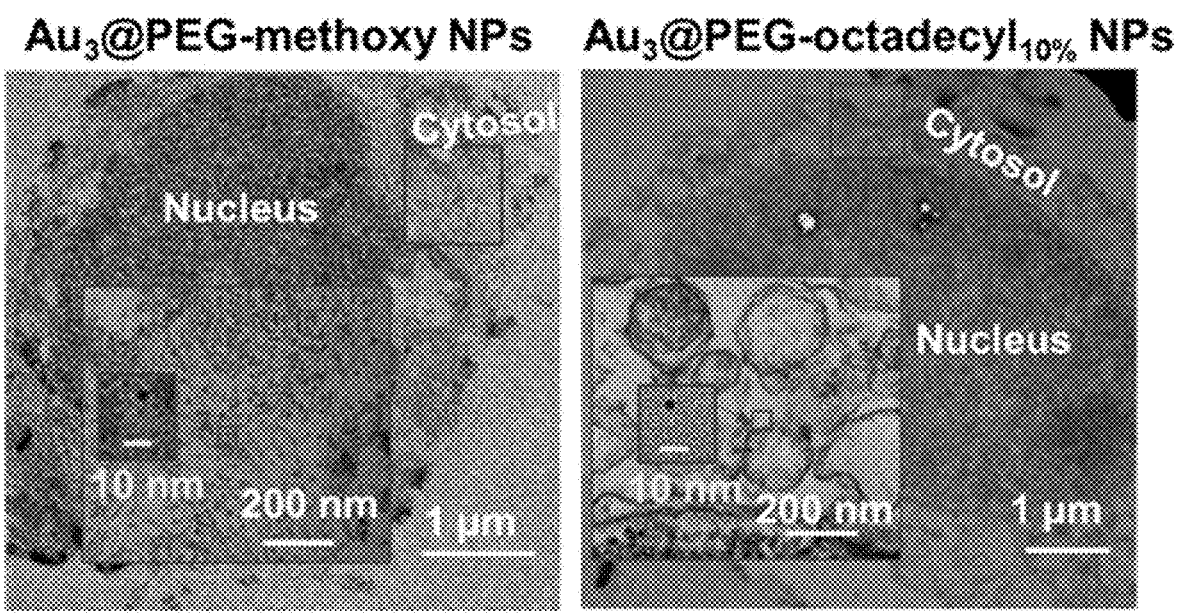
Figure 16:
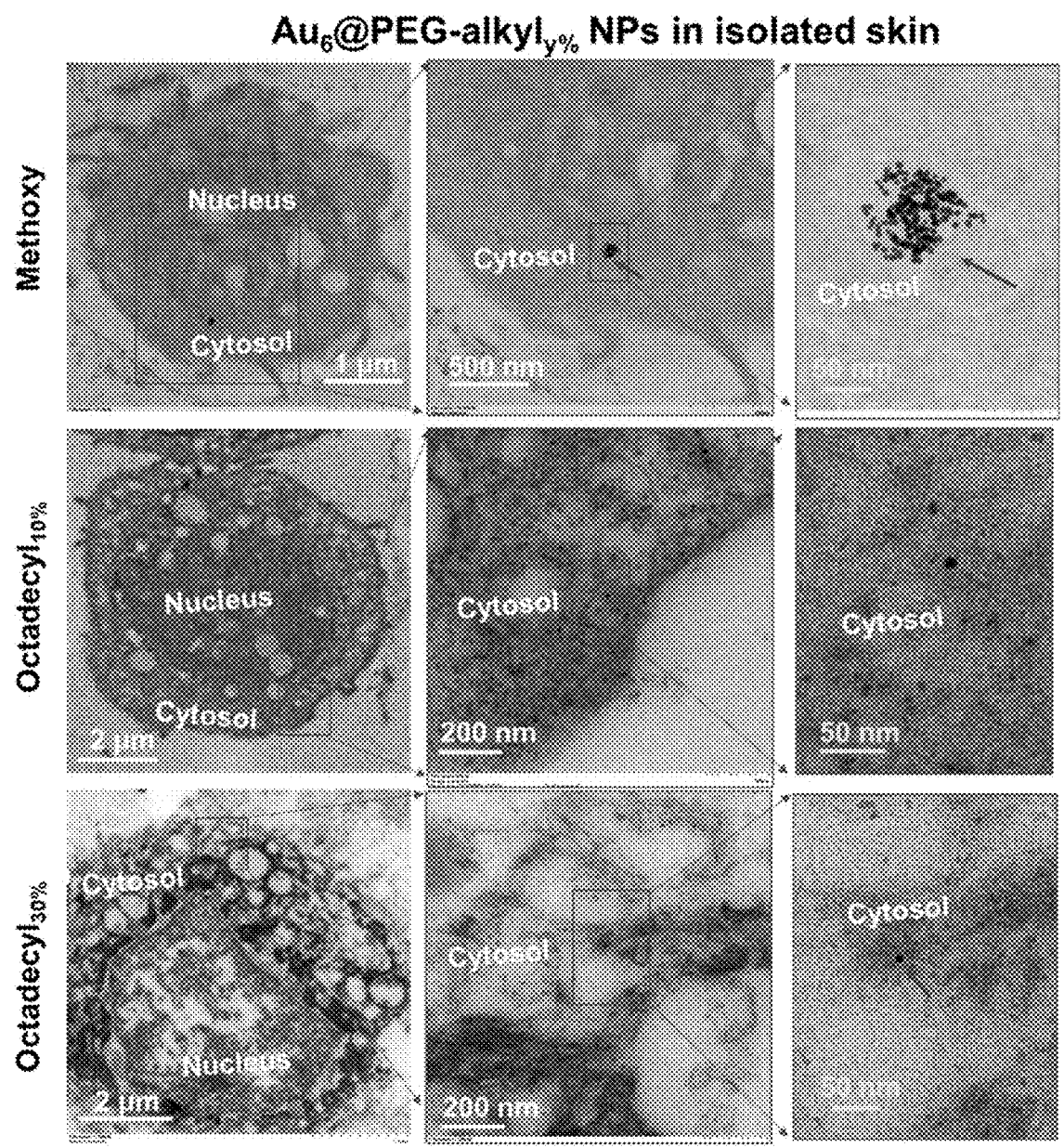
FIG. 16 shows TEM images of $Au_6$@PEG-octadecyl$_{y\ \%}$ NPs in isolated epidermal cells, wherein $Au_6$@PEG-octadecyl NPs (200 µL, 500 nM) of various alkyl loadings (y %) are topically applied to healthy mice, wherein 24 h post-application, the mice are sacrificed, and the skin is harvested for isolating the epidermis cells. TEM images of the isolated epidermis cells show the in vivo entry of NPs to the epidermal cells, indicating their permeation through the stratum corneum to epidermis, according to an embodiment of the subject invention.
Figure 17:
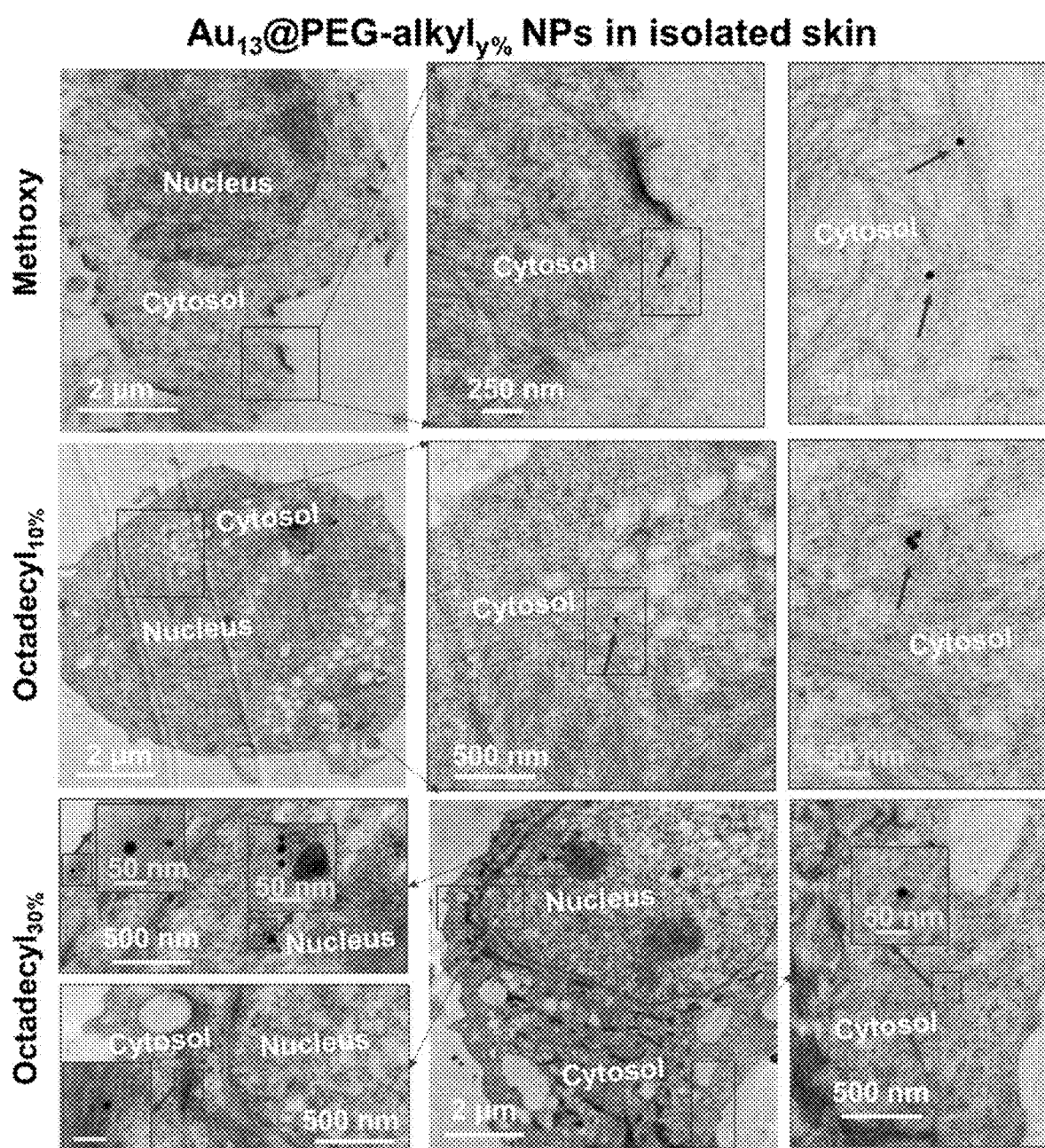
FIG. 17 shows TEM images of $Au_{13}$@PEG-octadecyl$_{y\ \%}$ NPs in isolated epidermal cells, wherein $Au_{13}$@PEG-octadecyl NPs (200 µL, 50 nM) of various alkyl loadings (y %) are topically applied to healthy mice, wherein 24 hours post-application, the mice are sacrificed, and the skin is harvested for isolating the epidermis cells, wherein TEM images of the isolated epidermis cells show the in vivo entry of NPs to the epidermal cells, indicating their permeation through the stratum corneum to epidermis, according to an embodiment of the subject invention.
Figure 18:
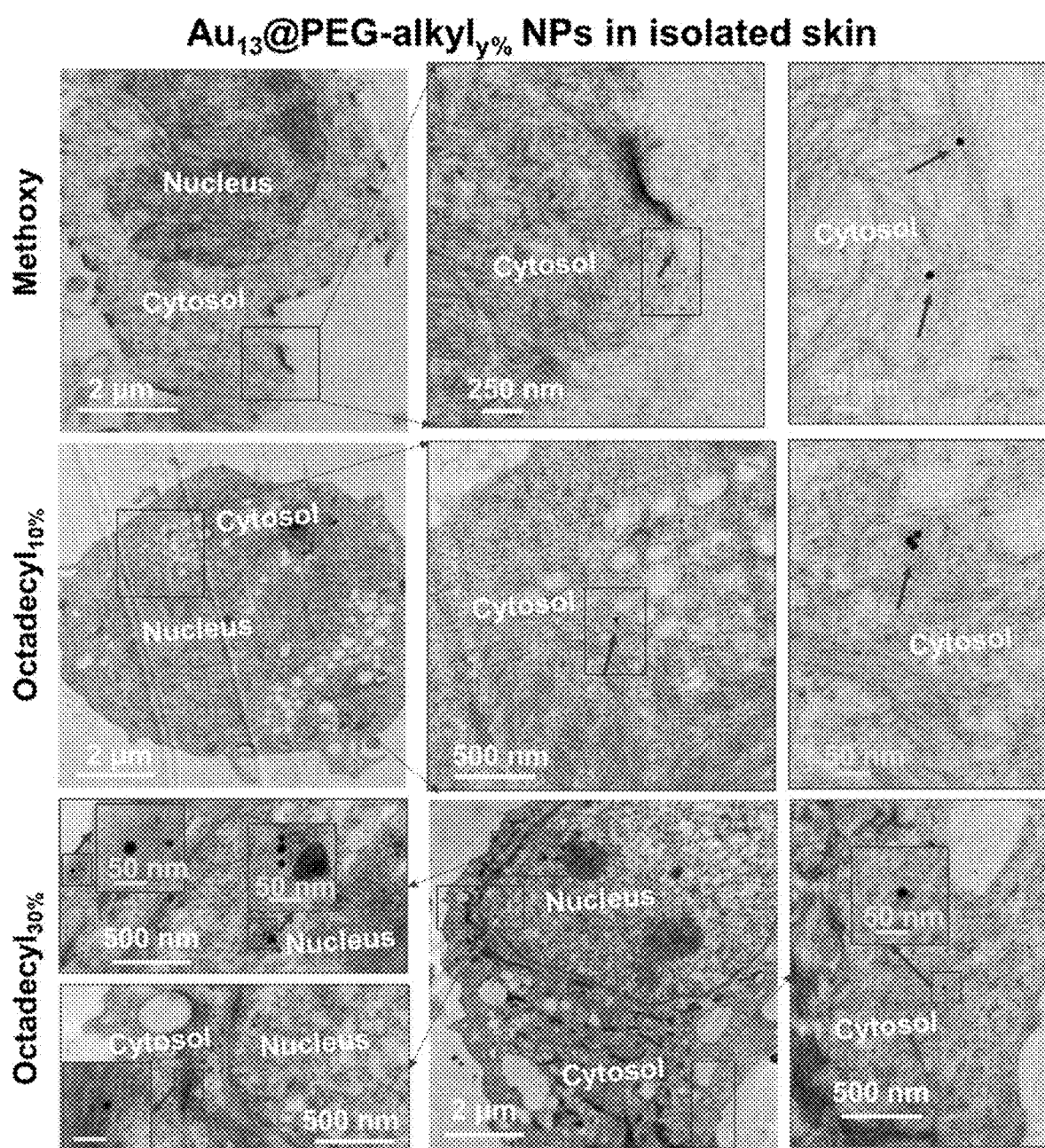
FIG. 18 shows TEM images reveal the distribution of $Au_3$@PEG-methoxy NPs in healthy skin, wherein 24 hours post-application (200 µL, ~3 µM), $Au_3$@PEG-methoxy NPs mostly remain in the SC layer, with a small portion of them permeating though the SC to the viable epidermis or dermis and hypodermis, wherein the NPs are found distributed individually or as clusters in cells or intercellular space, wherein the use of heavy metal stains (for example; osmium, uranium, and lead) is omitted to increase the contrast between the small NPs and the biological structures, wherein KC stands for keratinocyte cell; FB stands for fibroblast; CF stands for collagen fiber; SS stands for stratum spinosum; SG stands for stratum granulosum; SB stands for stratum basale, wherein numbers 1-3 denote the various regions of the original skin sample to be enlarged to insets with yellow or red borders, according to an embodiment of the subject invention.
Figure 19:
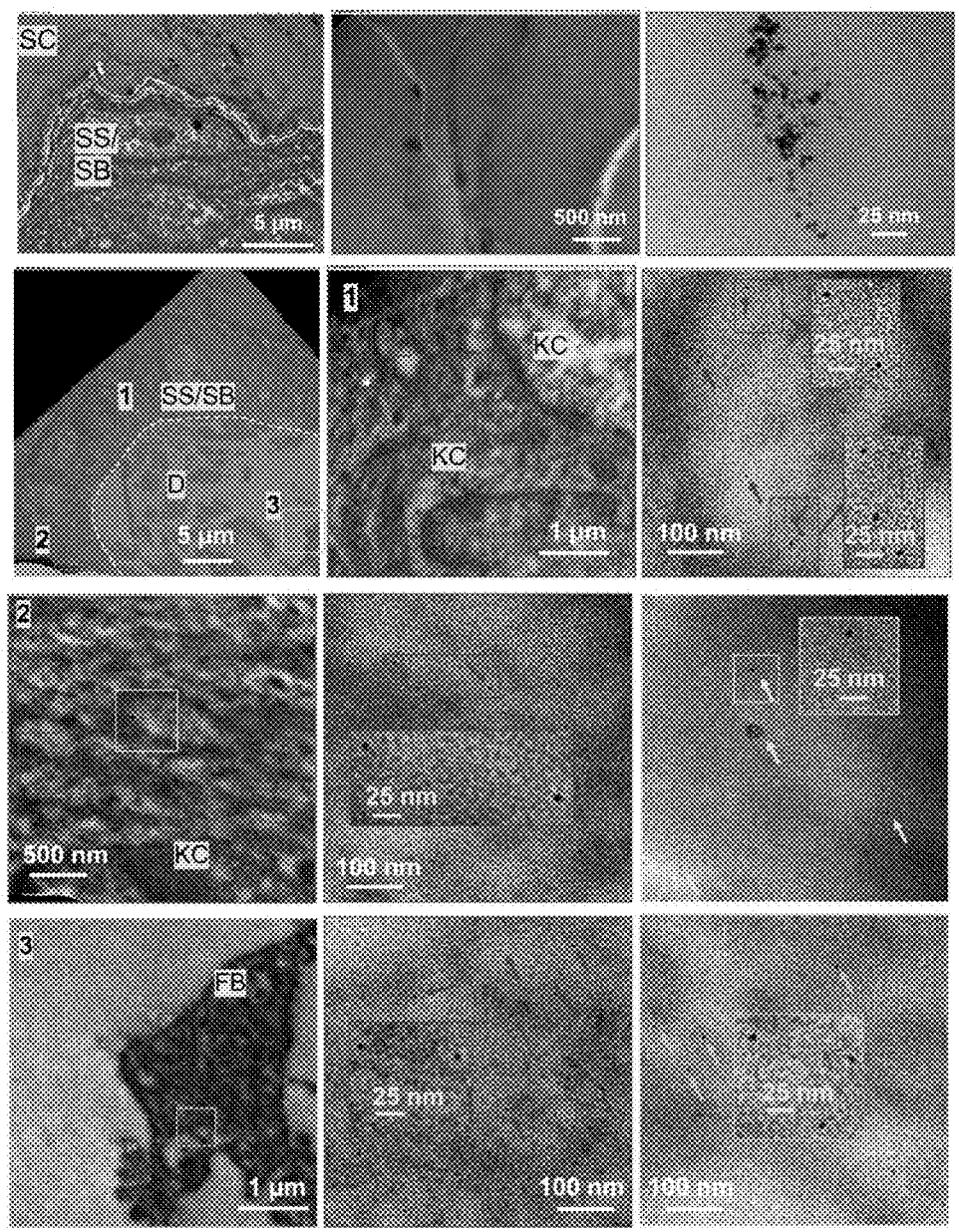
FIG. 19 shows TEM images revealing the distribution of $Au_3$@PEG-octadecyl$_{30\%}$ NPs in healthy skin, wherein 24 hours post-application (200 µL, ~3 µM), $Au_3$@PEG-octadecyl NPs mostly remain in the SC layer, with a small portion of them permeating though the SC to the viable epidermis or dermis and hypodermis, wherein the NPs are found distributed individually or as clusters in cells or intercellular space; wherein $Au_3$@PEG-octadecyl$_{30\%}$ NPs are more abundantly found inside epidermal keratinocytes than $Au_3$@PEG-methoxy NPs, wherein the use of heavy metal stains (for example, osmium, uranium, and lead) is omitted to increase the contrast between the small NPs and the biological structures, wherein KC stands for keratinocyte cell; FB stands for fibroblast; CF stands for collagen fiber; SS stands for stratum spinosum; SG stands for stratum granulosum; SB stands for stratum basale, wherein numbers 1-3 denote the various regions of the original skin sample to be enlarged to insets with yellow or red borders, according to an embodiment of the subject invention.

TEM imaging is used to confirm the internalization of Au$_3$@PEG-octadecyl$_{30\%}$ NPs as shown in FIGS. 13A-13B and other types of NPs as shown in FIGS. 15A-15B, 16, and 17 in isolated epidermis. For the intact skin samples, TEM images of FIGS. 18-19 show that Au$_3$@PEG-octadecyl$_{30\%}$ NPs are found in epidermal keratinocytes, intercellular space of keratinocytes, and dermis.

FIG. 14 is a schematic representation of experimental processes and schemes for topically applying alkyl-terminated AuNPs onto IMQ-induced psoriatic skin. In one embodiment, 62.5 mg of IMQ cream is topically applied onto the mouse dorsal skin for 6 days to develop the psoriasis model. Then, the psoriatic skin is treated with either methoxy-PEG-AuNPs or alkyl$_{x\ \%}$-PEG-AuNPs (200 μL; 500 ppm) for 24 hours.

Figure 20:
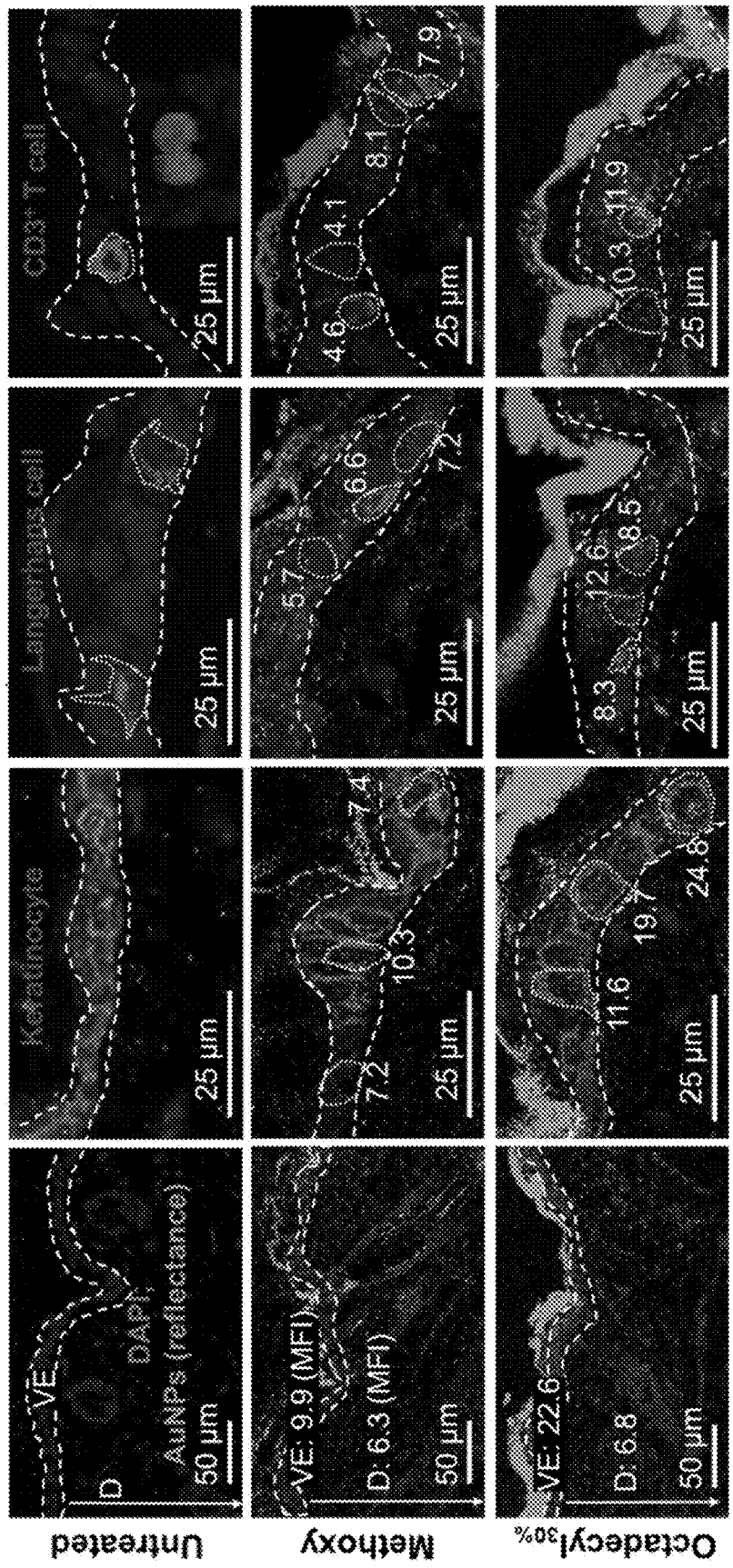
FIG. 20 shows confocal imaging of the skin topically treated with $Au_3$@PEG-alkyl$_{y\ \%}$ NPs, wherein 24 hours post-application (200 µL, ~3 µM), confocal reflectance mode reveals the cellular distribution of AuNPs by silver enhancement staining (green) and with immunofluorescence staining of keratinocytes, Langerhans cells, and CD3+ T cells, wherein cell nucleus is stained by DAM (blue), wherein untreated stands for healthy skin without AuNP treatment, wherein positive stained cells are circled by a white dotted line, wherein for comparison, some neighbour cells of positive stained cells are also circled by a yellow dotted line, wherein number besides the circled cell indicates the mean intensity of the AuNP reflectance in the circled cell region, wherein representative images are chosen from n=3 images per mouse from n=2 mice/group, according to an embodiment of the subject invention.

To examine the intradermal distributions of AuNPs in healthy skin at cell level, the locations of AuNPs in skin sections are tracked by confocal reflectance imaging upon silver staining enhancement. Representative confocal images of FIG. 20 show that all types of AuNPs tested are mainly distributed in the SC, epidermis, and hair follicles. Consistent with the ICP-MS data, the reflected light from AuNPs in the epidermis is stronger in samples treated with Au$_3$@PEG-octadecyl$_{30\%}$ NPs than that in samples treated with Au$_3$@PEG-methoxy NPs. The keratinocytes, Langerhans cells, and T cells are further stained by cytokeratin antibody cocktail (AE1/AE3), CD207 antibody, and CD3 antibody, respectively. Results show that Au$_3$@PEG-octadecyl$_{30\%}$ NPs exhibit higher cellular entry in all three cell types when compared to Au$_3$@PEG-methoxy NPs, with no preferential accumulation in specific cell type.

Figure 21A:
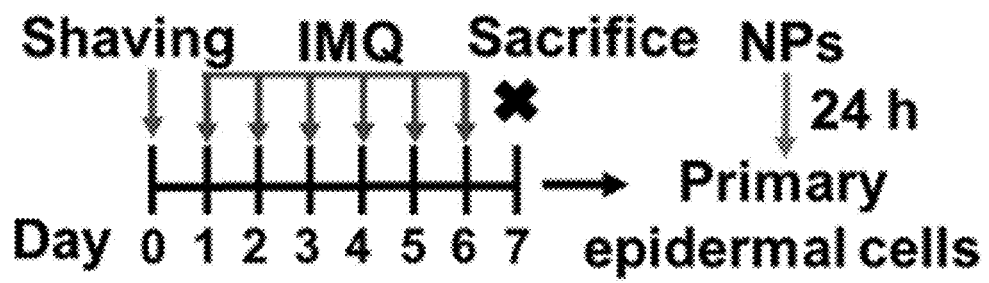
Figure 21B:
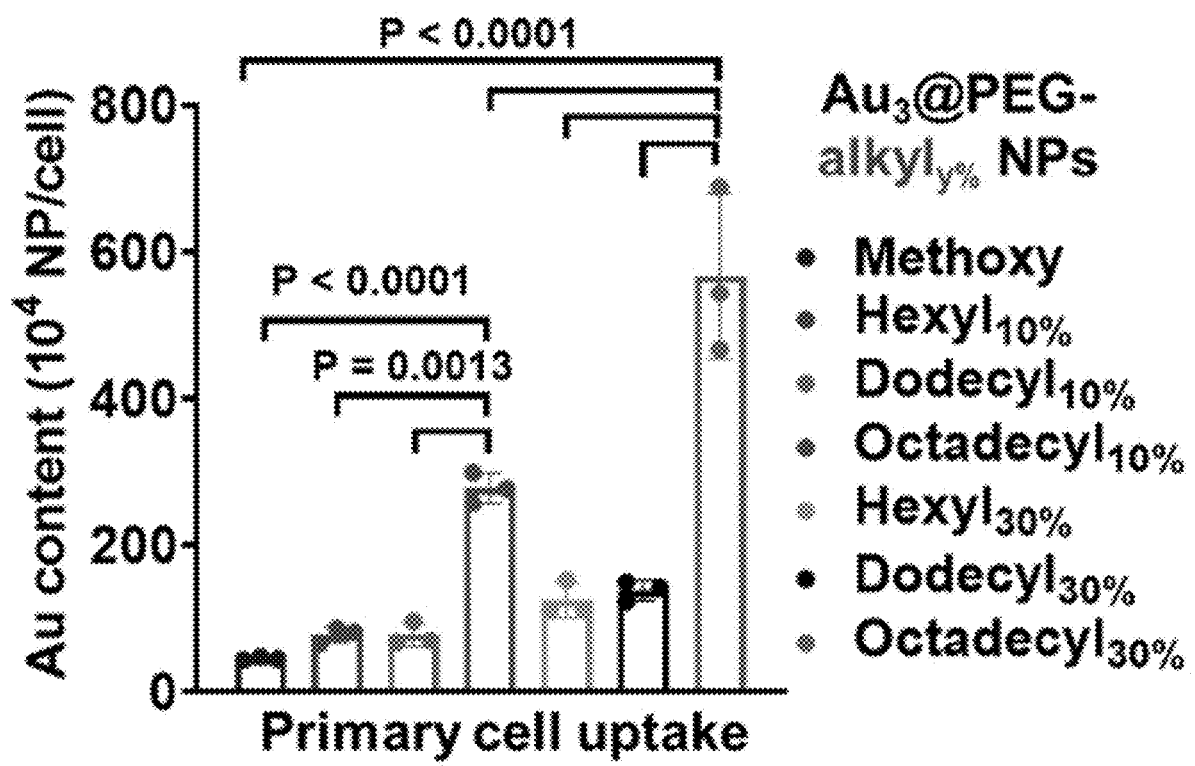

1.2.5 Cellular Distribution of Au$_3$@PEG-alkyl$_{y\ \%}$ NPs in Psoriatic Skin of IMQ-induced Mouse Model It is noted that the structures of psoriatic skin are different from these of healthy skin (for example, psoriatic skin has impaired SC with scars), the interaction between NPs and psoriatic skin are studied to enhance the anti-psoriasis nanomedicine design. Balb/c mice (6-8 weeks) are daily treated with IMQ (62.5 mg of IMQ cream, with 3.125 mg of the active compound) on shaved back for 6 days, then a series of skin inflammatory reactions such as scaling and thickening of skin patches are induced on Day 7, matching the phenotype of psoriasis. The same cell isolation procedures are used in the healthy cellular uptake experiment to harvest primary cells from psoriatic epidermis as shown in FIG. 11A. ICP-MS results confirm that the cellular uptake of Au$_3$@PEG-alkyl$_{y\ \%}$ NPs in psoriatic primary epidermal cells also increases with increasing alkyl chain length and loadings as shown in FIG. 21B. The uptake of $Au_3$@PEG-octadecyl$_{30\%}$ NPs is about 11.6-fold higher than $Au_3$@PEG-methoxy NPs, similar to the uptake data for primary healthy epidermal cells.

Figure 22:
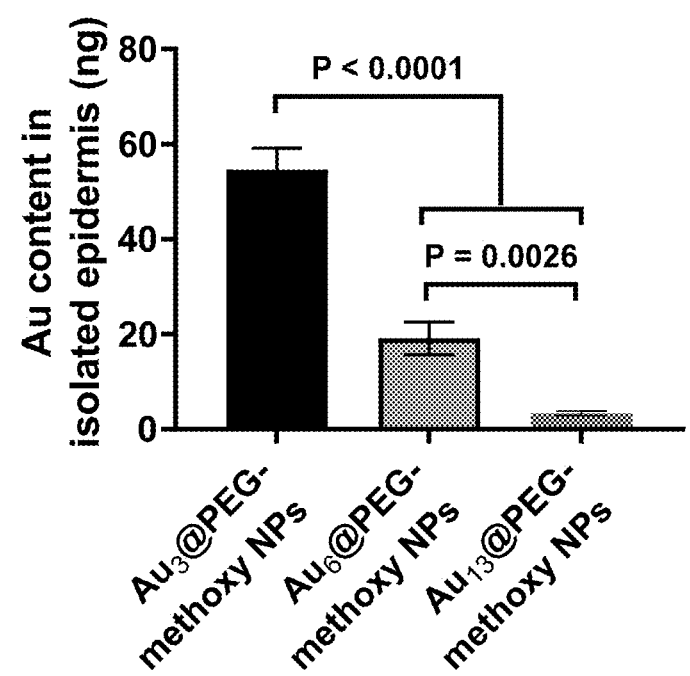
FIG. 22 shows effect of NP core size on the delivery of $Au_x$@PEG-methoxy NPs to the psoriatic epidermis, wherein mice are depilated on Day 0 and received daily topical application of IMO on the dorsal skin from Day 1 to Day 6, wherein on Day 7, psoriatic mice is topically applied with $Au_x$@PEG-methoxy NPs (200 μL; ~3 μM $Au_3$ NPs, ~500 nM $Au_6$ NPs, or ~50 nM $Au_{13}$ NPs), wherein 24 hours post-application, the psoriatic skin is harvested, and the epidermis is separated from the dermis and hypodermis for quantification of Au content, wherein n=3-4, mean±SD, and statistical significance is calculated by one-way ANOVA with Tukey's Test for post-hoc analysis, with adjusted P values shown in FIG. 22, according to an embodiment of the subject invention.
Figure 23:
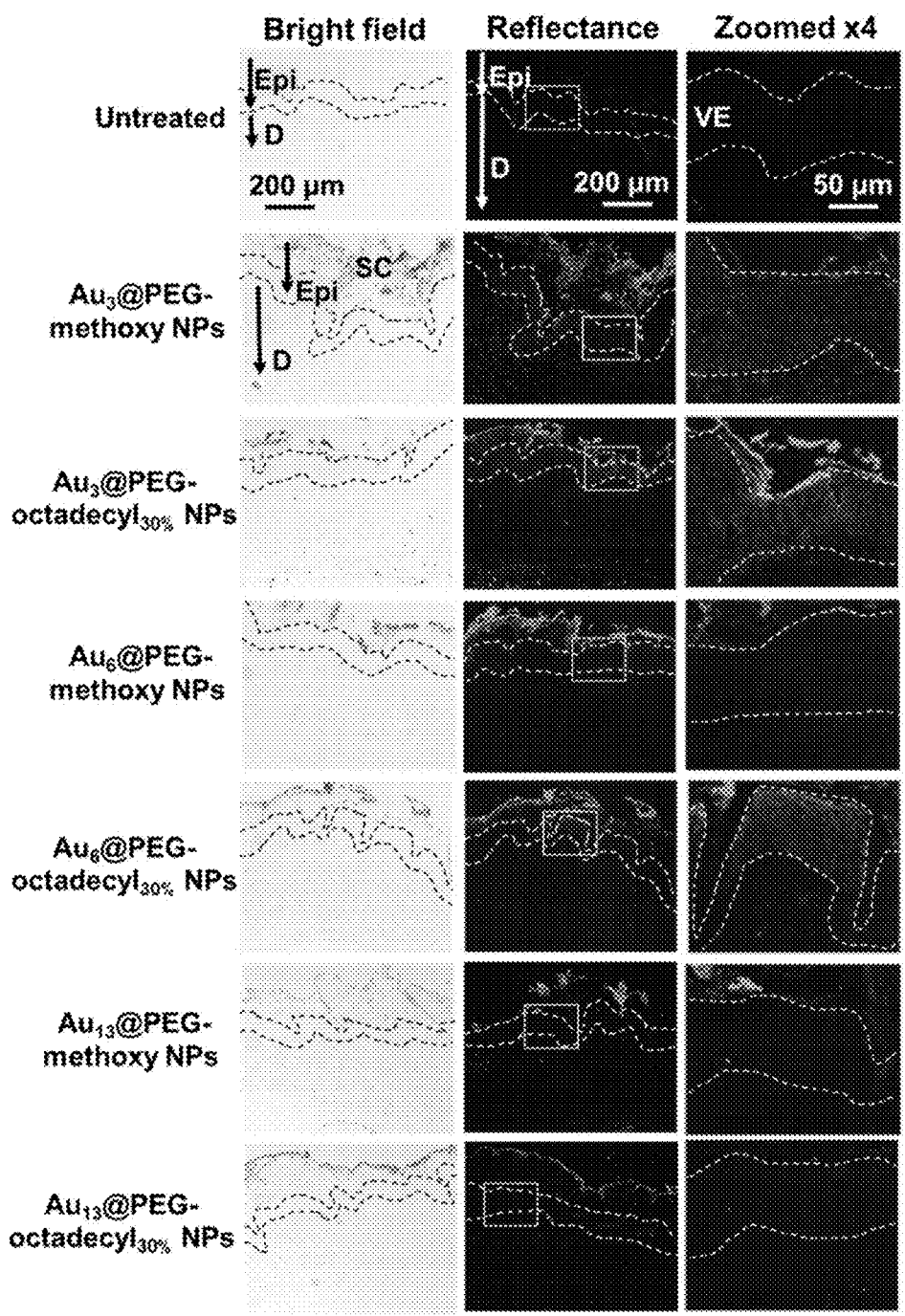
FIG. 23 shows intradermal tissue-level distribution of topically applied $Au_x$@PEG-alkyl$_{y\%}$ NPs in psoriatic mouse skin, wherein 24 hours post-application (200 μL; about 3 μM $Au_3$ NPs, about 500 nM $Au_6$ NPs, or ~50 nM $Au_{13}$ NPs), the skin is harvested, wherein after silver staining to enhance the Au cores, the sections are imaged under bright field (first column) to reveal the silver-enhanced AuNPs (brown) and in reflectance mode to reveal the reflectance signals of the silver-enhanced AuNPs (green, second column), wherein the third column shows the zoomed images of the boxed area in the second column, wherein untreated control indicates psoriatic skin without application of NPs, wherein the dotted line indicates the boundary of viable epidermis (VE), wherein Epi stands for epidermis, according to an embodiment of the subject invention.

To investigate the effect of NP size on delivery to psoriatic epidermis, $Au_x$@PEG-methoxy NPs (x=3, 6, 13) are topically applied onto the psoriatic skin of IMQ-treated mice for 24 hours and the NP distributions in the different skin layers and epidermal cells are examined. ICP-MS data of FIG. 22 and confocal reflectance images of FIG. 23 reveal that $Au_3$@PEG-methoxy NPs can cross the scarred SC and enter cells of the thickened epidermis of psoriatic skin in significantly higher amounts than the larger counterparts. The advantage of choosing $Au_3$@PEG-methoxy NPs over larger NPs for delivery to the epidermis is more apparent for psoriatic skin than for healthy skin. Based on these data, it is concluded that an overall NP size <15 nm (when PEG chains are attached) is optimal for topical delivery to the epidermis.

Figure 24A:
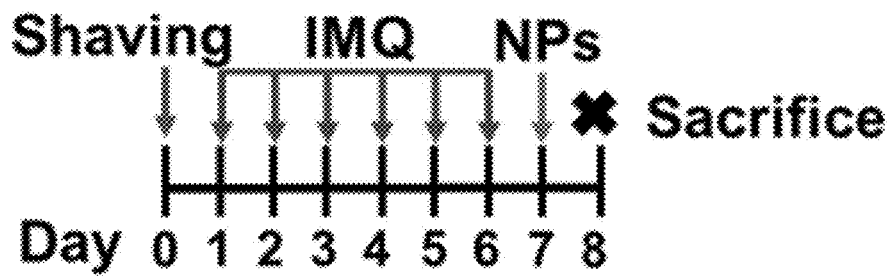
Figure 24B:
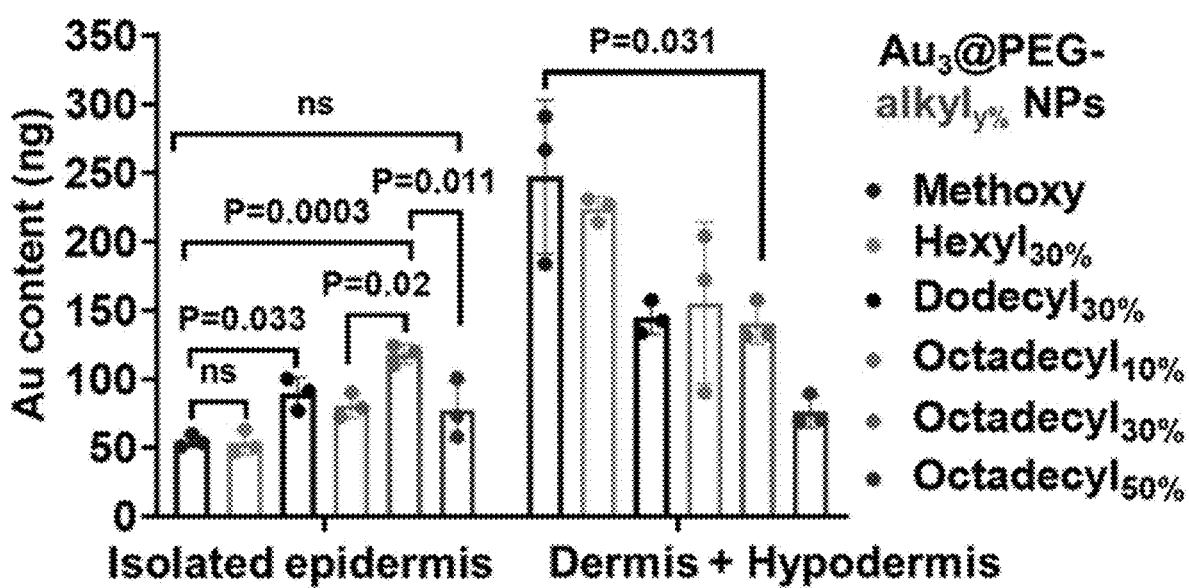

The effect of alkylation on delivery to psoriatic epidermis is then investigated by topically applying $Au_3$@PEG-alkyl$_{30\%}$ NPs (hexyl, dodecyl) and $Au_3$@PEG-octadecyl$_{y\%}$ NPs (y=0, 10, 30, or 50) to IMQ-treated mice for 24 hours. By ICP-MS, $Au_3$@PEG-octadecyl$_{30\%}$ NPs accumulate more abundantly in the epidermis than $Au_3$@PEG-alkyl$_{y\%}$ NPs with shorter alkyl chain length and lower octadecyl loading as shown in FIGS. 24A-24B.

Further, the epidermal accumulation of $Au_3$@PEG-octadecyl$_{50\%}$ NPs is lower than that of $Au_3$@PEG-octadecyl$_{30\%}$ NPs, probably because enhanced hydrophobic interactions of the former NP lead to a larger NP size (for example, 36.4 nm) that disfavors skin permeation. These results convincingly demonstrate that there exists an optimal loading of octadecyl chains of 30 mol %, in the design of NPs for best topical delivery to the epidermis. In addition, because psoriatic skin has multiple layers of keratinocytes (unlike the single layer in healthy skin), the probability of finding $Au_3$@PEG-octadecyl$_{30\%}$ NPs in the epidermis and keratinocytes is higher in psoriatic skin; meanwhile the accumulation of $Au_3$@PEG-octadecyl$_{30\%}$ NPs in dermis and hypodermis is lower in psoriatic skin as shown in FIGS. 24A-24B in comparison with FIGS. 11A-11B.

Figure 25:
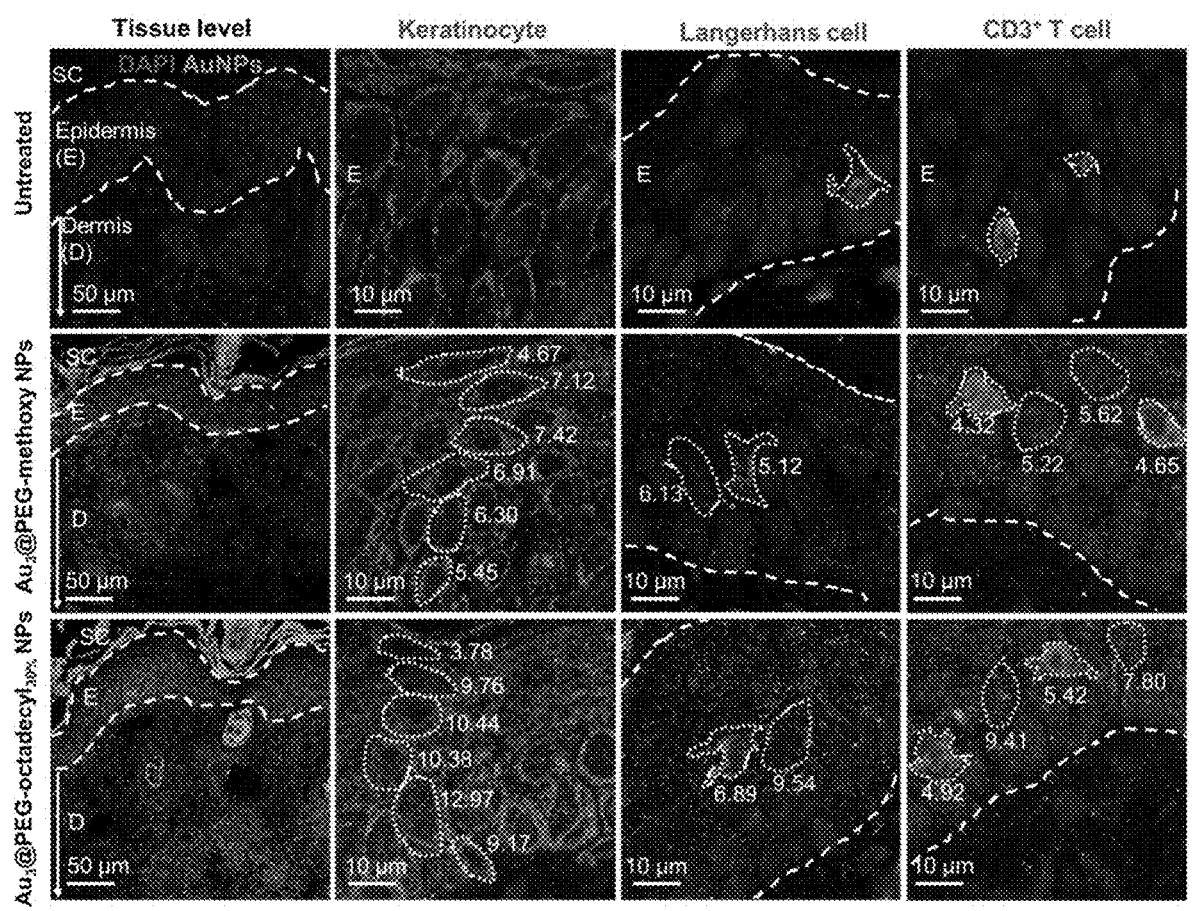
FIG. 25 shows cellular-level distribution of topically applied $Au_3$@PEG-alkyl$_{y\%}$ NPs in psoriatic skin, wherein confocal imaging of the psoriatic skin topically treated with $Au_3$@PEG-alkyl$_{y\%}$ NPs (3 μM, 200 μL) for 24 hours reveals AuNPs by silver enhancement staining (green) and with immunofluorescence staining (red) of keratinocytes (AE1/3 cytokeratin; second column), Langerhans cells (CD207; third column), and CD3$^+$ T cells (forth column), wherein cell nucleus is stained by DAPI (blue), wherein untreated stands for healthy skin without AuNP application, wherein E stands for epidermis; D stands for dermis, wherein number indicates the mean intensity of the AuNP reflectance signal in immunostained cells (white dotted line) or neighbouring non-immunostained cells (yellow dotted line), wherein representative images are chosen from n=3 images per mouse from n=2 mice/group, according to an embodiment of the subject invention.

Confocal immunofluorescence images show that NPs tend to accumulate in keratinocytes of the middle epidermis than in the flattened keratinocytes of the upper layer in psoriatic skin as shown in FIG. 25. Further, $Au_3$@PEG-octadecyl$_{30\%}$ NPs preferentially localize in keratinocytes over the neighbouring Langerhans cells or T cells. Such a preference is less obvious for $Au_3$@PEG-methoxy NPs. Moreover, like healthy skin, $Au_3$@PEG-octadecyl$_{30\%}$ NPs enter the three epidermal cell types in psoriatic skin more abundantly than $Au_3$@PEG-methoxy NPs.

To validate the label-free confocal reflectance imaging data, Cyanine 5 (Cy5)-labeled $Au_3$@PEG-methoxy NPs and Cy5-labeled $Au_3$@PEG-octadecyl$_{30\%}$ NPs are prepared for tracking their intradermal distributions by confocal fluorescence imaging.

Figures 26A, 26B:
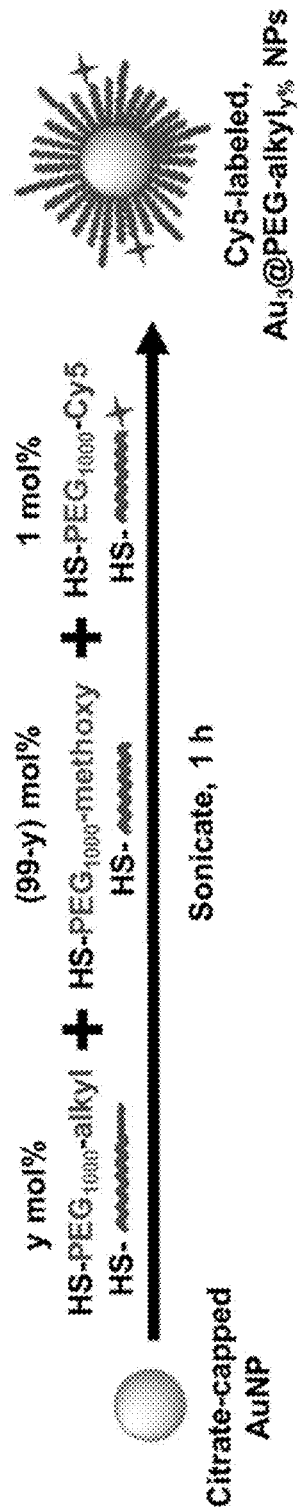
Figure 26C:
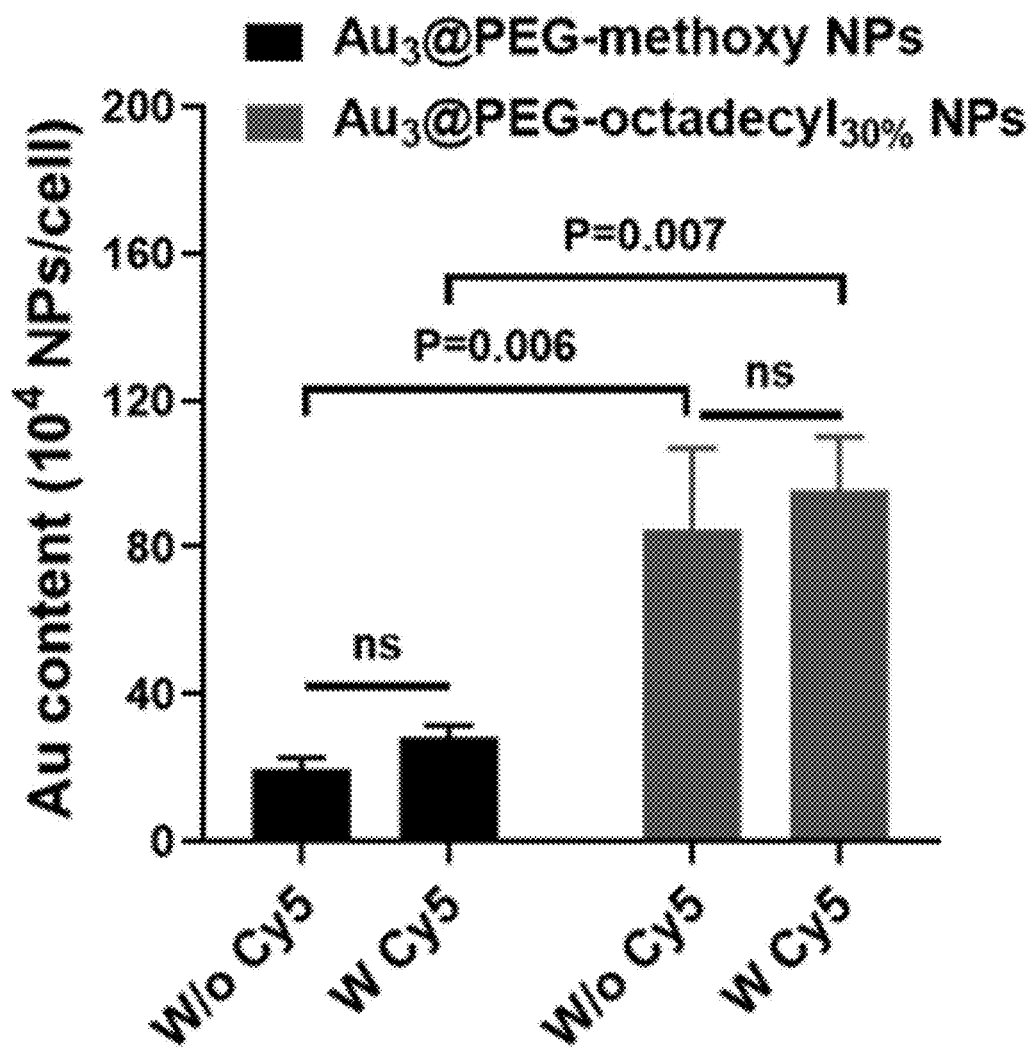

It is revealed that such Cy5-labeled NPs exhibit similar hydrodynamic sizes, zeta potentials, and cellular uptake properties as their nonfluorescent versions as shown in FIGS. 26A-26C.

Figure 27:
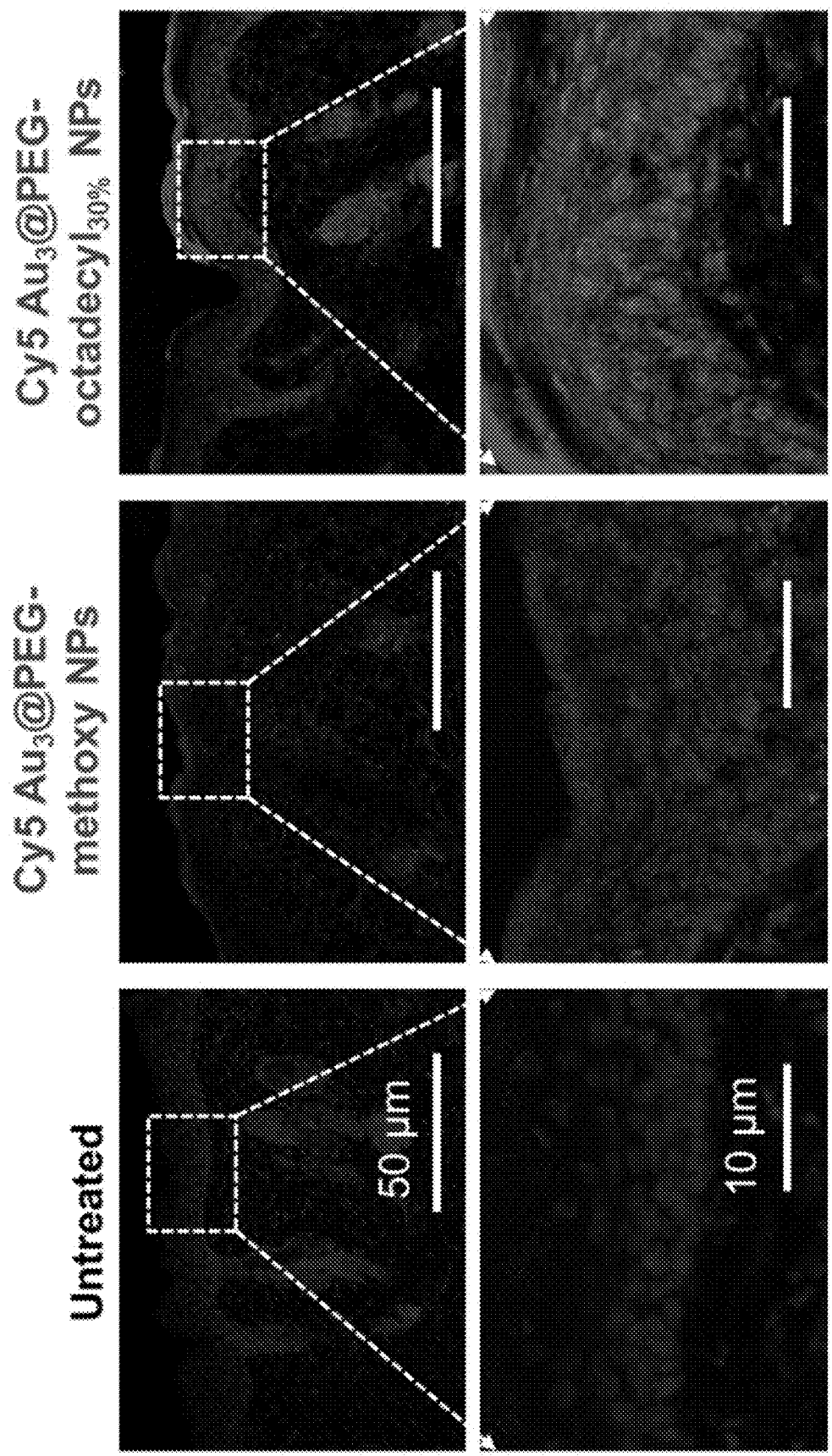
FIG. 27 shows intradermal tissue-level distribution of topically applied Cy5-labeled $Au_3$@PEG-alkyl$_{y\%}$ NPs in psoriatic mouse skin, wherein after topically applying the Cy5-labeled NPs (3 μM, 200 μL) to the skin of psoriatic mice for 24 hours, their intradermal distribution is tracked by confocal imaging and detected stronger Cy5 fluorescence in the epidermis of mice that are treated with Cy5-labeled NPs with 30 mol % octadecyl chains compared with those treated with Cy5-labeled NPs without octadecyl chains, according to an embodiment of the subject invention.

After applying the Cy5-labeled NPs to the skin of psoriatic mice for 24 hours, Cy5 fluorescence detected in the epidermis of mice treated with $Au_3$@PEG-octadecyl$_{30\%}$ NPs is stronger than those treated with $Au_3$@PEG-methoxy NPs. The confocal fluorescence imaging data of FIG. 27 indicate more effective delivery of NPs with 30 mol % octadecyl chains, consistent with the confocal reflectance imaging and ICP-MS data.

1.2.6 Biodistribution after Topical Application of $Au_3$@PEG-alkyl$_{y\%}$ NPs

Figure 28A:
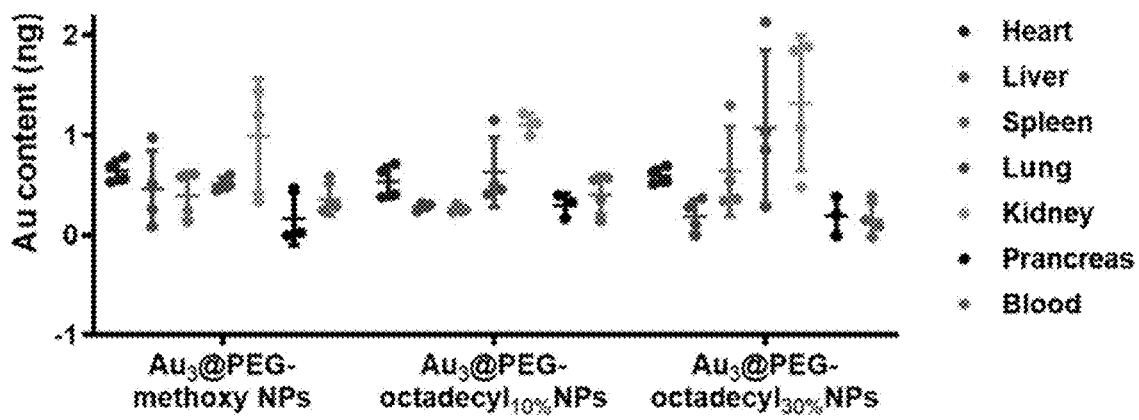
FIGS. 28A-28B show biodistribution of topically applied $Au_3$@PEG-alkyl$_{y\%}$ NPs in healthy mice and mice with psoriasis, wherein 24 hours post-application of $Au_3$@PEG-alkyl$_{y\%}$ NPs (3 μM, 200 μL) onto healthy skin (same as FIGS. 11A-11B) or psoriatic skin (same as FIG. 22), the blood and organs of healthy mice of FIG. 28A, and mice with psoriasis of FIG. 28B are collected for ICP-MS measurement, wherein n=3-4 mice, mean±SD, according to an embodiment of the subject invention.
Figure 28B:
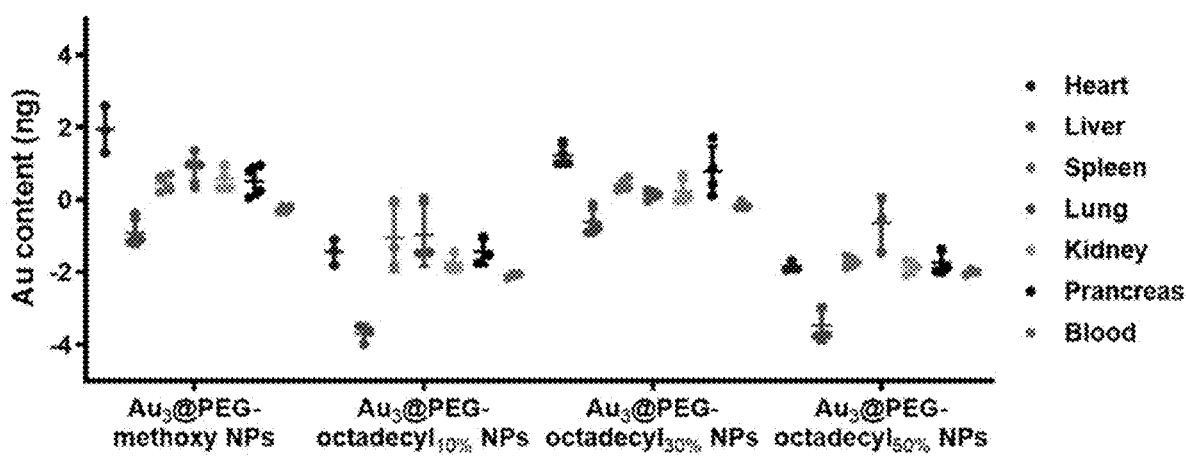

After the study of the intradermal distributions of topically applied NPs, the biodistributions of these NPs in blood and internal organs are further investigated. According to the ICP-MS measurements, there is very limited Au content (less than 2 ng) detected in major internal organs and blood after topical application of NPs to both healthy mice and mice with psoriasis for 24 hours as shown in FIGS. 28A-28B.

Figure 29:
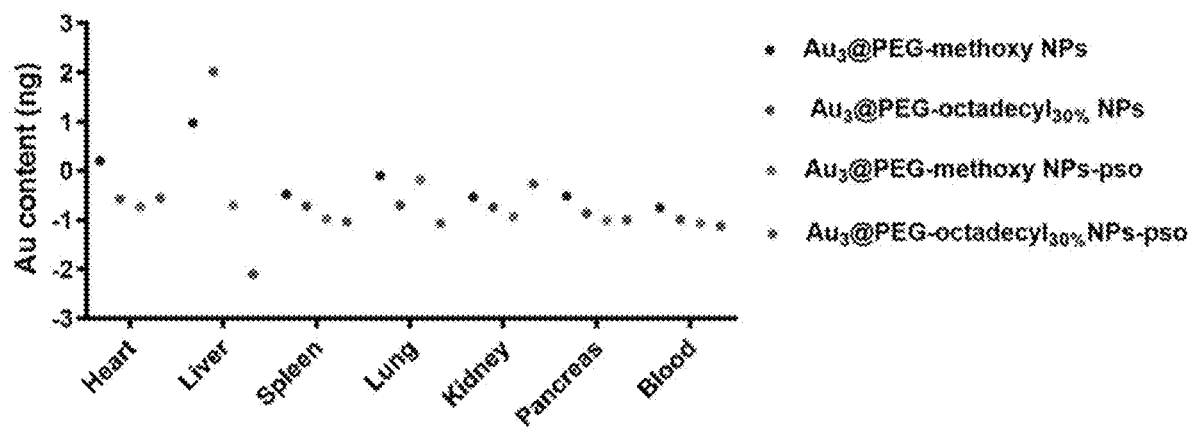
FIG. 29 shows biodistribution of topically applied high concentration of $Au_3$@PEG-alkyl$_{y\%}$ NPs in healthy mice or mice with psoriasis, wherein 24 hours post-application of $Au_3$@PEG-alkyl$_{y\%}$ NPs (30 μM, 200 μL) onto healthy skin or psoriatic skin, the blood and organs are collected for ICP-MS measurement, wherein n=1 mice, according to an embodiment of the subject invention.

To further understand the biodistribution of topically applied $Au_3$@PEG-allyl$_{y\%}$ NPs, the concentration of applied NPs is increased by 10 times (30 μM, 200 μL) and the Au content in different organs and blood is checked after 24 hours. However, no NPs are detected in the blood or major internal organs of both healthy mice and mice with psoriasis as shown in FIG. 29.

1.2.7 Effects of Excipient

Figure 30A:
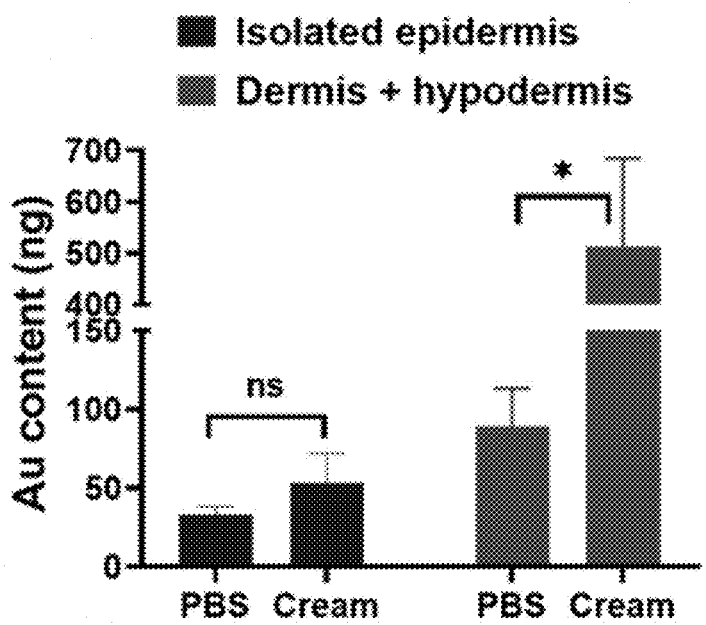
Figure 30B:
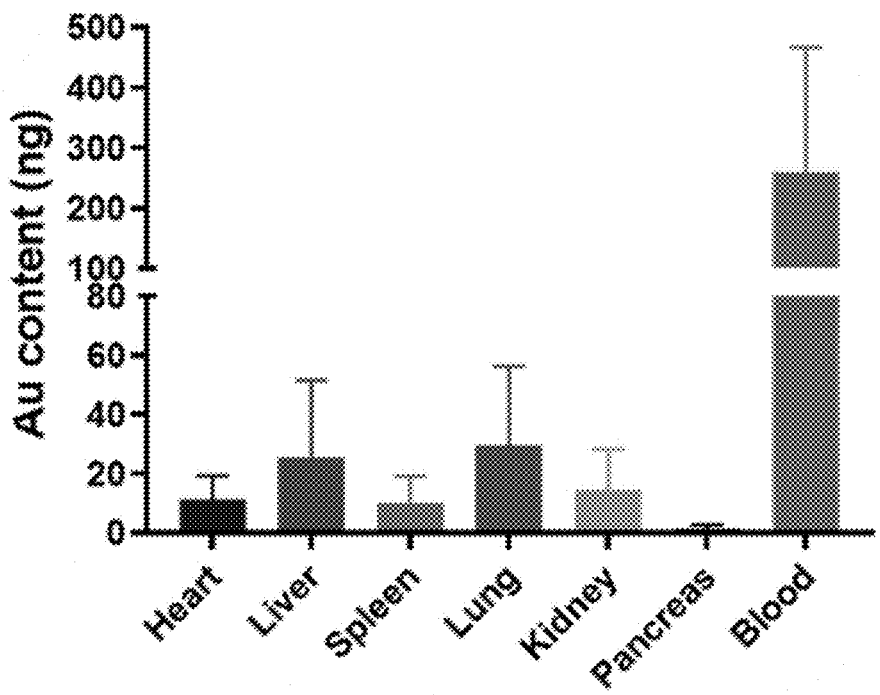

The NPs into PBS may be suspended for topical delivery without the aid of an excipient. Further, a commercial hand cream is used as the excipient for topical delivery of $Au_3$@PEG-methoxy NPs. Specifically, 50 μL of $Au_3$@PEG-methoxy NPs (12 μM) are mixed with 50 mg of hand cream, then this resultant AuNP-containing cream is applied onto shaved dorsal skin of mouse, covering an area of 15 mm 25 mm (same as the size of gauze). After 24 hours, the skin is rinsed with PBS for 3 times then harvested for analysis. ICP-MS results show that with the help of cream, the AuNPs penetrate through the skin and enter internal organs and blood, without showing any significant enhancement in epidermis accumulation when compared to the negative PBS control as shown in FIGS. 30A-30B, suggesting that excessive permeability may reduce epidermal retention (which reduces efficacy) and may cause systemic accumulation (which induces toxicity). Therefore, when applying the $Au_3$@PEG-methoxy or -alkyl NPs in the downstream studies, no excipient is not used.

It is shown that sub-15 nm NPs can cross the SC upon topical application and when attached with octadecyl chains, enhanced accumulation in the epidermis and entry to the keratinocytes for healthy mice and psoriasis mouse models are shown, without the use of excipients.

First, by screening a series of sub-15 nm alkylated NPs that bear different lengths and loadings of alkyl chains, it is proved that allylation promotes the in vitro uptake of NPs by immortalized keratinocytes as well as primary epidermal cells isolated from both healthy mice and psoriatic mice. Next, by topically applying un-alkylated NPs with various Au core sizes onto the skin of healthy mice and psoriatic mice, it is shown that the optimal core size for epidermal delivery is about 3 nm (the optimal overall size is <15 nm). The sub-15 nm size of $Au_3$@PEG-octadecyl$_{30\%}$ NPs allows penetration of the SC and accumulation in the epidermis without the aid of excipients, and an optimal loading of octadecyl groups (30 mol %) maintains the colloidal stability of Au cores in skin while boosting their uptake by epidermal cells. Despite the structural differences in psoriatic skin, the total absolute Au content for the permeation of $Au_3$@PEG-octadecyl$_{30\%}$ NPs in the psoriatic skin is similar to that in the healthy skin. Lastly, very limited Au content is detected in major internal organs and blood after topical application of NPs to both healthy mice and mice with psoriasis for 24 hours.

These in vivo data not only improve the cellular-level understanding of the bio-nano interactions of NPs with psoriatic skin, but also enable optimization of rational design of bionanomaterials to overcome the delivery bottleneck to keratinocytes based on surface alkylation or more broadly, functional group engineering.

Embodiment Two: Alkyl-Terminated Gold Nanoparticles as a Self-Therapeutic Treatment for Psoriasis The anti-psoriasis potential of the alkylated gold NPs, which consists of a 3 nm gold core, a shell of 1000 Da PEG strands, and octadecyl chains attached to 30% of the PEG strands ($Au_3$@PEG-octadecyl$_{30\%}$ NP) is studied. When being applied onto the skin of IMQ-induced mice (an established model of psoriasis), the NPs may penetrate the SC and enter keratinocytes. As a result, concurrently applying the NPs with IMQ inhibits psoriasis. Further, the NPs can treat psoriasis as effectively as standard betamethasone-calcipotriol therapy, with significantly reduced skin wrinkling and hair loss. No NPs are found in major organs and no cutaneous or systemic toxicity is observed in the animals four weeks post-application. The work presents a simple, safe, and effective alternative for treating psoriasis.

2.1 Materials and Methods
2.1.1 Efficacy Evaluation in "Prevention Mode"

Balb/c mice between 6 and 8 weeks of age are depilated on Day 0 and divided into 4 treatment groups (n=8 mice per group). From Day 1 to Day 6, all groups of mice receive daily topical application of the IMQ cream. 30 minutes post-application of the IMQ cream, the middle dorsal area is topically applied daily with either (i) no additional treatment (denoted "IMQ only"), (ii) $Au_3$@PEG-octadecyl$_{30\%}$ NPs (200 μL of PBS containing 6 μM NPs pipetted into a piece of gauze with an area of 15 mm×25 mm; or equivalently 1000 ppm Au) (denoted "IMQ+$Au_3$@PEG-octadecyl$_{30\%}$ NPs"), (iii) $Au_3$@PEG-methoxy NPs (200 μL of PBS containing 6 μM NPs pipetted into a piece of gauze; or equivalently 1000 ppm Au) (denoted "IMQ+$Au_3$@PEG-methoxy NPs"), or (iv) free PEG strands (967105, M.W: about 1000, J&K Scientific) (200 μL of 1.2 mg/mL PEG in PBS, the same amount of PEG found in $Au_3$@PEG-methoxy NPs) (denoted "IMQ+free PEG"), all with a target coverage area of 15 mm×25 mm on the psoriatic skin. The treated area is then covered with a Tegaderm film (3M).

The severity of psoriatic skin lesions is assessed daily using the modified Psoriasis Area and Severity Index (PASI) scores, a composite score for the degree of erythema, scaling, and thickness on a scale of 0 to 4. Specifically, 0 indicates no symptoms, 1 indicates mild, 2 indicates moderate, 3 indicates severe, and 4 indicates very severe. The body weight is also monitored daily. On Day 7, mice are sacrificed. The treated skin area is then rinsed with PBS for three times, harvested, and chopped into slices of 3 mm×10 mm in area for further analysis. Next, whole blood is collected from the mouse heart via an intracardiac puncture with 25 G needle under anaesthesia before animal sacrifice. Other organs are collected after sacrifice for further analysis. The group size of each treatment group is calculated according to Dunnett's formalism (see the section "Sample Size Calculation" below).

2.1.2 Synthesis and Characterization of Polythymidine Coated AuNPs ($Au_3$@T12 NPs)

Standard reagents for solid-state synthesis of oligonucleotides are purchased from GeneParma. DNA phosphoramidites are purchased from Hongene. Thiolated DNA oligonucleotides with 12 repeating thymidines (HS-T12) are synthesized by a MerMade 12 Oligonucleotide synthesizer (LGC Bioautomation) based on manufacturer-recommended cleavage and deprotection protocols. All oligonucleotides are purified by a high-performance liquid chromatography instrument (Agilent 1260) equipped with a reverse-phase PLRP-S 300 Å 8 μm column (Agilent). Triethylammonium acetate (TEAA) buffer (0.03 M) is run with a 2%/min gradient of 100% $CH_3CN$ at a flow rate of 3 mL/min while monitoring the absorbance of nucleic acid at 260 nm and 280 nm. After HPLC purification, the oligonucleotides are lyophilized and stored at −20° C. for future use.

Then, 300 μL of 200 μM thiolated DNA oligonucleotides (HS-T12) are incubated in 300 μL of 40 mM Tris(2-carboxyethyl) phosphine hydrochloride (TCEP) for 1 hour. To modify citrate-capped $Au_3$ NPs with DNA, 10 mL of 300 nM $Au_3$ NPs is mixed with 600 μL HS-T12/TCEP mixture and manually shaken for a few seconds and tuned to 0.01% sodium dodecyl sulfate (SDS) and 1× Tris-acetate-EDTA (TAE) buffer. After incubating the solution at room temperature for 20 minutes, NaCl solution is sequentially added to the NP solution at time intervals of 30 minutes until a final concentration of 0.3 M is reached to achieve dense coverage of the NP surface with DNA oligonucleotides. The NP product is obtained by dialyzing the reaction mixture against Nanopure water (Barnstead, Thermo Fisher) by 5 rounds of centrifugal filtration (Amicon® Ultra-15, MWCO: 10 k Da) at 4,000 g for 15 minutes and resuspension in deionized water. The loading of oligonucleotides are then quantified by a reported method[32]. Specifically, 20 mol % of cyanine 5 (Cy5)-conjugated SH-T12 is mixed with 80 mol % of SH-T12 to synthesis DNA coated AuNP, then DNA is chemically displaced from the NP surface using DTT. The displacement is achieved by adding equal volumes of oligonucleotide-functionalized gold NPs and 1.0 M DTT in 0.18 M PB at pH 8.0. The oligonucleotides are released into solution during an overnight incubation and the gold precipitate is removed by centrifugation. To determine oligonucleotide concentration, 100 μL of supernatant is placed in a 96-well plate and the fluorescence is compared to a standard curve. During the fluorescence measurement, the fluorophore is excited at 650 nm and the emission is collected at 670 nm. The DNA loading is calculated by dividing the number of DNA strands by the number of AuNPs.

2.1.3 Efficacy Evaluation in "Treatment Mode"

Balb/c mice between 6 and 8 weeks of age are depilated on Day 0 and divided into 3 treatment groups (n=7 mice per group). Each group daily receives topical application of 62.5 mg of IMQ cream for 6 consecutive days (Day 1 to Day 6). From Day 7 to Day 10, the mice are daily treated with either (i) PBS (200 μL of liquid pipetted into a piece of gauze), (ii) Betamethasone and Calcipotriol (BC) ointment (20 mg of cream spread as a thin layer), or (iii) $Au_3$@PEG-octadecyl$_{30\%}$ NPs (200 μL PBS containing 6 μM NPs pipetted into a piece of gauze; or equivalently 1000 ppm of Au), all with a target coverage area of 15 mm×25 mm on the psoriatic skin. The treated area is then covered with a Tegaderm film. The PASI scores and body weight are measured daily from Day 7 to Day 10. Mice are sacrificed on Day 11. The treated skin area is rinsed with PBS for three times, harvested, and chopped into slices of 3 mm 10 mm in area for further analysis. Whole blood and other organs are also collected for further analysis. The group size of each treatment group is calculated according to Dunnett's formalism (see the section "sample size calculation" below).

2.1.4 Sample Size Calculation

For in vivo efficacy studies, the group size of each treatment is calculated according to Dunnett's formalism.[33] Dunnett's test is a multiple comparison procedure that compares the efficacy of each treatment group with the same control group. Here, "H0: All treatment groups are equivalent to the control group" is tested against "H1: There exists one group that is superior to the control group". Specifically, the treatment groups and the control group are compared in a way that (i) the chance of committing type 1 error is <5% and that (ii) our comparison is of power 80%. Dunnett's formalism states that $p=\sqrt{N}\delta/\sigma$, p is the correlation coefficient that depends on N. There are 3 and 2 treatment groups in the "prevention mode" (excluding the IMQ only control group) and the "treatment mode" (excluding the PBS control group), respectively. Thus, p equals 4.30 and 4.05 for the "prevention mode" and the "treatment mode", respectively. If the superior treatment group gives an outcome ($\delta$) of 1.5 standard deviation ($\sigma$) better than the control group, the required N is determined to be $(4.30/1.5)^2 \approx 8$ for the "prevention mode" and $(4.05/1.5)^2 \approx 7$ for the "treatment mode".

2.1.5 Immunohistochemistry (IHC) Staining for Efficacy Evaluation

For each treated or control mouse, two small slices of skin tissue, each of 3 mm×10 mm in area and at least 3 mm apart from each other in the original harvested skin, are embedded into separate paraffin blocks and sectioned. The two slices from each mouse are IHC stained with two different markers, CD3 and Ki67 (see below). Deparaffinized and rehydrated tissue sections are immersed in citrate buffer (10 mM sodium citrate, 0.05% Tween 20, pH=6.0) and heated in the microwave oven for 3 minutes under high power (about 95-100° C.) and for 20 more minutes under low power. After cooling in the heated solution for 30 minutes, the slides are washed in distilled water twice, then rinsed in PBS for 5 minutes. Next, the slides are blocked with 2.5% normal horse serum (Vector Laboratories) for 2 hours at room temperature and incubated with 50 µL of primary antibodies [2.5 µg/mL for Ki67 antibody (ab15580; Abcam) or 2 µg/mL for CD3 antibody (ab16669; Abcam)] formulated in horse serum are incubated overnight at 4° C. After rinses with PBS, the sections are treated with 3% $H_2O_2$ (Merck Millipore) for 10 minutes, rinsed again, and incubated with about 50 µL of secondary antibodies (NP-7401-50; ImmPRESS HRP Polymer detection Kit; Vector Laboratories) for 30 minutes. The sections are developed using 3,3'-diaminobenzidine (DAB) enzyme substrate (ImmPACTTM DAB, Vector Laboratories) for 4 minutes. All slides are counterstained with Mayer's hematoxylin for 2 minutes, washed in distilled water, dehydrated in ethanol, cleared in xylene, and mounted with DPX mountant (Sigma). Sections are for visualization and photograph under a Ti-E motorized inverted fluorescence microscope (Nikon) with the brightfield mode.

2.1.6 Image Analysis for Efficacy Evaluation

For each section-containing slide, 3 pictures (1.2 mm×0.9 mm; 10× under bright field) are taken such that 6 pictures in total are counted for analysis of each mouse. To measure the thickness of epidermis (from the stratum granulosum to the epidermal-dermal junction) and the thickness of whole skin (from epidermis to hypodermis-muscle junction), the area of epidermis or whole skin in each picture is measured by the ImageJ software and divided the area by the length of skin in each picture (typically 1.2 mm long). Similarly, the number of Ki67$^+$ cells in basal epidermis, the number of CD3$^+$ cells in the whole skin, and the number of hair follicles in the whole skin are counted and divided by the length of skin in each picture. The averaged value of 6 pictures per mouse is displayed using a stacked bar chart with scatter plot points.

2.1.7 Levels of Inflammatory Cytokines in Skin Homogenates for Efficacy Evaluation After removing 40 mg of skin tissue from each treated mouse, the skin tissue is treated with 1.6 mL of tissue protein extraction reagent (78510; Thermo Scientific) supplemented with 1× protease inhibitor cocktail (78430; Thermo Scientific). The samples are homogenized by using a Tissue-Tearor homogenizer (BioSepc Products) on ice and centrifuged at 15000 rpm and 4° C. for 10 minutes to remove any tissue debris. 200 µL aliquots of the supernatant are used for measuring the concentrations of IL-17A, IL-12/23 p40, and IL-1β by using the Mouse IL-17 DuoSet ELISA kit (DY421-05; R&D Systems), ELISA MAX™ Deluxe Set Mouse IL-12/IL-23 p40 (431604; BioLegend), and ELISA MAXIM Deluxe Set Mouse IL-1β (432604; BioLegend) per the manufacturer's instructions.

2.1.8 Determination of Levels of ALT, AST and BUN in Blood for Safety Evaluation 500 µL of whole blood is collected from the mouse heart via an intracardiac puncture (using a 25-Gauge needle) under anaesthesia before animal sacrifice. The whole blood is left to sit for 30 minutes at room temperature and then centrifuged at 2,000×g for 10 min at 4° C. Next, about 200 µL of blood serum is collected from the supernatant for measuring the concentrations of alanine aminotransferase (ALT, a marker for liver function), aspartate aminotransferase (AST, a marker for liver function) and blood urea nitrogen (BUN, a marker for kidney function) at the PathLab Medical Laboratories.

2.2 Results

2.2.1 Improvement of the IMQ-induced Psoriatic Skin Condition in the "Prevention mode" by Topical Application of Au$_3$@PEG-octadecyl$_{30\%}$ NPs.

Figure 31A:
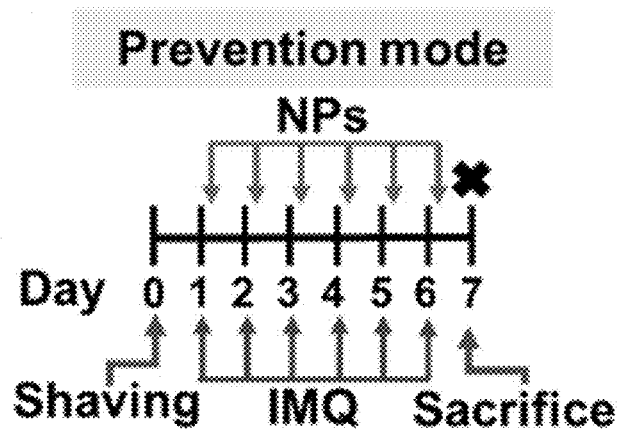

To determine whether Au$_3$@PEG-octadecyl$_{30\%}$ NP can inhibit the development of psoriasis, psoriasis is induced by concurrently appling IMQ and the NPs for 6 consecutive days as shown in FIG. 31A. Moreover, Au$_3$@PEG-methoxy NPs containing the same dosage of Au cores as Au$_3$@PEG-octadecyl$_{30\%}$ NPs or a 7:3 molar mixture of free PEG to PEG-octadecyl strands (PEG-octadecyl$_{30\%}$) that mirrors the PEG composition in Au$_3$@PEG-octadecyl$_{30\%}$ NPs are also included for comparison. Negative control animals are treated with IMQ only. For all groups, the PASI scores of the mice are monitored daily to evaluate the degree of scaling, induration, and erythema.

Compared to the healthy skin, the skin of the IMQ control mice displayed significantly higher psoriasis area and severity index (PASI). It is observed that the treatment with the alkyl-PEG-AuNPs can ameliorate inflammation as indicated by the reduction of scales and induration, while free PEG molecules cannot prevent the development of psoriasis. After 6 days, treatment with octadecyl$_{30\%}$ PEG-Au3 NPs can even smoothen and thin the psoriatic skin with barely visible scales, bringing the appearance of the skin close to that of the normal skin.

2.2.1.1 Efficacy Evaluation of Au$_3$@PEG-octadecyl$_{30\%}$ NPs

Figure 31B:
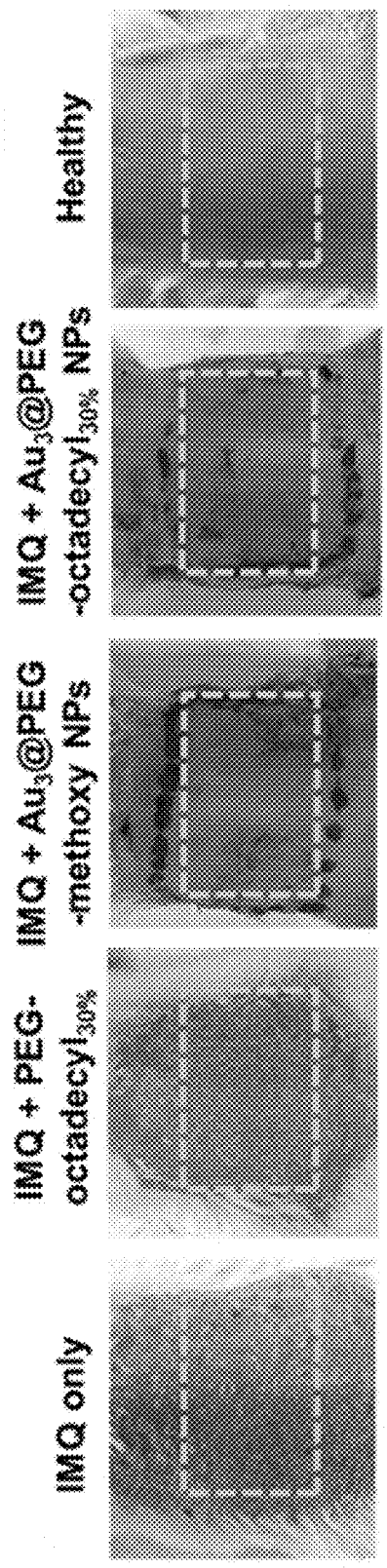
Figure 31C:
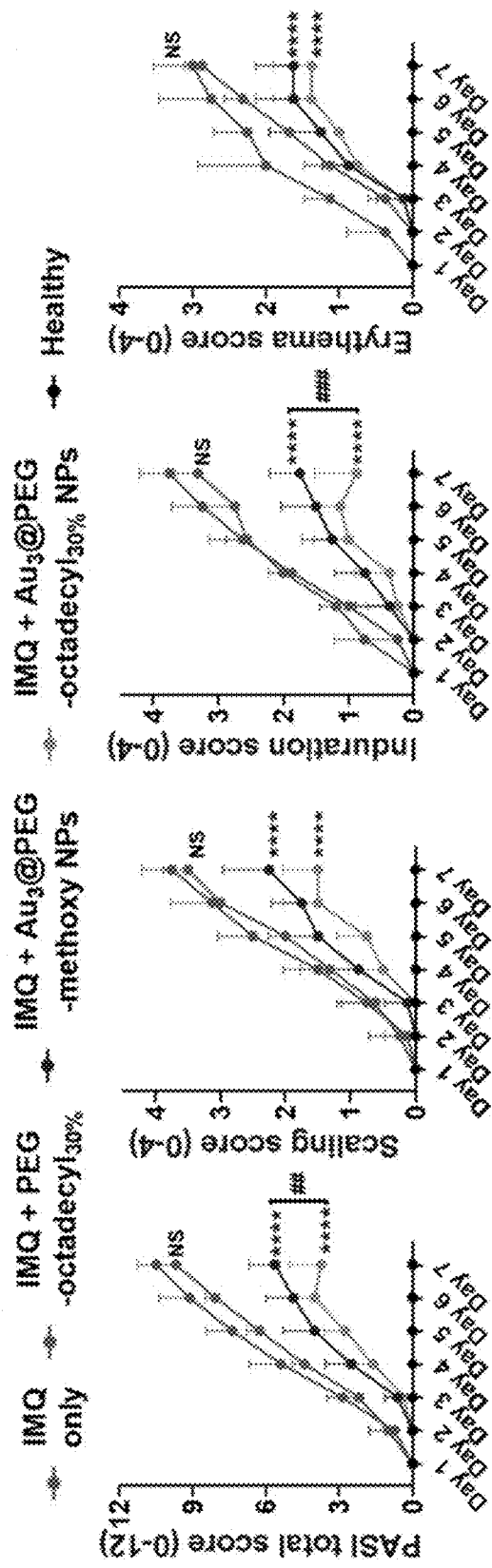

Gross examination show mice treated with IMQ only displayed the expected symptoms of psoriatic inflammation as shown in FIG. 31B along with significantly higher PASI scores than that of the healthy animals as shown in FIG. 31C. Of all the treated groups, animals treated with IMQ and Au$_3$@PEG-octadecyl$_{30\%}$ NPs (IMQ+Au$_3$@PEG-octadecyl$_{30\%}$ NPs) have the lowest PASI scores and smoothened and thinned skin that resembled healthy skin as shown in FIG. 31B. While application of IMQ and Au$_3$@PEG-methoxy NPs (IMQ+Au$_3$@PEG-methoxy NPs) inhibits inflammation as shown by tests on smaller scales and with shorter induration on the skin, the animals still have PASI scores significantly higher than these of IMQ+Au$_3$@PEG-octadecyl$_{30\%}$ NPs treated animals. The results are consistent with the biodistribution data in FIG. 24B that show significantly more alkylated NPs localizing in keratinocytes. Application of free PEG-octadecyl$_{30\%}$ mixture does result in inhibiting of inflammation as shown in FIG. 31C.

Figure 32A:
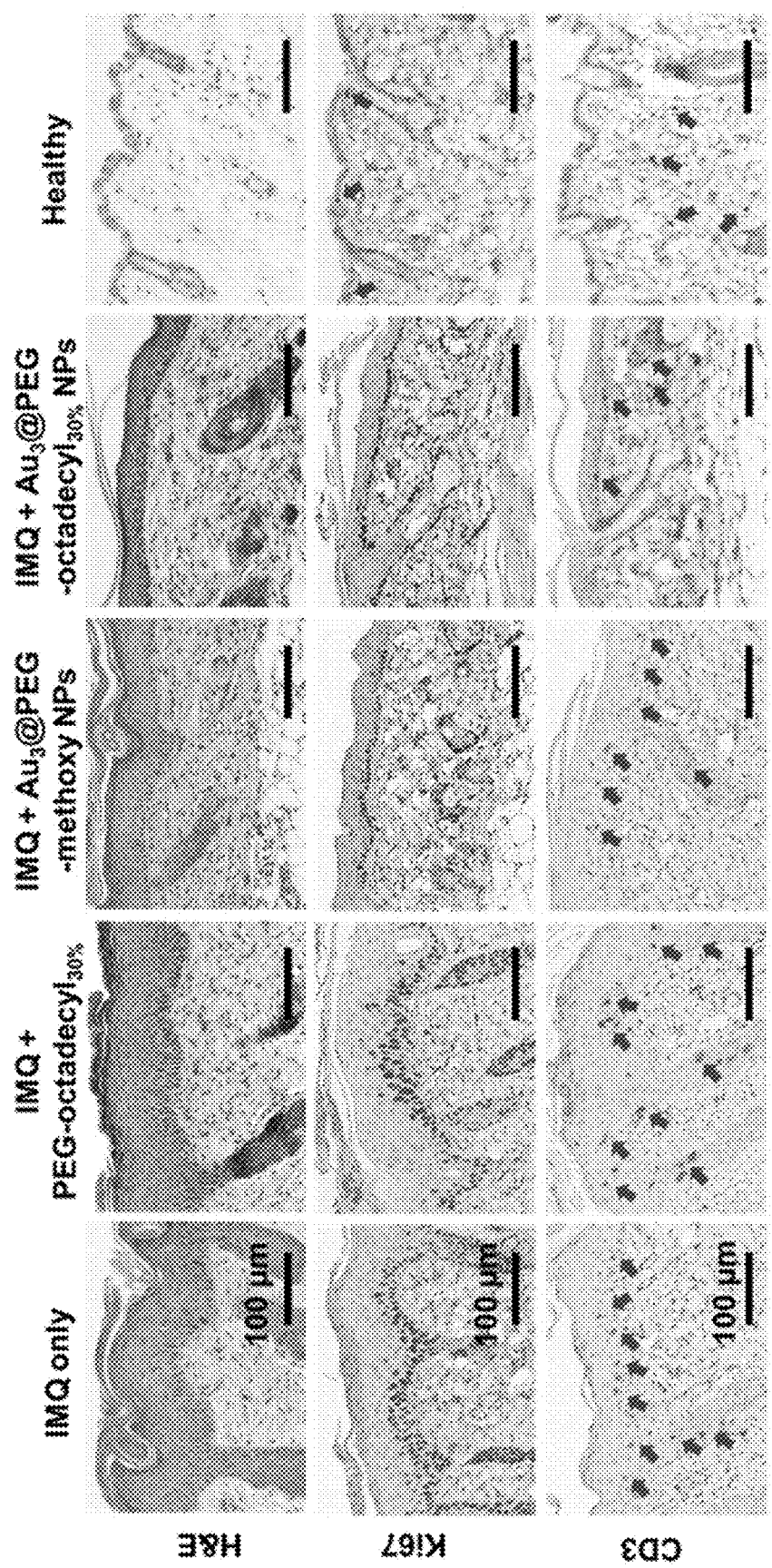
Figure 32B:
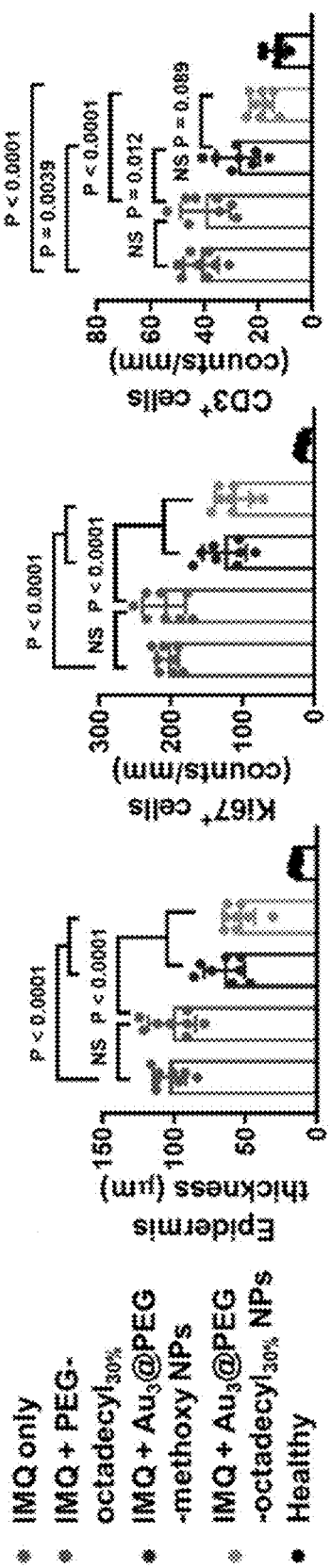

On Day 7, the treated skin is harvested from all groups for histological examination and immunohistochemical staining. Hyper proliferating keratinocytes are stained with Ki67 marker[34] and infiltrating T cells are stained with CD3 marker. Concurrent application of Au$_3$@PEG-octadecyl$_{30\%}$ NPs and IMQ inhibit psoriatic phenotypes, including parakeratosis, acanthosis, hyperproliferation of keratinocytes and infiltration of T cells as shown in FIG. 32A. When all treated groups are compared with the negative control (IMQ only), Au$_3$@PEG-octadecyl$_{30\%}$ NPs lead to the most significant reduction in mean epidermal thickness (47.1%) and population of Ki67$^+$ cells (44.3%) and CD3$^+$ cells (54.6%) as shown in FIG. 32B.

Figure 33A:
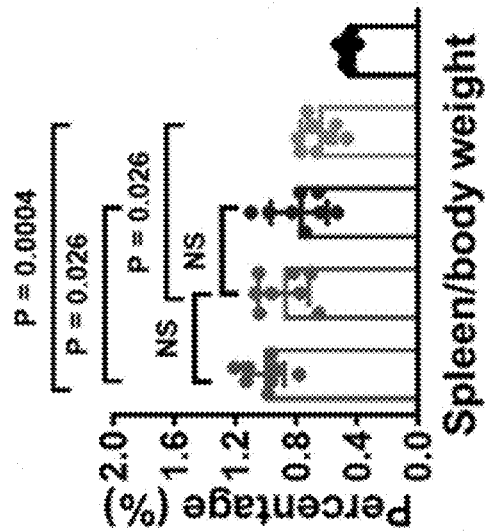
Figure 33B:
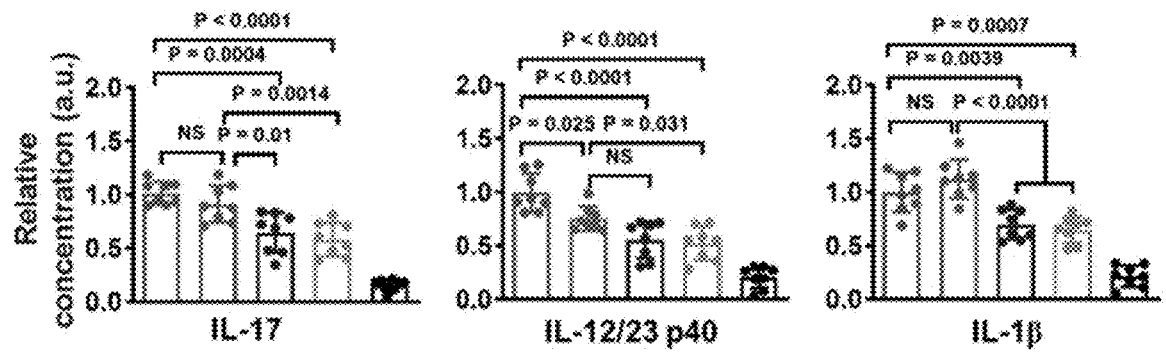

IMQ is known to induce systemic inflammation and splenomegaly, the weights of spleens from all groups are measured and normalized to body weights. The normalized spleen weights of psoriatic animals (IMQ only) increase as expected from 0.43% at Day 0 (before treatment) to 1.02% on Day 7 after IMQ treatment. Notably, the mean normalized spleen weights of animals treated with IMQ and Au$_3$@PEG-methoxy NPs (0.78%) or animals treated with IMQ and Au$_3$@PEG-octadecyl$_{30\%}$ (0.65%) NPs do not increase to the level of the psoriatic animals, indicating that NP treatment inhibits splenomegaly in IMQ-treated animals as shown in FIG. 33A. To ascertain the level of inflammation on Day 7, the levels of psoriasis-related cytokines in the treated skin are measured. The application of Au$_3$@PEG-octadecyl$_{30\%}$ NPs with IMQ significantly reduces levels of IL-17, IL-12/23 p40, and IL-1β by 41.7%, 47.9%, and 35.1%, respectively as shown in FIG. 33B.

The results demonstrate that un-alkylated Au$_3$@PEG-methoxy NPs can also inhibit inflammation associated with psoriasis. Although less effective than alkylated NPs, Au$_3$@PEG-methoxy NPs lead to the significant reduction in mean epidermal thickness (37.2%), population of Ki67$^+$ cells (38.7%), CD3$^+$ cells (33.1%), and the cytokine levels of IL-17 (35.5%), CL-12/23 p40 (44.5%) and IL-1β (30%), suggesting that the therapeutic function of the NPs comes from the gold core, and alkyl chain can improve the efficacy by enhanced delivery to epidermal cells.

In addition, the amounts of psoriasis-related cytokines, IL-17, IL-12/23 p40, and IL-1β, in octadecyl$_{30\%}$-PEG-Au3 NPs treated skin are significantly reduced by 41.7%, 47.9%, and 35%, respectively.

2.2.1.2 Evaluation of Efficacy of Free PEG-octadecyl$_{30\%}$ Mixture, Free PEG Strands, and PBS Solvent To understand the effects of each component in the NP formulation, the effects of free PEG-octadecyl$_{30\%}$ mixture, free PEG strands, and PBS in the prevention mode are further evaluated. During the experiment, it is observed that PEG strands can moisturize the treated skin aera but may not inhibit psoriasis.

Figure 34A:
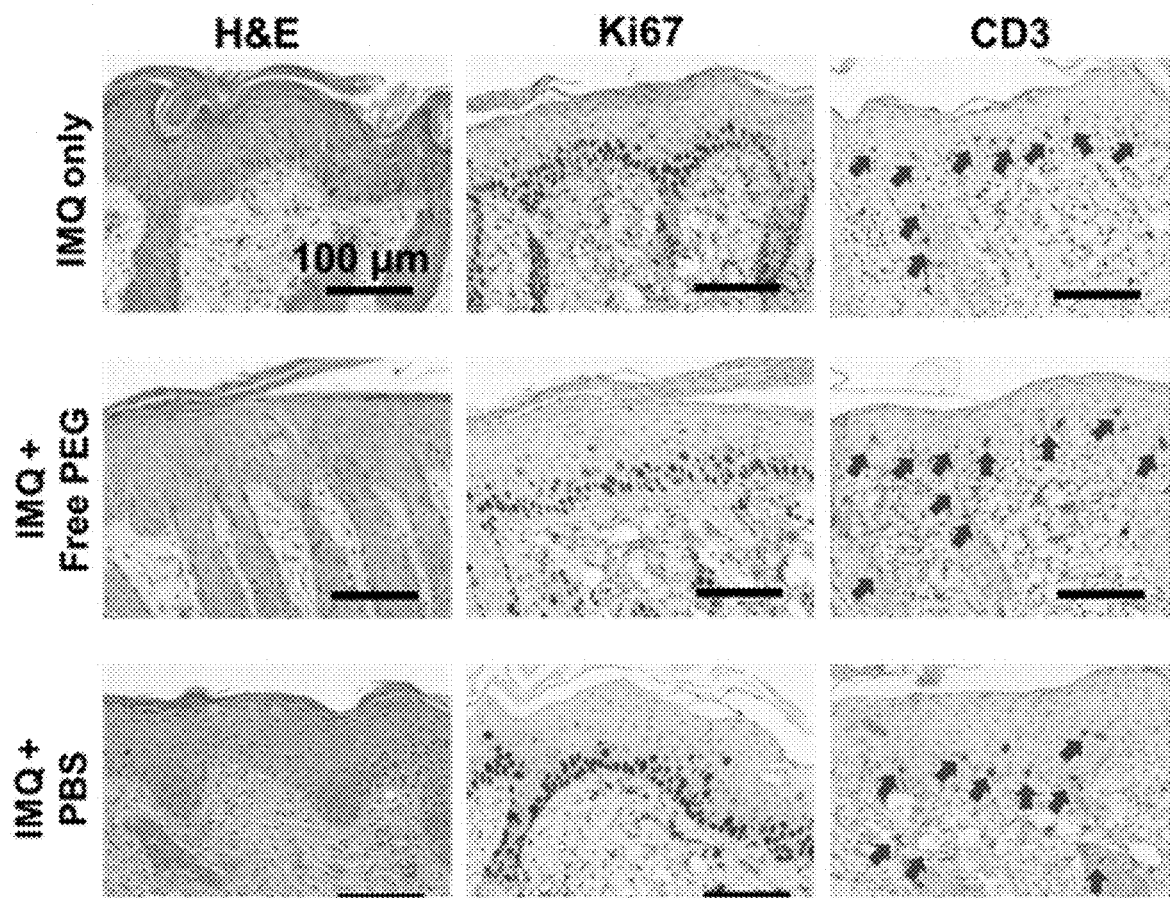
Figure 34B:
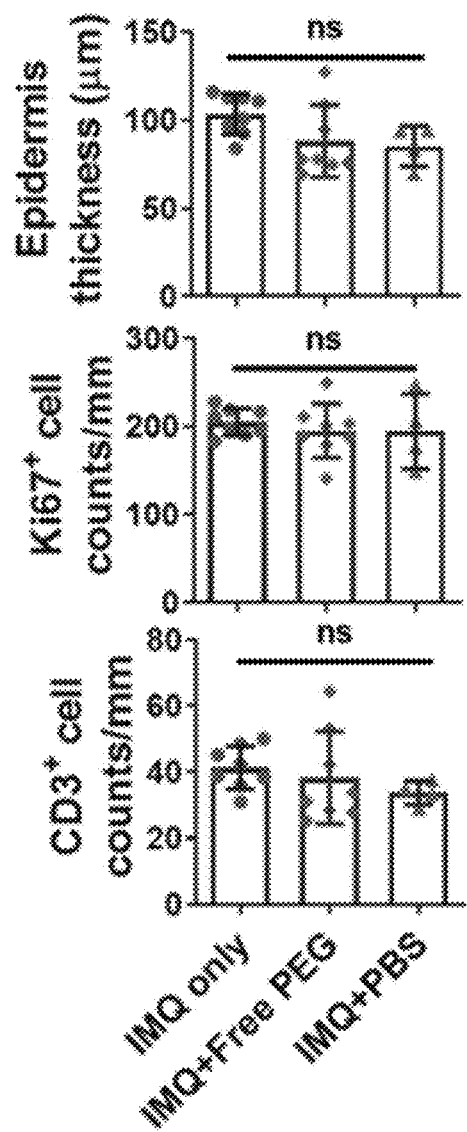

After being treated in the prevention mode, free PEG-octadecyl$_{30\%}$ mixture, free PEG strands, and PBS buffer treated skin do not show obvious improvement when compared to IMQ only treated skin. By histological analysis, free PEG-octadecyl$_{30\%}$ mixture, free PEG strands, and PBS buffer treated groups do not significantly reduce epidermis thickness and number of proliferative keratinocytes and CD3$^+$ T cells as shown in FIGS. 34A-34B.

2.2.1.3 Efficacy of Another Type of Au$_3$-based NP

Au$_3$ NPs are further coated with polythymidine segments instead of PEG to form "spherical nucleic acids" (termed Au$_3$@T12 NPs). The loading of polythymidine is 17.16±0.13 strands per Au$_3$ NP. By DLS, the hydrodynamic size of Au$_3$@T12 NPs is 11.97±0.57 nm, which is similar to that of Au$_3$@PEG-alkyl$_{y\,\%}$ NPs. After incubation in PBS for 24 hours, the hydrodynamic size (14.03±1.81 nm) does not show significant change, confirming the stability of Au$_3$@T12 NPs.

Figure 35A:
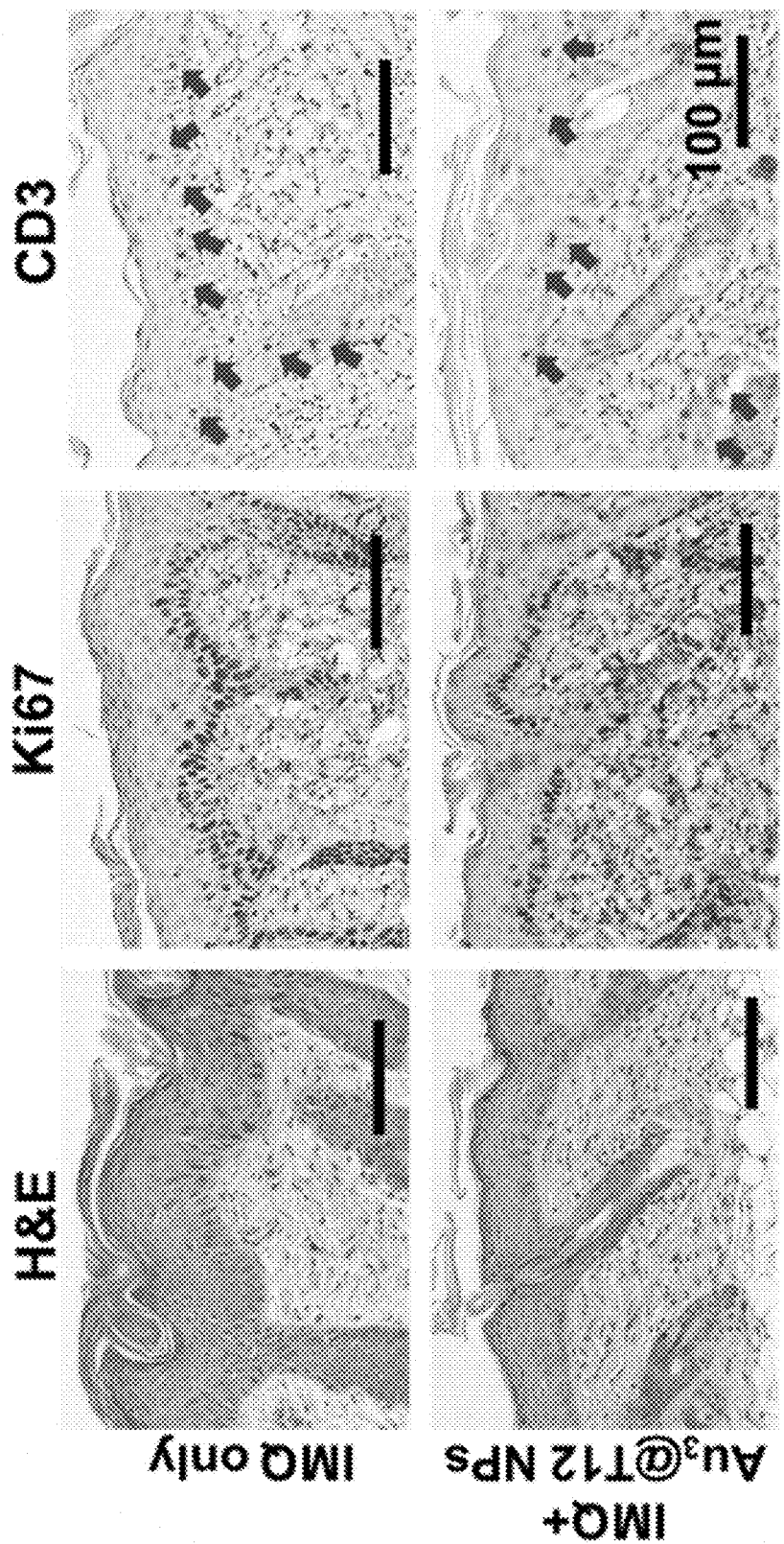
Figure 35B:
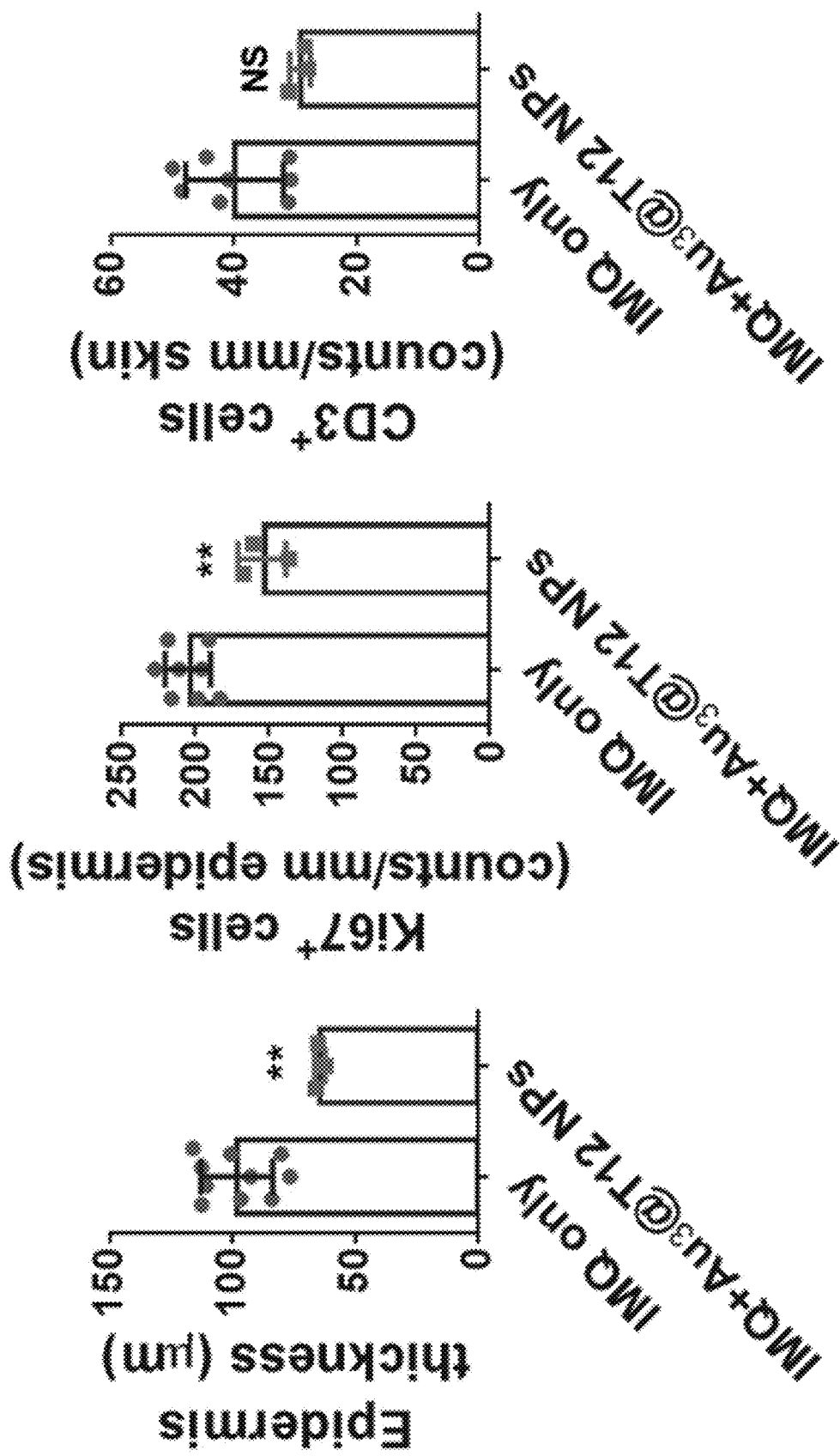
FIG. 35B shows epidermis thickness, number of Ki67 per length of basal epidermis and skin, and $CD3^+$ cells per length of basal epidermis and skin, respectively, wherein n=3 mice, across 1 experiment, wherein mean±SD, statistical significance is calculated by unpaired two-tailed t test. **P<0.01, and wherein NS stands for not significant, according to an embodiment of the subject invention.

Topically application of IMQ cream in conjunction with Au$_3$@T12 NPs (200 μL of PBS containing 6 μM NPs) in accordance with the "prevention mode", Au$_3$@T12 NPs exhibit anti-psoriasis efficacy, leading to significant reduction in mean epidermis thickness (34.3%) and population of Ki67 cells (24.5%) as shown in FIGS. 35A-35B. The data reinforce the conclusion that AuNPs are self-therapeutic for anti-psoriatic inflammation.

Figure 36A:
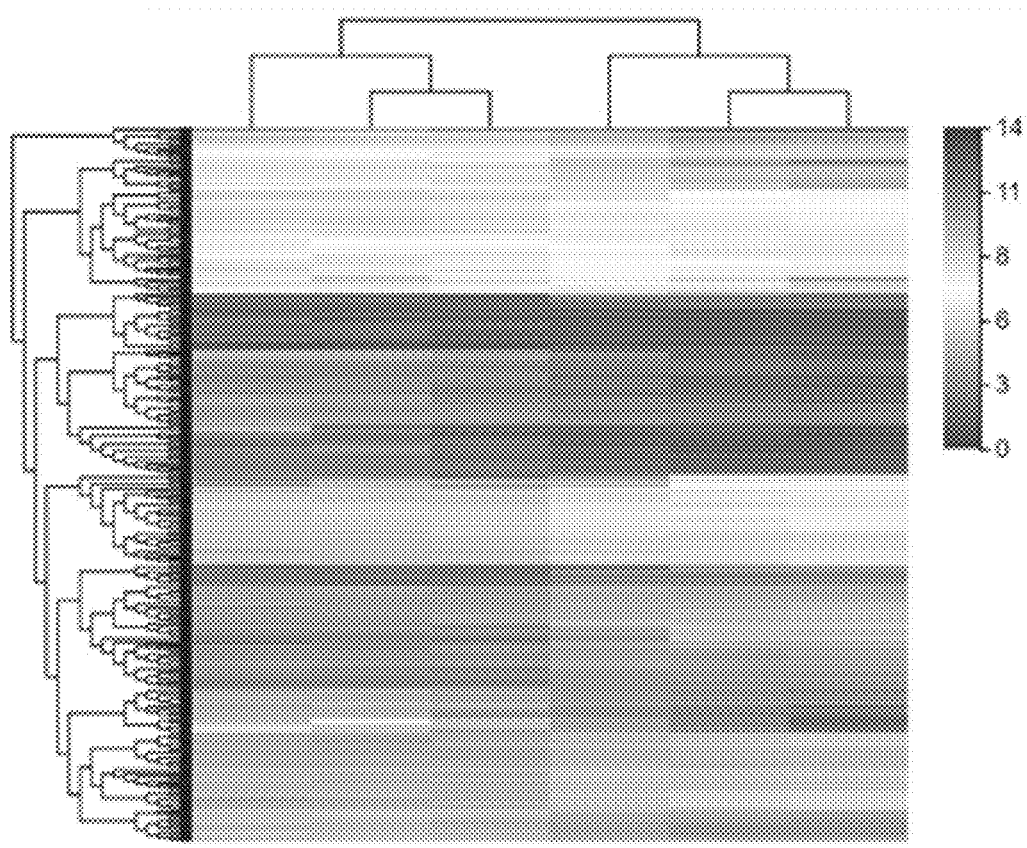
FIGS. 36A-36C show heat maps of normalized gene expression, wherein the horizontal axis shows the normalized expression [in terms of fragments per kilobase million (FPKM) value +1] of each gene and the vertical axis shows the detected transcripts in triplicates, according to an embodiment of the subject invention.
Figure 36B:
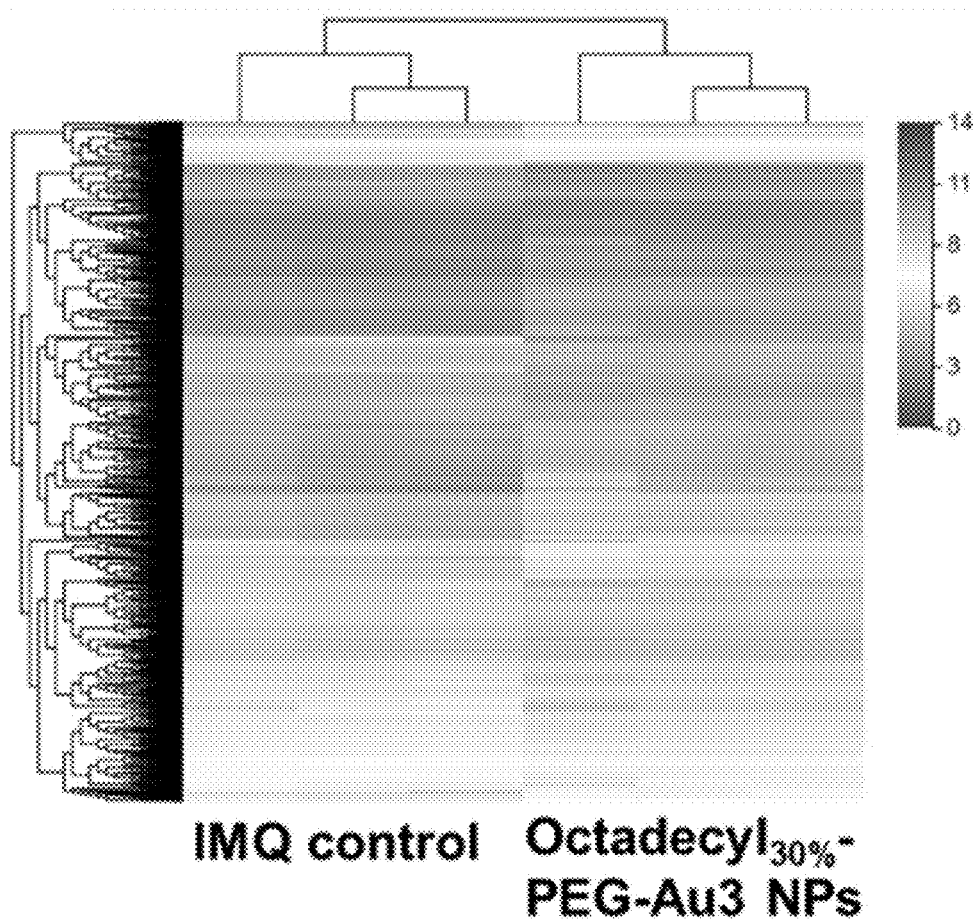
Figure 36C:
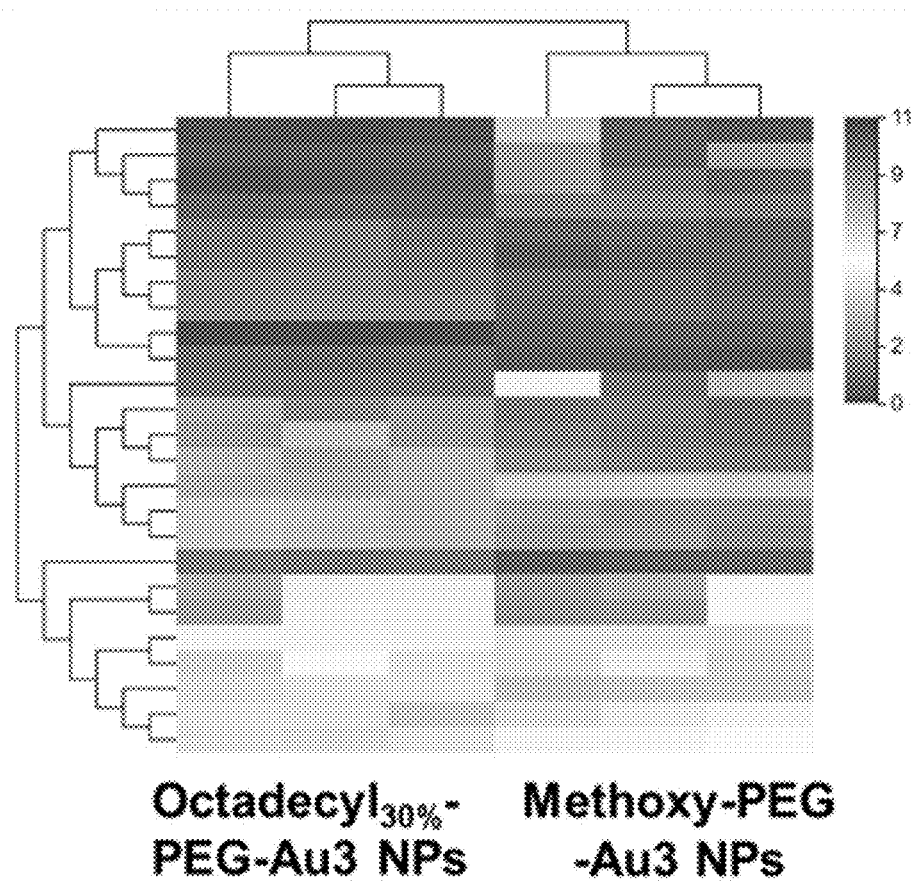

DEGs cluster heat map shows highly similar profile for both types of AuNPs treatment in upregulated (red) and downregulated (blue) genes when compared to IMQ control as shown in FIGS. 36A-36C. Moreover, FIGS. 36A-36C show heat maps of normalized gene expression. In particular, FIG. 36A shows heat maps of normalized gene expression of IMQ control vs methoxy-PEG-Au$_3$ NPs treated skin (343 genes), FIG. 36B shows heat maps of normalized gene expression of IMQ control vs octadecyl$_{30\%}$ PEG-Au3 NPs treated skin (2428 genes), and FIG. 36C shows heat maps of normalized gene expression of skin treated with methoxy-PEG-Au3 NPs vs octadecyl$_{30\%}$ PEG-Au3 NPs.

Figure 37:
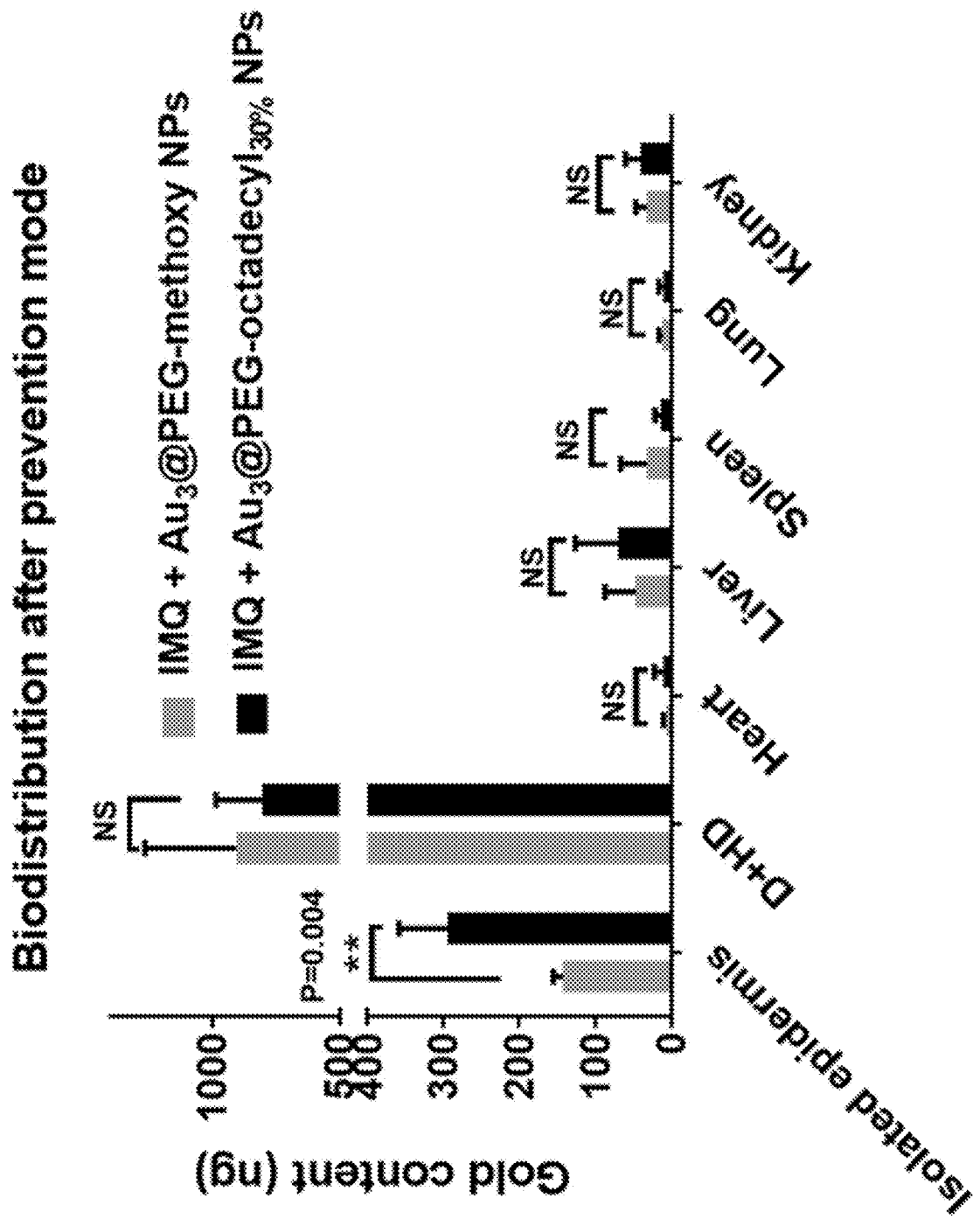
FIG. 37 shows organ-level distribution of $Au_3$@PEG-octadecyl$_{30\%}$ NPs upon topical application to IMQ-induced psoriatic mice in the "prevention mode", wherein mice are topically applied with IMQ cream and $Au_3$@PEG-octadecyl$_{30\%}$ NPs (200 μL, 6 μM) or $Au_3$@PEG-methoxy NPs (200 μL, 6 μM) for 6 consecutive days (from Day 1 to Day 6), in accordance with the "prevention mode", wherein on Day 7, the mice are sacrificed, and the skin and major internal organs are harvested, wherein NPs mostly accumulate in the skin, with $Au_3$@PEG-octadecyl$_{30\%}$ NPs localized in the isolated epidermis about 2-fold more than $Au_3$@PEG-methoxy NPs, wherein n=4 mice, across 1 experiment, mean±SD, statistical significance is calculated by unpaired two-tailed t test, wherein NS stands for not significant, D+HD stands for dermis and hypodermis, according to an embodiment of the subject invention.

2.2.1.4 Biodistribution of Au$_3$@PEG-alkyl$_{y\,\%}$ NPs After the Treatment in Prevention Mode Apart from efficacy, the biodistributions of Au$_3$@PEG-alkyl$_{y\,\%}$ NPs at the end of the prevention mode are also assessed. ICP-MS data show that both Au$_3$@PEG-methoxy NPs and Au$_3$@PEG-octadecyl$_{30\%}$ NPs mostly accumulate in the skin layer with limited uptake by internal organs as shown in FIG. 37, indicating that the topically application of NPs has limited systemic influence on Day 7. As expected, alkylation of NPs significantly promotes the entry of NPs to epidermis (P=0.004), but not deep skin layers and other organs.

Figure 38:
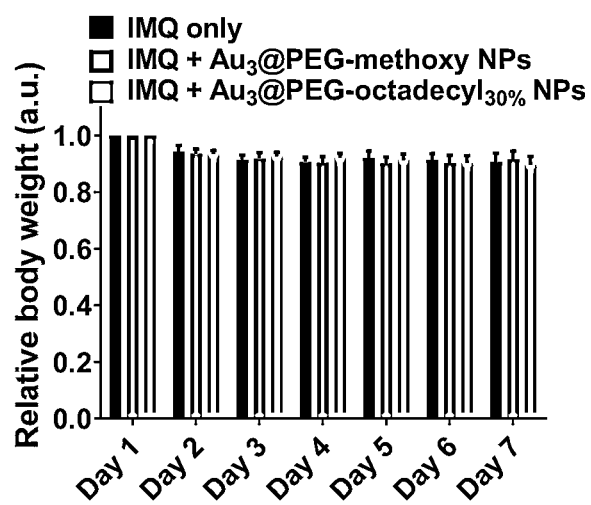
FIG. 38 shows that topical application of $Au_3$@PEG-octadecyl$_{30\%}$ NPs does not induce significant weight loss in the "prevention mode", wherein change in body weight with the weight on Day 1 is normalized to 1 a.u., n=8 mice per group, across 3 independent experiments, according to an embodiment of the subject invention.

2.2.1.5 Acute Toxicity Evaluation of Au$_3$@PEG-Alkyl$_{y\,\%}$ NPs After the Treatment in Prevention Mode During the experiment, no abnormal behaviors from treated mice are observed. the body weight of each mouse is monitored during the prevention mode. From Day 1 to Day 7, the mean body weights of all tested groups do not show significant difference as shown in FIG. 38. It is noted that IMQ causes about 10% body weight loss in mice for all treatment groups in general.

Figure 39A:
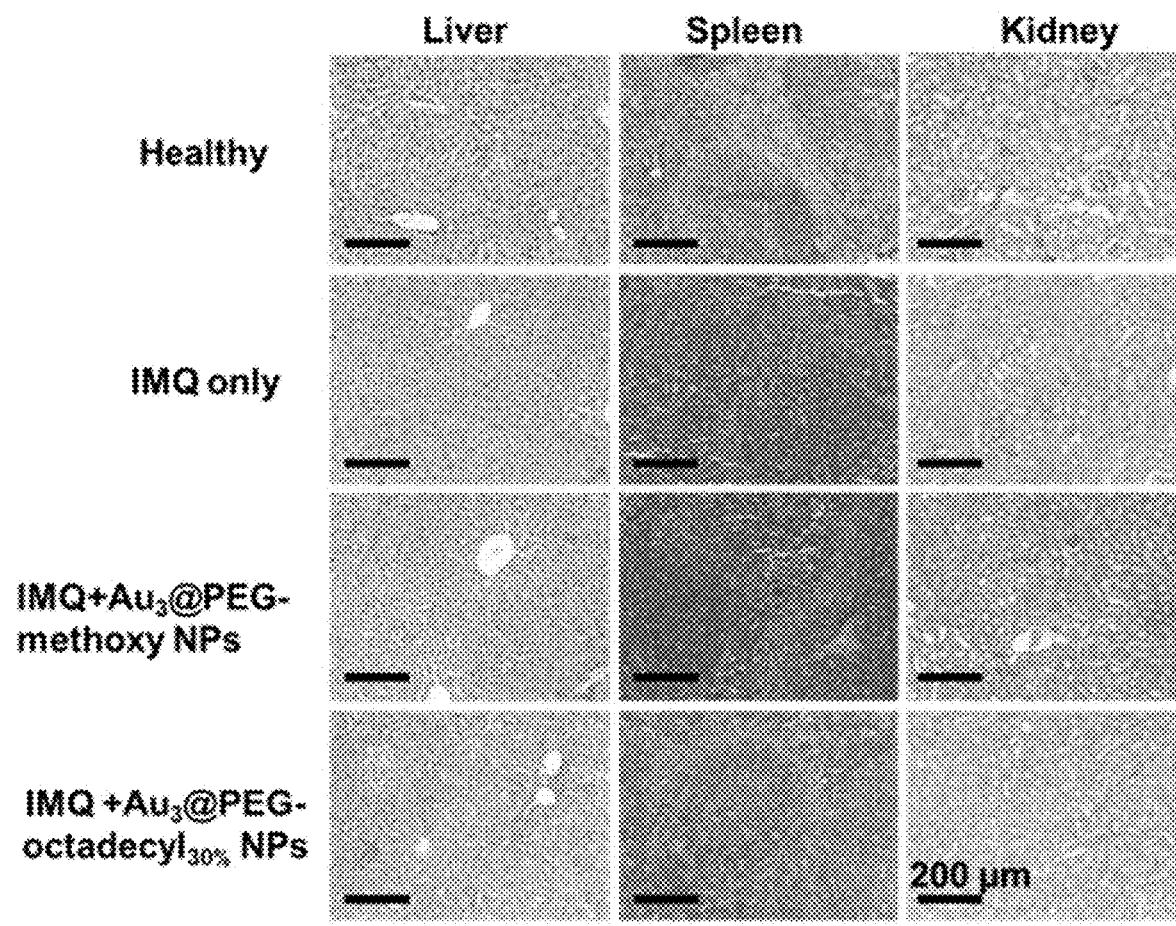
Figure 39B:
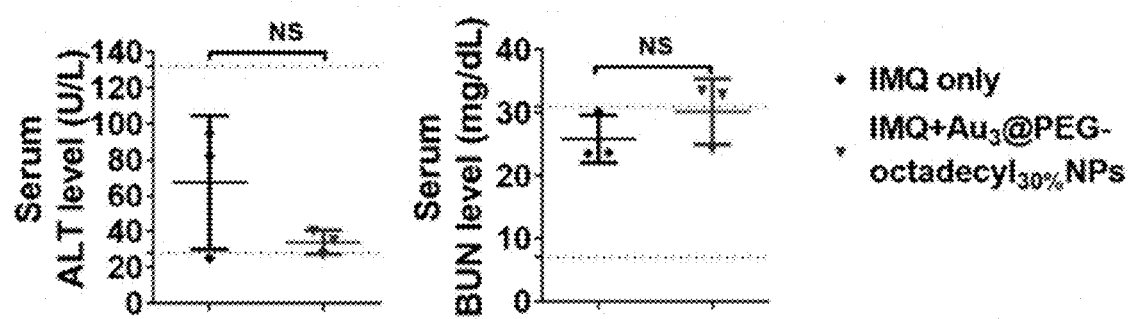

The major internal organs for histological analysis on Day 7 are also collected. Histological staining shows that the concurrent application of NP and IMQ does not cause any obvious damage to the liver, spleen and kidney, even though these organs take up comparatively more gold content than their counterparts as shown in FIG. 39A. Moreover, the blood serum is collected for biochemistry analysis on Day 7 before sacrifice. Serum alanine transaminase (ALT) and blood urea nitrogen (BUN), which are the markers for liver function and kidney function, respectively, are chosen. The ALT and BUN level of mice in both IMQ only control and "IMQ+Au$_3$@PEG-octadecyl$_{30\%}$ NPs" group are determined to be within the normal range; these levels are also insignificantly different among the 2 groups as shown in FIG. 39B. It is noted that the mean ALT level is reduced in alkylated AuNPs-treated mice, probably because the NPs reduce the number of inflammatory cells and concentration of cytokines in the skin. In turn, reduction in local inflammation of the skin may attract fewer inflammatory cells from the systemic circulation to the skin.

Figure 40:
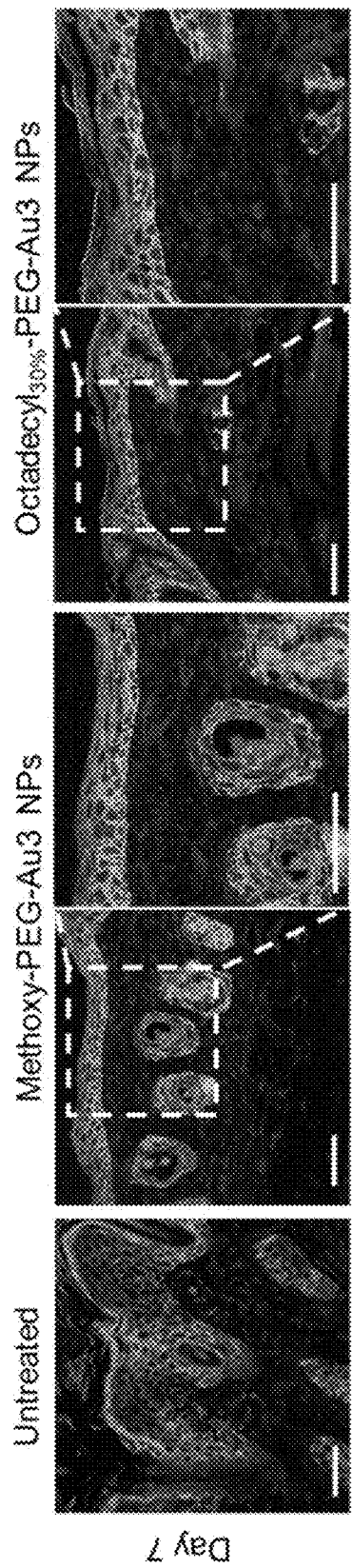
FIG. 40 shows skin distribution of alkyl-PEG-AuNPs on day 7 for the "prevention mode", wherein the term "untreated" denotes normal skin without AuNPs treatment and scale bar=50 μm, according to an embodiment of the subject invention.

As expected, the alkylation of NPs significantly promoted the entry of NPs to viable epidermis (VE) (for example P=0.004, t test) and keratinocytes as shown in FIG. 40, but not to deep skin layers and other organs.

FIG. 40 shows skin distribution of alkyl-PEG-AuNPs on day 7 for the "prevention mode". The images demonstrate the cellular level and tissue level distribution of AuNPs in keratinocytes and skin as reflected light (red) under reflectance mode. Keratinocytes are stained by AE1/3 cytokeratin cocktail (green). Cell nucleus is stained by DAPI (blue).

2.2.2 Topical Application of $Au_3$@PEG-Octadecyl$_{30\%}$ NPs Treats the IMQ-Induced Psoriatic Skin Condition in the "Treatment Mode".

Figure 41A:
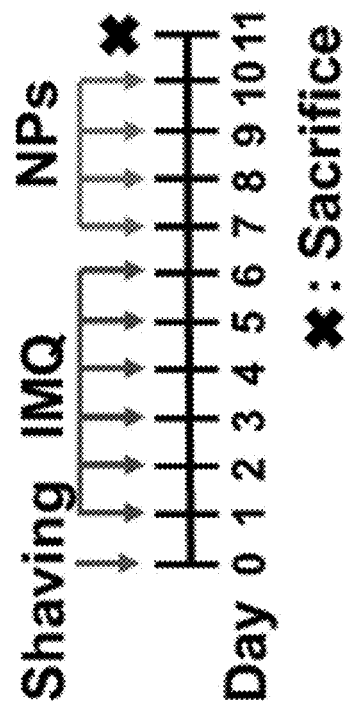

To evaluate the translational potential of $Au_3$@PEG-octadecyl$_{30\%}$ NPs, their abilities to treat psoriasis are determined by topically applying daily doses of NPs for 4 days onto mice with pre-established psoriasis obtained from 6 days of IMQ application as shown in FIG. 41A. Negative control is PBS and positive control is a standard commercial ointment termed BC that contains betamethasone (a steroid) and calcipotriol (a vitamin D analog).

It is noted that symptoms of psoriasis dissipate naturally when IMQ cream is discontinued. Applying the IMQ cream is stopped from Day 7 onwards for two reasons. (1) long-term (>8 days) use of IMQ cream may cause significant body weight loss (>20%) and higher mortality of mice; (2) separating the application of IMQ cream and AuNPs excludes the possibility that AuNPs inhibit IMQ from activating the inflammatory cascade, allowing for testing the true therapeutic potential of the NPs.

Figure 41B:
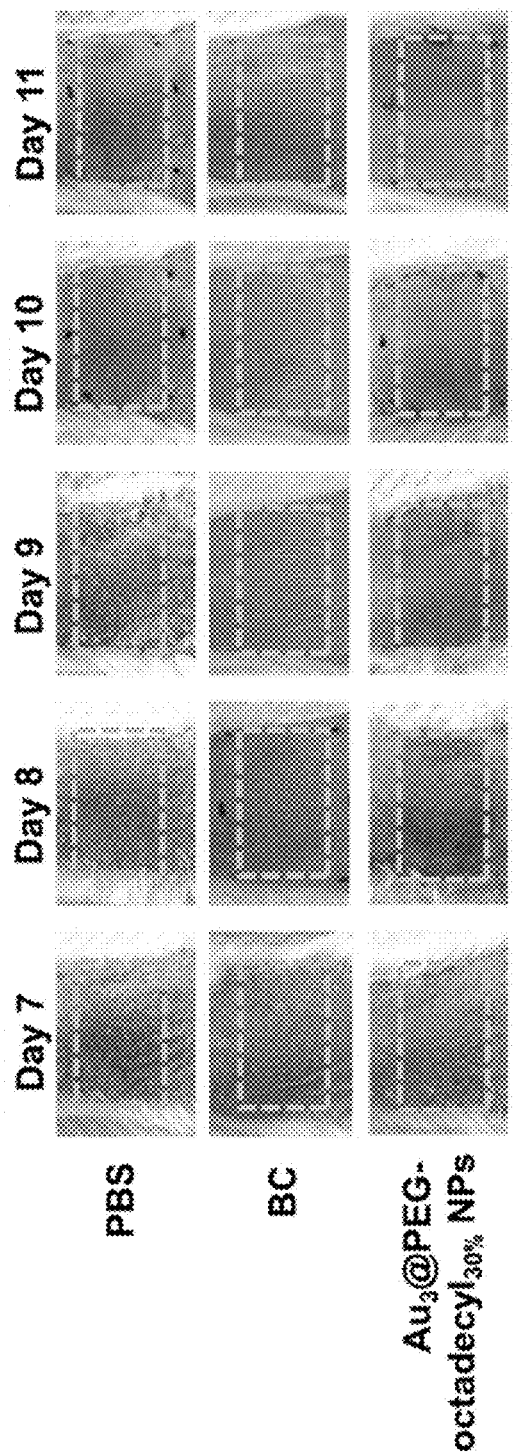
Figure 41C:
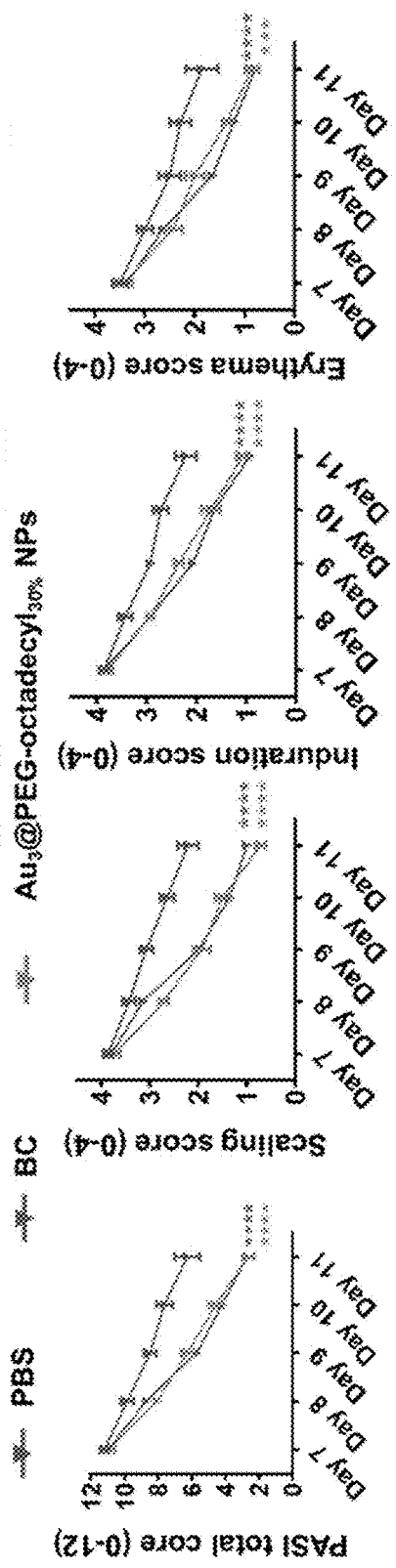
Figure 42A:
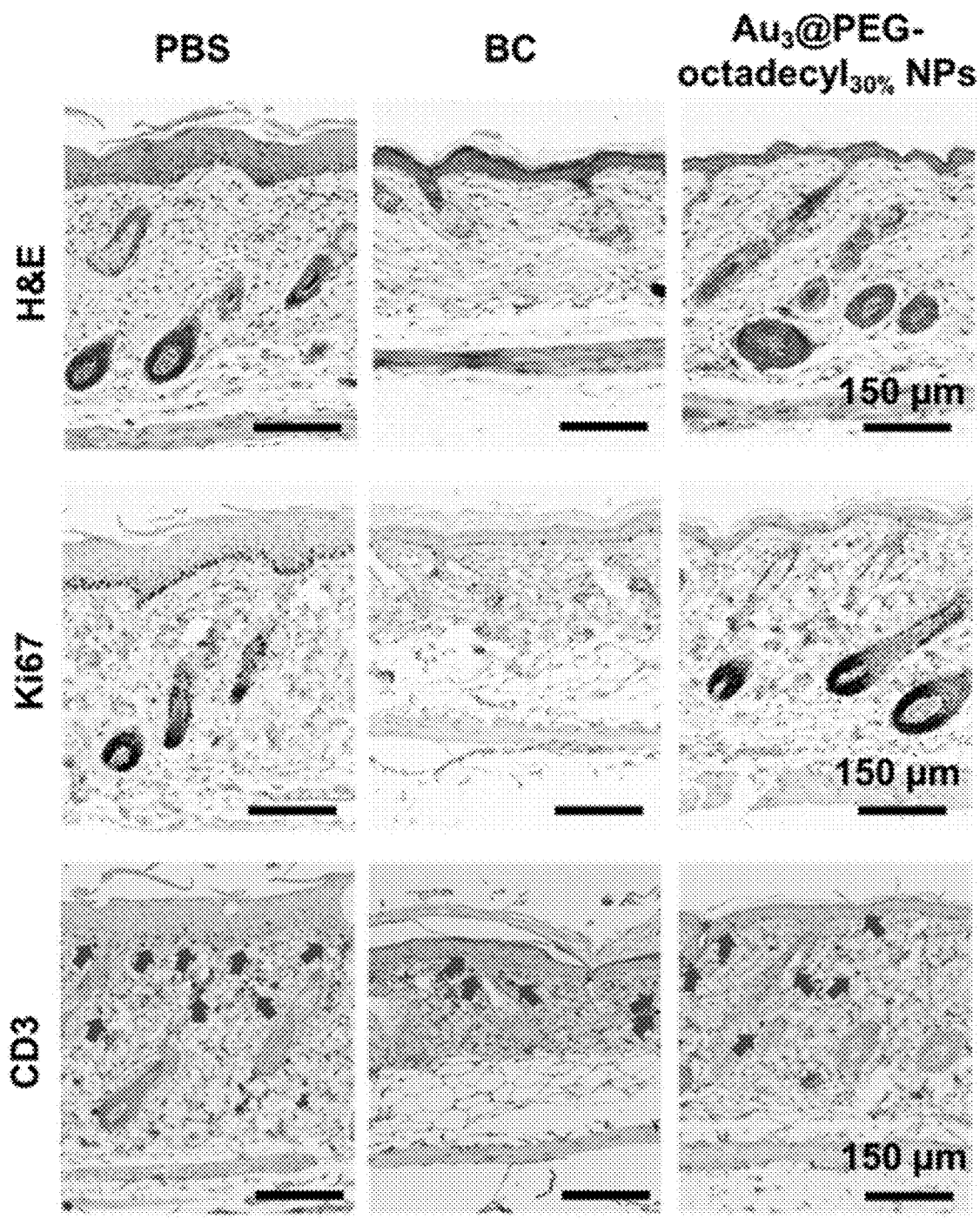
Figure 42B:
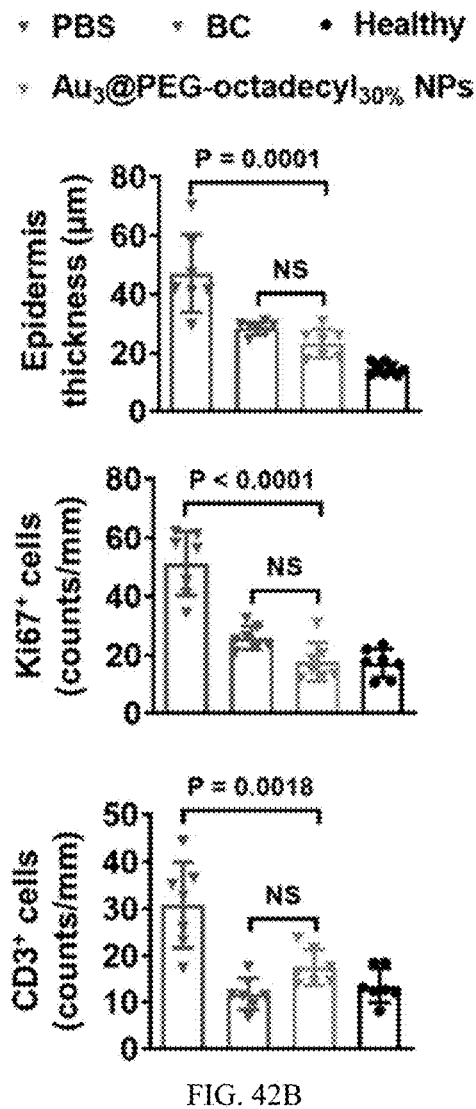
Figure 43:
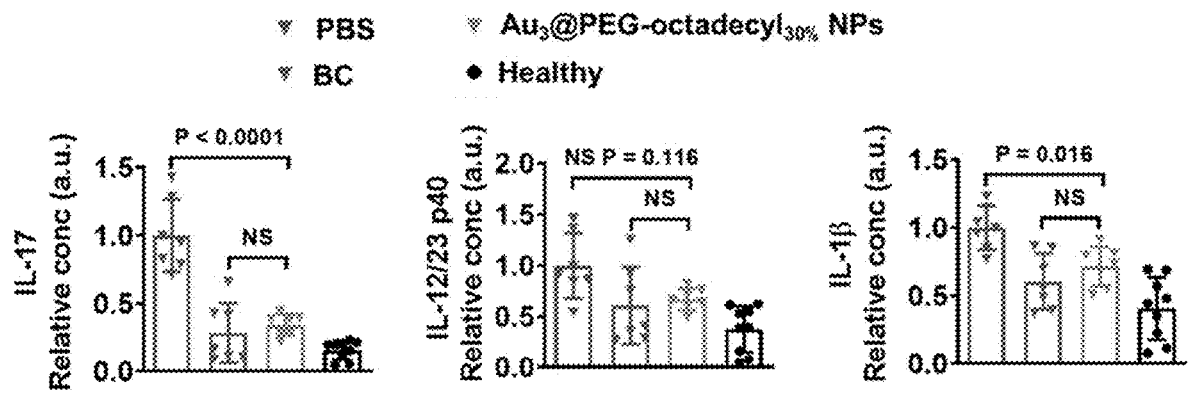
FIG. 43 shows efficacy evaluation of $Au_3$@PEG-octadecyl$_{30\%}$ NPs in the "prevention mode" by ELISA, wherein relative concentrations of inflammatory cytokines (IL-17, IL-12/23 p40 and IL-1β) extracted from the treated skin are detected by ELISA, wherein "1 a.u." indicates the mean concentration of "PBS" control group, wherein n=7 mice, across 2 independent experiments, wherein mean±SD, statistical significance among different treatment groups (excluding the healthy control group) is calculated by one-way ANOVA with Tukey's Test for post-hoc analysis, with adjusted P values shown in the FIG. 43, wherein P>0.05 for NS cases, according to an embodiment of the subject invention.

Compared to PBS control, four days of $Au_3$@PEG-octadecyl$_{30\%}$ NPs or BC treatment resulted in lower PASI scores, smaller scales and shorter induration as shown in FIGS. 41B and 41C. Importantly, at the end of the treatment on Day 11, skins treated with $Au_3$@PEG-octadecyl$_{30\%}$ NPs appear normal and smooth whereas skins treated with BC appear wrinkled. Histological examination of the treated skin reveals that $Au_3$@PEG-octadecyl$_{30\%}$ NPs and BC significantly reduce the epidermis thickness by 50.6% and 39.7%, the number of Ki67[+] cells by 65.5% and 49.4%, and the number of CD3[+] cells by 43.1% and 61.6%, respectively as shown in FIGS. 42A-42B. ELISA is further used to quantify the concentration of proinflammatory cytokines. The results show that the concentrations of IL-17, IL-12/23 p40, and IL-1β in the psoriatic skin return to near-normal levels by $Au_3$@PEG-octadecyl$_{30\%}$ NPs and BC treatment, and no significant difference between the two treatments as shown in FIG. 43.

Figure 44A:
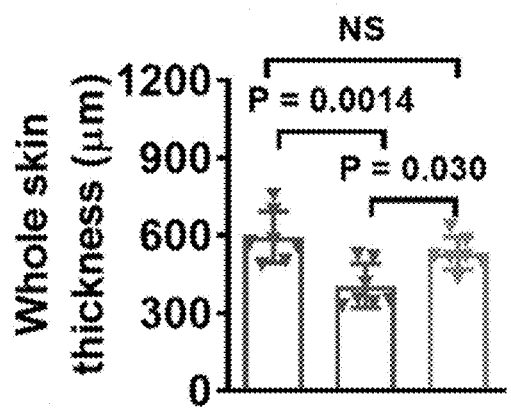
Figure 44B:
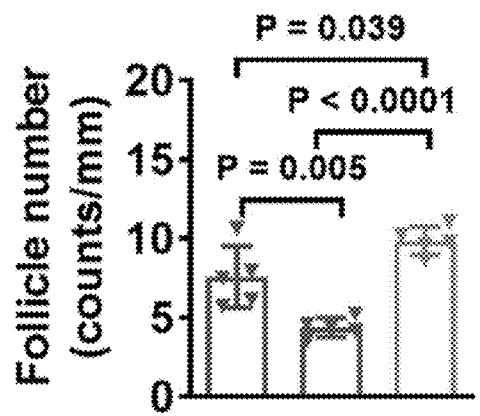

However, with BC treatment, thinning of the dermis is observed, which likely cause the wrinkles seen in FIG. 41B, and fewer hair follicles in FIG. 44A. The observation is consistent with the previous report that long-term topical application of BC may cause skin atrophy,[39] likely due to inhibition of fibroblast proliferation, migration, chemotaxis, and protein synthesis.[40] These undesirable cutaneous side effects are not observed in the tests of $Au_3$@PEG-octadecyl$_{30\%}$ NPs.

Figure 45:
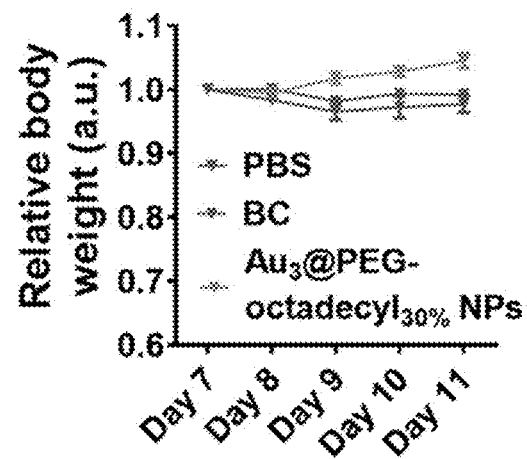
FIG. 45 shows topical application of $Au_3$@PEG-octadecyl$_{30\%}$ NPs did not induce significant weight loss in the "treatment mode", wherein change of body weight during the treatment period (Day 7 to Day 11) with the weight on Day 1 is normalized to 1 a.u, wherein n=7 mice per group, across 2 independent experiments, according to an embodiment of the subject invention.
Figure 46A:
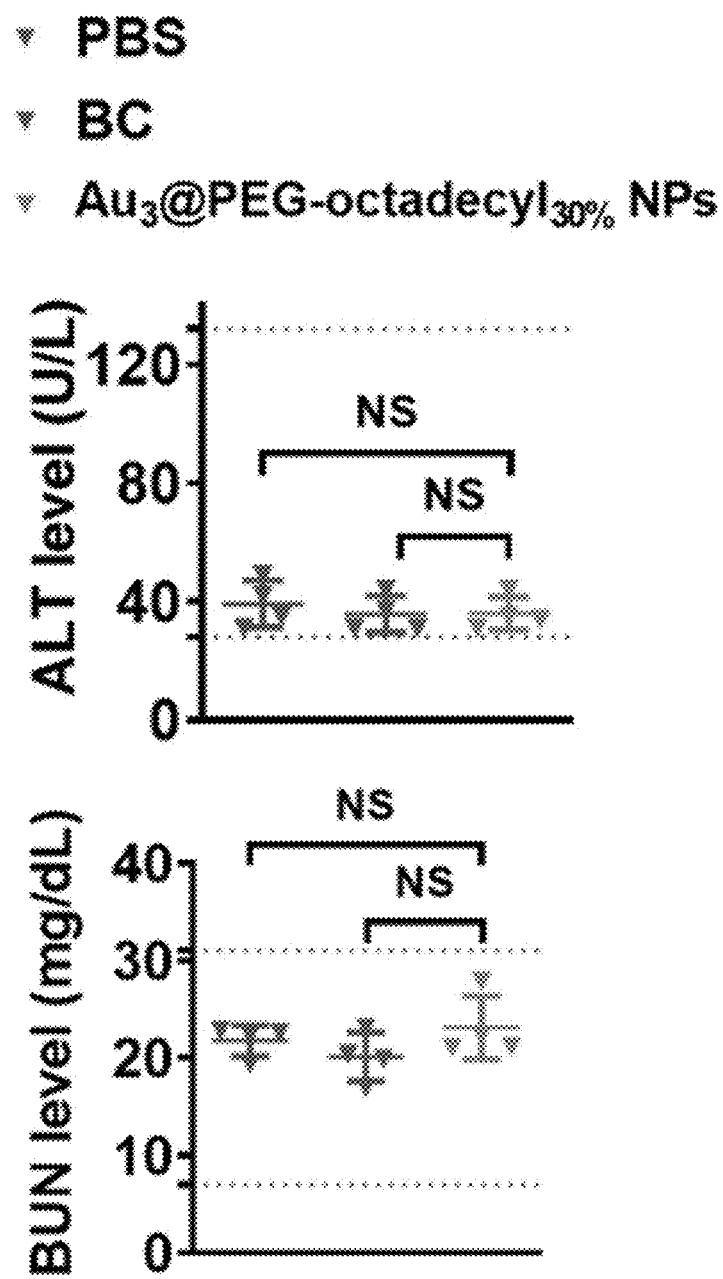
Figure 46B:
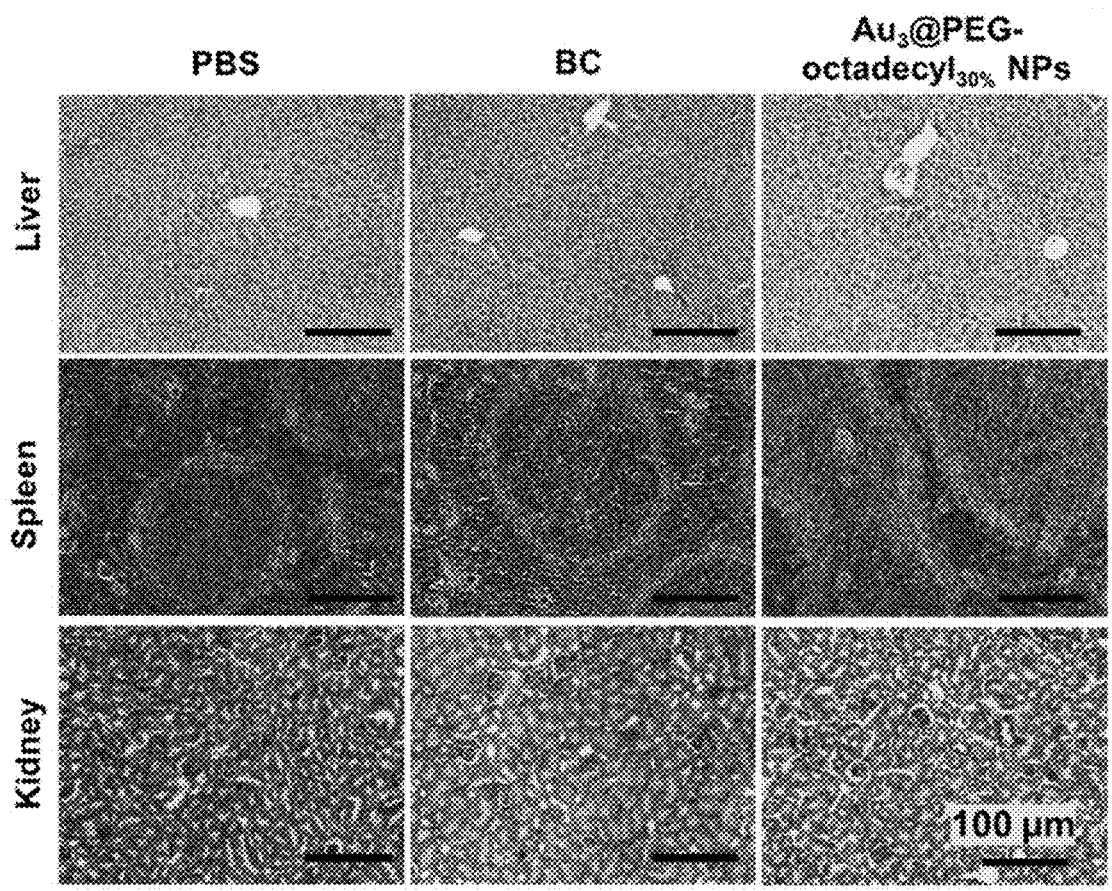

Irrespective of the treatment, the animals maintain a stable body weight from Day 7 to Day 11 as shown in FIG. 45. Blood serum levels of ALT (liver function) and BUN (kidney function) are normal and major internal organs do not show obvious histological change on Day 11 as shown in FIGS. 46A-46B. The data indicate that the NPs have limited acute systemic toxicity.

On day 11, the spleen to body weight percentage is 0.729% in PBS control, and 0.66% in the octadecyl$_{30\%}$-PEG-Au3 NPs treatment group. Daivobet® ointment reduces the percentage to 0.395%, which is below the healthy group's value of 0.437%, indicating possible adverse systemic effects of the corticosteroid drug. The concentrations of skin cytokine IL-17, IL-12/23 p40, and IL-1β are also reduced to near-normal level upon treatment with both octadecyl$_{30\%}$-PEG-Au3 NPs and Daivobet® ointment.

Figure 47A:
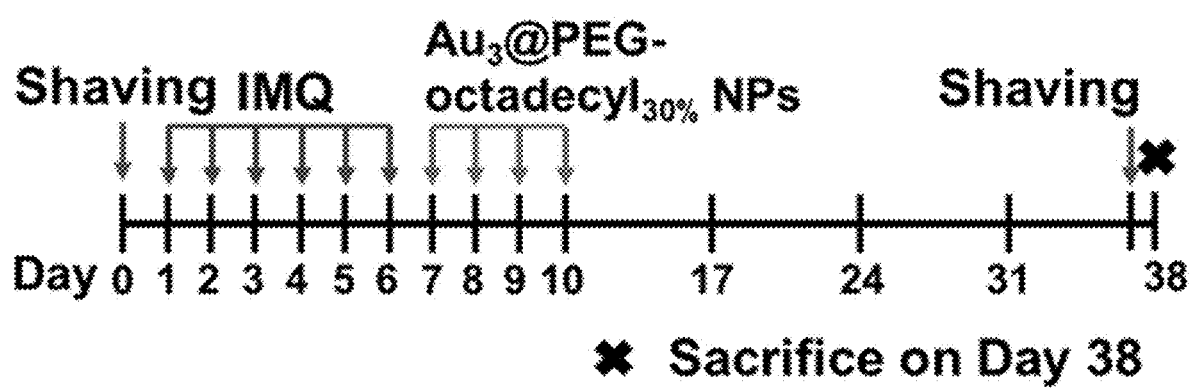

2.2.3 Topical Application of $Au_3$@PEG-Octadecyl$_{30\%}$ NPs Do not Cause Long-Term Toxicity The long-term toxicity of $Au_3$@PEG-octadecyl$_{30\%}$ NPs is evaluated by topically applying them to psoriatic mice and sacrificing the animals after 4 weeks as shown in FIG. 47A. After 4 daily doses of NPs treatment from Day 7 to Day 10, the body weights gradually increase in the first week post-treatment and remain stable as shown in FIG. 47B.

Figures 47B, 47C:
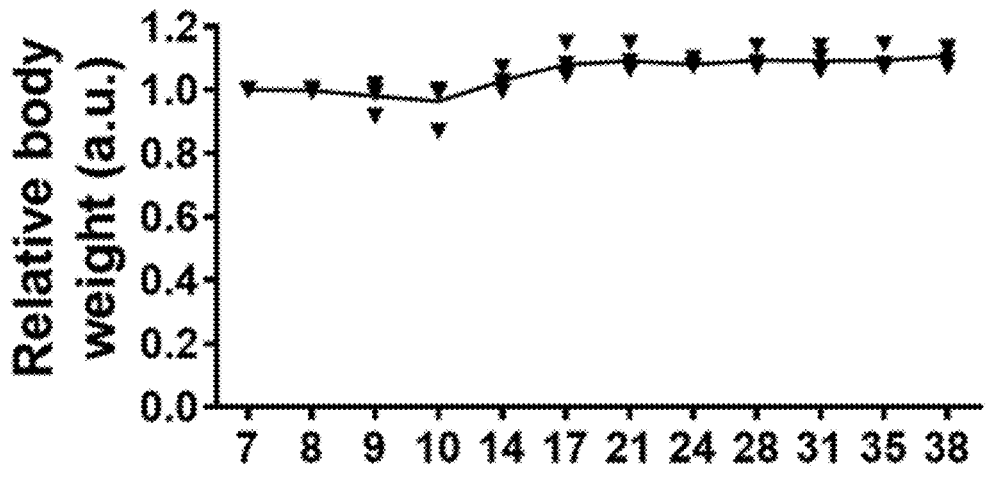
Figure 47D:
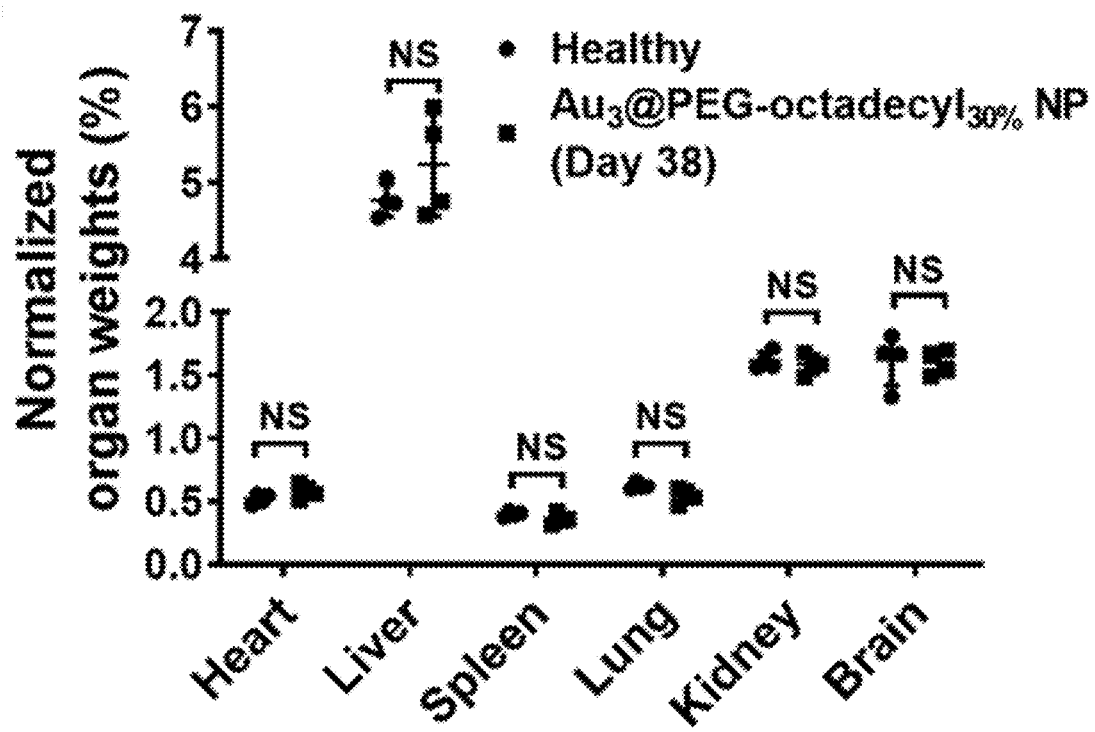
Figure 47E:
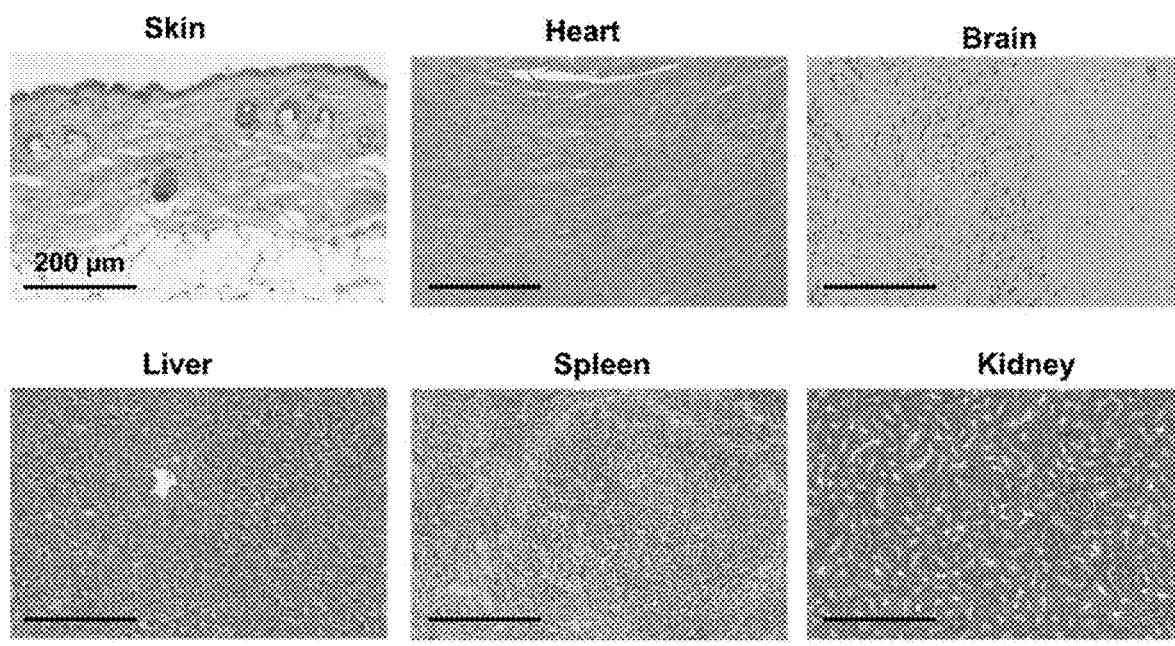
Figure 48:
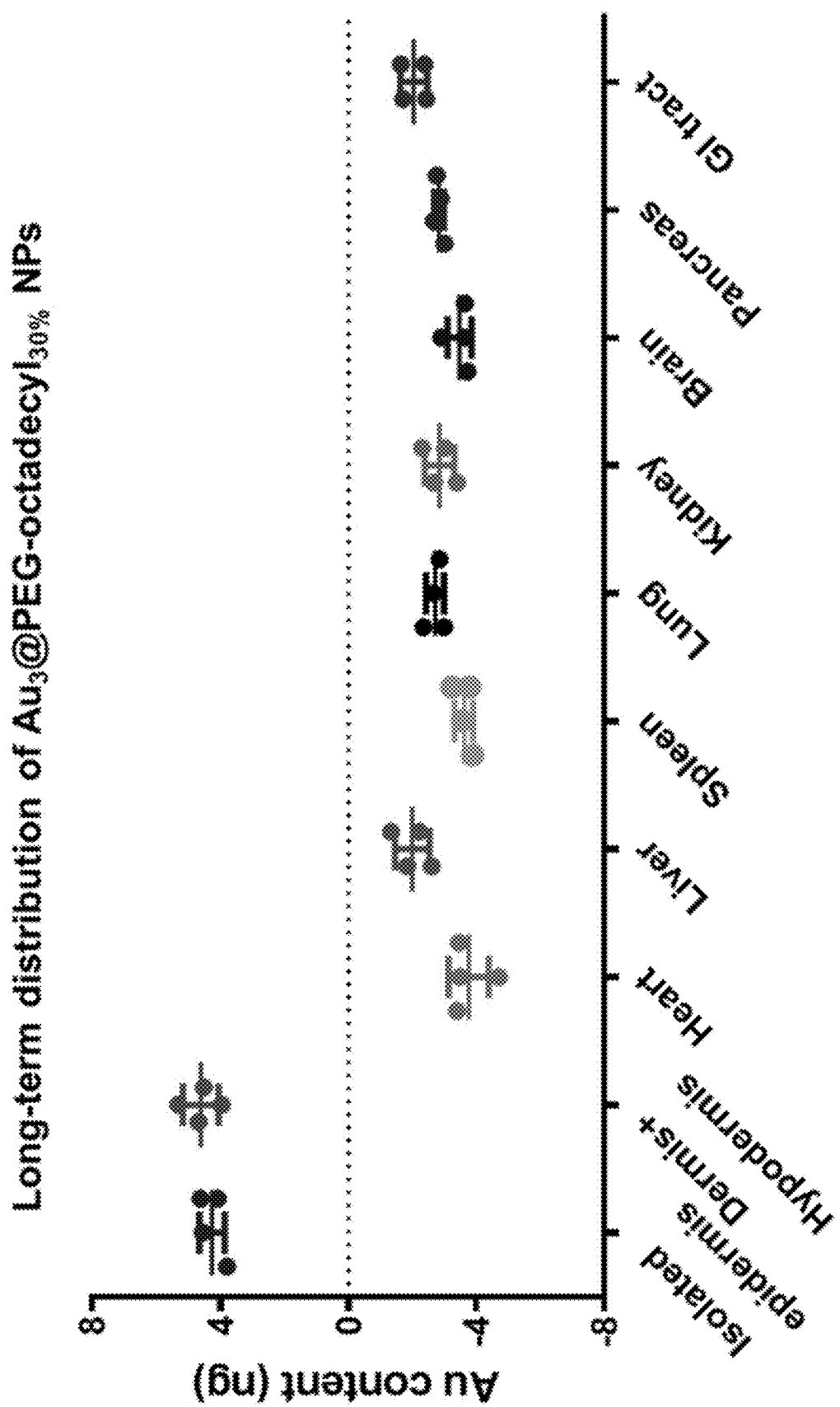
FIG. 48 shows long-term clearance of $Au_3$@PEG-octadecyl$_{30\%}$ NPs, wherein four weeks post treatment, the skin and major organs are collected after sacrifice the mice for ICP-MS measurement, according to an embodiment of the subject invention.

On Day 38, blood markers of ALT, AST and BUN remain in the normal range, indicating the normal liver and kidney function as shown in FIG. 47C. Moreover, histological examination of the skin and major internal organs (heart, brain, liver, spleen, and kidney) does not show obvious structural changes as demonstrated in FIG. 47E. In addition, ICP-MS measurements do not reveal any detectable Au contents in the skin and major organs (heart, liver, spleen, lung, kidney, brain, pancreas, and gastrointestinal tract). Therefore, the data indicate that $Au_3$@PEG-octadecyl$_{30\%}$ NPs do not lead to significant long-term toxicity.

The anti-psoriatic potential of $Au_3$@PEG-octadecyl$_{30\%}$ NPs in the "prevention mode" is interrogate by concurrently applying IMQ and NPs for 6 days. Remarkably, it reveals that $Au_3$@PEG-octadecyl$_{30\%}$ NPs, without drug loading, exhibit anti-psoriatic inflammation efficacy by inhibiting the development of psoriasis phenotype and significantly reducing epidermis thickness, proliferative keratinocytes, and CD3[+] T cell infiltration, and psoriasis-related cytokines. Notably, $Au_3$@PEG-methoxy NPs and $Au_3$@T12 NPs also exhibit anti-inflammatory effects, although not as effective as these of the $Au_3$@PEG-octadecyl$_{30\%}$ NPs, while free PEG-octadecyl$_{30\%}$ mixture, free PEG strands, or PBS do not show obvious effect in inhibiting psoriasis.

Accordingly, the data indicate that $Au_3$@PEG-octadecyl$_{30\%}$ NPs and $Au_3$@PEG-methoxy NPs inhibit the development of IMQ-induced psoriasis and inflammation, and surface alkylation of NPs leads to more effective inhibition. These data reinforce our conclusion that AuNPs are self-therapeutic for anti-psoriatic inflammation.

Furthermore, a "treatment mode" is adopted by establishing psoriasis in a mouse IMQ model for 6 days before topically applying 4 doses of $Au_3$@PEG-octadecyl$_{30\%}$ NPs. During the treatment period, both $Au_3$@PEG-octadecyl$_{30\%}$ NPs and standard steroid and vitamin D analog therapy show similar levels of anti-psoriatic efficacy when compared to the PBS treated mice. At the end of treatment, $Au_3$@PEG-octadecyl$_{30\%}$ NPs exhibit an anti-psoriasis efficacy similar to that of standard steroid and vitamin D analog therapy, but with significantly reduced side effects such as skin thinning and hair loss of the ointment.

Moreover, no NPs are found in major organs and no cutaneous or systemic toxicity is observed in the animals four weeks post-application.

Embodiment Three: Mechanism for the Anti-Psoriasis Efficacy of Alkyl-Terminated Gold Nanoparticles

3.1.2 Reported Anti-Inflammation and Antiangiogenic Mechanism of Gold NPs

The mechanisms of anti-inflammatory of gold salts involve inhibition of the release of lysosomal enzymes of phagocytic cells[46], modulation of some prostaglandins[47], and inhibition the proliferation of synovial cells as well as collagen synthesis[48]. Similar to gold salts, the AuNPs are reported to interfere with the transmission of inflammatory signaling and acted as immuno-suppressant[49].

3.1.1 RNA Sequencing (RNA-Seq) Technology

Transcriptomes are essential for interpreting the functional elements of the genome and understanding development and disease. The introduction of high-throughput next-generation sequencing (NGS) technologies revolutionized transcriptomics[50]. RNA sequencing (RNA-Seq) technique uses NGS to reveal the presence and quantity of RNA in a biological sample. Of particular interest is the discovery of differentially expressed genes across different conditions. Since RNA-seq first appeared in literature in 2008[51], the number of publications containing RNA-Seq data has increased exponentially over the past decade owing to the decreasing costs. A typical RNA-Seq experiment consists of isolating RNA, converting it to complementary DNA (cDNA), preparing the sequencing library, and sequencing it on an NGS platform.

To gain insights into the anti-psoriatic efficacy of $Au_3$@PEG-octadecyl$_{30\%}$ NPs, RNA-Seq is performed on skin samples of mice that receive treatments of "IMQ only", "IMQ+$Au_3$@PEG-methoxy NPs", or "IMQ+$Au_3$@PEG-octadecyl$_{30\%}$ NPs" in "prevention mode" by BGISEQ platform.

3.2 Materials and Methods

3.2.1 Whole-Transcriptome Analysis with Total RNA-Seq

After conducting efficacy studies in the "prevention mode", about 60 mg of skin biopsies is harvested from each IMQ-induced psoriatic mouse that are distributed in three treatment groups (n=3 for each group), including (i) IMQ only without NP treatment, (ii) IMQ with topical application of $Au_3$@PEG-methoxy NPs, and (iii) IMQ with topical application of $Au_3$@PEG-octadecyl$_{30\%}$ NPs. The harvested skin is snap frozen in liquid nitrogen, stored at −80° C., and later sent to Beijing Genomics Institute (BGI) via courier mail for RNA extraction, RNA library construction, and bioinformatic analysis. The mRNA is isolated from total RNA using oligo (dT) magnetic beads following the manufacturer's instructions for cDNA library construction. Double stranded cDNA is sequenced using the DNBseq platform. At least 20 million clean reads per sample on the DNBseq platform are generated for data analysis.

3.2.2 RNA-Seq Data Analysis

Differential expressed gene (DEG) detection, gene ontology (GO) analysis of DEG, and other analysis based on gene expression are performed by BGI. GO terms and DEGs with corrected p values (Q values) smaller than 0.05 are considered significantly enriched. Gene analysis is performed using the Dr. Tom analysis platform (BGI). For heatmap analysis, the mean normalized FPKM (Fragments Per Kilobase Million) of each group is normalized against the mean normalized FPKM of the IMQ only control group, with the normalized, relative expression levels expressed as $log_2$. For scatter plots, the normalized FPKM of each sample from different groups is shown in $log_2$ (FPKM+1) scale.

3.2.3 Quantitative Reverse-Transcription Polymerase Chain Reaction (qRT-PCR).

After conducting efficacy studies in the "prevention mode", about 60 mg of skin biopsies is harvested from each IMQ-induced psoriatic mouse that are distributed in three treatment groups (n=3 for each group), including (i) IMQ only without treatment, (ii) IMQ with topical application of free PEG strands, and (iii) IMQ with topical application of a 7:3 molar mixture of free PEG to PEG-octadecyl strands ("PEG-octadecyl$_{30\%}$"). The harvested skin is snap frozen in liquid nitrogen and stored at −80° C.

RNA is isolated using the Trizol reagent (Thermo Fisher Scientific) and reverse-transcribed using the RevertAid First Strand cDNA Synthesis Kit (Thermo Fisher Scientific) to generate cDNA. qRT-PCR is performed on StepOnePlus™ Real-Time PCR System using TB SYBR Green Premix Ex Taq kit (Takara) following the manufacturer's instructions. Gene expression is quantified using pre-designed primers purchased from Shanghai Rui Mian Bio Tech (see sequences below).

| Gene | Forward sequence (5' to 3') | Reverse sequence (5' to 3') |
|---|---|---|
| Mouse Il17a | CAGACTACCTCAACCGTTCCAC (SEQ ID NO: 1) | TCCAGCTTTCCCTCCGCATTG A (SEQ ID NO: 2) |
| Mouse Il17f | AACCAGGGCATTTCTGTCCCAC (SEQ ID NO: 3) | GGCATTGATGCAGCCTGAGTG T (SEQ ID NO: 4) |
| Mouse Il12b | TTGAACTGGCGTTGGAAGCACG (SEQ ID NO: 5) | CCACCTGTGAGTTCTTCAAAG GC (SEQ ID NO: 6) |
| Mouse Il1b | TGGACCTTCCAGGATGAGGACA (SEQ ID NO: 7) | GTTCATCTCGGAGCCTGTAGT G (SEQ ID NO: 8) |
| Mouse Tnf | GGTGCCTATGTCTCAGCCTCTT (SEQ ID NO: 9) | GCCATAGAACTGATGAGAGGG AG (SEQ ID NO: 10) |
| Mouse GAPDH | CATCACTGCCACCCAGAAGACT G (SEQ ID NO: 11) | ATGCCAGTGAGCTTCCCGTTC AG (SEQ ID NO: 12) |

Gene levels are analyzed using the $\Delta\Delta CT$ method and normalized to the housekeeping gene glyceraldehyde 3-phosphate dehydrogenase (GAPDH). For scatter plots, each sample is shown in $log_2$ (normalized expression+1) scale, consistent with the RNA-seq data obtained by the tests.

3.3 Results

3.3.1 Overview of the RNA-Seq Results

Figure 49A:
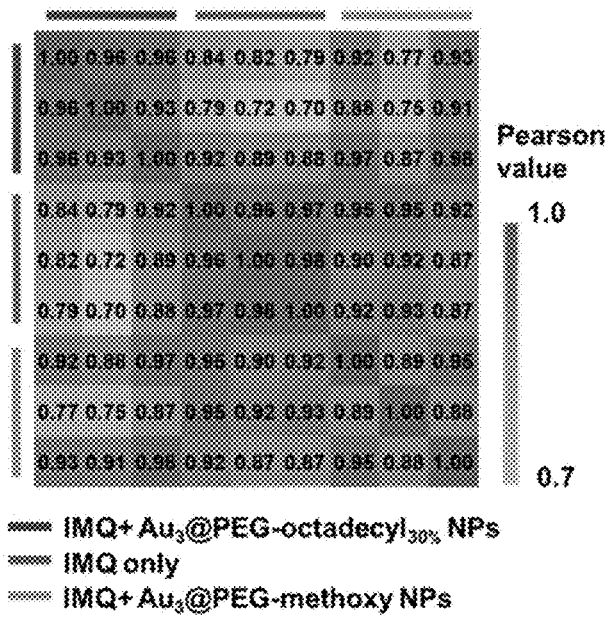
Figure 49B:
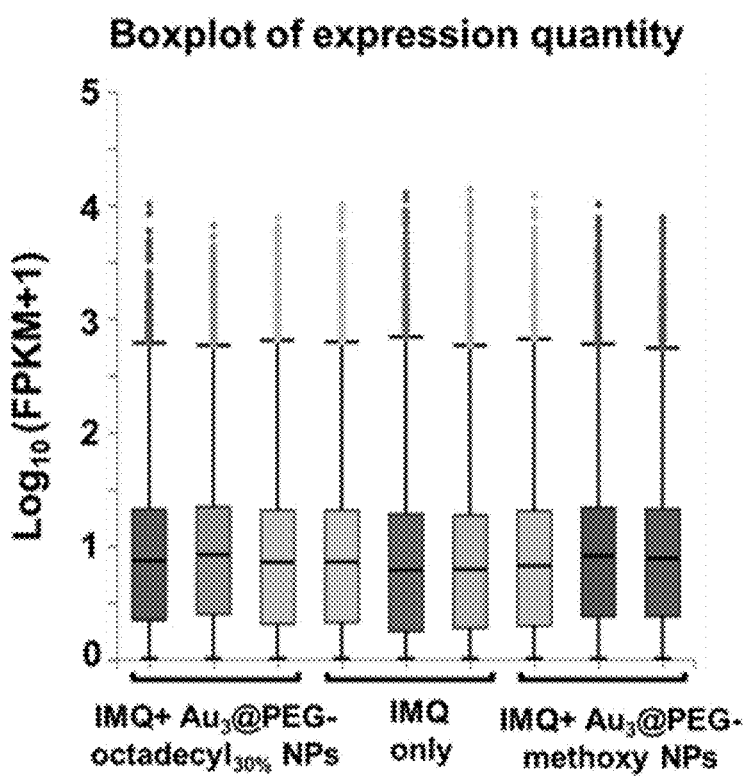

The RNAs of 9 skin samples from 3 treatment groups (n=3 for each group, "IMQ only", "IMQ+$Au_3$@PEG-methoxy NPs", or "IMQ+$Au_3$@PEG-octadecyl$_{30\%}$ NPs") are sequenced by BGISEQ platform. The average mapping ratio with reference genome is 95.54%, the average mapping ratio with gene is 77.65%; and 18200 genes are identified. In order to reflect the correlation of gene expression between samples, the Pearson correlation coefficients of all gene expressions between every two samples are calculated and shown in the heatmap as shown in FIG. 49A. The heatmap shows that within each group, the coefficients are greater than 0.88, which reflects the similarity of the overall gene expression between samples in the same group, while the low coefficients value between IMQ only group and IMQ+$Au_3$@PEG-octadecyl$_{30\%}$ NPs indicate the significant difference in this comparison. In addition, the boxplot of FIG. 49B shows a similar gene expression quantity distribution of samples.

Next, the Venn diagram and Volcano map are used to show the differential expressed genes (DEGs) in each pairwise comparison. There are 2428 DEGs detected in Pair 1 ("IMQ only" vs "IMQ+Au$_3$@PEG-octadecyl$_{30\%}$ NPs"), with 1374 downregulated genes and 1054 upregulated genes in the "IMQ+Au$_3$@PEG-octadecyl$_{30\%}$ NPs" group. In Pair 2 ("IMQ only" vs "IMQ+Au$_3$@PEG-methoxy NPs"), there are 343 DEGs detected, with 208 downregulated genes and 135 upregulated genes in "IMQ+Au$_3$@PEG-methoxy NPs" group. While there are only 25 DEGs in Pair 3 ("IMQ+Au$_3$@PEG-methoxy NPs" vs "IMQ+Au$_3$@PEG-octadecyl$_{30\%}$ NPs") comparison.

The data indicate that application of Au$_3$@PEG-octadecyl$_{30\%}$ NPs modulates more genes when compared to Au$_3$@PEG-methoxy NPs, although the number of DEGs between the two NP groups is limited.

Figures 51A, 51B:
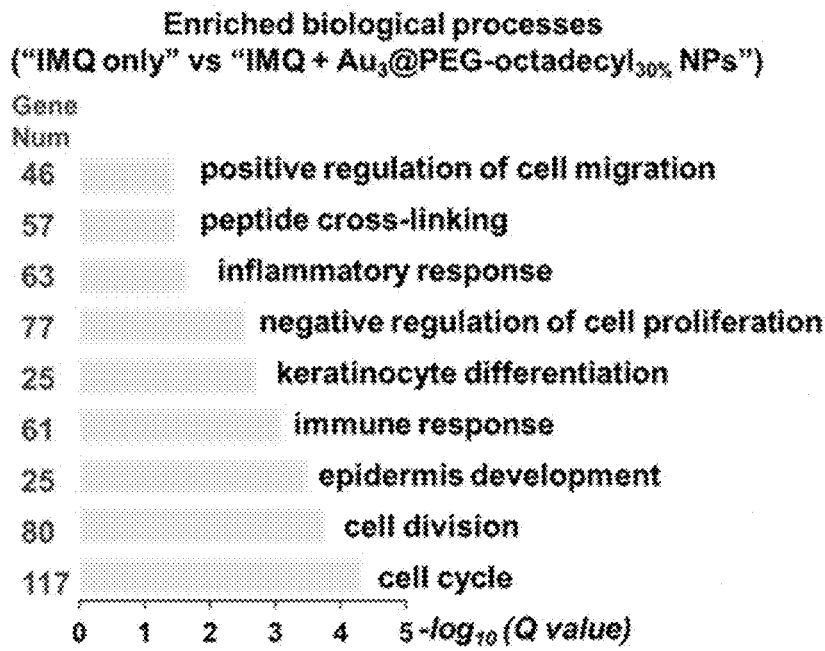

3.3.2 Au$_3$@PEG-octadecyl$_{30\%}$ NPs Significantly Suppresses Proinflammatory Genes in Psoriatic Skin Gene ontology (GO) analysis demonstrates that "IMQ+Au$_3$@PEG-octadecyl$_{30\%}$ NPs" group shows significant upregulation of keratinocyte differentiation as well as downregulation of epidermis development and inflammatory processes when compared to the "IMQ only" group of FIG. 51A and Table 4; Q<0.05, consistent with the attenuated proliferation of keratinocytes or infiltration of immune cells as shown in FIGS. 32A-32B.

Figure 54:
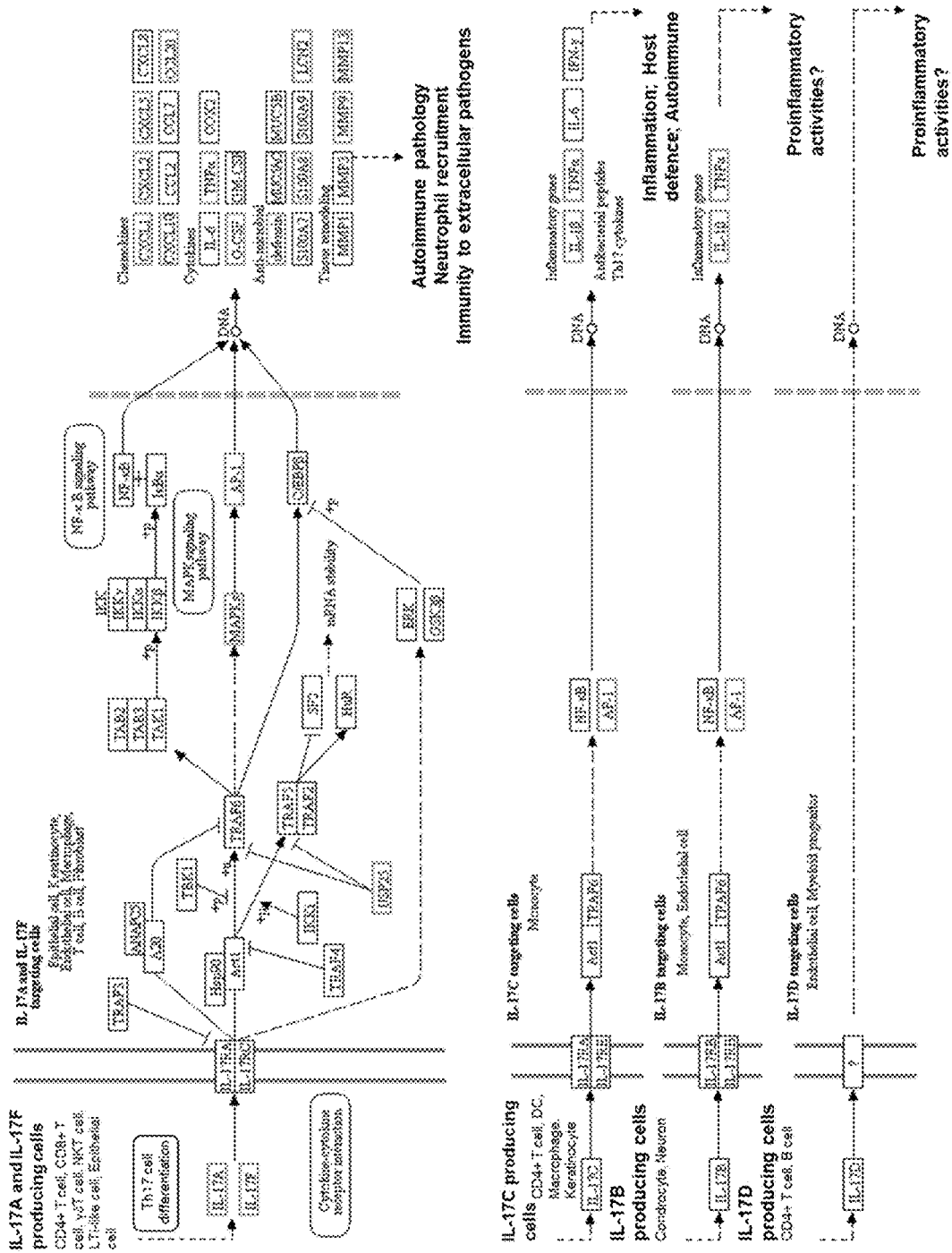
FIG. 54 shows changes in the expression of marker genes along the IL-17 signaling pathway when comparing "IMQ+Au$_3$@PEG-octadecyl$_{30\%}$ NPs" group to "IMQ only" group, wherein mice are topically applied with IMQ cream only or IMQ cream in conjunction with Au$_3$@PEG-octadecyl$_{30\%}$ NPs daily from Day 1 to Day 6, in accordance with the "treatment" mode, followed by animal sacrifice on Day 7, wherein downregulated genes are boxed in green while upregulated genes are boxed in orange, wherein topical treatment with Au$_3$@PEG-octadecyl$_{30\%}$ NPs leads to significant (Q value <0.05) downregulation of the major genes along the IL-17 pathway (for example, TNF and IL1B), according to an embodiment of the subject invention.
Figure 55:
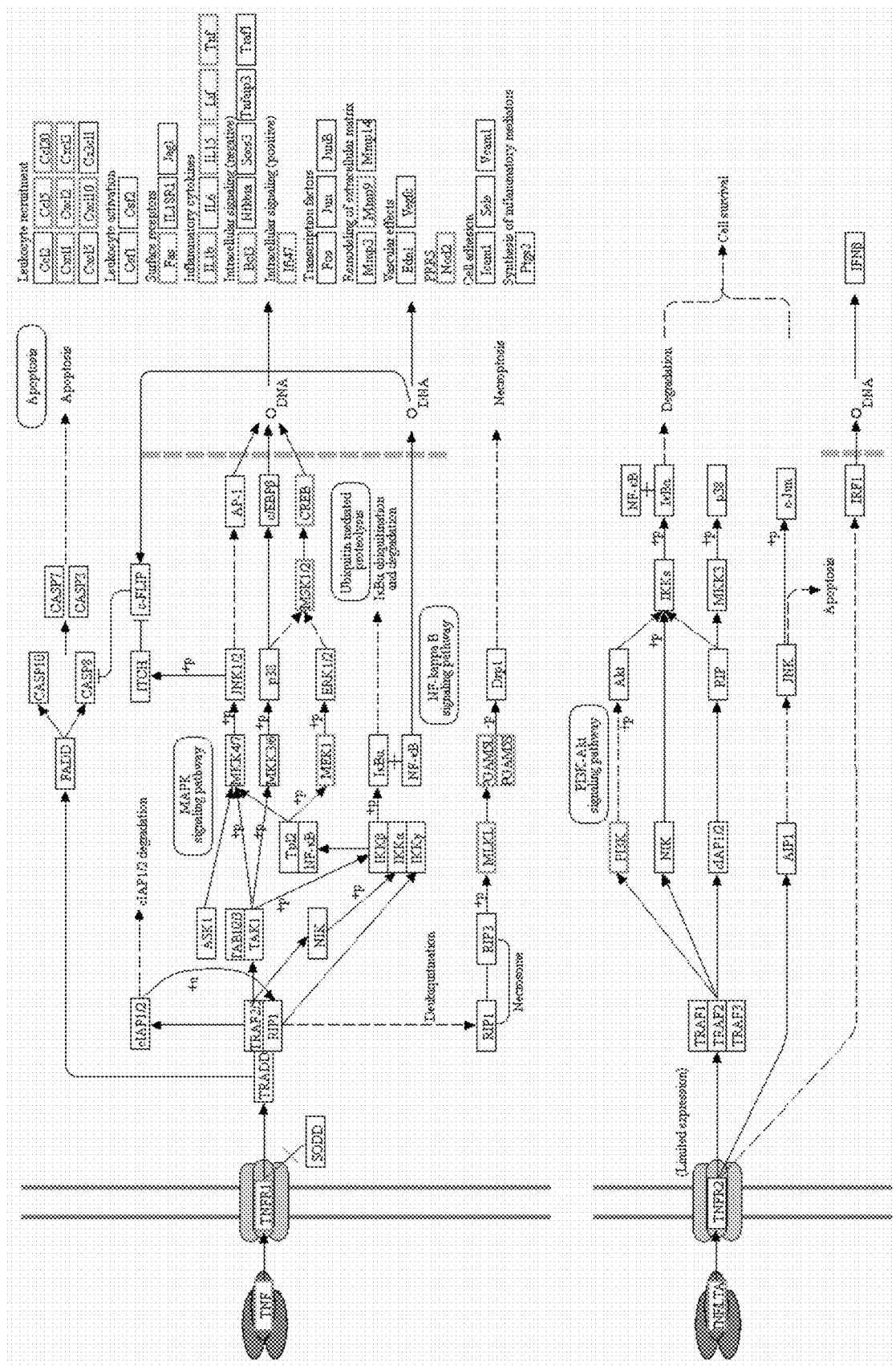
FIG. 55 shows changes in the expression of marker genes along the TNF signaling pathway when comparing "IMQ+Au$_3$@PEG-octadecyl$_{30\%}$ NPs" group to "IMQ only" group, wherein mice are topically applied with IMQ cream only or IMQ cream in conjunction with Au$_3$@PEG-octadecyl$_{30\%}$ NPs daily from Day 1 to Day 6, in accordance with the "treatment" mode, followed by animal sacrifice on Day 7, wherein downregulated genes are boxed in green while upregulated genes are boxed in orange, according to an embodiment of the subject invention.
Figure 56A:
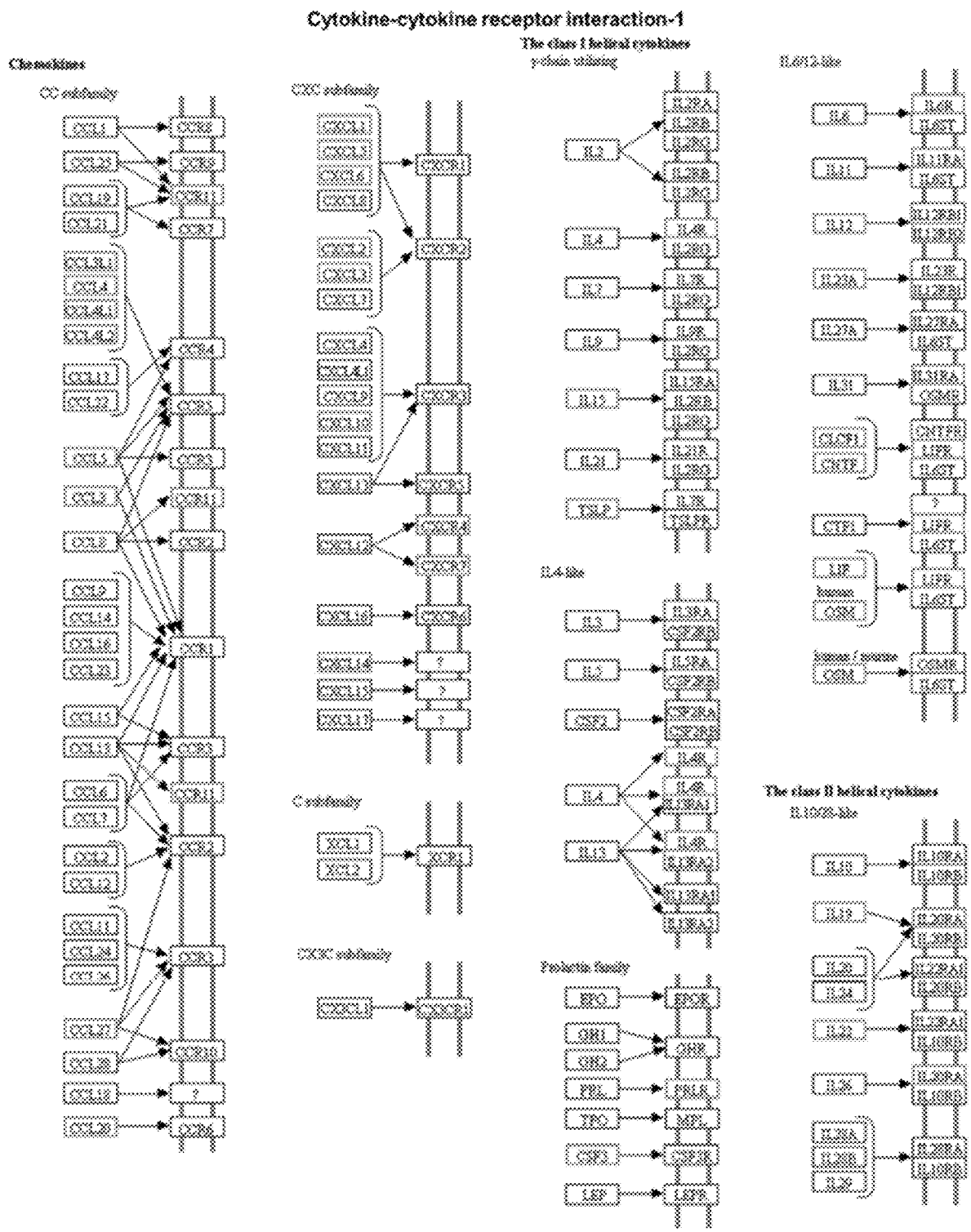
FIGS. 56A and 56B show changes in the expression of marker genes along the cytokine-cytokine receptor interaction (CCRI) signaling pathway when comparing "IMQ+Au$_3$@PEG-octadecyl$_{30\%}$ NPs" group to "IMQ only" group, wherein for the treatment group, mice are topically applied IMQ cream and Au$_3$@PEG-octadecyl$_{30\%}$ NPs daily for six consecutive days (prevention mode) from Day 1 to Day 6, followed by sacrificing the animals on Day 7, wherein downregulated genes are boxed in green while upregulated genes are boxed in orange. Topical treatment with Au$_3$@PEG-octadecyl$_{30\%}$ NPs led to significant (Q value <0.05) downregulation of the major genes along the CCRI pathway are downregulated (for example, TNF and IL1B), according to an embodiment of the subject invention.
Figure 56B:
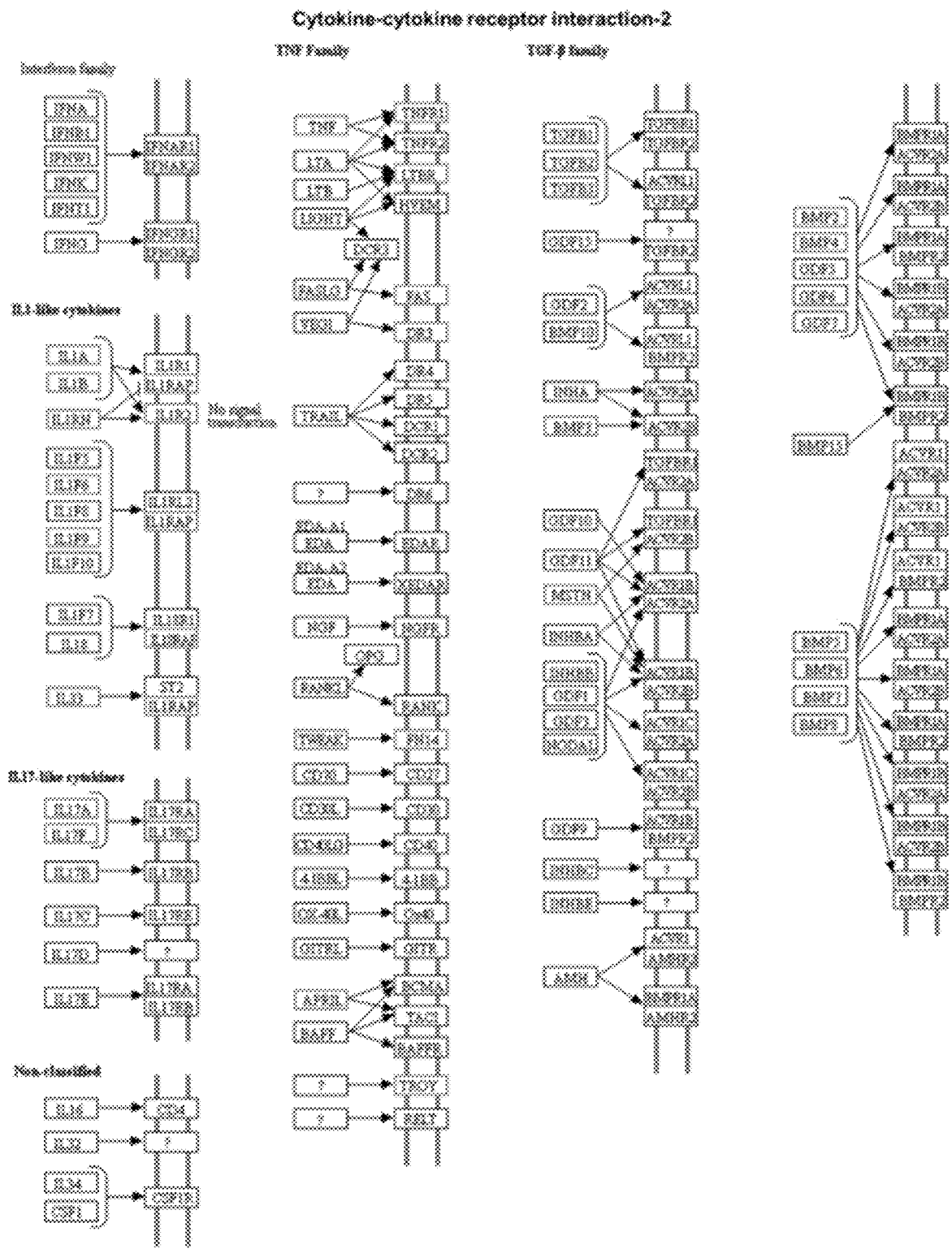
Figure 58A:
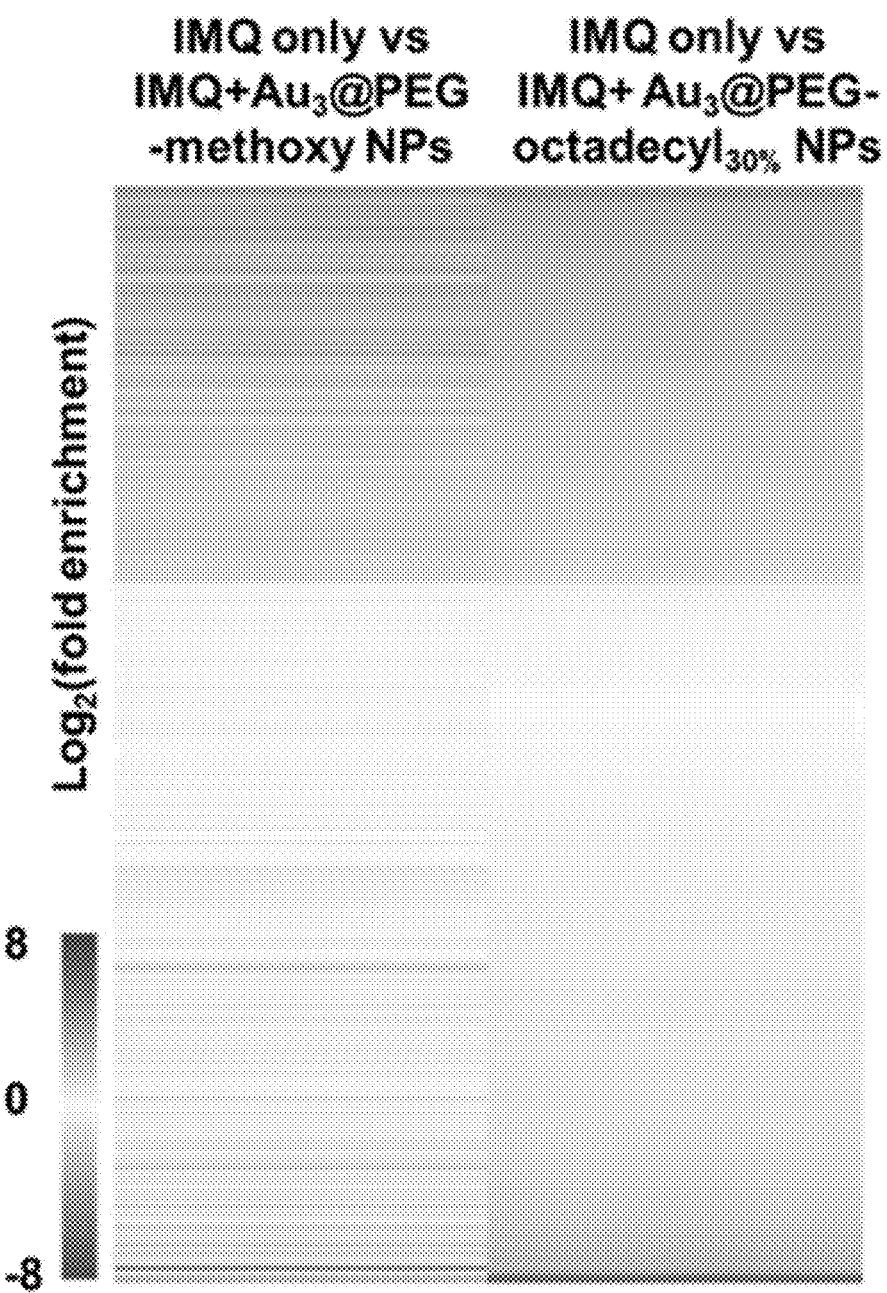
Figure 58B:
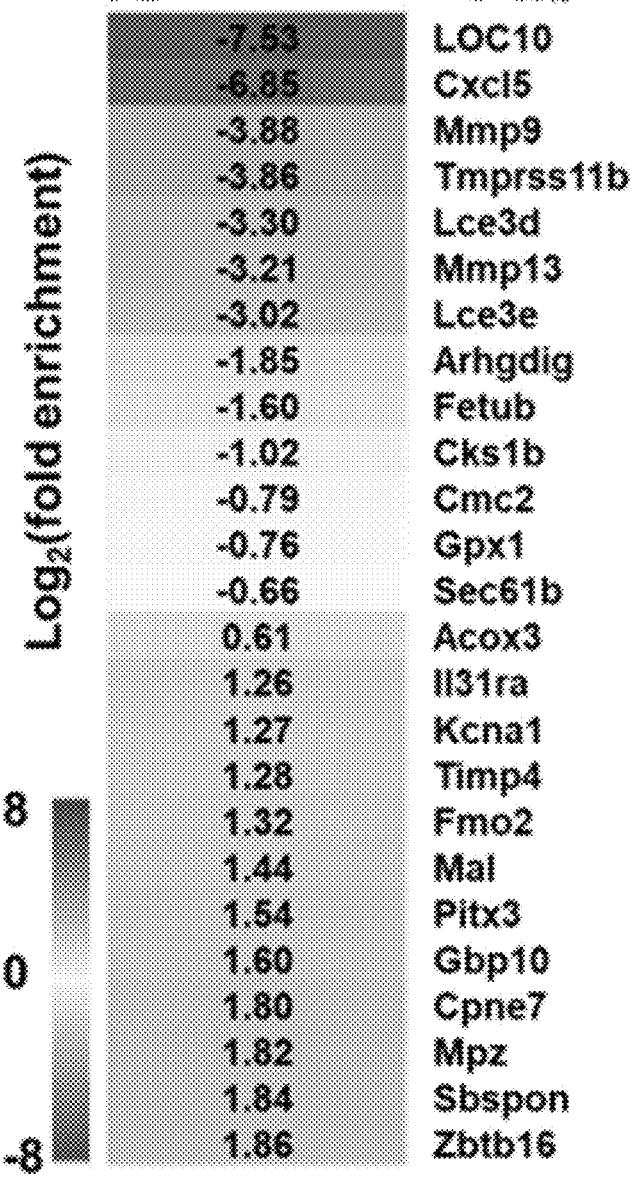
Figure 59:
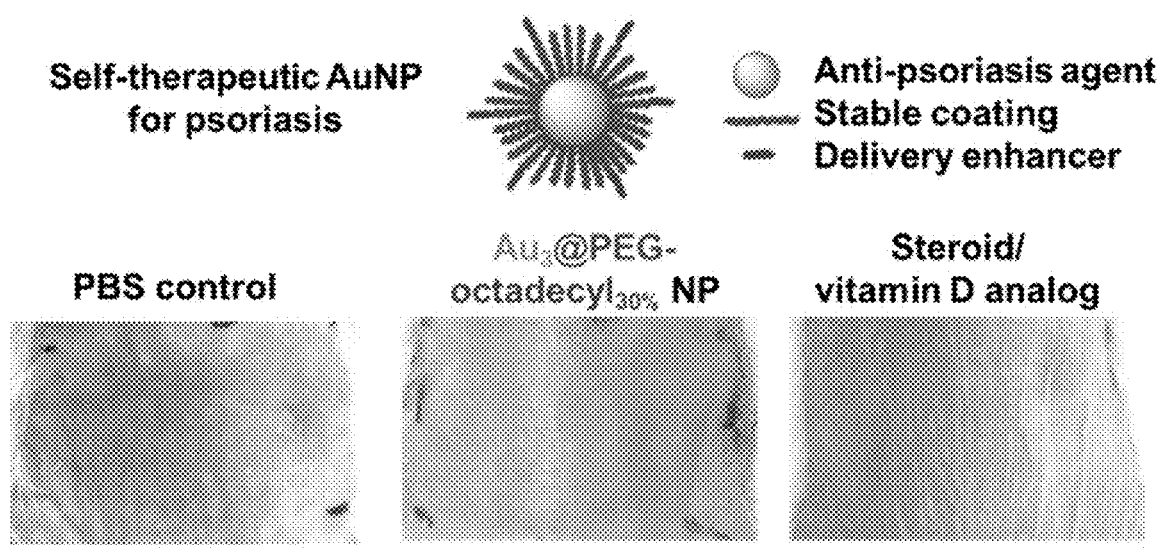
FIG. 59 shows that sub-15 nm gold NPs decorated with octadecyl chains can be topically delivered to psoriatic epidermal cells without using excipients, wherein devoid of known chemical or biological anti-psoriatic drugs, these alkylated gold NPs inhibit psoriasis by downregulating genes linked to epidermis hyperproliferation and inflammation and treat psoriasis as effectively as standard steroid-vitamin D analog therapy but without severe systemic or cutaneous toxicity, according to an embodiment of the subject invention.

In terms of the enriched differentially expressed genes (DEGs) obtained by benchmarking the "IMQ+Au$_3$@PEG-octadecyl$_{30\%}$ NPs" group against the "IMQ only" group (IMQ only vs. IMQ+Au$_3$@PEG-octadecyl$_{30\%}$ NPs), Au$_3$@PEG-octadecyl$_{30\%}$ NPs lead to significant suppression of three classes of genes that are linked to psoriasis as shown in FIG. 51B, Tables 8-9; Q<0.05. These DEGs are significantly enriched in the downstream of the IL-17 signaling pathway as shown in FIG. 54, the downstream of the TNF signaling pathway as shown in FIG. 55, and the cytokine-cytokine receptor interactions signaling pathway as shown in FIGS. 56A and 56B. To further understand the interactions among different pathways and identify the key DEGs, KEGG network analysis of the three groups is performed as shown in FIG. 57. Among all related pathways, the cytokine-cytokine receptor interaction signaling pathway is significantly enriched in all three pair comparisons. It is noted that the IL-17 and TNF pathways are also enriched, albeit to a less significant extent. The data suggest that the alkylated NPs may reduce psoriasis by blocking the communication between different inflammatory cells.

The inhibited genes include (i) cytokines that are released during psoriasis pathogenesis (for example, 65-fold lower expression for Il12b, 11-fold for Il17f, and 6-fold for Il1b which directly validates our observed ELISA data in FIG. 33B, (ii) chemokines that are secreted by keratinocytes to guide the infiltration of leukocytes to the inflammation site (for example, 7-fold lower expression for Ccl4, 28-fold for Ccl3, and 2-fold for Ccl20), and (iii) antimicrobial peptides that are highly expressed in psoriatic lesions[54] and affect inflammatory responses by acting as chemotactic agents, angiogenic factors, and regulators of cell proliferation (for example, 23-fold lower expression for Defb3, 27-fold for S100a7a, and 5-fold for Defb14). Furthermore, significant downregulation of other psoriasis-related genes (iv), such as key keratins (Krt6/16/17) that contribute to hyperproliferation and innate immune activation of keratinocytes[56,57] is detected, explaining the observed reduction in hyperproliferation of keratinocytes in FIG. 32B, epidermal hyperplasia (Fosl1, TGFα), monocyte chemotactic protein-induced protein 1 (Zc3h12a), lipid metabolism (Pla2g4, which generates the lipid antigens presented by Langerhans cells), and matrix metalloproteinases (Mmp8/Mmp9/Mmp13, which are markers of tissue remodeling and leukocyte transendothelial migration).

Figure 51C:
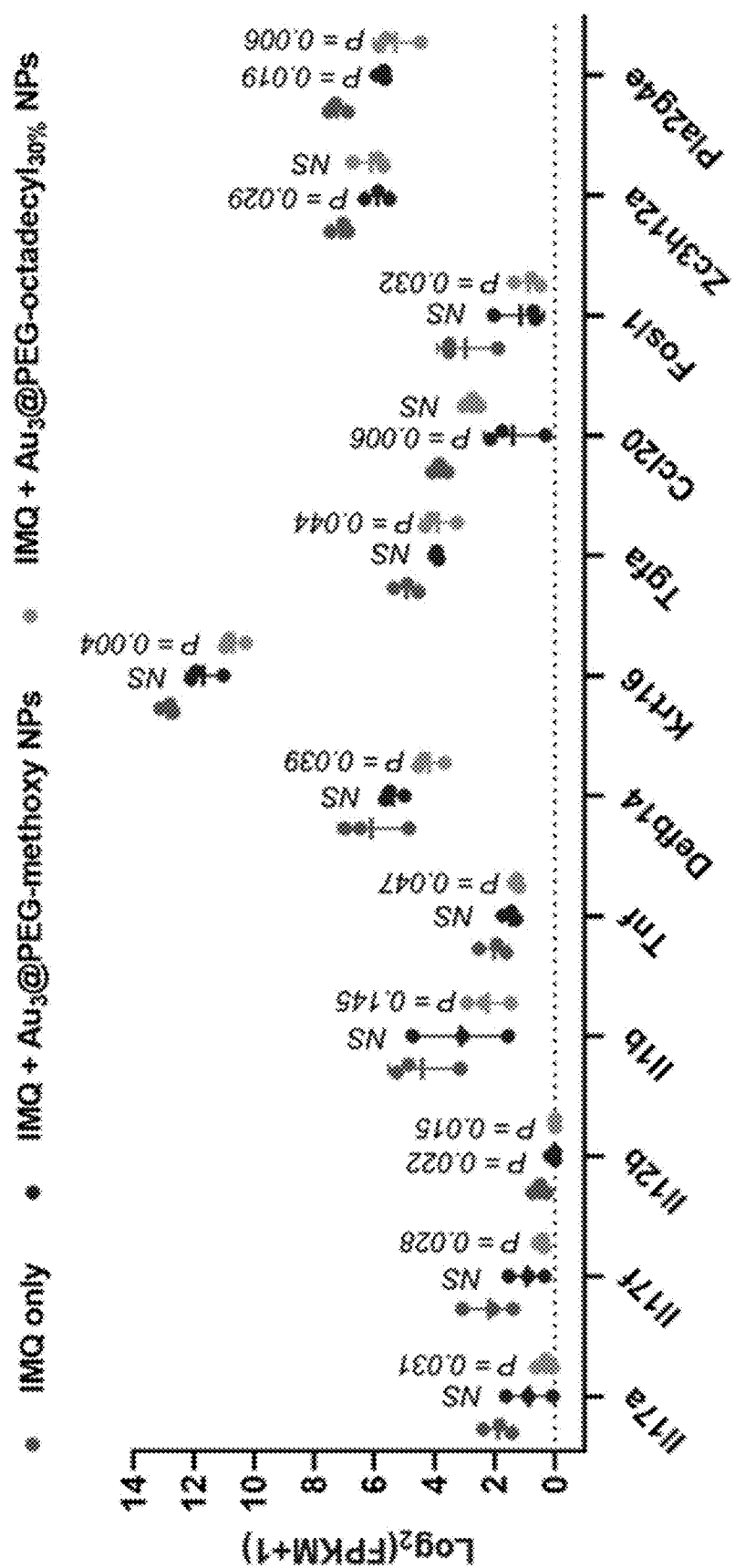

FIG. 51C presents the normalized expression levels of genes encoding representative cytokines, chemokines, AMPs, and KRTs. These genes are downregulated upon application of Au$_3$@PEG-methoxy NPs or Au$_3$@PEG-octadecyl$_{30\%}$ NPs. Nevertheless, Au$_3$@PEG-octadecyl$_{30\%}$ NPs consistently exhibit more significant gene inhibition than Au$_3$@PEG-methoxy NPs. The results demonstrate that Au$_3$@PEG-methoxy NPs downregulate similar types of genes [(i)-(iv)] or biological processes that are suppressed by Au$_3$@PEG-octadecyl$_{30\%}$ NPs (IMQ only vs. IMQ+Au$_3$@PEG-methoxy NPs; as shown in FIG. 51B and Table 5.

TABLE 4

Enriched biological processes found in the pairwise comparison "IMQ only" vs "IMQ + Au$_3$@PEG-octadecyl$_{30\%}$ NPs" (Q value < 0.05).

| GO_ biological process | Q value |
|---|---|
| ribosome biogenesis | 5.04E-13 |
| sterol biosynthetic process | 9.74E-08 |
| rRNA processing | 4.36E-07 |
| cholesterol biosynthetic process | 1.83E-06 |
| lipid metabolic process | 4.70E-06 |
| cell cycle## | 4.94E-05 |
| steroid metabolic process | 4.94E-05 |
| cholesterol metabolic process | 7.56E-05 |
| oxidation-reduction process | 9.21E-05 |
| cell division## | 1.81E-04 |
| epidermis development## | 3.25E-04 |
| steroid biosynthetic process | 7.10E-04 |
| Myelination | 7.10E-04 |
| immune response## | 8.01E-04 |
| response to toxic substance | 0.0019 |
| keratmocyte differentiation## | 0.0019 |
| proteasomal ubiquitin-independent protein catabolic process | 0.0028 |
| negative regulation of cell proliferation## | 0.0029 |
| positive regulation of establishment of protein localization to telomere | 0.0044 |
| regulation of catalytic activity | 0.0053 |
| cellular response to hypoxia | 0.0061 |
| mitotic cell cycle | 0.0064 |
| positive regulation of neuron projection development | 0.0067 |
| glutamine metabolic process | 0.0083 |
| isoprenoid biosynthetic process | 0.0083 |
| proteasomal protein catabolic process | 0.0083 |
| mitotic spindle assembly | 0.0149 |
| skeletal muscle tissue regeneration | 0.0162 |
| positive regulation of protein serine/threonine kinase activity | 0.0184 |
| inflammatory response### | 0.0230 |
| cytoskeleton organization | 0.0230 |
| Aging | 0.0230 |
| skeletal muscle fiber adaptation | 0.0234 |
| glutathione metabolic process | 0.0240 |
| negative regulation of interferon-gamma production | 0.0269 |
| positive regulation of gene expression | 0.0276 |
| peptide cross-linking## | 0.0349 |
| positive regulation of cell migration## | 0.0371 |
| glycogen metabolic process | 0.0403 |
| fatty acid metabolic process | 0.0403 |
| response to vitamin E | 0.0403 |

Note:
The lines indicated by "##" are the enriched biological processes shown in FIG. 51A that are directly related to the anti-psoriasis efficacy of the Au$_3$@PEG-octadecyl$_{30\%}$ NPs.

TABLE 5

Enriched biological processes (top 40) found in the pairwise comparison "IMQ only" vs "IMQ + Au$_3$@PEG-methoxy NPs" (Q value < 0.05).

| GO_ biological process | Q value |
|---|---|
| sterol biosynthetic process | 1.82E−13 |
| lipid metabolic process | 3.17E−13 |
| cholesterol biosynthetic process | 3.09E−11 |
| steroid biosynthetic process | 2.95E−10 |
| isoprenoid biosynthetic process | 3.68E−08 |
| cholesterol metabolic process | 5.50E−08 |
| steroid metabolic process | 7.22E−08 |
| response to organic cyclic compound | 0.0076 |
| lipid biosynthetic process | 0.0116 |
| response to virus | 0.0116 |
| keratinocyte differentiation | 0.0116 |
| immune response | 0.0139 |
| regulation of cell proliferation | 0.0146 |
| keratinization | 0.0159 |
| response to toxic substance | 0.0178 |
| positive regulation of fat cell differentiation | 0.0178 |
| muscle contraction | 0.0197 |
| ergosterol biosynthetic process | 0.0212 |
| regulation of midbrain dopaminergic neuron differentiation | 0.0212 |
| negative regulation of myoblast proliferation | 0.0212 |
| skeletal muscle atrophy | 0.0228 |
| cell chemotaxis | 0.0228 |
| fatty acid metabolic process | 0.0250 |
| negative regulation of insulin secretion | 0.0288 |
| epidermal growth factor receptor signaling pathway | 0.0346 |
| xylulose metabolic process | 0.0413 |
| isopentenyl diphosphate biosynthetic process | 0.0413 |
| isopentenyl diphosphate biosynthetic process, mevalonate pathway | 0.0413 |
| skeletal muscle fiber development | 0.0413 |
| dimethylallyl diphosphate biosynthetic process | 0.0413 |
| negative regulation of planar cell polarity pathway involved in axis elongation | 0.0413 |
| fatty acid biosynthetic process | 0.0422 |
| smoothened signaling pathway | 0.0447 |
| response to fatty acid | 0.0447 |
| positive regulation of canonical Wnt signaling pathway | 0.0447 |
| negative regulation of lipid biosynthetic process | 0.0470 |

Figure 53:
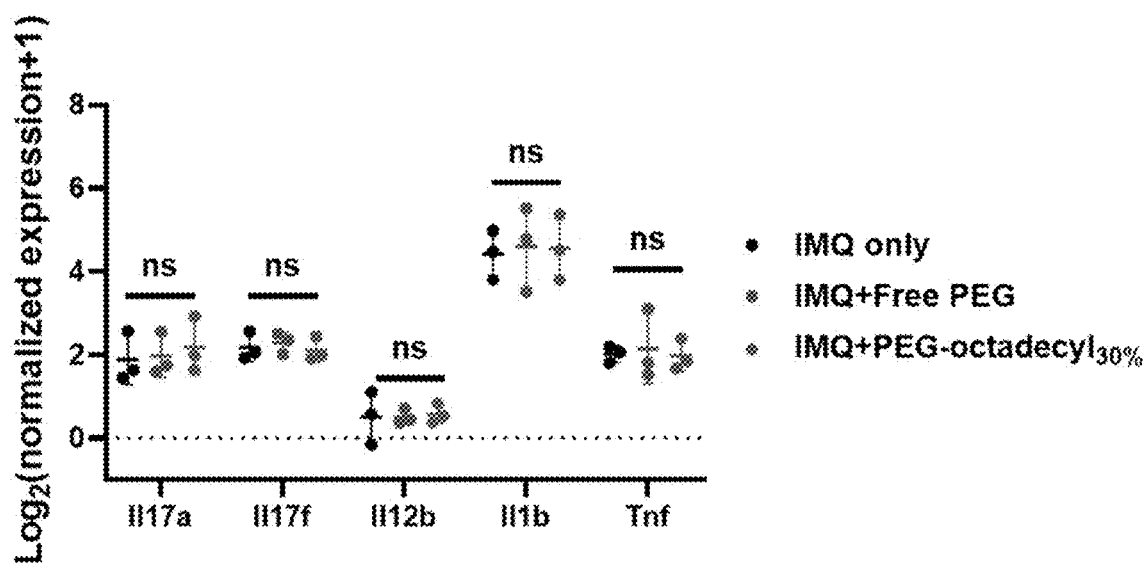
FIG. 53 shows effect of PEG strands or alkyl chains on the expression of key inflammatory genes related to psoriasis, wherein mice are topically applied with IMQ cream in conjunction with free PEG strands or free PEG-octadecyl$_{30\%}$ strands for 6 consecutive days (from Day 1 to Day 6), in accordance with the "prevention mode", wherein on Day 7, the skin and extracted tissue RNA are harvested to investigate the changes in gene expression, wherein qRT-PCR analysis reveals no significant difference in the expression levels of key inflammatory genes (including Il17a, Il17f, Il12b, Il1b, and Tnf) upon free PEG or free PEG-octadecyl$_{30\%}$ treatment when compared to the IMQ only control, mean±SD, statistical significance is calculated by one-way ANOVA with Tukey's Test for post-hoc analysis, wherein NS stands for not significant, according to an embodiment of the subject invention.

Further, psoriasis is induced to mice via IMQ and concurrently applied free PEG or free PEG-octadecyl$_{30\%}$ strands for 6 consecutive days, followed by harvesting the treated skin on Day 7. Quantitative reverse-transcription polymerase chain reaction (qRT-PCR) analysis reveals no significant difference in the expression levels of key genes in psoriasis pathology (including Il17a, Il17f, Il12b, Il1b and Tnf) in both treatment groups when compared to the IMQ control as shown in FIG. 53. The results are consistent with the efficacy data in prevention mode and suggest limited influence of the PEG strands or alkyl chains on gene expression, indicating that the changes in the expression of psoriasis marker genes following treatment with Au$_3$@PEG-octadecyl$_{30\%}$ NPs in FIGS. 51A-51C primarily stem from the Au core.

TABLE 6

Enriched Kyoto Encyclopedia of Genes and Genomes (KEGG) Pathways in the three pairwise comparison groups (gene level, Q < 0.05).

| Pairwise comparison groups | KEGG Pathway | Q value |
|---|---|---|
| "IMQ only" vs "IMQ + Au$_3$@PEG-octadecyl$_{30\%}$ NPs" | Ribosome biogenesis in eukaryotes | 3.99E−07 |
| | Proteasome | 4.49E−07 |
| | Steroid biosynthesis | 0.0024 |
| | Spliceosome | 0.0132 |
| | Calcium signaling pathway | 0.0132 |
| | Biosynthesis of antibiotics | 0.0138 |
| | RNA transport | 0.0138 |
| | AMPK signaling pathway | 0.0151 |
| | Methane metabolism | 0.0171 |
| | Terpenoid backbone biosynthesis | 0.0241 |
| | Aminoacyl-tRNA biosynthesis | 0.0241 |
| | Cytokine-cytokine receptor interaction | 0.0361 |
| | Primary bile acid biosynthesis | 0.0390 |
| | Glutathione metabolism | 0.0396 |
| | Biosynthesis of secondary metabolites | 0.0399 |
| | IL-17 signaling pathway## | 0.2079 |
| "IMQ only" vs "IMQ + Au$_3$@PEG-methoxy NPs" | Steroid biosynthesis | 3.27E−08 |
| | Terpenoid backbone biosynthesis | 3.27E−08 |
| | Biosynthesis of secondary metabolites | 4.72E−06 |
| | Biosynthesis of antibiotics | 7.42E−06 |
| | Metabolic pathways | 0.0068 |
| | Sesquiterpenoid and triterpenoid biosynthesis | 0.0088 |
| "IMQ + Au$_3$@PEG-methoxy NPs" vs "IMQ + Au$_3$@PEG-octadecyl$_{30\%}$ NPs" | IL-17 signaling pathway | 0.0084 |

Note:
The genes indicated by "##" are also shown in FIG. 54.

TABLE 7

Enriched biological processes (top 40) found in the pairwise comparison "IMQ + Au$_3$@PEG-methoxy NPs" vs "IMQ + Au$_3$@PEG-octadecyl$_{30\%}$ NPs" (Q < 0.05).

| GO_ biological process | Q value |
|---|---|
| membrane raft polarization | 0.0338 |
| glandular epithelial cell differentiation | 0.0338 |
| negative regulation of gliogenesis | 0.0338 |
| peptide cross-linking | 0.0338 |
| collagen catabolic process | 0.0338 |
| posttranslational protein targeting to membrane, translocation | 0.0338 |
| myelination | 0.0338 |
| detection of mechanical stimulus involved in sensory perception of touch | 0.0338 |
| regulation of neutrophil mediated killing of gram-negative bacterium | 0.0338 |
| oxygen metabolic process | 0.0338 |
| defense response to other organism | 0.0338 |
| protein insertion into plasma membrane | 0.0338 |
| cell aggregation | 0.0338 |
| positive regulation of pancreatic trypsinogen secretion | 0.0338 |
| response to methamphetamine hydrochloride | 0.0338 |
| positive regulation of cell proliferation in midbrain | 0.0338 |
| cellular response to glial cell derived neurotrophic factor | 0.0338 |
| ovarian cumulus expansion | 0.0359 |
| response to symbiotic bacterium | 0.0359 |
| response to hormone | 0.0359 |
| negative regulation by host of viral exo-alpha-sialidase activity | 0.0359 |
| negative regulation by host of viral glycoprotein metabolic process | 0.0359 |
| negative regulation of exo-alpha-sialidase activity | 0.0359 |
| negative regulation of glycoprotein metabolic process | 0.0359 |
| central nervous system development | 0.0362 |
| epidermis development | 0.0362 |
| protein oxidation | 0.0362 |
| transformation of host cell by virus | 0.0362 |
| keratinocyte differentiation | 0.0362 |
| fatty acid beta-oxidation using acyl-CoA oxidase | 0.0362 |

TABLE 7-continued

Enriched biological processes (top 40) found in the pairwise comparison "IMQ + Au$_3$@PEG-methoxy NPs" vs "IMQ + Au$_3$@PEG-octadecyl$_{30\%}$ NPs" (Q < 0.05).

| GO_ biological process | Q value |
|---|---|
| T-helper 2 cell cytokine production | 0.0362 |
| cartilage development | 0.0362 |
| negative regulation of cation channel activity | 0.0362 |
| skeletal system development | 0.0391 |
| protein localization to paranode region of axon | 0.0391 |
| cell communication by electrical coupling | 0.0391 |
| neuronal signal transduction | 0.0391 |
| regulation of chemokine production | 0.0391 |
| mitotic cell cycle phase transition | 0.0391 |
| male germ-line stem cell asymmetric division | 0.0391 |
| positive regulation of NK T cell differentiation | 0.0391 |

TABLE 8

List of representative DEGs in the three pairwise comparisons that are related to psoriasis-related genes.

| Category | Gene ID | Gene Symbol | "IMQ only" vs "IMQ + Au$_3$@PEG-octadecyl$_{30\%}$ NPs" Log$_2$ ## | Q value | "IMQ only" vs "IMQ + Au$_3$@PEG-methoxy NPs" Log$_2$ | Q value | "IMQ + Au$_3$@PEG-methoxy NPs" vs "IMQ + Au$_3$@PEG-octadecyl$_{30\%}$ NPs" Log$_2$ | Q value |
|---|---|---|---|---|---|---|---|---|
| i. Cytokine | 12985 | Csf3 | −6.18 | 0.0001 | −3.14 | 0.0126 | −3.02 | 0.9757 |
| | 16160 | Il12b | −5.90 | 0.0013 | −3.71 | 0.1108 | −2.18 | 1.0000 |
| | 50929 | Il22 | −4.86 | 0.0182 | −1.44 | 0.5938 | −3.39 | 1.0000 |
| | 257630 | Il17f | −3.66 | 0.0000 | −2.16 | 0.1154 | −1.49 | 1.0000 |
| | 16171 | Il17a | −3.57 | 0.0000 | −1.73 | 0.3281 | −1.84 | 1.0000 |
| | 329244 | Il19 | −3.22 | 0.0023 | −2.66 | 0.0000 | −0.54 | 1.0000 |
| | 83430 | Il23a | −2.98 | 0.0003 | −1.45 | 0.1222 | −1.53 | 1.0000 |
| | 16176 | Il1b | −2.84 | 0.0004 | −1.36 | 0.4208 | −1.48 | 1.0000 |
| | 16175 | Il1a | −2.39 | 0.0014 | −2.67 | 0.0015 | 0.29 | 1.0000 |
| | 54448 | Il1f6 | −2.08 | 0.0074 | −1.76 | 0.0400 | −0.31 | 1.0000 |
| | 77125 | Il33 | −1.96 | 0.0000 | −0.24 | 0.8963 | −1.71 | 0.1408 |
| | 53603 | Tslp | −1.53 | 0.0421 | −0.98 | 0.4045 | −0.54 | 1.0000 |
| | 16181 | Il1rn | −1.40 | 0.0028 | −1.10 | 0.0114 | −0.29 | 1.0000 |
| | 21926 | Tnf | −1.37 | 0.0041 | −0.95 | 0.2306 | −0.41 | 1.0000 |
| | 215257 | Il1f9 | −1.02 | 0.0477 | −0.71 | 0.2197 | −0.31 | 1.0000 |
| ii. hemokine | 20311 | Cxcl5 | −5.22 | 0.0290 | 1.65 | 0.8068 | −6.85 | 0.0133 |
| | 330122 | Cxcl3 | −5.07 | 0.0010 | −2.86 | 0.1778 | −2.20 | 1.0000 |
| | 20310 | Cxcl2 | −4.89 | 0.0113 | −2.73 | 0.3847 | −2.16 | 0.9324 |
| | 20302 | Ccl3 | −3.80 | 0.0002 | −2.25 | 0.1959 | −1.54 | 1.0000 |
| | 20303 | Ccl4 | −3.05 | 0.0003 | −1.86 | 0.3134 | −1.19 | 1.0000 |
| | 14825 | Cxcl1 | −2.68 | 0.0000 | −1.91 | 0.0145 | −0.76 | 1.0000 |
| | 20297 | Ccl20 | −1.40 | 0.0000 | −2.91 | 0.0092 | 1.51 | 0.9622 |
| iii. AMPs | 27358 | Defb3 | −4.73 | 0.0143 | −1.81 | 0.1623 | −2.91 | 0.9463 |
| | 56519 | Defb4 | −4.62 | 0.0051 | −0.81 | 0.7821 | −3.79 | 0.6442 |
| | 381493 | S100a7a | −4.14 | 0.0000 | −1.20 | 0.6179 | −2.93 | 0.3007 |
| | 20201 | S100a8 | −2.56 | 0.0092 | −0.95 | 0.0979 | −1.61 | 0.8439 |
| | 244332 | Defl4 | −2.33 | 0.0016 | −1.14 | 0.2706 | −1.18 | 0.2181 |
| | 67860 | S100a16 | −1.15 | 0.0005 | −0.57 | 0.1773 | −0.57 | 0.9926 |
| iv. Others | 16687 | Krt6a | −3.58 | 0.0000 | −1.39 | 0.1561 | −2.18 | 0.0804 |
| | 16688 | Krt6b | −3.26 | 0.0000 | −1.19 | 0.2394 | −2.06 | 0.1334 |
| | 16666 | Krt16 | −2.37 | 0.0000 | −1.30 | 0.0345 | −1.06 | 0.5152 |
| | 16664 | Krt14 | −1.28 | 0.0001 | −0.39 | 0.6814 | −0.88 | 0.6417 |
| | 14283 | Fosl1 | −3.41 | 0.0001 | −2.73 | 0.0323 | −0.67 | 1.0000 |
| | 21802 | Tgfa | −1.28 | 0.0194 | −1.30 | 0.0091 | 0.02 | 1.0000 |
| | 230738 | Zc3h12a | −1.20 | 0.0134 | −1.40 | 0.0094 | 0.21 | 1.0000 |
| | 329502 | Pla2g4e | −2.08 | 0.0001 | −1.74 | 0.0000 | −0.33 | 1.0000 |
| | 78390 | Pla2g4d | −2.58 | 0.0006 | −1.02 | 0.3111 | −1.55 | 0.4074 |
| | 211429 | Pla2g4b | −2.29 | 0.0008 | −1.96 | 0.0099 | −0.33 | 1.0000 |
| | 17394 | Mmp8 | −2.91 | 0.0377 | 2.43 | 0.5623 | −5.33 | 0.5122 |
| | 17386 | Mmp13 | −1.68 | 0.0049 | 1.55 | 0.2444 | −3.21 | 0.0170 |
| | 17395 | Mmp9 | −1.08 | 0.0007 | 2.81 | 0.2130 | −3.88 | 0.0308 |
| | 319191 | Hist1h2ai | −5.98 | 0.0044 | −0.31 | 0.9235 | −5.66 | 0.1016 |
| | 319152 | Hist1h3h | −5.45 | 0.0102 | −0.61 | 0.8071 | −4.83 | 0.4815 |

Figure 50A:
Figure 50B:
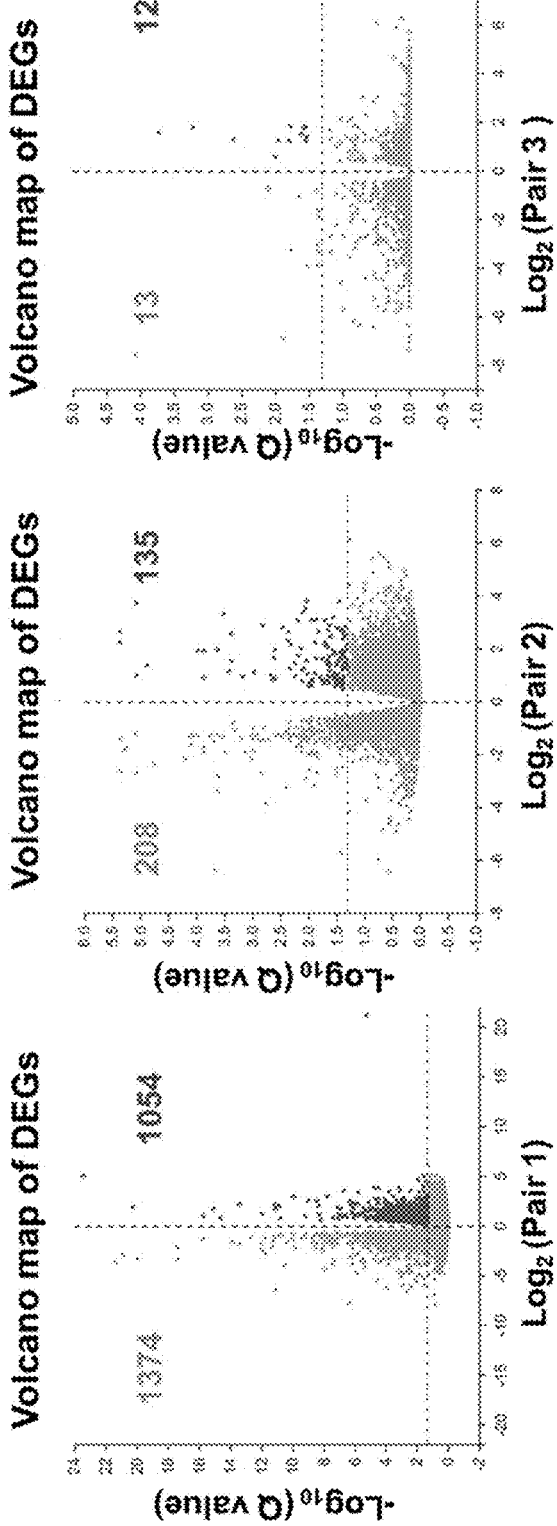

Note:

i. cytokine, ii. Chemokine, iii. antimicrobial peptides (AMPs), and iv. Others [e.g., keratins (Krt) and matrix metalloproteinases (Mmp)]. The log$_2$ values of the representative genes in the pairwise comparasion of "IMQ only" vs "IMQ + Au$_3$@PEG-octadecyl$_{30\%}$ NPs" column, indicated by "##", are shown in FIGS. 50A-50B. These genes are selected since they are downregulated genes downstream of the IL-17 siganlling pathways as shown in FIG. 54.

TABLE 9

Raw data for the significantly regulated genes shown in Table 8.

Expression (FPKM), n = 3

| Gene ID | Gene Symbol | "IMQ only" | | | "IMQ + Au$_3$@PEG-octadecyl$_{30\%}$ NPs" | | | "IMQ + Au$_3$@PEG-methoxy NPs" | | |
|---|---|---|---|---|---|---|---|---|---|---|
| 32985 | Csf3 | 0.57 | 2.21 | 2.44 | 0 | 0 | 0.09 | 0.14 | 0.37 | 0.13 |
| 16160 ## | Il12b | 0.21 | 0.68 | 0.41 | 0.02 | 0 | 0 | 0 | 0 | 0.12 |
| 50929 | Il22 | 0.99 | 0.44 | 0.33 | 0 | 0 | 0.06 | 0 | 0.48 | 0.23 |
| 257630 ## | Il17f | 7.45 | 3.18 | 1.63 | 0.48 | 0.27 | 0.33 | 0.85 | 1.9 | 0.27 |
| 16171 ## | Il17a | 4.24 | 2.57 | 1.69 | 0.54 | 0.22 | 0.05 | 0.05 | 2.07 | 0.85 |
| 329244 | Il19 | 8.98 | 6.2 | 6.16 | 2.03 | 0.13 | 0.38 | 0.74 | 2.27 | 0.92 |
| 83430 | Il23a | 1.98 | 2.14 | 1.57 | 0.09 | 0.18 | 0.56 | 1.09 | 0.44 | 0.82 |
| 16176 ## | Il1b | 7.89 | 28.09 | 37.11 | 1.76 | 6.53 | 4.17 | 1.96 | 25.65 | 7.39 |
| 16175 | Il1a | 8.87 | 37.46 | 31.86 | 9.12 | 3.91 | 4.83 | 4.67 | 3.09 | 6.65 |
| 54448 | Il1f6 | 125.47 | 434.14 | 478.29 | 112.56 | 47.09 | 133.57 | 114.81 | 113.19 | 135 |
| 77125 | Il33 | 56.25 | 29.99 | 31.2 | 15.18 | 10.6 | 8.62 | 52.73 | 39.69 | 16.44 |
| 53603 | Tslp | 100.05 | 150.12 | 119.02 | 68.21 | 33.38 | 61.62 | 68.58 | 68.75 | 60.54 |
| 16181 | Il1rn | 176.06 | 264.85 | 290.7 | 148.91 | 91.84 | 180.96 | 159.46 | 158.43 | 201.24 |
| 21926 ## | Tnf | 4.73 | 2.79 | 2.09 | 1.41 | 1.28 | 1.55 | 2.32 | 1.72 | 1.44 |
| 215257 | Il1f9 | 6.7 | 3.91 | 5.3 | 3.79 | 1.63 | 0.9 | 4.69 | 1.07 | 3.1 |
| 20311 | Cxcl5 | 3.47 | 0 | 0.46 | 0.07 | 0.04 | 0 | 0.26 | 12.57 | 0.55 |
| 330122 | Cxcl3 | 0.66 | 11.6 | 10.89 | 0.13 | 0 | 0.7 | 0.06 | 3.07 | 0.87 |
| 20310 | Cxcl2 | 0.68 | 29.68 | 35 | 0.23 | 0.53 | 1.9 | 0.41 | 9.72 | 2.26 |
| 20302 | Ccl3 | 2.79 | 23.63 | 25.14 | 0.66 | 2.59 | 1.35 | 0.58 | 8.9 | 3.95 |
| 20303 | Ccl4 | 3.03 | 5.66 | 8.99 | 0.4 | 1.54 | 0.62 | 0.2 | 4.58 | 1.01 |
| 14825 | Cxcl1 | 9.17 | 12.25 | 10.92 | 1.48 | 2.17 | 2.32 | 1.26 | 5.35 | 3.53 |
| 20297 ## | Ccl20 | 15.93 | 13.39 | 10.86 | 4.66 | 5.68 | 7.21 | 2.35 | 0.24 | 3.4 |
| 27358 | Defb3 | 844.94 | 2509.79 | 3382.65 | 36.63 | 3.48 | 258.67 | 176.13 | 1391.94 | 772.69 |
| 56519 | Defb4 | 1.35 | 4.91 | 6.85 | 0 | 0 | 0.64 | 1.41 | 7.05 | 0.62 |
| 381493 ## | S100a7a | 3.18 | 21.27 | 26.28 | 0.53 | 0.92 | 0.44 | 0.43 | 17.04 | 9.07 |
| 20201 | S100a8 | 6446.06 | 8851.08 | 11443.7 | 1194.98 | 283.67 | 3757.88 | 5346.27 | 6187.3 | 4543.96 |
| 244332 ## | Defb14 | 28.05 | 88.09 | 123.88 | 22.12 | 11.76 | 19.43 | 30.97 | 49.26 | 44.29 |
| 67860 | S100a16 | 654.18 | 641.75 | 687.94 | 398.1 | 251.79 | 388.12 | 561.93 | 429.34 | 525.99 |
| 16687 | Krt6a | 3261.82 | 3479.3 | 4377.28 | 472.12 | 232.5 | 375.26 | 1742.4 | 2627.34 | 513.87 |
| 16688 | Krt6b | 4291.22 | 4234.44 | 5536.2 | 740.5 | 356.26 | 604.56 | 2674.02 | 3644.6 | 726.15 |
| 16666 ## | Krt16 | 6600.56 | 7098.97 | 8859.96 | 1824.08 | 1244.8 | 2023.13 | 4398.18 | 3938.65 | 2082.43 |
| 16664 | Krt14 | 6702.37 | 6950.78 | 9997.84 | 4252.37 | 3311.5 | 3856.63 | 8709.45 | 7556.63 | 4489.55 |
| 14283 ## | Fosl1 | 2.7 | 10.39 | 10.42 | 1.55 | 0.4 | 0.71 | 0.58 | 0.65 | 3.08 |
| 21802 ## | Tgfa | 22.42 | 39.99 | 28.78 | 16.28 | 8.58 | 18.95 | 14.32 | 13.59 | 15.04 |
| 230738 ## | Zc3h12a | 130.53 | 176.07 | 117.72 | 58.18 | 50.99 | 105.29 | 78.87 | 57.83 | 44.46 |
| 329502 ## | Pla2g4e | 117.85 | 183.35 | 155.54 | 47.84 | 21.08 | 55.83 | 49.99 | 48.83 | 59.84 |
| 78390 | Pla2g4d | 7.35 | 19.41 | 22.59 | 2.38 | 1.76 | 5.56 | 5.3 | 13.1 | 11.05 |
| 211429 | Pla2g4b | 44.45 | 152.5 | 132.41 | 27.88 | 15.51 | 36.63 | 26.43 | 37.44 | 37.09 |
| 17394 | Mmp8 | 0.38 | 1.54 | 2.98 | 0.02 | 0.6 | 0.2 | 0.19 | 32.55 | 0.37 |
| 17386 | Mmp13 | 1.35 | 0.64 | 1.07 | 0.43 | 0.27 | 0.39 | 4.47 | 4.77 | 0.65 |
| 17395 | Mmp9 | 3.75 | 2.24 | 2.32 | 1.43 | 1.5 | 1.55 | 8.73 | 57.14 | 1.56 |
| 319191 | Hist1h2ai | 1.36 | 0.9 | 2.87 | 0 | 0 | 0 | 1.68 | 1.38 | 1.61 |
| 319152 | Hist1h3h | 1.42 | 0.98 | 0.86 | 0 | 0 | 0 | 0.68 | 1.07 | 0.75 |

Note:
The genes indicated by "##" are also shown in FIG. 51C.

Next, the DEGs (for example, Q≤0.05) related to (1) cytokines, (2) chemokines, (3) antimicrobial peptides (AMPs), and (4) other psoriasis-related genes are analysed, in the octadecyl$_{30\%}$-PEG-Au$_3$ NPs treatment vs. IMQ control comparison as shown in FIGS. 52A-52D.

Figure 52A:
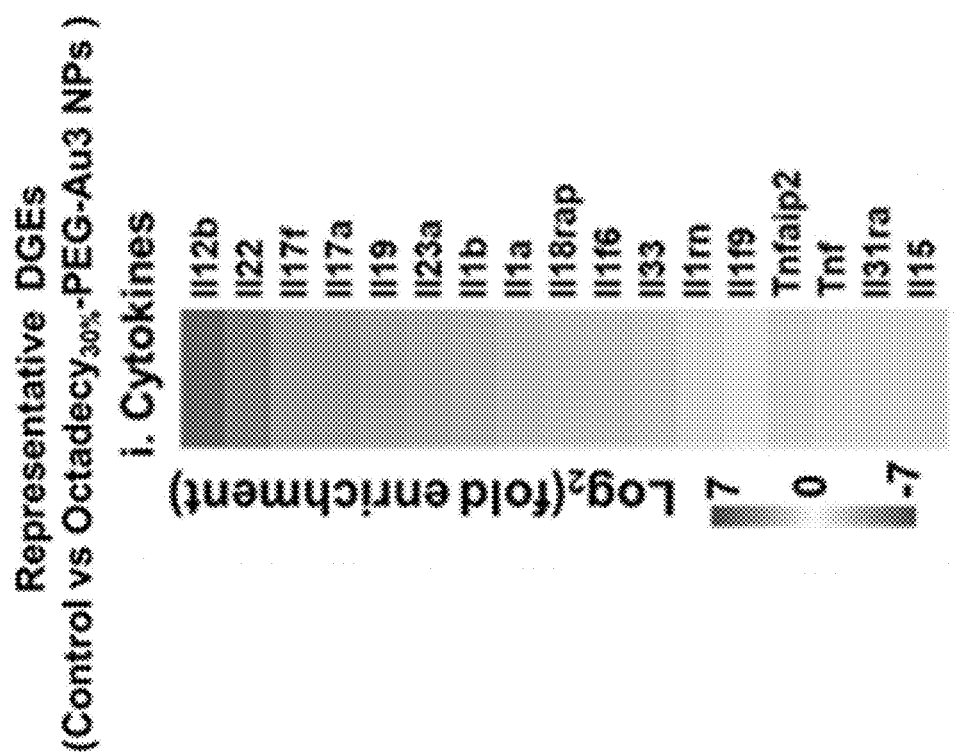
FIGS. 52A-52D show differentially expressed (FIG. 52A) cytokines, (FIG. 52B) antimicrobial peptides (AMPs), (FIG. 52C) chemokine and (FIG. 52D) other related genes in octadecyl$_{30\%}$-PEG-Au$_3$ NPs treatment normalized to IMQ Control. (Q value ≤0.05), according to an embodiment of the subject invention.

First, in line with the ELISA results of FIG. 33B, upon treatment with octadecyl$_{30\%}$-PEG-Au$_3$ NPs, the gene expression level of the major psoriasis-related cytokines[42, 43], such as IL-23, IL-12, IL-17a, IL-17f, IL-1β, and TNFα, are all significantly lower than that in the IMQ control by around 2 to 64 folds as shown in FIG. 52A.

Second, the chemokines are small cytokines representing a large group of small chemotactic proteins (about 8-11 kDa in size) that guide the movement of leukocytes to sites of inflammation[42]. In the skin, epidermal keratinocytes are able to express multiple chemokines that can attract certain leukocytes, such as T cells or dendritic cells (DCs), to migrate to the epidermis. It is recognized that CCL4 chemokine is a chemoattractant for cells bearing CCR1 and CCR5 receptors, for example, Th1 cells, immature dendritic cells, NK cells, and monocytes[44]. CCL20 attracts cells with CCR6 receptor—Th1 lymphocytes, dendritic cells and monocytes, while CXCL8 and CXCL2 are chemoattractants for neutrophils expressing receptors for IL-8 (CXCR1 and CXCR).

Figure 52B:
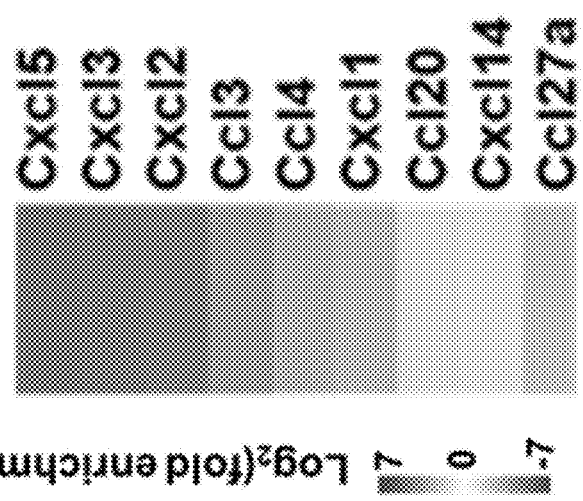
Figure 52C:
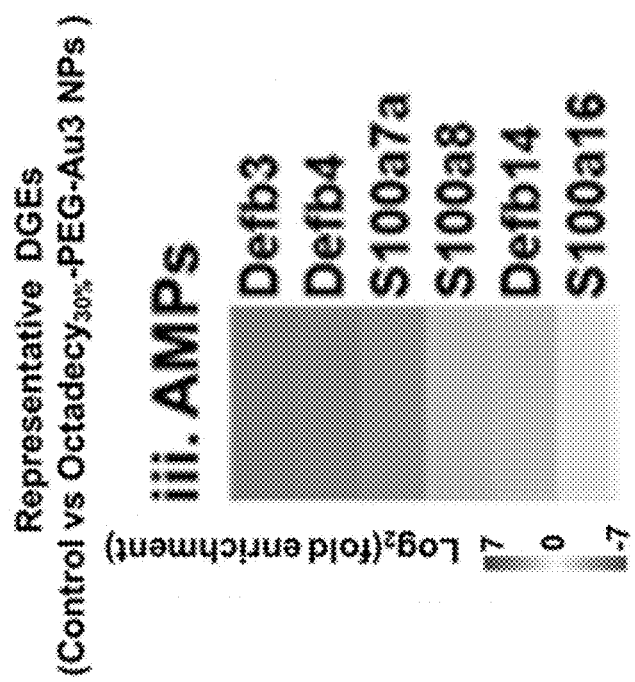

The heat map in FIG. 52B shows that the expression of most of the relevant chemokines are reduced with the octadecyl$_{30\%}$-PEG-Au$_3$ NPs treatment as expected. The result also explains the decrease of CD3$^+$ cell infiltration shown in FIG. 32A.

Third, AMPs generally are small amino acids residues (composed of 12-50 amino acids) that have positive charge and amphipathic structure[45]. These antimicrobial molecules are best known for their integral role in killing pathogenic microorganisms; but they can also affect inflammatory responses by acting as chemotactic agents, angiogenic factors, and regulators of cell proliferation. Various AMP, such as b-defensins, S100 proteins and cathelicidin, are highly expressed in psoriatic lesions[41]. The heat map in FIG. 52C demonstrates the downregulation of a few AMPs genes, including β-defensin 4, 5, 14, and S100a7 (psoriasin), S100a8 (calgranulin A), and S100a16.

Finally, the expression of miscellaneous genes that are related to psoriasis is further examined. Keratins (KRT) are the major structural intermediate filament proteins in keratinocytes and are expressed in a highly specific pattern at different differentiation stages of keratinocytes. Recent studies have recognized KRT6/16/17 as key early barrier alarmins and upregulation of these keratins alters proliferation, cell adhesion, migration and inflammatory features of keratinocytes, contributing to hyperproliferation and innate immune activation of keratinocytes, followed by the auto-immune activation of T cells that drives psoriasis[46-47].

Figure 52D:
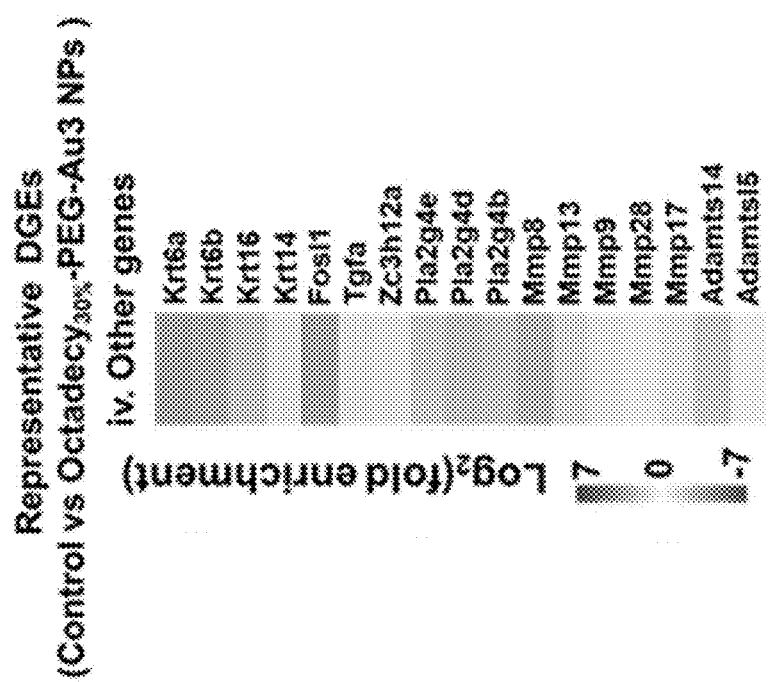

After treatment with octadecyl$_{30\%}$-PEG-Au$_3$ NPs, the downregulation of KRT6/16/17 genes are observed in FIG. 52D, which is consistent with the reduced hyperproliferation of keratinocytes in FIG. 32A.

3.3.3 Molecular Basis of Alkylation Effects

The data suggest a molecular basis that explains how alkylation enhances anti-psoriasis efficacy. The pairwise comparison of "IMQ+Au$_3$@PEG-methoxy NP" vs. "IMQ+Au$_3$@PEG-octadecyl$_{30\%}$ NP" reveals significant inhibition of genes related to psoriasis (for example, 15-fold lower expression for Mmp9 and 9-fold for Mmp13; as shown in FIG. 51C, the IL-17 signaling pathway (Q=0.0084; Table 6), and psoriasis-related processes [e.g., epidermis development (Q=0.036) and regulation of chemokine production (Q=0.039); Table 7]. The same pairwise comparison result in significant upregulation of membrane-raft polarization, a process related to the endocytosis of NPs (Q=0.033; Table 6). The result is consistent with the enhanced delivery of Au$_3$@PEG-octadecyl$_{30\%}$ NPs to keratinocytes that is superior to that of Au$_3$@PEG-methoxy NPs.

RNA-seq is used to profile the anti-psoriatic efficacy mechanism of alkyl-terminated AuNPs. RNA-seq results reveal that Au$_3$@PEG-octadecyl$_{30\%}$ NPs concurrently with induction of psoriasis downregulated genes that are linked to epidermal hyperproliferation and inflammation. These genes are not only significantly enriched in cytokine-cytokine receptor interaction signaling pathway, but also in the downstream of the IL-17 signaling pathway and the downstream of the TNF signaling pathway. The results also demonstrate that Au$_3$@PEG-methoxy NPs downregulated similar types of genes or biological processes that are suppressed by Au$_3$@PEG-octadecyl$_{30\%}$ NPs, but less effective. These data directly validate the efficacy observed and suggest that the alkylated NPs inhibit psoriasis by blocking the communication between different inflammatory cells. In addition, the upregulation of membrane-raft polarization in Au$_3$@PEG-octadecyl$_{30\%}$ NPs treated skin explains the enhanced delivery of Au$_3$@PEG-octadecyl$_{30\%}$ NPs to keratinocytes that is superior to that of the Au$_3$@PEG-methoxy NPs. Moreover, the qRT-PCR data suggest limited influence of the PEG strands or alkyl chains on gene expression, indicating the changes in the expression of psoriasis marker genes following treatment with Au$_3$@PEG-octadecyl$_{30\%}$ NPs primarily stem from the Au core.

The sub-15 nm Au$_3$@PEG-octadecyl$_{30\%}$ NPs are self-therapeutic agents for treating psoriasis. It has been proven that NP size and alkyl loading are critical parameters for topical delivery of NPs to the epidermal cells of healthy and psoriatic skin. The sub-15 nm size of Au$_3$@PEG-octadecyl$_{30\%}$ NPs allows penetration of the SC and accumulation in the epidermis without the aid of excipients, and an optimal loading of octadecyl groups (30 mol %) maintains the colloidal stability of Au cores in skin while boosting their uptake by epidermal cells.

The results are significant because they demonstrate that surface engineering of NPs with functional groups (through alkylation in this case) can overcome a major delivery hurdle to epidermal keratinocytes for treating psoriasis. Moreover, the therapeutic component of Au$_3$@PEG-octadecyl$_{30\%}$ NPs is the Au core, even though Au$_3$@PEG-octadecyl$_{30\%}$ NPs, devoid of known chemical and biological anti-psoriatic drugs, inhibit psoriasis by inhibiting genes that are enriched in the downstream of IL-17 signaling pathway and linked to epidermis hyperproliferation and inflammation. Optimal alkylation of the Au cores yields improved efficacy and more significantly inhibited inflammatory genes by promoting the entry of Au cores to epidermal cells.

It is demonstrated that Au$_3$@PEG-octadecyl$_{30\%}$ NPs treat psoriasis as effectively as a commercial ointment that contains steroid- and vitamin D analog, but without long-term retention in major internal organs or inducing long-term toxicity.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Mehrmal, S., Uppal, P., Nedley, N., Giesey, R. L. & Delost, G. R. The global, regional, and national burden of psoriasis in 195 countries and territories, 1990 to 2017: A systematic analysis from the Global Burden of Disease Study 2017. *J. Am. Acad. Dermatol,* 84, 46-52 (2021).
2. Griffiths, C. E. & Barker, J. N. Pathogenesis and clinical features of psoriasis. *Lancet* 370, 263-271 (2007).
3. Boehncke, W. H. & Schön, M. P. Psoriasis. *Lancet* 386, 983-994 (2015).
4. Pariser, D. M. et al. National Psoriasis Foundation clinical consensus on disease severity. *Arch. Dermatol.* 143, 239-242 (2007).

5. Lowes, M. A., Bowcock, A. M. & Krueger, J. G. Pathogenesis and therapy of psoriasis. *Nature* 445, 866-873 (2007),
6. Auerbach, R. Methotrexate in psoriasis: Revised guidelines. *J. Am. Acad. Dermatol.* 19, 145-156 (1988).
7. Warren, E. W. & Khanderia, U. Use of retinoids in the treatment of psoriasis. *Clin. Pharm,* 8, 344-351 (1989),
8. Rosmarin, D. M., Lebwohl, M., Elewski, B. E. & Gottlieb, A. B. Cyclosporine and psoriasis: 2008 National Psoriasis Foundation* Consensus Conference. *J. Am. Acad. Dermatol.* 62, 838-853 (2010).
9. Lebwohl, M. et al. From the Medical Board of the National Psoriasis Foundation: Monitoring and vaccinations in patients treated with biologics for psoriasis. *J. Am. Acad. Dermatol.* 58, 94-105 (2008).
10. Fernández-Ruiz, M. & Aguado, J. M. Risk of infection associated with anti-TNT-α therapy. *Expert Rev. Anti. Infect. Ther.* 16, 939-956 (2018).
11. Castela, E. et al. Topical corticosteroids in plaque psoriasis: A systematic review of efficacy and treatment modalities. *J. Eur. Acad. Dermatology Venereol.* 26, 36-46 (2012).
12. Fereig, S. A., El-Zaafarany, G. M., Arafa, M. G. & Abdel-Mottaleb, M. M. A. Tackling the various classes of nano-therapeutics employed in topical therapy of psoriasis. *Drug Deliv.* 27, 662-680 (2020).
13. Arora, R., Katiyar, S. S., Kushwah, V. & Jain, S. Solid lipid nanoparticles and nanostructured lipid carrier-based nanotherapeutics in treatment of psoriasis: a comparative study, *Expert Opin. Drug Deliv.* 14, 1.65-177 (2017).
14. Avasatthi, V. et al. A novel nanogel formulation of methotrexate for topical treatment of psoriasis: optimization, in vitro and in vivo evaluation. *Pharm. Dev. Technol.* 21, 554-562 (2016).
15. Ferreira, M. et al. Methotrexate loaded lipid nanoparticles for topical management of skin-related diseases: Design, characterization and skin permeation potential. *Int. J. Pharm.* 512, 14-21 (2016).
16. Sapino, S., Oliaro-Bosso, S., Zonari, D., Zanotti, A. & Ugazio, E. Mesoporous silica nanoparticles as a promising skin delivery system for methotrexate. *Int. J. Pharm.* 530, 239-248 (2017).
17. Kohler, N., Sun, C., Wang, J. & Zhang, M. Methotrexate-modified superparamagnetic nanoparticles and their intracellular uptake into human cancer cells. *Langmuir* 21, 8858-8864 (2005).
18. Wong, L. S., Tymms, K. E. & Buckley, N. A. Potential for methotrexate exposure through contamination during parenteral use as an immunosuppressant, *Intern. Med. J.* 39, 379-383 (2009).
19. Bessar, H. et al. Functionalized gold nanoparticles for topical delivery of methotrexate for the possible treatment of psoriasis. *Colloids Surfaces B Biointerfaces* 141, 141-147 (2016).
20. Pinto, M. F. et al. A new topical formulation for psoriasis: Development of methotrexate-loaded nanostructured lipid carriers, *Int. J. Pharm.* 477, 519-526 (2014),
21. Fratoddi, I. et al. Effects of topical methotrexate loaded gold nanoparticle in cutaneous inflammatory mouse model. *Nanomedicine Nanotechnology, Biol. Med.* 17, 276-286 (2019).
22. Özcan, A. et al. Nanoparticle-Coupled Topical Methotrexate Can Normalize Immune Responses and Induce Tissue Remodeling in Psoriasis. *J. Invest. Dermatol.* 140, 1003-1014.e8 (2020).
23. Ferreira, M. et al. Topical co-delivery of methotrexate and etanercept using lipid nanoparticles: A targeted approach for psoriasis management. *Colloids Surfaces B Biointerfaces* 159, 23-29 (2017).
24. Viegas, J. S. R. et al. Nanostructured lipid carrier co-delivering tacrolimus and TNF-α siRNA as an innovate approach to psoriasis. *Drug Deliv. Transl. Res.* 10, 646-660 (2020).
25. Zheng, D. et al. Topical delivery of siRNA-based spherical nucleic acid nanoparticle conjugates for gene regulation. *Proc. Natl. Acad. Sci. U.S.A.* 109, 11975-11980 (2012).
26. Lewandowski, K. T. et al. Topically Delivered Tumor Necrosis Factor-α-Targeted Gene Regulation for Psoriasis. *J. Invest. Dermatol.* 137, 2027-2030 (2017).
27. Nemati, H. et al. Using siRNA-based spherical nucleic acid nanoparticle conjugates for gene regulation in psoriasis. *J. Control. Release* 268, 259-268 (2017).
28. Liu, H. et al. Targeting the IL-17 Receptor Using Liposomal Spherical Nucleic Acids as Topical Therapy for Psoriasis. *J. Invest. Dermatol.* 140, 435-444.e4 (2020).
29. Korkmaz, E. & Falo, L. D. Spherical Nucleic Acids as Emerging Topical Therapeutics: A Focus on Psoriasis. *J. Invest. Dermatol.* 140, 278-281 (2020).
30. Kim, J. Y. et al. Nanoparticle-Assisted Transcutaneous Delivery of a Signal Transducer and Activator of Transcription 3-Inhibiting Peptide Ameliorates Psoriasis-like Skin Inflammation. *ACS Nano* 12, 6904-6916 (2018).
31. Liang, H. et al. Topical nanoparticles interfering with the DNA-LL37 complex to alleviate psoriatic inflammation in mice and monkeys. *Sci. Adv.* 6, 1-15 (2020).
32. Hornos Carneiro, M. F. &. Barbosa, F. Gold nanoparticles: A critical review of therapeutic applications and toxicological aspects. *J. Toxicol. Environ. Heal.—Part B Crit. Rev.* 19, 129-148 (2016).
33. Arvizo, R. R. et al. Inhibition of tumor growth and metastasis by a self-therapeutic nanoparticle. *Proc. Natl. Acad. Sci. U.S.A.* 110, 6700-6705 (2013).
34. Saha, S. et al. Gold Nanoparticle Reprograms Pancreatic Tumor Microenvironment and Inhibits Tumor Growth. *ACS Nano* 10, 10636-10651 (2016).
35, Zhang, Y. et al. Gold nanoparticles inhibit activation of cancer-associated fibroblasts by disrupting communication from tumor and microenvironmental cells. *Bioact. Mater.* 6, 326-332 (2021).
36. Ho, L. W. C. et al. Effect of Alkylation on the Cellular Uptake of Polyethylene Glycol-Coated Gold Nanoparticles. *ACS Nano* 11, 6085-6101 (2017).
37. Flo, L. W. C., Yin, B., Dai, G. & Choi, C. H. J, Effect. of Surface Modification with Hydrocarbyl Groups on the Exocytosis of Nanoparticles. *Biochemistry* (2020) doi: 10, 1021/acs.biochem.0c00631.
38. Lowes, M. A., Suárez-Fariñas, M. & Krueger, J. G. Immunology of psoriasis. *Annu. Rev. Immunol.* 32, 227-255 (2014).
39. van der Fits, L. et al. Imiquimod-Induced Psoriasis-Like Skin Inflammation in Mice Is Mediated via the IL-23/IL-17 Axis. *J. Immunol.* 182, 5836-5845 (2009).
40, Sonavane, G. et al. In vitro permeation of gold nanoparticles through rat skin and rat intestine: Effect of particle size. *Colloids Surfaces B Biointerfaces* 65, 1-10 (2008).
41. Ogawa, E., Sato, Y., Minagawa, A. & Okuyama, R. Pathogenesis of psoriasis and development of treatment. *J. Dermatol.* 45, 264-272 (2018).

42. Sokołowska-Wojdyło, M., Nedoszytko, B., Ruckemann-Dziurdzińska, K., Roszkiewicz, J. & Nowicki, R. J. Chemokines and cytokines network in the pathogenesis of the inflammatory skin diseases: atopic dermatitis, psoriasis and skin mastocytosis. (2014) doi: 10.5114/pdia.2014.40920.
43. Lee, C. H. & Hwang, S. T. Y. Pathophysiology of chemokines and chemokine receptors in dermatological science: A focus on psoriasis and cutaneous T-cell lymphoma. *Dermatologica Sin.* 30, 128-135 (2012).
44. Méhul, B. et al. Noninvasive proteome analysis of psoriatic stratum corneum reflects pathophysiological pathways and is useful for drug profiling. *Br. J. Dermatol.* 177, 470-488 (2017).
45. Jones, R. Antimicrobial peptides in the pathogenesis of psoriasis Shin. *Bone* 23, 1-7 (2014).
46. Zhang, X., Yin, M. & Zhang, L. J. Keratin 6, 16 and 17-Critical Barrier Alarmin Molecules in Skin Wounds and Psoriasis. *Cells* 8, 1-14 (2019).
47. Lessard, J. C. et al. Keratin 16 regulates innate immunity in response to epidermal barrier breach. *Proc. Natl. Acad. Sci. U.S.A.* 110, 19537-19542 (2013).
48. Benhadou, F. et al. Epidermal autonomous VEGFA/Flt1/Ntp1 functions mediate psoriasis-like disease. *Sci. Adv.* 6, (2020).
49. Ruiz-Romeu, E. et al. MCPIP1 RNase Is Aberrantly Distributed in Psoriatic Epidermis and Rapidly Induced by IL-17A. *J. Invest. Dermatol.* 136, 1599-1607 (2016).
50. Rioux, et al. The tissue-engineered human psoriatic skin substitute: A valuable in vitro model to identify genes with altered expression in lesional psoriasis. *Int. J. Mol. Sci.* 19, (2018).
51. Mezentsev, A., Nikolaev, A. & Bruskin, S. Matrix metalloproteinases and their role in psoriasis. *Gene* 540, 1-10 (2014).
52. R. Brown, K., Andrew Lyon, L., P. Fox, A., D. Reiss, B. & Natan, M. Hydroxylamine Seeding of Colloidal Au Nanoparticles. 3. Controlled Formation of Conductive Au Films. *Chem. Mater.* 12, 314-323 (2000).
53. Mühlpfordt, H. The preparation of colloidal gold particles using tannic acid as an additional reducing agent. *Experientia* 38, 1127-1128 (1982).
54. Frens, G. Controlled nucleation for the regulation of the particle size in monodisperse gold suspension. *Nature* 241, 20-22 (1973).
55. Haiss, W., Thanh, N. I. K., Aveyard, J. & Fernig, D. G. Determination of size and concentration of gold nanoparticles from UV-Vis spectra. *Anal. Chem.* 79, 4215-4221 (2007).
56. Chou, L. Y. T. & Chan, W. C. W. Fluorescence-Tagged Gold Nanoparticles for Rapidly Characterizing the Size-Dependent Biodistribution in Tumor Models. *Adv. Healthc. Mater.* 1, 714-721 (2012).
57. Dunnett, C. W. Multiple Comparisons between Several Treatments and a Specified Treatment, in *Linear Statistical Inference* (eds. Caliński, T. & Klonecki, W.) 39-47 (Springer New York, 1985).
58. Giljohann, D. A. et al. Gold nanoparticles for biology and medicine. *Angew. Chemie—Int. Ed.* 49, 3280-3294 (2010).
59. Daniel, M.-C. & Astruc, D. Gold Nanoparticles: Assembly, Supramolecular Chemistry, Quantum-Size-Related Properties, and Applications toward Biology, Catalysis, and Nanotechnology. *Chem. Rev,* 104, 293-346, (2004).
60. Enustun, B. V & Turkevich, J. Coagulation of Colloidal Gold. *J. Am. Chem. Soc.* 85, 3317-3328 (1963).
61. Polte, J. et al. Mechanism of Gold Nanoparticle Formation in the Classical Citrate Synthesis Method Derived from Coupled In Situ XANES and SAXS Evaluation. *J. Am. Chem. Soc.* 132, 1296-1301 (2010).
62. Brown, K. R., Walter, D. G. &. Natal), M. J. Seeding of Colloidal Au Nanoparticle Solutions. 2. Improved Control of Particle Size and Shape. *Chem. Mater.* 12, 306-313 (2000).
63. Worthen, A. J., Tran, V., Cornell, K. A., Truskett, T. M. & Johnston, K. P. Steric stabilization of nanoparticles with grafted low molecular weight ligands in highly concentrated brines including divalent ions. *Soft Matter* 12, 2025-2039 (2016).
64. Yamashita, S. Heat-induced antigen retrieval: Mechanisms and application to histochemistry. *Prog. Histochem. Cytochem.* 41, 141-200 (2007).
65. Gilleron, J. et al. Image-based analysis of lipid nanoparticle-mediated siRNA delivery, intracellular trafficking and endosomal escape. *Nat. Biotechnol.* 31, 638-646 (2013).
66. McGrath, J. A. & Uitto, J. Anatomy and organization of human skin. *Rook's Textbook of Dermatology* 1-53 (2010) doi:https://doi.org/10.1002/9781444317633.ch3
67. Larese Filon, F., Mauro, M., Adami, G., Bovenzi, M. & Crosera, M. Nanoparticles skin absorption: New aspects for a safety profile evaluation. *Regul. Toxicol. Pharmacol.* 72, 310-322 (2015).
68. Liu, Y. et al. Dopamine Receptor-Mediated Binding and Cellular Uptake of Polydopamine-Coated Nanoparticles, *ACS Nano* 15, 13871-13890 (2021).
69. Bos, J. D. & Meinardi, M. M. H. M. The 500 Dalton rule for the skin penetration of chemical compounds and drugs. *Exp. Dermatol.* 9, 165-169 (2000).
70. Vogt, A. et al. Nanocarriers for drug delivery into and through the skin—Do existing technologies match clinical challenges? *J. Control. Release* 242, 3-15 (2016).
71. Hornos Carneiro, M. F. & Barbosa, F. Gold nanoparticles: A critical review of therapeutic applications and toxicological aspects. *J. Toxicol. Environ. Heal.—Part B Crit. Rev.* 19, 129-148 (2016).
72. Zhang, Y. et al. Gold nanoparticles inhibit activation of cancer-associated fibroblasts by disrupting communication from tumor and microenvironmental cells. *Bioact. Mater.* 6, 326-332 (2021).
73. Crisan, D. et al. Topical silver and gold nanoparticles complexed with *Cornus mas* suppress inflammation in human psoriasis plaques by inhibiting NT-κB activity. *Exp. Dermatol.* 27, 1166-1169 (2018).
74. Yang, H. et al. Mechanism for the Cellular Uptake of Targeted Gold Nanorods of Defined Aspect Ratios. *Small* 12, 5178-5189 (2016).
75. Chen, Z. et al. Specific Delivery of Oligonucleotides to the Cell Nucleus via Gentle Compression and Attachment of Polythymidine. *ACS App. Mater. Interfaces* 11, 27624-27640 (2019).
76. Hurst, S. J., Lytton-Jean, A. K. R. & Mirkin, C. A. Maximizing DNA loading on a range of gold nanoparticle sizes. *Anal. Chem.* 78, 8313-8318 (2006).
77. Dunnett, C. W. Multiple comparisons between several treatments and a specified treatment, in *Linear Statistical Interference* (eds. Caliński, T. & Klonecki, W.) 39-47 (Springer New York, 1985).

78. Rijzewijk, J. J., Van Erp, P. E. & Bauer, F. W. Two binding sites for Ki67 related to quiescent and cycling cells in human epidermis. *Acta Derm. Venereol.* 69, 512--515 (1989).
79. Veale, D. J., Barnes, L., Rogers, S. &. FitzGerald, O. Immunohistochemical markers for arthritis in psoriasis. *Ann. Rheum. Dis.* 53, 450-454 (1994).
80. Lowes, M. A., Bowcock, A. M. & Krueger, J. G. Pathogenesis and therapy of psoriasis. *Nature* 445, 866-873 (2007).
81. Vasseur, P. et al. Liver fibrosis is associated with cutaneous inflammation in the imiquimod-induced murine model of psoriasiform dermatitis. *Br. J. Dermatol* 179, 101-109 (2018).
82. Liang, H. et al. Topical nanoparticles interfering with the DNA-LL37 complex to alleviate psoriatic inflammation in mice and monkeys. *Sci. Adv.* 6, 1-15 (2020).
83. Kragballe, K. et al. A 52-week randomized safety study of a calcipotriol/betamethasone dipropionate two-compound product (Dovobet®/Daivobet®/Tacionex®) in the treatment of psoriasis vulgaris. *Br. J. Dermatol.* 154, 1155-1160 (2006).
84. Camisa, C. & Garofola, C. 45—Topical Corticosteroids. in (ed. Wolverton, S. E. B. T.-C. D. D. T. (Fourth E.) 511-527.e6 (Elsevier. 2021). doi:https://doi.org/10.1016/B978-0-323-61211-1.00045-0.
85, Stenn, K. S., Paus, R., Dutton, T. & Sarba, B. Glucocorticoid Effect on Hair Growth Initiation: A Reconsideration. *Skin Pharmacol. Physiol.* 6, 125-134 (1993).
86. Higby, G. J. Gold in medicine—A review of its use in the west before 1900. *Gold Bull.* 15, 130-140 (1982).
87, Champion, G. D., Graham, G. G. & Ziegler, J. B. The gold complexes. *Baillieres. Clin. Rheumatol,* 4, 491-534 (1990).
88. Kean, W. F. & Kean, I. R. L. Clinical pharmacology of gold. *Inflammopharmacology* 16, 112-125 (2008).
89. Mukherjee, P. et al. Antiangiogenic properties of gold nanoparticles. *Clin. Cancer Res.* 11, 3530-3534 (2005).
90. Dimartino, M. J. R. Walz, D. T. Inhibition of lysosomal enzyme release from rat leukocytes by auranofin. A new chrysotherapeutic agent. *Inflammation* 2, 131-142 (1977).
91. Stone, K. J., Mather, S. J. & Gibson, P. P. Selective inhibition of prostaglandin biosynthesis by gold salts and phenylbutazone. *Prostaglandins* 10, 241-251 (1975).
92. Goldberg, R. L., Parrott, D. P., Kaplan, S. R. & Fuller, G. C. Effect of gold sodium thiomalate on proliferation of human rheumatoid synovial cells and on collagen synthesis in tissue culture. *Biochem. Pharmacol.* 29, 869-876 (1980).
93. Sumbayev, V. V et al. Gold Nanoparticles Downregulate Interleukin-1β-Induced Pro Inflammatory Responses. *Small* 9, 472-477 (2013).
94. Koch, C. M. et al. A beginner's guide to analysis of RNA sequencing data. *Am. J. Respir. Cell Mol. Biol.* 59, 145-157 (2018).
95. Nagalakshmi, U. et al. The Transcriptional Landscape of the Yeast Genome Defined by RNA Sequencing. *Science (80-.).* 320, 1344 LP-1349 (2008).
96. Schuck, S. & Simons, K. Polarized sorting in epithelial cells: raft clustering and the biogenesis of the apical membrane. *J. Cell Sci.* 117, 5955-5964 (2004).
97. Ho, L. W. C., Liu, Y., Han, R., Bai, Q. & Choi, C. H. J. Nano-Cell Interactions of Non-Cationic Bionanomaterials. *Acc. Chem. Res.* 52, 1519-1530 (2019).

We claim:

1. A composition for transdermal delivery of nanoparticles and entry into skin cells, the composition comprising:
   a core comprising at least one gold nanoparticle;
   a shell comprising a plurality of polyethylene glycol (PEG) strands conjugated to the core; and
   a plurality of alkyl functional groups conjugated to the shell of PEG strands, the PEG strands having a molecular weight of about 1000 Da;
   wherein chain loading of the plurality of alkyl functional groups is in a range greater than 0 mol % and smaller than or equal to 50 mol %,
   wherein an overall diameter of the composition is smaller than 15 nm and greater than 0.0 nm, and
   wherein a density of the plurality of PEG strands attached to outer surfaces of the core in terms of number of PEG strands per nm² is one of following values: 5.73±0.03, 5.56±0.09, 5.07±0.14, 5.59±0.13, 5.12±0.22, 5.6±0.1, 5.14±0.15, 5.44±0.32, 4.87±0.11, 6.07±0.62, 4.92±0.08, 3.98±0.88, or 3.36±1.24.

2. The composition of claim 1, wherein chain lengths of the plurality of alkyl functional groups are in a range of 1-24 carbons.

3. The composition of claim 1, wherein the chain loading of the plurality of alkyl functional groups is about 30 mol %.

4. The composition of claim 1, wherein a diameter of the core is in a range of 1-10 nm.

5. The composition of claim 4, wherein the diameter of the core is about 3 nm.

6. The composition of claim 3, wherein the 30 mol % chains loading is octadecyl group loading.

7. The composition of claim 1, wherein the composition is able to enter into keratinocytes.

* * * * *